US008307201B2

(12) United States Patent
Wakita et al.

(10) Patent No.: US 8,307,201 B2
(45) Date of Patent: Nov. 6, 2012

(54) INFORMATION PROCESSING SYSTEM, SERVICE PROVIDING APPARATUS AND METHOD, INFORMATION PROCESSING APPARATUS AND METHOD, RECORDING MEDIUM, AND PROGRAM

(75) Inventors: Yoshihiro Wakita, Tokyo (JP); Kenichi Takemura, Kanagawa (JP)

(73) Assignee: Sony Corporation, Tokyo (JP)

( * ) Notice: Subject to any disclaimer, the term of this patent is extended or adjusted under 35 U.S.C. 154(b) by 862 days.

(21) Appl. No.: 10/503,746

(22) PCT Filed: Oct. 27, 2003

(86) PCT No.: PCT/JP03/13681
§ 371 (c)(1),
(2), (4) Date: May 16, 2005

(87) PCT Pub. No.: WO2004/053703
PCT Pub. Date: Jun. 24, 2004

(65) Prior Publication Data
US 2005/0210395 A1 Sep. 22, 2005

(30) Foreign Application Priority Data

Dec. 12, 2002 (JP) .................................. 2002-361135

(51) Int. Cl.
*G06F 21/00* (2006.01)
*G06F 19/26* (2011.01)
(52) U.S. Cl. ...................................... 713/153; 715/753
(58) Field of Classification Search .................. 713/153; 715/757
See application file for complete search history.

(56) References Cited

U.S. PATENT DOCUMENTS 6,183,367 B1 * 2/2001 Kaji et al. ........................ 463/42
(Continued)

FOREIGN PATENT DOCUMENTS

EP         0 843 168 A2    5/1998
(Continued)

OTHER PUBLICATIONS

Mitre Corporation: "Collaborative Virtual Workspace, CVW User's Guide" Internet Article, [Online] Nov. 2000, XP002392507 Retrieved from the Internet: URL:http://cvw.sourceforge.net/cvw/info/docs32/userguide/> [retrieved on Jul. 27, 2006].

(Continued)

*Primary Examiner* — Gilberto Barron, Jr.
*Assistant Examiner* — Devin Almeida
(74) *Attorney, Agent, or Firm* — Oblon, Spivak, McClelland, Maier & Neustadt, L.L.P.

(57) ABSTRACT

The present invention is related to an information processing system, a service providing apparatus and method, an information processing apparatus and method, a recording medium, and a program that are intended to simultaneously share content data in private virtual spaces. A home server 11 is arranged at user A's home. A portable user terminal 1 and so on can access the home server 11. A virtual home DB server 21 supplies the layout information about virtual home and so on to the portable user terminal 1. An authentication server 22 executes authentication processing on the portable user terminal 1. An inter-user-terminal communication relay server 23 executes the processing associated with the communication between a plurality of users. A user information holding server 24 stores the personal data of each user and the content data, which are shared with other users. The present invention is applicable to programs realizing realtime communication by use of the Internet.

29 Claims, 112 Drawing Sheets

U.S. PATENT DOCUMENTS

| | | | |
|---|---|---|---|
| 6,512,520 B1* | 1/2003 | Naka et al. | 345/473 |
| 6,678,215 B1* | 1/2004 | Treyz et al. | 368/10 |
| 2002/0080173 A1* | 6/2002 | Tagami et al. | 345/753 |
| 2002/0128067 A1* | 9/2002 | Blanco | 463/43 |

FOREIGN PATENT DOCUMENTS

| | | |
|---|---|---|
| JP | 11-96402 A | 4/1999 |
| JP | 2001-154966 A | 6/2001 |
| JP | 2001-229282 A | 8/2001 |
| JP | 2002-44765 A | 2/2002 |
| JP | 2002-108750 A | 4/2002 |
| JP | 2002-132618 A | 5/2002 |
| JP | 2002-140278 A | 5/2002 |
| JP | 2002-312612 A | 10/2002 |
| WO | WO-99/65192 | 12/1999 |

OTHER PUBLICATIONS

General Dynamics Electronic Systems: "Enabling Secure Collaboration" Internet Article, [Online] Sep. 1, 2000, XP002392508 Retrieved from the Internet: URL:http//collaboration.mitre.org/secure/gendy.rtf> [retrieved on Jul. 27, 2006] pp. 6-11.

eRoom Technology, Inc.: "eRoom Real time meetings" Internet Article, [Online] 2001, XP002392509 Retrieved from the Internet: URL:http://sccmecomdmz.sccm.org/eRoomHelp/realtime.htm> [retrieved on Jul. 27, 2006].

Lea R et al: "Networking Home Entertainment Devices With HAVI" Computer, IEEE Service Center, Los Alamitos, CA, US, vol. 33, No. 9, Sep. 1, 2000, pp. 35-43, XP000987591 ISSN: 0018-9162.

Hayes J: "Policy-based authentication and authorization: secure access to the network infrastructure" Computer Security Applications, 2000. ACSAC '00. 16th Annual Conference New Orleans, LA, USA Dec. 11-15, 2000, Los Alamitos, CA, USA, IEEE Comput. Soc, US, Dec. 11, 2000, pp. 328-333, XP010529830 ISBN: 0-7695-0859-6.

* cited by examiner

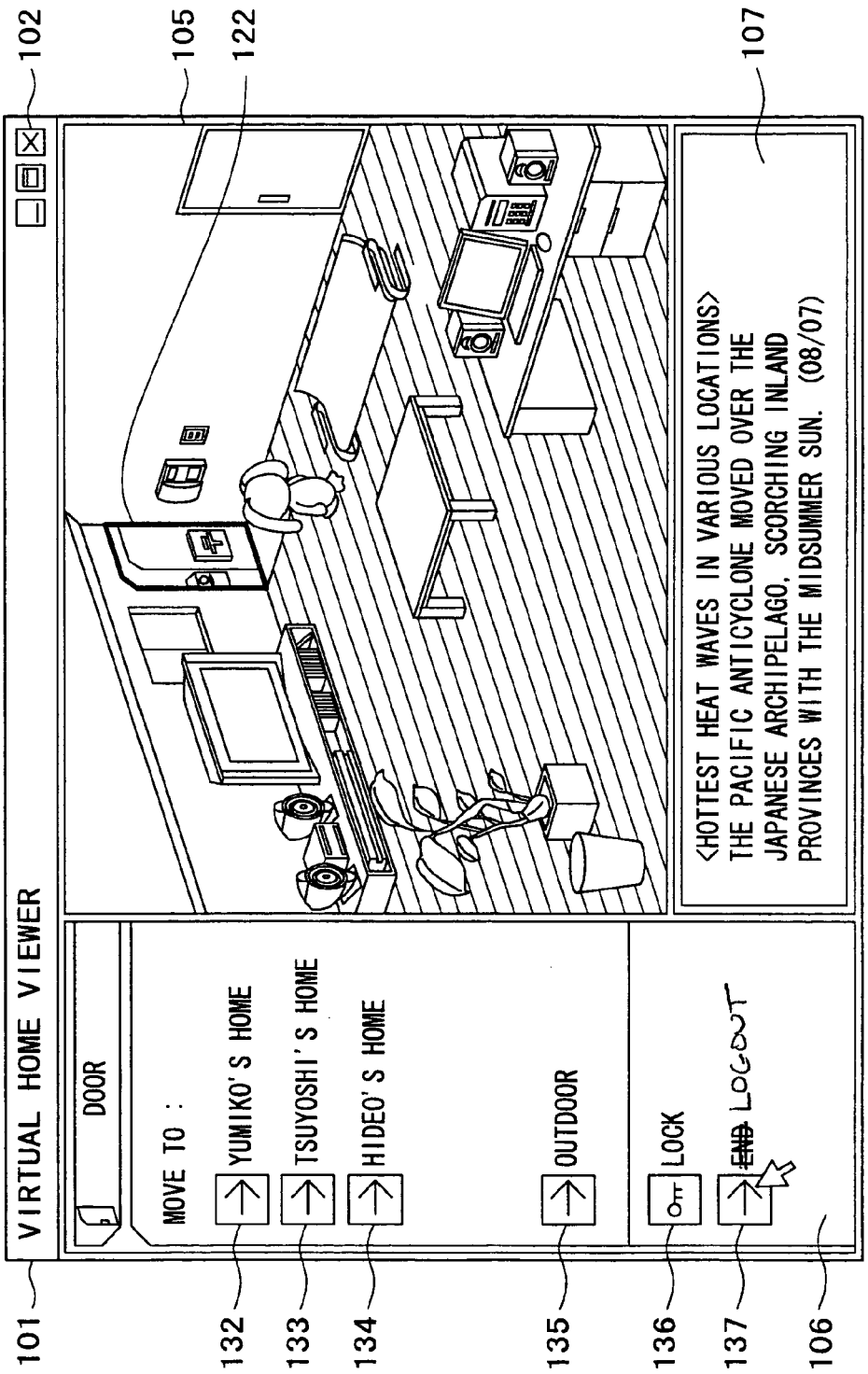

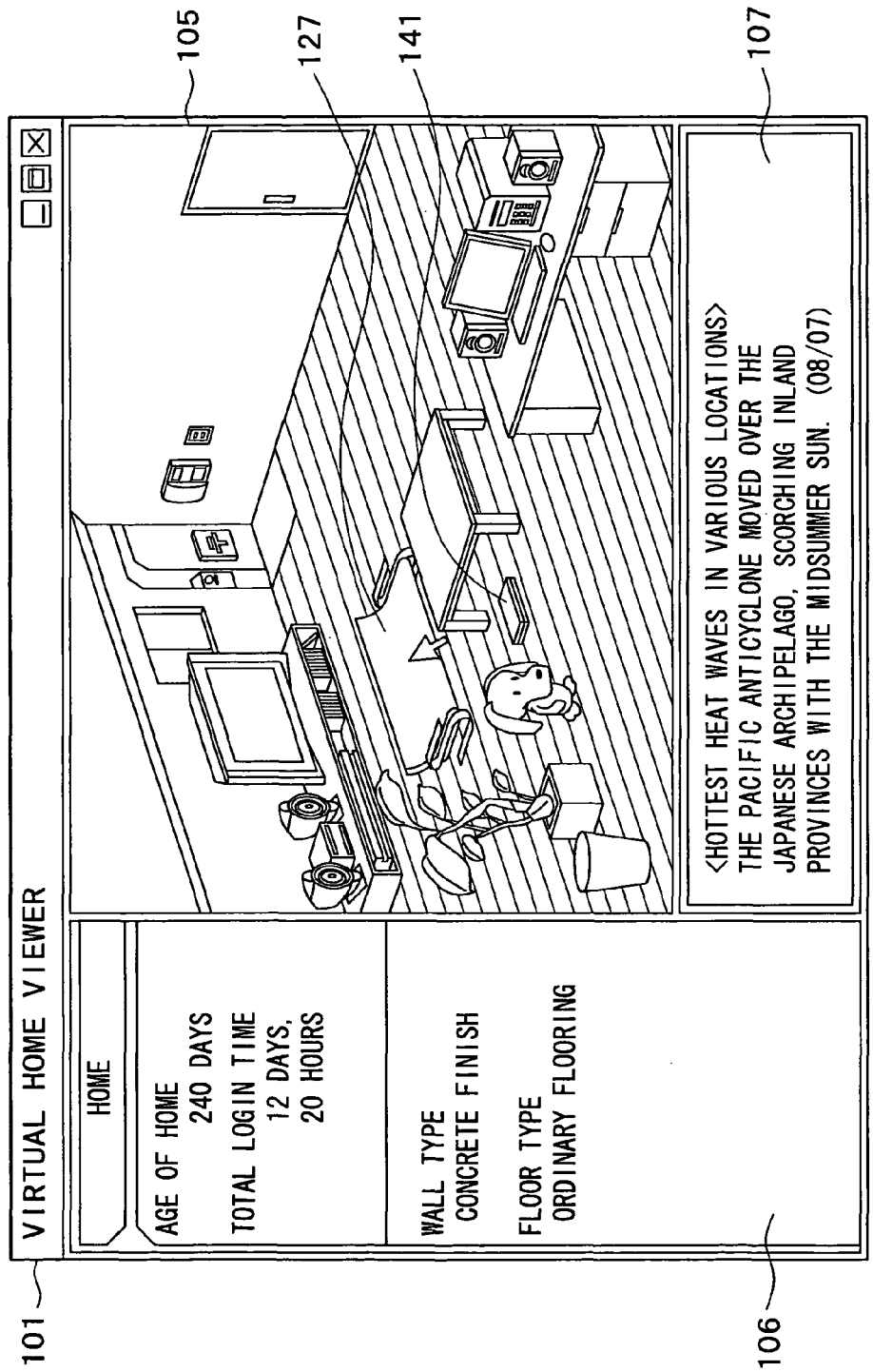

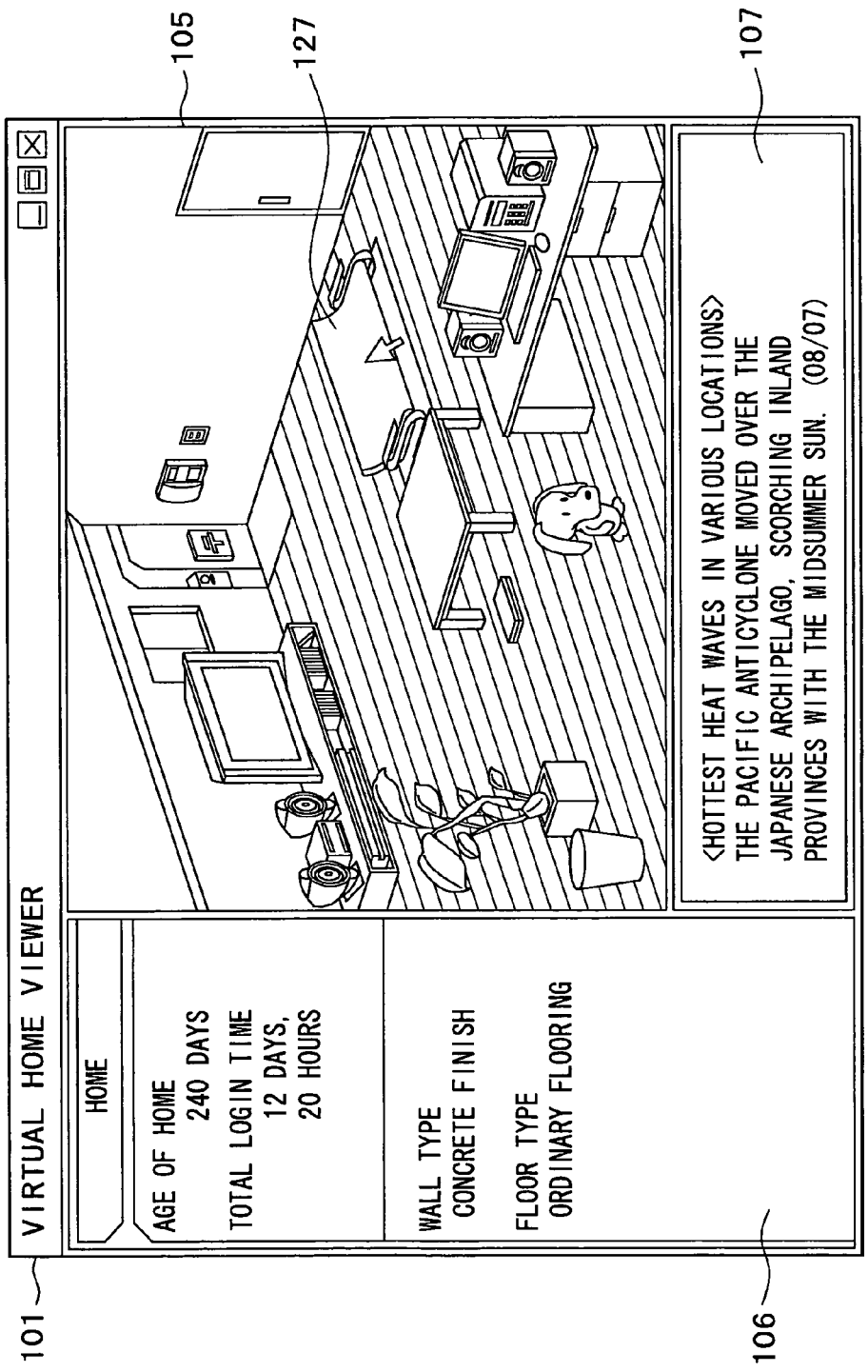

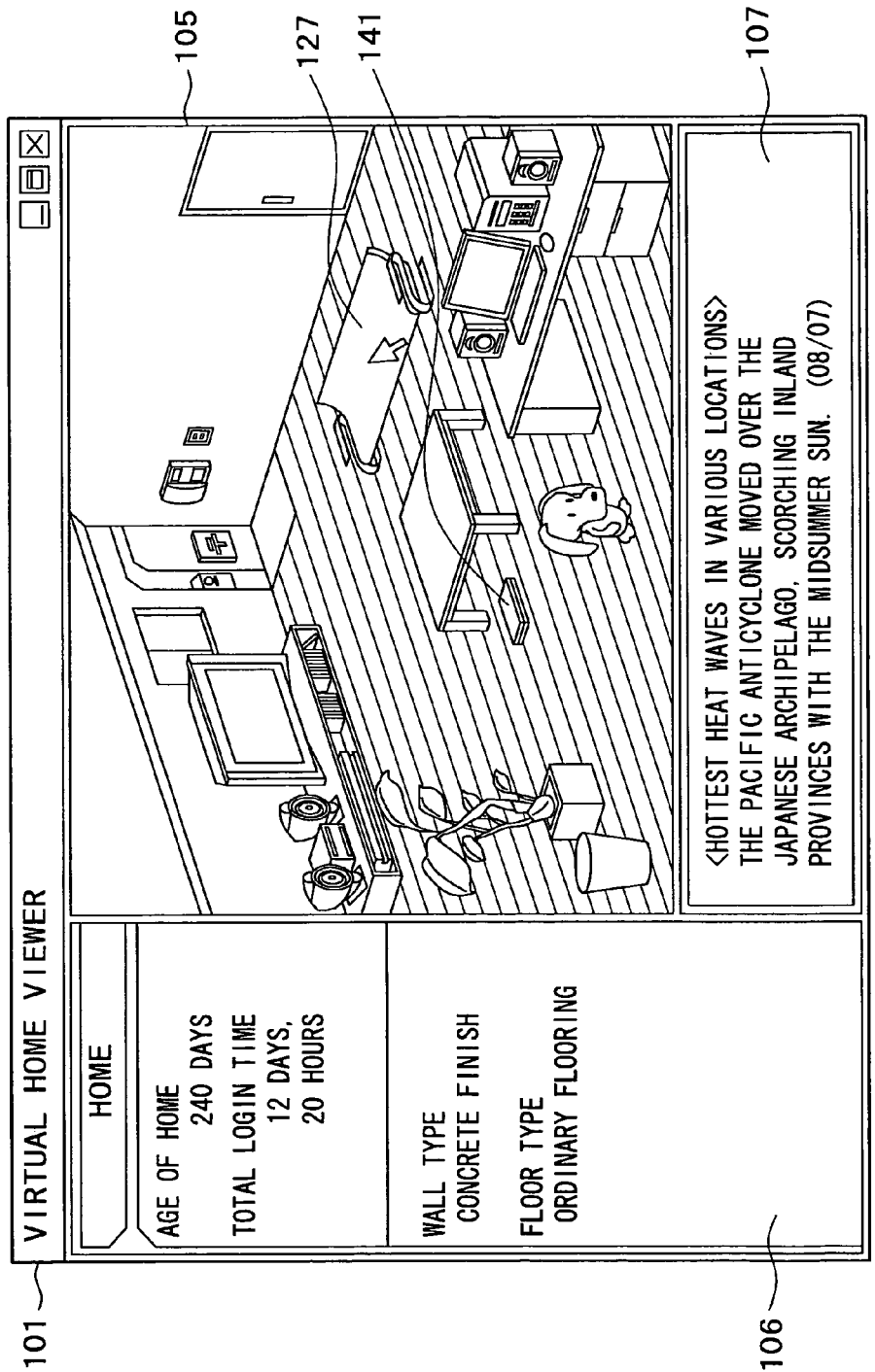

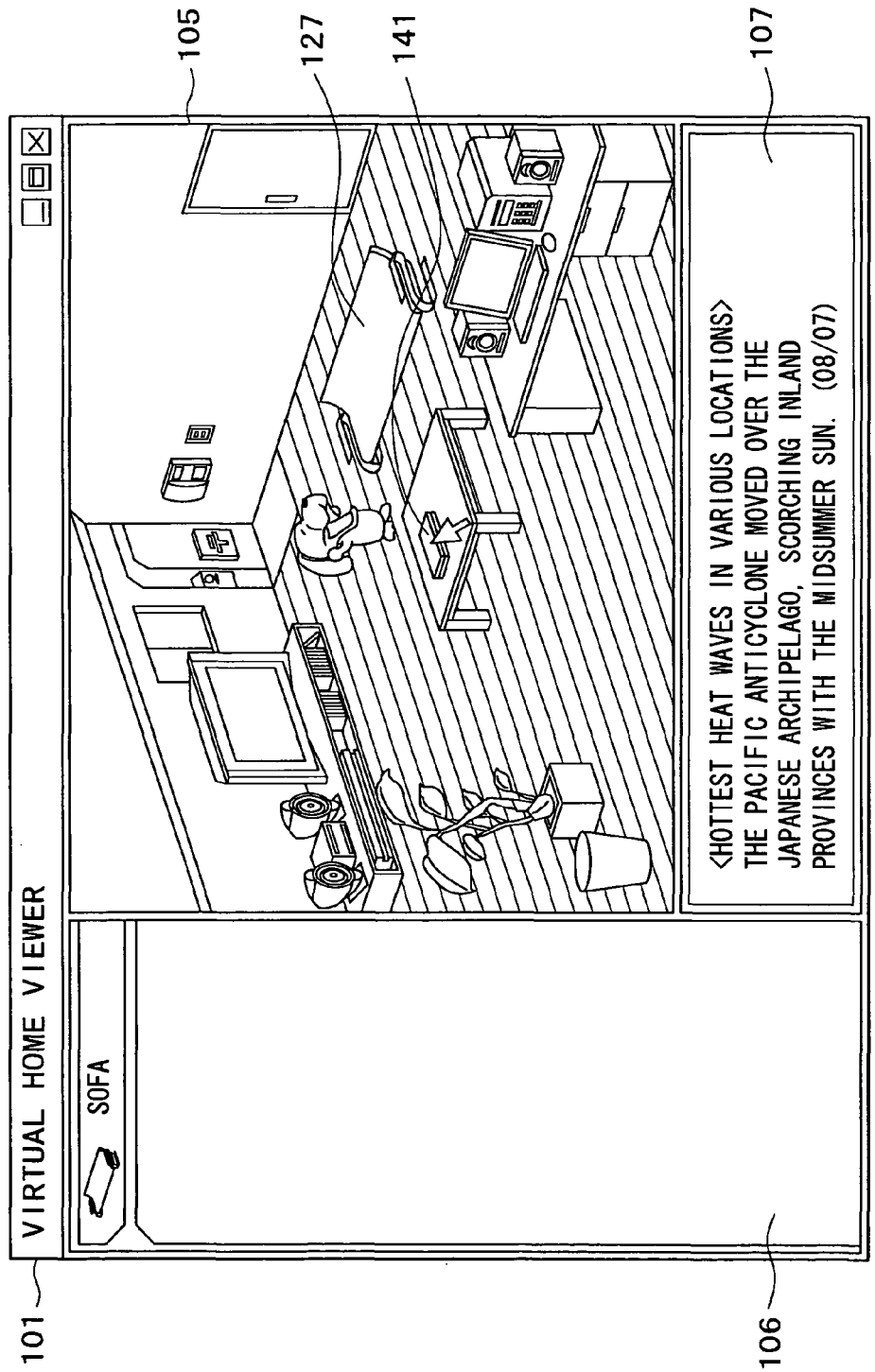

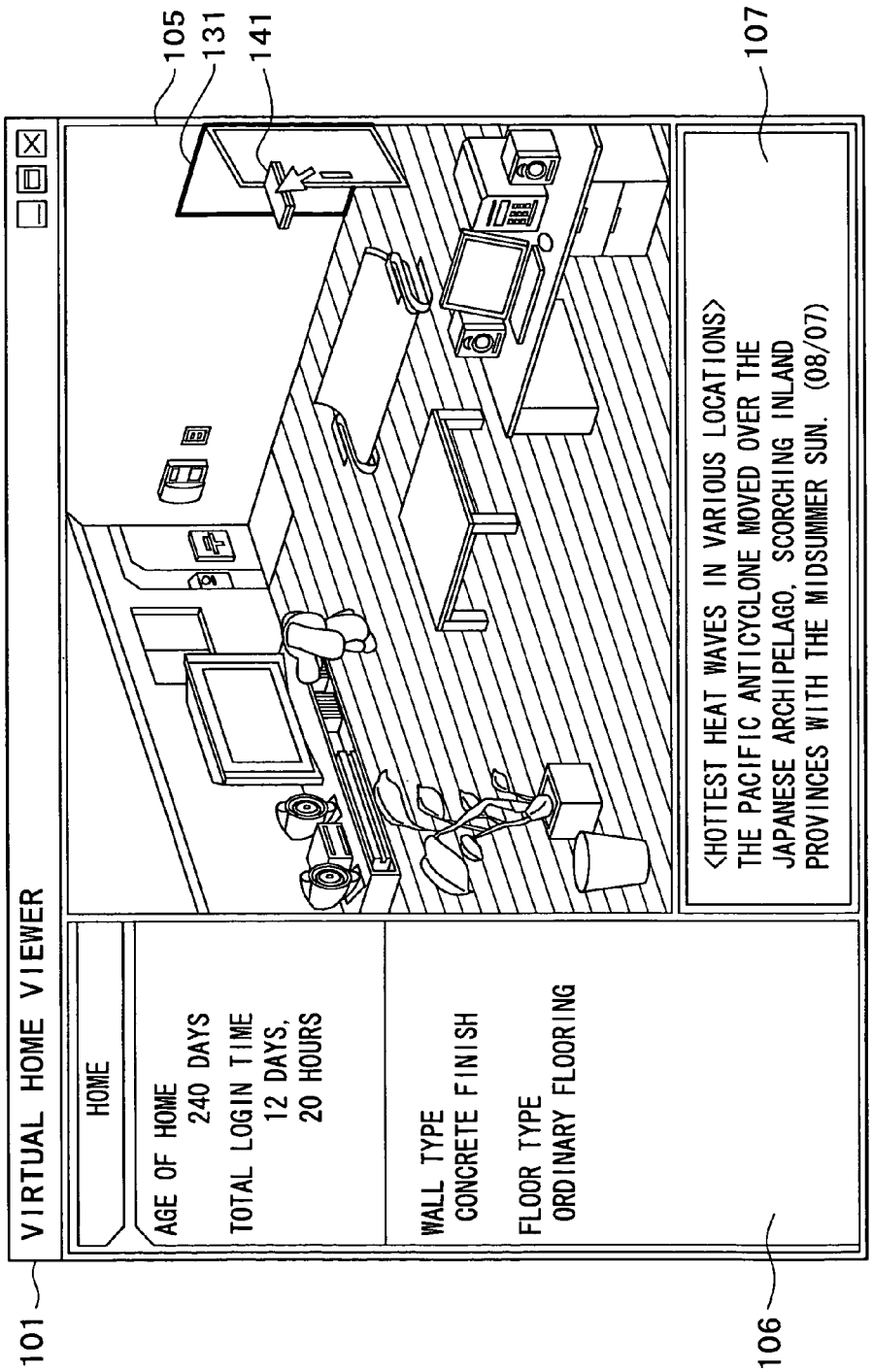

FIG. 44

INFORMATION PROCESSING SYSTEM, SERVICE PROVIDING APPARATUS AND METHOD, INFORMATION PROCESSING APPARATUS AND METHOD, RECORDING MEDIUM, AND PROGRAM

TECHNICAL FIELD

The present invention relates generally to an information processing system, a service providing apparatus and method, an information processing apparatus and method, a recording medium, and a program and, more particularly, to an information processing system, a service providing apparatus and method, an information processing apparatus and method, a recording medium, and a program that are suitably for use in remotely controlling real devices by operating icons in a virtual space.

BACKGROUND ART

With the popularization of the Internet, technologies have been under development to realize the control of electrical household appliances connected to a home network via the Internet (refer to Japanese Patent Laid-open No. 2002-44765, for example) and the sharing of the same content among a plurality of terminal devices (personal computers and so on) connected to the Internet, for example.

For the programs for remotely controlling electrical household appliances by using personal computers via a network, UPnP, Jini, and HAVi are known for example. These programs are middleware, and the user interface, which is operated by users for controlling their electrical household appliances, depends on other software programs using the middleware such as UPnP.

Methods of sharing content through the Internet include one in which content is communicated in file data based on FTP and HTTP and another in which content is communicated in stream data based on RTSP and RTP. These methods can restrict the destinations of content transfer by means of the authentication based on personal ID and password before content is transferred.

Technologies for authenticating electrical household appliances connected to a home network include 5C protection being applied to the authentication between the digital BS broadcast receiver and the digital video recorder, for example.

Incidentally, a method is disclosed in Japanese Patent Laid-open No. 2001-154966 for example in which a plurality of users simultaneously participate in a virtual space built on a computer network represented by the Internet, thereby realizing realtime communication.

The related-art software programs for realizing user interfaces for the remote control of electrical household appliances have only the functions of controlling electrical household appliances, namely, practicality, in many cases. Therefore, these related-art software programs present a problem that they cannot satisfy the needs of users who demand not only practicality but also amusement on the software programs of their personal computers.

The related-art technologies of forming communication in a virtual spaces also presents a problem of the lack of close communication between users because the forming of communication is achieved by users' entering public virtual spaces.

The virtual spaces realized by related-art technologies present a problem that the content provided by a participant of one of the virtual spaces cannot be shared realtime by other participants.

However, if the related-art methods in which content is shared via the Internet by means of FTP, HTTP, RTSP, and RTP are applied to the virtual spaces realized by related-art technologies, the content provided by a participant of one of the virtual spaces can be shared by other participants; but, in this case, if the personal ID and password for authentication are made public, a problem occurs in which copyrighted material may be distributed as content in an unauthorized manner.

DISCLOSURE OF INVENTION

In view of the foregoing, an object of the present invention is to control the electrical household appliances connected to a home network by use of the entertainment-oriented user interface called a virtual space and to achieve deeper communication between users in which a private virtual space is shared only by restricted member users to simultaneously share content data.

According to an aspect of the present invention, there is provided an information processing system including authentication means for authenticating the connection of the information processing apparatus, which has accessed via the first network, in the basis of identification information sent from the information processing apparatus; providing means for providing a private virtual space service to the information processing apparatus; storage means for storing a group to which a user of the information processing apparatus belongs; sharing means for making an information processing apparatus of an other user among users who belong to the same group of the user, the other user being permitted by the user, share the private virtual space service being provided to the information processing apparatus of the user; and common-use means for providing common use of content data among the information processing apparatuses of a plurality of users who share the private virtual space service. The information processing apparatus includes transmission means for transmitting the identification information by accessing the service providing apparatus via the first network; display control means for controlling the display of a private virtual space provided from the service providing apparatus; permission means for permitting a request for sharing from an other user of the private virtual space provided by the service providing apparatus; and instruction means for specifying the reproduction of the content data shared among the information processing apparatuses of the plurality of users who share the private virtual space service.

The above-mentioned identification information includes a personal ID and password of the user and a device ID and a password of the information processing apparatus.

The above-mentioned content data are held in an electronic device connected to a second network, which is private and managed by the user.

The above-mentioned common-use means acquires the content data from the electronic device via the first and second networks in accordance with an instruction by the information processing apparatus.

The above-mentioned information processing apparatus further includes acquisition means for acquiring the content data from the electronic device via the first and second networks.

The above-mentioned content data are audio data, video data, or program data.

The above-mentioned information processing apparatus further includes control means for controlling the electronic device connected to the second network in accordance with an operation performed by the user on an icon arranged in the virtual space, the icon corresponding to the electronic device.

According to an aspect of the present invention, there is provided a service providing apparatus including authentication means for authenticating the connection of the information processing apparatus, which has accessed via the network, in the basis of identification information sent from the information processing apparatus; providing means for providing the private virtual space service to the information processing apparatus; storage means for storing a group to which a user of the information processing apparatus belongs; sharing means for making an information processing apparatus of an other user among users who belong to the same group of the user, the other user being permitted by the user, share the private virtual space service being provided to the information processing apparatus of the user; and common-use means for providing common use of content data among the information processing apparatuses of a plurality of users who share the private virtual space service.

According to an aspect of the present invention, there is provided a service providing method including the steps of authenticating the connection of the information processing apparatus, which has accessed via the network, in the basis of identification information sent from the information processing apparatus; providing the private virtual space service to the information processing apparatus; storing a group to which a user of the information processing apparatus belongs; making an information processing apparatus of an other user among users who belong to the same group of the user, the other user being permitted by the user, share the private virtual space service being provided to the information processing apparatus of the user; and providing common use of content data among the information processing apparatuses of a plurality of users who share the private virtual space service.

According to an aspect of the present invention, there is provided a program of a first recording medium that is a computer including the steps of authenticating the connection of the information processing apparatus, which has accessed via the network, in the basis of identification information sent from the information processing apparatus; providing the private virtual space service to the information processing apparatus; storing a group to which a user of the information processing apparatus belongs; making an information processing apparatus of an other user among users who belong to the same group of the user, the other user being permitted by the user, share the private virtual space service being provided to the information processing apparatus of the user; and providing common use of content data among the information processing apparatuses of a plurality of users who share the private virtual space service.

According to an aspect of the present invention, there is provided a first program having a computer execute the steps of authenticating the connection of the information processing apparatus, which has accessed via the first network, in the basis of identification information sent from the information processing apparatus; providing the private virtual space service to the information processing apparatus; storing a group to which a user of the information processing apparatus belongs; making an information processing apparatus of an other user among users who belong to the same group of the user, the other user being permitted by the user, share the private virtual space service being provided to the information processing apparatus of the user; and providing common use of content data among the information processing apparatuses of a plurality of users who share the private virtual space service.

The above-mentioned identification information includes a personal ID and password of the user and a device ID and a password of the information processing apparatus.

The above-mentioned content data are held in an electronic device connected to a second network, which is private and managed by the user.

The processing of the above-mentioned common-use step acquires the content data from the electronic device via the first and second networks in accordance with an instruction by the information processing apparatus.

The above-mentioned content data are audio data, video data, or program data.

According to an aspect of the present invention, there is provided an information processing apparatus including transmission means for transmitting the identification information by accessing the service providing apparatus via the network; display control means for controlling the display of a private virtual space provided from the service providing apparatus; permission means for permitting a request for sharing from an other user of the private virtual space provided by the service providing apparatus; and instruction means for specifying the reproduction of the content data shared among the information processing apparatuses of a plurality of users who share the private virtual space service.

According to an aspect of the present invention, there is provided an information processing method including the steps of transmitting the identification information by accessing the service providing apparatus via the network; controlling the display of a private virtual space provided from the service providing apparatus; permitting a request for sharing from an other user of the private virtual space provided by the service providing apparatus; and specifying the reproduction of the content data shared among terminal apparatuses of a plurality of users who share the private virtual space service.

According to an aspect of the present invention, there is provided a program of a second recording medium including the steps of transmitting the identification information by accessing the service providing apparatus via the network; controlling the display of a private virtual space provided from the service providing apparatus; permitting a request for sharing from an other user of the private virtual space provided by the service providing apparatus; and specifying the reproduction of the content data shared among terminal apparatuses of a plurality of users who share the private virtual space service.

According to an aspect of the present invention, there is provided a second program having a computer execute the steps of transmitting the identification information by accessing the service providing apparatus via the first network; controlling the display of a private virtual space provided from the service providing apparatus; permitting a request for sharing from an other user of the private virtual space provided by the service providing apparatus; and specifying the reproduction of the content data shared among terminal apparatuses of a plurality of users who share the private virtual space service.

The above-mentioned identification information includes a personal ID and password of the user and a device ID and a password of the terminal apparatus.

The above-mentioned content data are held in an electronic device connected to a second network, which is private and managed by the user.

The second program further includes the step of acquiring the content data from the electronic device via the first and second networks.

The above-mentioned content data are audio data, video data, or program data.

The second program further includes the step of controlling the electronic device connected to the second network in accordance with an operation performed by the user on an icon arranged in the virtual space, the icon corresponding to the electronic device.

In the information processing system according to the invention, the service providing apparatus authenticates the connection of the information processing apparatus, which has accessed via the first network, and supplies a private virtual space service to the accessing information processing apparatus. A private virtual space, which is being provided to an information processing apparatus of one user, is shared by an other user who was permitted by the former user, the latter user belonging to a same group to which the former user belongs. Content data are commonly used between the information processing apparatuses of users who share a private virtual space service. On the other hand, the information processing apparatus permits a request by an other user for the sharing of a private virtual space provided by the service providing apparatus and specifies the reproduction of content data shared between the information processing apparatuses of a plurality of users who share the private virtual space service.

In the service providing apparatus and method and programs according to the invention, the service providing apparatus authenticates the information processing apparatus, which has accessed, and provides a private virtual space service. A private virtual space, which is being provided to an information processing apparatus of one user, is shared by an other user who was permitted by the former user, the latter user belonging to a same group to which the former user belongs. Content data are commonly used between the information processing apparatuses of users who share a private virtual space service.

In the information processing apparatus and method and programs according to the invention, the information processing apparatus permits a request by an other user for the sharing of a private virtual space provided by the service providing apparatus and specifies the reproduction of content data shared between the information processing apparatuses of a plurality of users who share the private virtual space service.

BRIEF DESCRIPTION OF DRAWINGS

FIG. 15 illustrates an exemplary display upon selection of a door icon.

FIG. 16 illustrates the movement of an icon.

FIG. 17 illustrates the movement of another icon.

FIG. 18 illustrates the change in the orientation of an icon.

FIG. 19 illustrates an operation for arranging an icon by superimposing the icon on another icon.

FIG. 21 illustrates the storage of an icon in a closet.

FIG. 44 illustrates an exemplary display upon selection of a TV icon.

BEST MODE FOR CARRYING OUT THE INVENTION

The following describes a virtual space remote control system according to the present invention by way of example with reference to the accompanying drawings. This virtual space remote control system allows each user to display own virtual space (hereafter also referred to as a virtual home or a virtual room) on a portable user terminal as a CG (Computer Graphics) image and allows each user to operate a computer icon and a television set icon for example arranged in the virtual home, thereby controlling various electronic equipment such as a personal computer connected to a home network (hereafter referred to as a PC), a television set (hereafter referred to as a TV set), audio equipment, and the like that exist in an user's real house.

The virtual space remote control system also allows to visit the virtual home of an other user, exchange messages with other users in realtime, and share content data (audio data such as music, video data such as still picture or moving picture, or program data) among multiple users who share same virtual home.

In what follows, the processing in which a user operates the screen of the virtual home displayed on the portable user terminal or the like to control the PC existing in the user's real home without having any interaction with any other users is referred to as standalone processing.

On the other hand, the processing in which a plurality of users interact each other like visiting an other user's home for example is referred to as communication processing.

Figure 1:
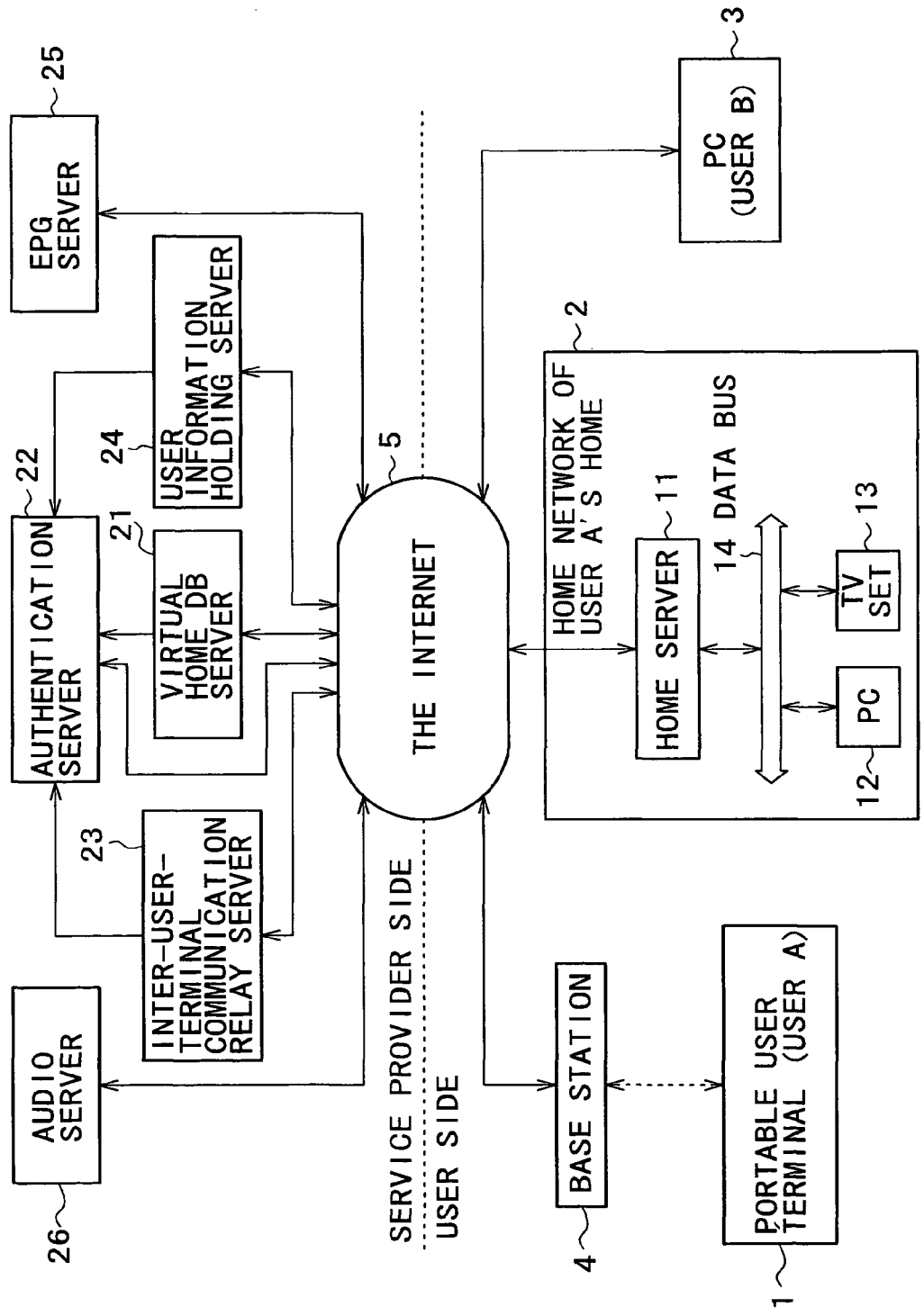
FIG. 1 is a schematic diagram illustrating an exemplary configuration of a virtual space remote control operation system to which the present invention is applied.

Now, referring to FIG. 1, there is shown an exemplary configuration of the virtual space remote control system. This system is divided into the equipment on the user side and the equipment on the service provider side.

First, the equipment on the user side will be described. For example, a portable user terminal 1 includes a PC, a PDA (Personal Digital Assistant), or a mobile telephone and executes a virtual home viewer program 51 (FIG. 2) by a CPU 31 (FIG. 2) to connect to desired servers and the like via a base station 4 and the Internet 5. Then, the terminal 1 realizes the following operation.

The portable user terminal 1, which is used by user A, connects to a virtual home DB server 21 for example on the service provider side via the base station 4 and the Internet 5 to get the information about the virtual home of user A and displays its image, that is the virtual home, on the screen. This image of the virtual home shows a PC icon and a TV set icon corresponding to a PC 12 and a TV set 13, which exist in the real house of user A (hereafter referred to as user A's home).

In response to a user operation performed on the PC icon or the TV set icon in the virtual home displayed on the screen, the portable user terminal 1 connects to a home server 11 constituting a home network 2 of user A's home via the base station 4 and the Internet 5, thereby sending control signals for controlling the PC 12 and the TV set 13, which are connected to the home network 2, after the authentication is performed.

Further, the portable user terminal 1 can acquire the content data stored in the PC 12 by controlling the home server 11 via the Internet 5.

User A's home has the home network 2 being arranged around the home server 11.

The home server 11 has a global IP address. Therefore, the portable user terminal 1 or the like can access the home server 11 via the Internet 5. With the home server 11, the personal ID and password unique to user A and the device ID and password unique to a user terminal (in this example, the portable user terminal 1) of user A are registered. When an access occurs through the Internet 5, authentication processing is executed. To be more specific, the home server 11 permits the access from the user terminal 1 via the Internet 5 only when user A uses the user terminal 1 registered with device ID and password in advance and has entered the correct personal ID and password.

It should be noted that restricting the number of user terminals being registered with the home server 11 to several units or the number of user terminals being permitted to access by the same personal ID and password to only one unit allows the prevention of the acquisition of content by any unauthorized access.

Also, it should be noted that the authentication processing to be executed by the home server 11 at the time of the occurrence of an access may be executed instead by an authentication server 22 to be described later. In this case, the information about the user ID and password and the information about the device ID and password that were used for the unauthorized accesses to the home server of each user's home can be accumulated on the authentication server 22, so that the unauthorized access attempts can be prevented more effectively. In addition, in the case where one user have a plurality of home networks for example, the procedures for registering personal IDs, device Ids, and so on can be executed at once.

The home server 11 receives the controls signals for controlling the PC 12 and the TV set 13 from the portable user terminal 1 via the Internet 5 and, by executing the middleware such as UPnP, the server 11 relays the received control signals to the PC 12 and the TV set 13 via the data bus 14.

In response to a request from the portable user terminal 1, the home server 11 sends the content data stored in the PC 12 for example to the portable user terminal 1 via the Internet 5.

As with the portable user terminal 1, the PC 12 of user A's home connects to the virtual home DB server 21 for example on the service provider side via the Internet 5, thereby displaying the user A's virtual home on the screen. Also, in response to user's operation preformed on the PC icon or the TV set icon in the displayed virtual home, the PC 12 sends control signals for controlling the TV set 13 for example connected to the home server 11.

As with the portable user terminal 1, the PC 3, which is used by user B, connects to the virtual home DB server 21 for example on the service provider side to display the user B's virtual home on the screen. Also, in response to user's operation performed on the PC icon or the TV set icon in the displayed virtual home, the PC 3 connects to the home server of user B's home via the Internet 5 to send control signals for controlling its PC (not shown) or the like connected to its home server (not shown).

It should be noted that the user-side equipment includes the portable user terminals and PCs being operated by users other than user A and user B and there are also home servers for these users other than user A and user B, the illustrations thereof being omitted for the brevity of description.

The following describes the equipment on the service provider side. The virtual home DB server 21 stores virtual home layout information (the external view, wall pattern, and floor material of the virtual home and the icon arrangement in the virtual home, for example), which is set by each user in a desired manner, and each user's event information (the information telling that messages addressed to that user are in the mailbox, the information indicative of applications for chat by other users, and so on). The virtual home DB server 21 provides these pieces of information to the portable user terminal 1 for example, which accesses the virtual home DB server 21 via the Internet 5.

The authentication server 22 executes the authentication processing for the portable user terminal 1 for example having accessed to a service provider's apparatus via the Internet 5. To be more specific, the access right for the service provider's apparatus is supplied only when the personal ID and password and the device ID and password to be sent from the portable user terminal 1 are registered in advance to verify the access right that is sent from the portable user terminal 1 to the virtual home DB server 21, the inter-user-terminal communication relay server 23, or the user information holding server 24.

It should be noted that the authentication server 22 can alternatively execute the authentication processing being executed for the portable user terminal 1 for example to which the home server 11 has accessed via the Internet 5. In this case, the authentication server 22 supplies the access right for the home server 11 to the portable user terminal 1 after the completion of the authentication processing, thereby verifying the access right, which is sent from the portable user terminal 1 to the home server 11.

The inter-user-terminal communication relay server 23 executes the processing associated with a plurality of users who use the virtual space remote control system. For example, the inter-user-terminal communication relay server 23 stores a member list of a user group to which each user belongs, manages the chat being executed between a plurality of users, and manages the conference synchronous information (details of which will be described later) being generated when a virtual room is shared.

It should be noted that each user can belong to a plurality of user groups.

The user information holding server 24 stores the personal data of each user; namely, the event detail information (mail addressed to that user and message text data for example) for event information, a variety of certificate data (details of which will be described later) obtained by each user, the text data written by the user by utilizing notepad capability, and the image data to be shared by other users, for example.

In response to a request by the portable user terminal 1 for example, which has accessed via the Internet 5, an EPG (Electronic Program Guide) server 25 provides EPG information including a television program guide and detail information about each program.

An audio server 26 is a broadcasting server of so-called Internet radio and provides audio stream data in response to a request by the portable user terminal 1 or the like, which has accessed via the Internet 5.

It should be noted that the equipment devices on the service provider side, the virtual home DB server 21 through the audio server 26, need not be arranged in a separate manner as shown; some of the servers may be integrated into one unit if required.

Figure 2:
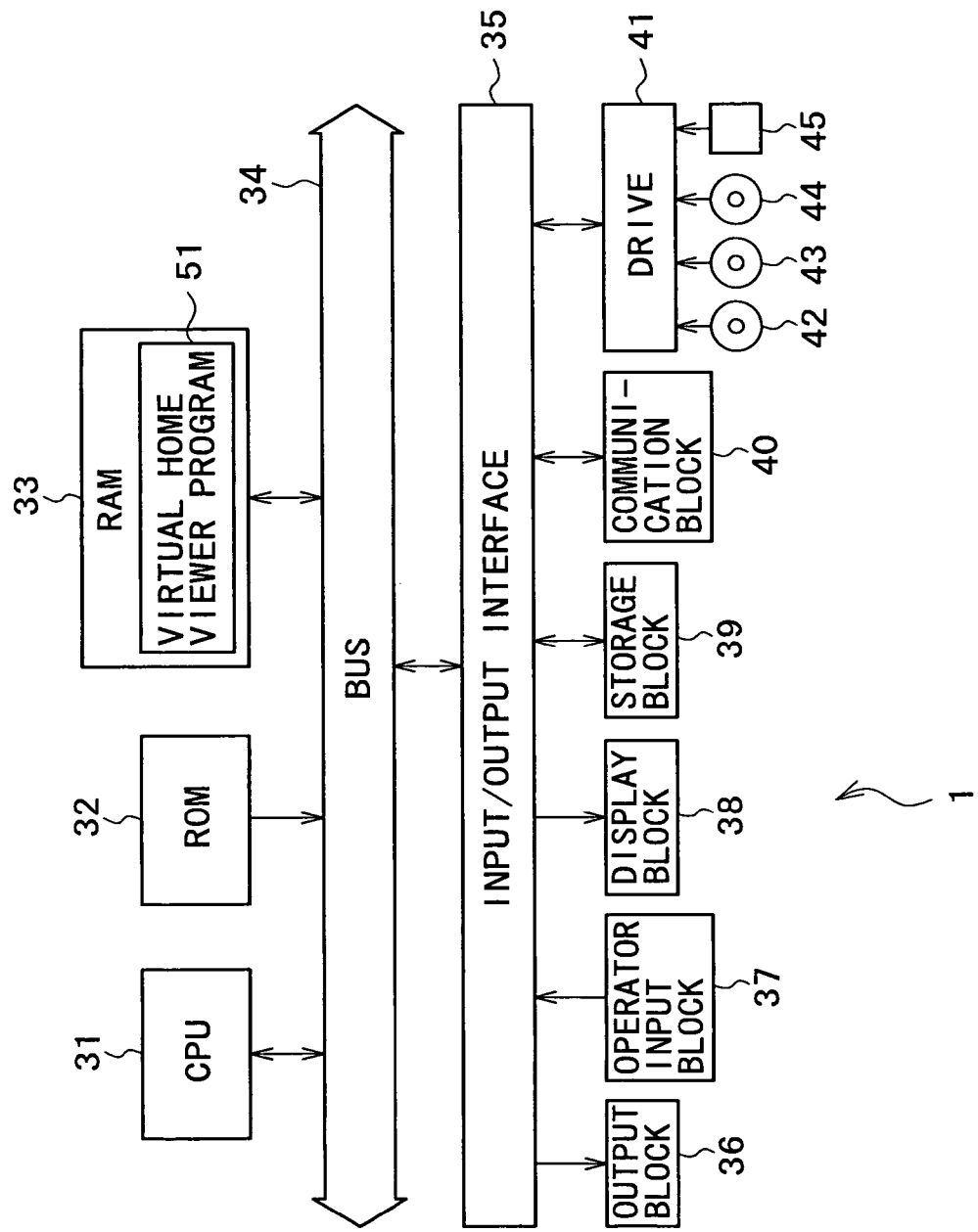
FIG. 2 is a block diagram illustrating an exemplary configuration of a portable user terminal shown in FIG. 1.

Referring to FIG. 2, there is shown an exemplary configuration of the portable user terminal 1. The portable user terminal 1 incorporates the CPU (Central Processing Unit) 31. The CPU 31 is connected to an input/output interface 35 via a bus 34. The bus 34 is connected to a ROM (Read Only Memory) 32 and a RAM (Random Access Memory) 33.

The input/output interface 35 is connected to an output block 36 for outputting sound or the like, an operator input block 37 based on an input device such as a keyboard and a touch panel for inputting operator commands by the user A, a display block 38 based on CRT (Cathode Ray Tube), LCD (Liquid Crystal Display), or the like on which images such as virtual home are shown, a storage block 39 based on a hard disk drive or the like for storing various programs and data, and a communication block 40 for performing communication via the base station 4 and the Internet 5. The input/output interface 35 is also connected to a drive 41, which reads and writes data on a recording medium such as a magnetic disk 42, an optical disk 43, a magneto-optical disk 44, or a semiconductor memory 45.

Figure 4:
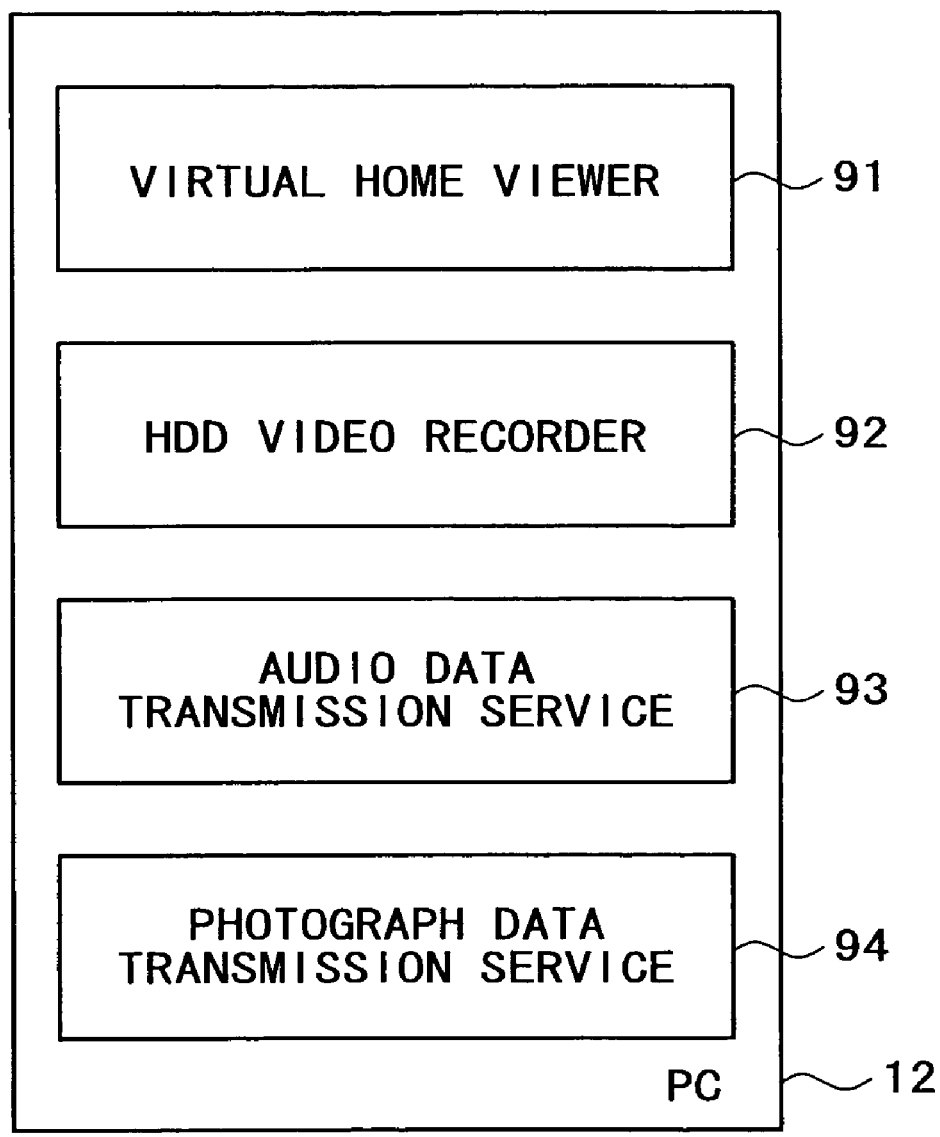
FIG. 4 is a functional block diagram of the PC shown in FIG. 1.

The CPU 31 realizes a virtual home viewer 91 shown in FIG. 4 by executing the virtual home viewer program 51 loaded from the storage block 39 into the RAM 33, this program being read from the above-mentioned recording medium into the storage block 39. This is the end of the description for the exemplary configuration of the portable user terminal 1.

Figure 3:
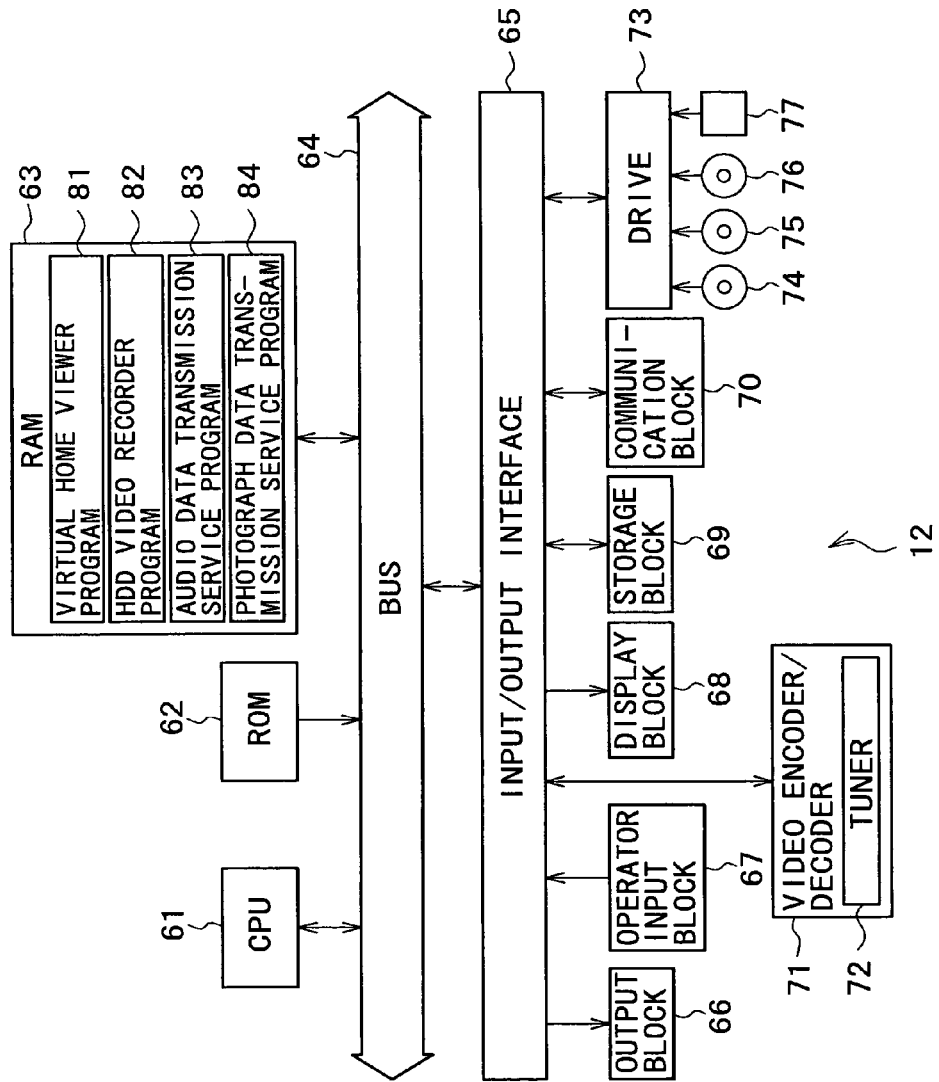
FIG. 3 is a block diagram illustrating an exemplary configuration of a PC shown in FIG. 1.

Referring to FIG. 3, there is shown an exemplary configuration of the PC 12. The PC 12 incorporates a CPU 61. The 61 is connected to an input/output interface 65 via a bus 64. The bus 64 is connected to a ROM 62 and a RAM 63.

The input/output interface 65 is connected to an output block 66 for outputting sound or the like, an operator input block 67 based on an input device such as a keyboard and a mouse for inputting operator commands by the user A, a display block 68 based on CRT, LCD, or the like on which images such as virtual home are shown, a storage block 69 based on a hard disk drive or the like for storing various programs and data, and a communication block 70 for performing communication with the home server 11 and communication with the equipment on the service provider side via the home server 11 and the Internet 5.

The input/output interface 65 is also connected with a drive 73, which reads and writes data on a recording medium such as a magnetic disk 74, an optical disk 75, a magneto-optical disk 76, or a semiconductor memory 77, and a video encoder/decoder 71, which encodes and decodes AV signals of television broadcasts, for example. The video encoder/decoder 71 incorporates a tuner 72 for receiving television broadcasts.

The CPU 61 executes a virtual home viewer program 81, a HDD (Hard Disk Drive) video recorder 82, a audio data transmission service program 83, and a photograph data transmission service program 84, which are read from any of the recording media such as the magnetic disk 74 through the semiconductor memory 77 into the storage block 69 and then into the RAM 63, thereby realizing the four functions shown in FIG. 4, namely, the virtual home viewer 91, a HDD video recorder 92, an audio data transmission service 93, and a photograph data transmission service 94. As described above, these programs may be distributed by various recording media or through networks such as the Internet 5.

The virtual home viewer 91 gets the information about the virtual home of user A from the virtual home DB server 21 via the Internet 5 to display the virtual home on the screen and, in response to user A's operation performed on the PC icon or the TV set icon in the virtual home, outputs the controls signals for controlling the PC 12 and the TV set 13 to the home server 11. In addition, the virtual home viewer 91 can reproduce sound of the audio data to be distributed as with the audio data transmission service 93 to be described later.

The HDD video recorder 92 controls the video encoder/decoder 71 to encode AV signals of television broadcast or the like and store the resultant coded data into the storage block 69. Also, the HDD video recorder 92 reads and decodes the coded data from the storage block 69, displays the decoded AV signal video onto the display block 68, and outputs the sound from the output block 66. Alternatively, the recorder 92 supplies the decoded AV signal video to the TV set 13 via the data bus 14.

The audio data transmission service 93 reproduces the audio data acquired from the audio server 26 and outputs the corresponding sound from the output block 66.

The photograph data transmission service 94 displays the image data stored in the storage block 69 onto the display block 68 or a list of thumbnail images (contracted images) of plural pieces of image data onto the display block 68, for example. This is the end of the description for the exemplary configuration of the PC 12.

It should be noted that an exemplary configuration of the PC 3 is substantially the same as the exemplary configuration of the portable user terminal 1 shown in FIG. 2 or the exemplary configuration of the PC 12 shown in FIG. 3, so that the description of the exemplary configuration of the PC 3 will be skipped.

The home server 11 and the virtual home DB server 21 through the user information holding server 24 are configured in substantially the same manner as the exemplary configuration of the PC 12 shown in FIG. 3, so that the description of the exemplary configuration of each of these components will be skipped. The home server 11 and the virtual home DB server 21 through the user information holding server 24 execute various processing operations to be described later by which the CPUs incorporated in each server carry out predetermined programs.

Figure 5:
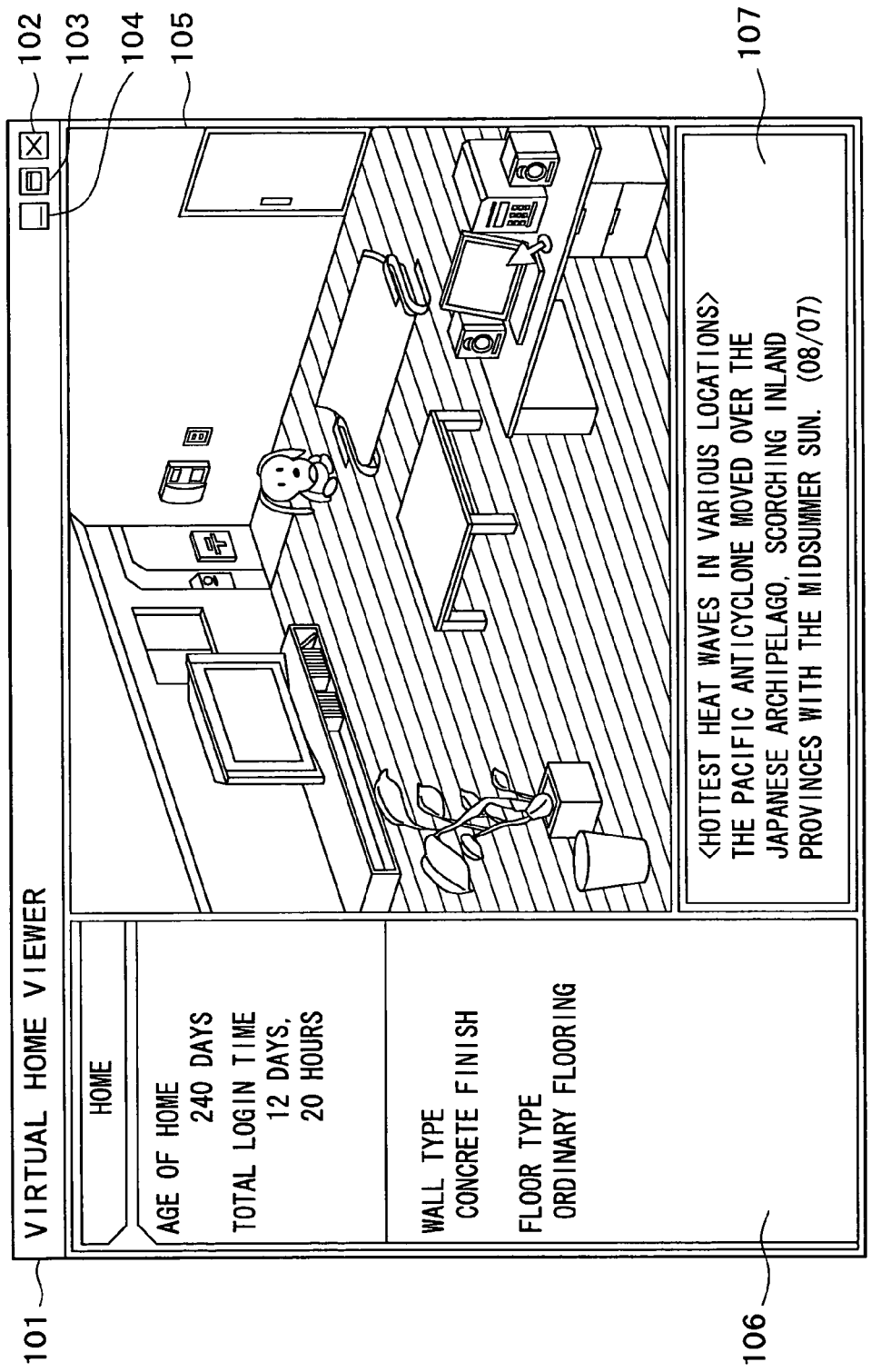
FIG. 5 illustrates an exemplary display of a virtual home viewer window.

Referring to FIG. 5, there is shown an example of a virtual home viewer window displayed on the screen of the portable user terminal 1 for example.

In the upper portion of this virtual home viewer window 101, "Close" button 102, which is pressed to close the window, "Maximize" button 103, which is pressed to display the window in full size or return the size thereof to its original size, and "Minimize" button 104, which is pressed to minimize the window, are arranged.

The virtual home viewer window 101 is divided into a main panel 105 in which the image of the virtual home is displayed, a control panel 106 in which the information about an icon selected by the user from among those displayed in the main panel 105, and a communication panel 107 in which chat, mail text, and news for example are displayed.

Figure 6:
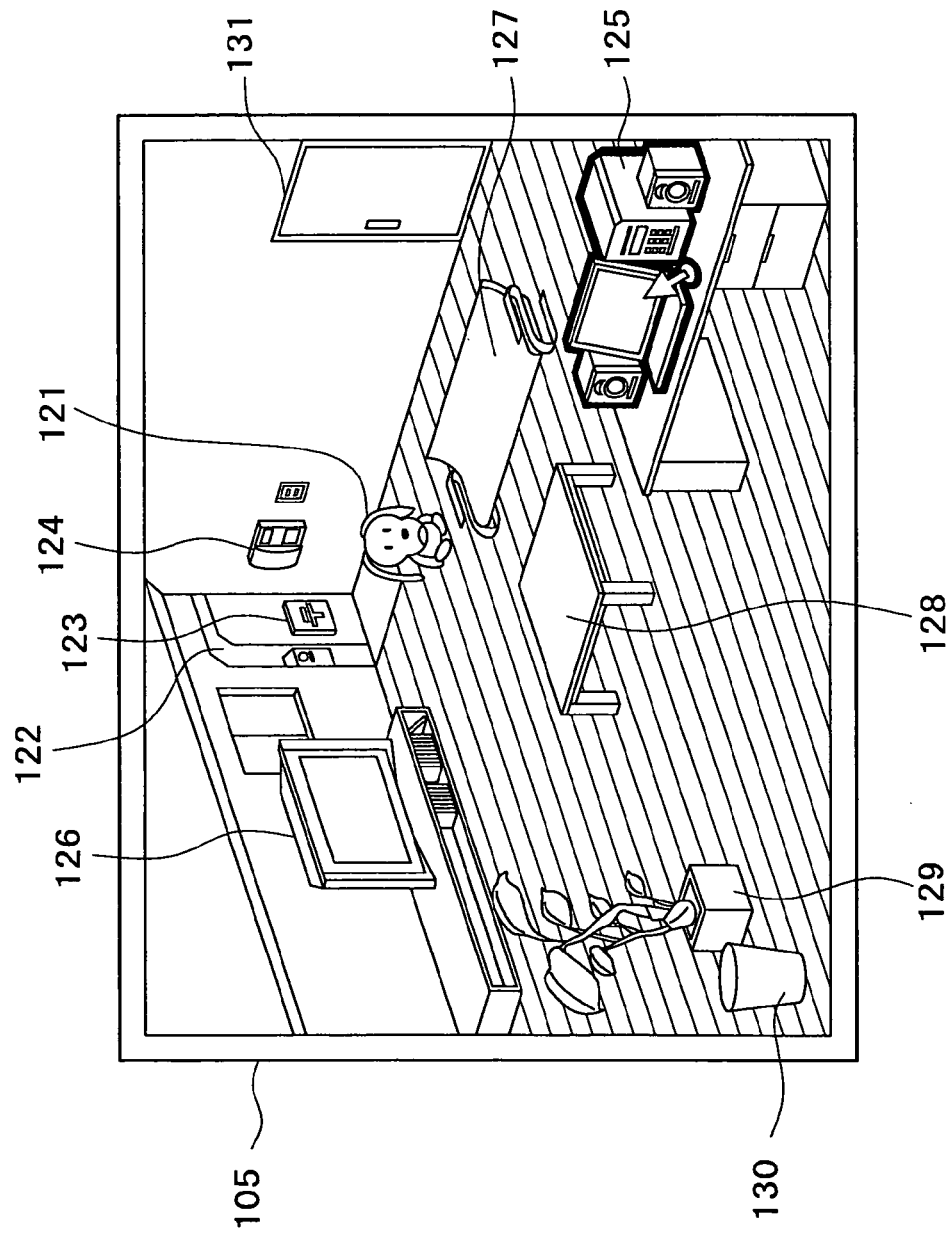
FIG. 6 illustrates icons arranged in a virtual room.

The following describes the virtual home shown in the main panel 105 with reference to FIG. 6. In the room of the virtual home (hereafter sometimes referred to as a virtual room), a mascot 121 exists that autonomously moves around in the room and that visits virtual homes of other users as an agent for this user for example.

The mascot as used herein has the capabilities of invoking the impression that the user is visiting the currently displayed place, drawing off user's attention to the change in the state of the virtual home viewer program, allowing the user to visually recognize the visiting own virtual home by an other user, and carrying an icon when visiting the virtual home of an other user. Also, the mascot has the capabilities of acting for the user's processing in some manner as with the agent disclosed in Japanese Patent Laid-open No. 2002-44765. However, the mascot need not always has these capabilities of acting for the user's processing as the agent.

The virtual room is arranged with a door icon 122, which is clicked when by the mascot 121 visits an other user's home, a mailbox icon 123, which is clicked when mail addressed to that user is received, a telephone icon 124, which is clicked when talking (However, chatting in the present embodiment) with an other member of the member group to which this user belongs, a PC icon 125, which is clicked to control the really existing PC 12 in user A's home, and a TV set icon 126, which is clicked to control the TV set 13 really existing in user A's home.

Further, the virtual room is arranged with a sofa icon 127 and a table icon 128, which are furniture, and a pot plant icon 129 and a trash box icon 130, which are indoor ornaments and small objects (hereafter referred to as items).

The icons, the PC icon 125 through the trash box icon 130, can be arranged at any places in the room. The items icons such as the pot plant icon 129 may be taken out of the room at the time of visiting the other user and presented to the other user.

In addition, the virtual room is arranged with a closet icon 131, which is clicked to accommodate item icons such as the pot plant icon 129 (the accommodated icons are hidden from the screen) or to bring out accommodated icons into the room (the icons are redisplayed on the screen).

The user can select the designs of icons, the patterns of virtual room wallpapers, and the materials of the floor or the like from among prepared options.

The following describes a sequence of processing operations being carried out when the CPU 31 of the portable user terminal 1 executes the virtual home viewer program 51 loaded in the RAM 33. In what follows, the subject of the action of the portable user terminal 1 is the virtual home viewer program 51.

Figure 7:
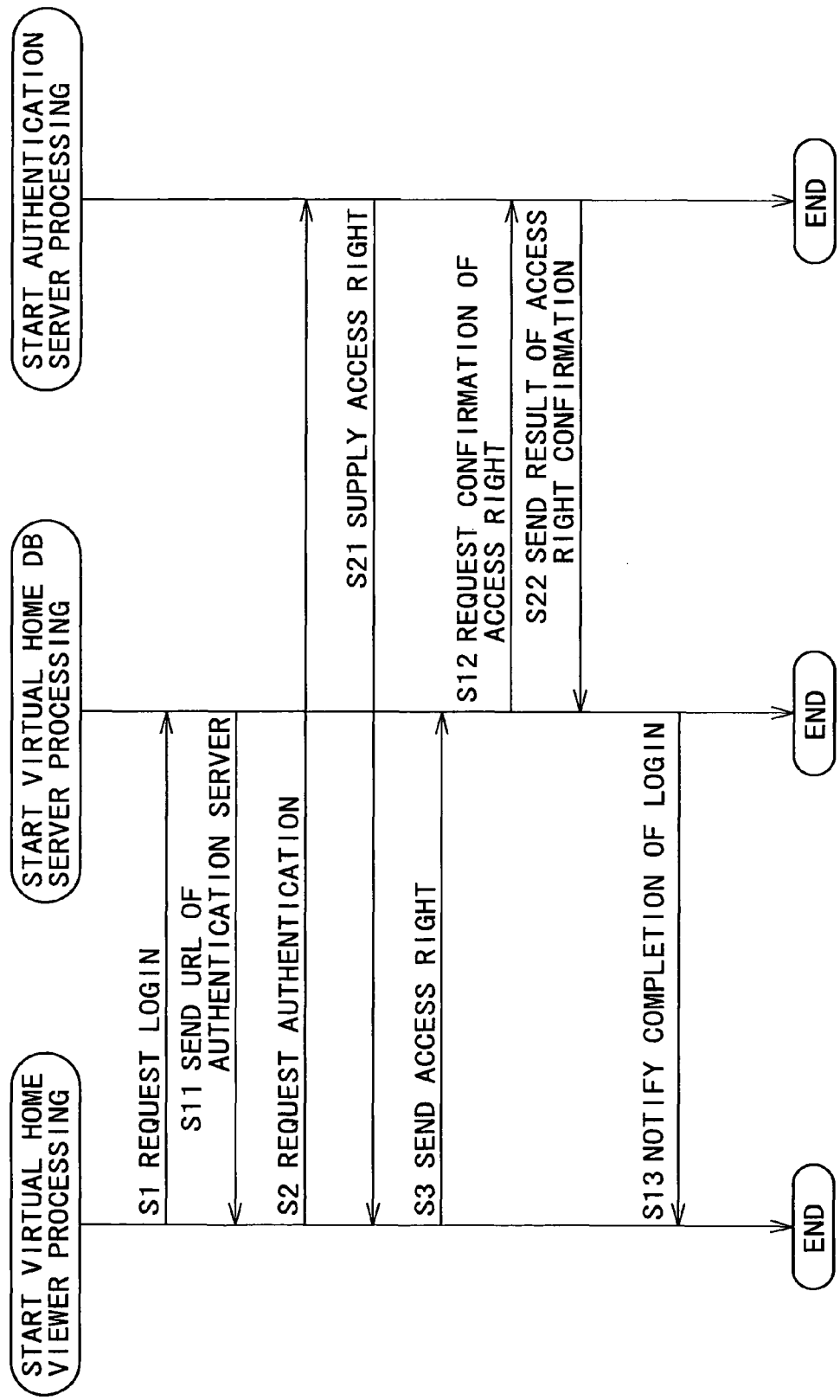
FIG. 7 is a flowchart for describing login processing.

First, a login operation is performed on the equipment on the service provider side. The following describes this login processing with reference to the flowchart shown in FIG. 7.

Figure 8:
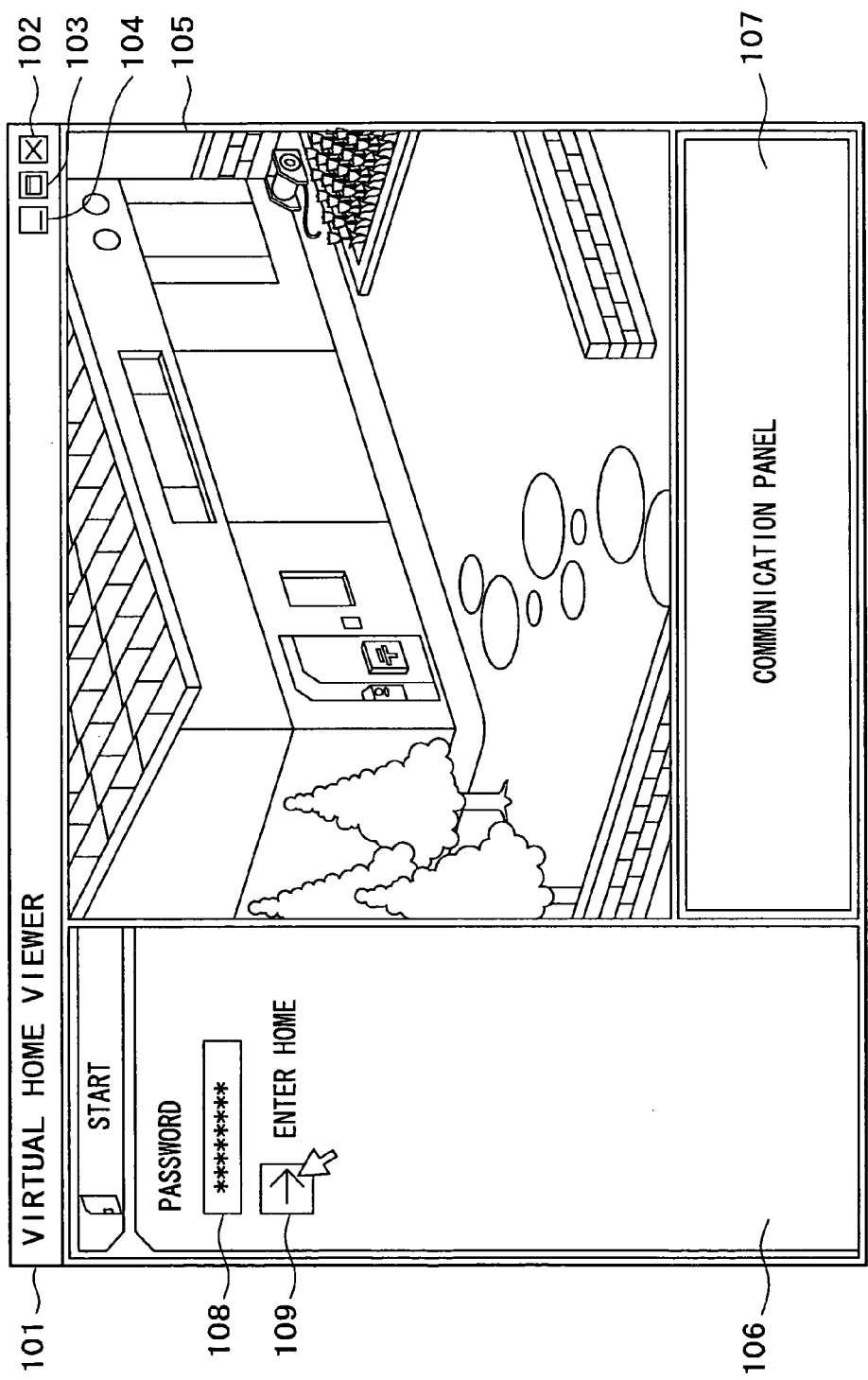
FIG. 8 is an exemplary display of a virtual home viewer window to be displayed upon login.

When the virtual home viewer program 51 is started up, the external view of user A's home is displayed in the main panel 105 of the screen as shown in FIG. 8. For the displaying of this image, the layout information supplied from the virtual home DB server 21 at the last login and cached (or held) in the storage block 39 or the like is used. A password entry box 108 and "Enter Home" button 109 are displayed in the control panel 106.

When user A enters the login password in the password entry box 108 and clicks the "Enter Home" button 109, the virtual home viewer program 51 accesses the virtual home DB server 21 via the base station 4 and the Internet 5 to send a login request in step S1.

In response to this login request, the virtual home DB server 21 sends the URL (Uniform Resource Locator) of the authentication server 22 back to the virtual home viewer program 51 via the Internet 5 and the base station 4 in step S11.

In step S2, the virtual home viewer program 51 accesses the authentication server 22 via the base station 4 and the Internet 5 to send the personal ID and password of user A being entered by user A and the device ID and password set to the portable user terminal 1) along with a verification request.

In response to this verification request, the authentication server 22 checks the validity of the ID and the like. If the password or ID are found to be valid, the server 22 supplies the access right to the virtual home viewer program 51 via the Internet 5 and the base station 4, thereby allowing access to all devices on the service provider side and the home server 11 of user A's home in step S21.

In step S3, the virtual home viewer program 51 sends the granted access right to the virtual home DB server 21 via the base station 4 and the Internet 5. In step S12, the virtual home DB server 21 requests the authentication server 22 for verifying the access right send from the virtual home viewer program 51. In step S22, the authentication server 22 verifies the access right and sends the result of the verification to the virtual home DB server 21.

In step S13, if the verification result received from the authentication server 22 indicates that the access right is authentic, then the virtual home DB server 21 notifies the virtual home viewer program 51 of the successful login operation via the Internet 5 and the base station 4.

Receiving the successful login notification, the virtual home viewer program 51 can continue the subsequent processing. This is the end of the description of the login processing.

Figure 9:
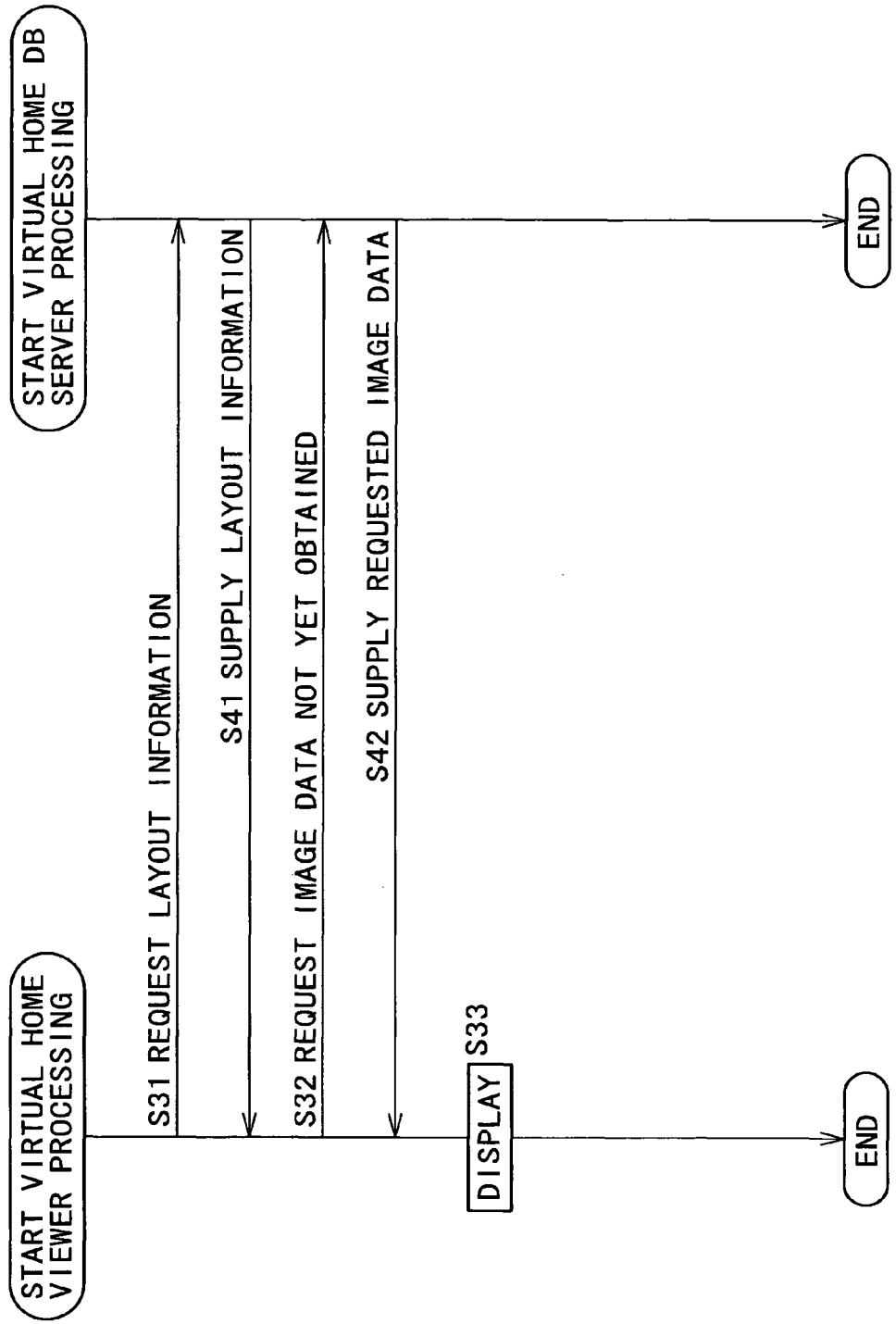
FIG. 9 is a flowchart for describing layout information acquisition processing.

Next, the processing of getting the layout information for displaying the virtual room in the main panel 105 is executed. The following describes this layout information acquisition processing with reference to the flowchart shown in FIG. 9.

In step S31, the virtual home viewer program 51 requests the virtual home DB server 21 for the layout information about the user A's virtual home via the base station 4 and the Internet 5. In response to this request, the virtual home DB server 21 supplies the most recent layout information about the user A's virtual home stored in the virtual home DB server 21 to the virtual home viewer program 51 via the Internet 5 and the base station 4 in step S41.

In step S32, the virtual home viewer program 51 compares the captured most recent layout information with the layout information cached in the storage block 39 or the like and requests the virtual home DB server 21 for the updated data such as icon image data, which do not exist in the cached layout information but exist in the most recent layout information, via the base station 4 and the Internet 5.

Figure 10:
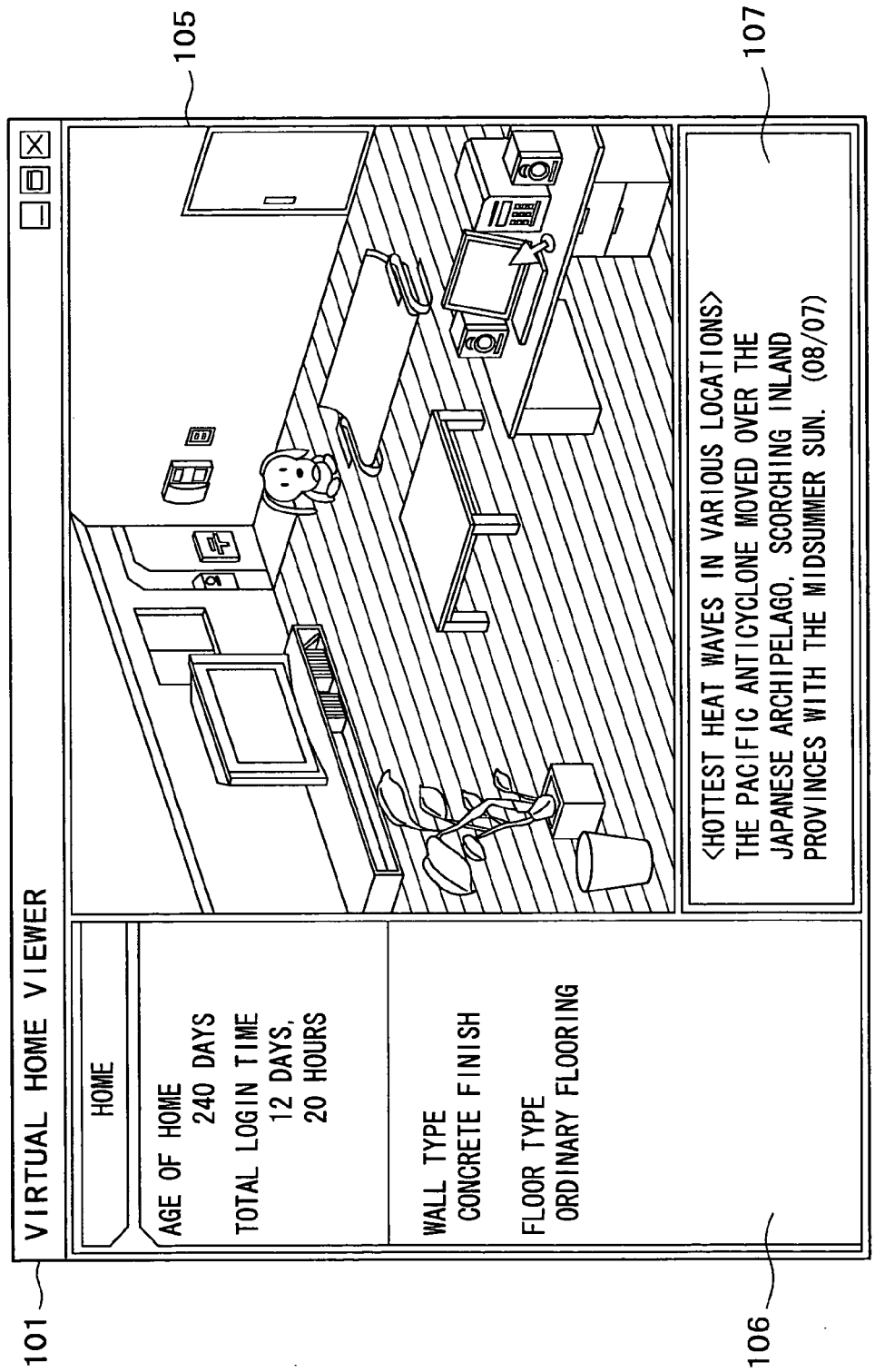
FIG. 10 illustrates an exemplary display of a virtual room.

In response to this request, the virtual home DB server 21 supplies the requested updated data such as icon image data to the virtual home viewer program 51 via the Internet 5 and the base station 4 in step S42. Then, in step S33, the virtual home viewer program 51 displays the image of the virtual room in the main panel 105 as shown in FIG. 10. At this moment, because the user selects none of the icons in the virtual room, the state (age of home, total login time, wall type, floor type, etc.) of the virtual home is displayed in the control panel 106. This is the end of the description of the layout information acquisition processing.

Figure 11:
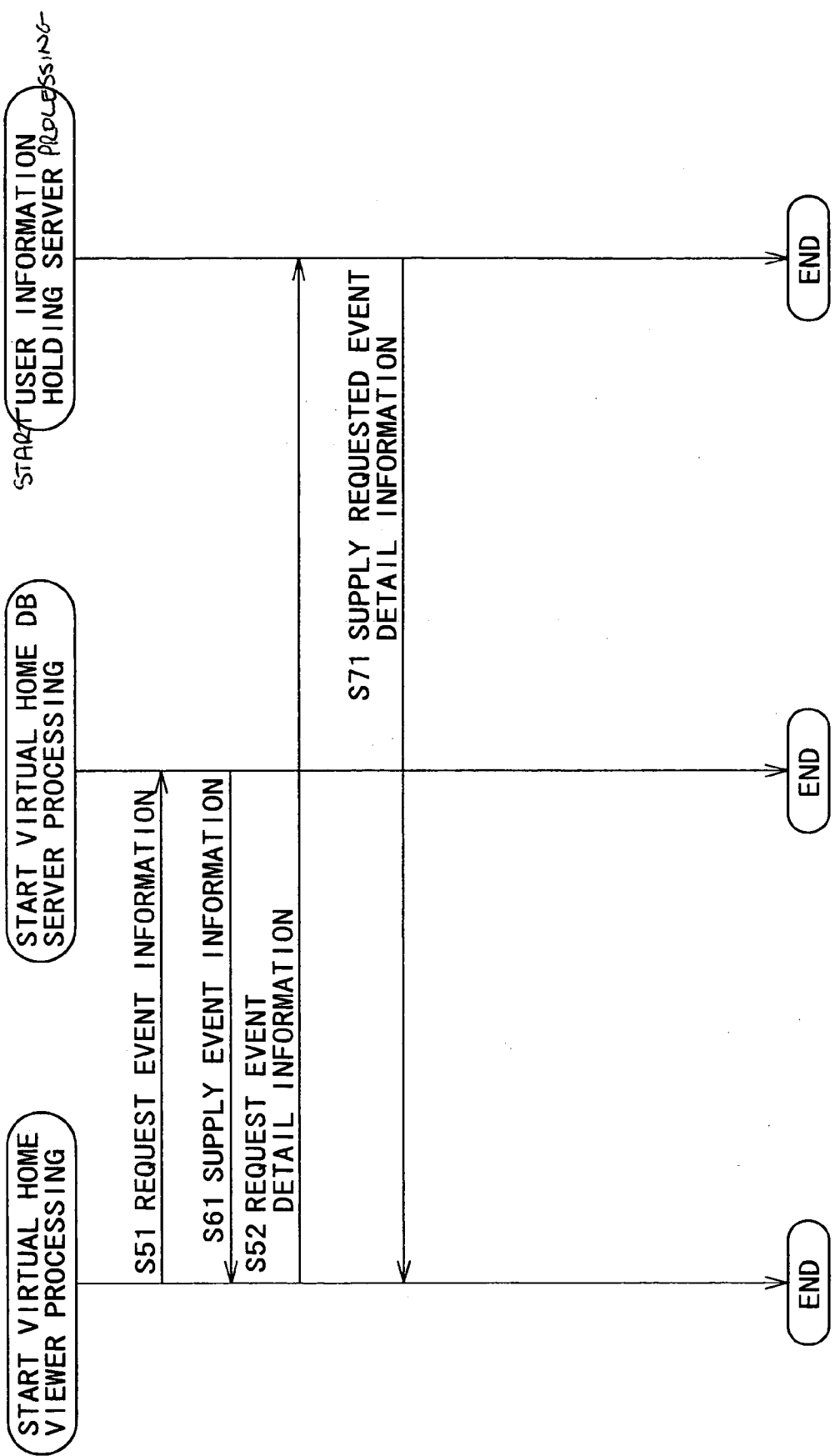
FIG. 11 is a flowchart for describing event information acquisition processing.

Next, the processing of capturing the event information of user A is executed. The following describes user A's event information acquisition processing with reference to the flowchart shown in FIG. 11. The event information is stored in the virtual home DB server 21 and indicates an action performed on user A by an other user (for example, the arrival of mail to user A, the recording of answerphone message for user A, or the visiting by an other user to user A's virtual home).

In step S51, the virtual home viewer program 51 requests the virtual home DB server 21 for the event information of user A via the base station 4 and the Internet 5. In response to this request, the virtual home DB server 21 supplies the event information of user A via the Internet 5 and the base station 4 in step S61.

In step S52, on the basis of the user A's event information supplied from the virtual home DB server 21, the virtual home viewer program 51 accesses the user information holding server 24 via the base station 4 and the Internet 5 to request for the event detail information corresponding to the event information. The event detail information herein denotes the text data, which are specific contents of mail or message addressed to user A.

However, in this case, this is the first connection to the user information holding server 24 since the login, so that, like the processing of steps S3, S12, and S22 of the above-mentioned login processing, such a sequence of processing operations is executed before requesting for the event detail information corresponding to the event information as that the virtual home viewer program 51 sends the access right obtained from the authentication server 22 to the user information holding server 24, the user information holding server 24 requests the authentication server 22 for the verification of the access right sent from the virtual home viewer program 51, and the authentication server 22 verifies the access right and sends the result of the verification to the user information holding server 24.

In step S71, the user information holding server 24 supplies the requested event detail information to the virtual home viewer program 51 via the Internet 5 and the base station 4. This is the end of the description of the event information acquisition processing.

It should be noted that this event information acquisition processing will be periodically executed hereafter in predetermined timing; namely, this processing is executed in a polling manner.

Figure 12:
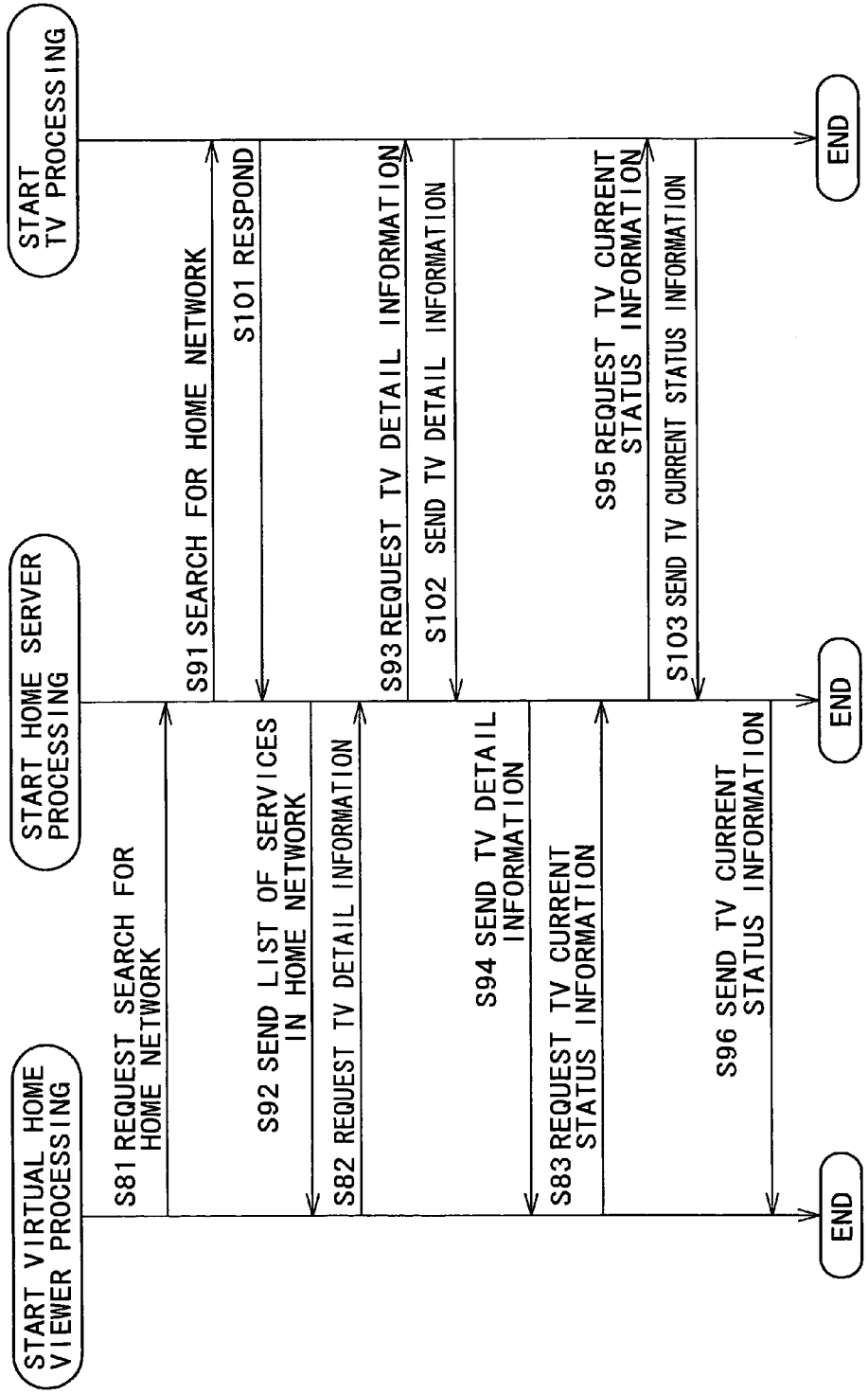
FIG. 12 is a flowchart for describing home network information acquisition processing.

Next, home network information acquisition processing is executed to understand the state of the equipment components constituting the home network 2 of user A. The following describes this home network information acquisition processing with reference to the flowchart shown in FIG. 12.

In step S81, the virtual home viewer program 51 accesses the home server 11 via the base station 4 and the Internet 5 to request for the searching of the home network 2. In response to this request, the home server 11 searches for the home network 2 in step S91. To be more specific, the home server 11 requests all the devices connected thereto via the data bus 14 for a response.

In response to this request, the TV set 13 sends the information for identifying itself to the home server 11 in step S101. It should be noted that the PC 12 connected to the home server 11 via the data bus 14 executes the substantially the same processing, although not shown. Subsequently, the PC 12 executes the substantially the same processing as the TV set 13, the description of which is skipped.

In step S92, on the basis of the response from the TV set 13 and the PC 12 connected to the data bus 14, the home server 11 creates a list of home network services indicative of a list of devices constituting the home network 2 and supplies the created list to the virtual home viewer program 51 via the Internet 5 and the base station 4.

On the basis of the home network service list received from the home server 11, the virtual home viewer program 51 requests the home server 11 via the base station 4 and the Internet 5 for the detail information about the devices (also referred to as network devices) constituting the home network 2 in step S82. The detail information about the network devices herein includes the items that can be controlled from the virtual home viewer program 51 (in the case of TV set 13, power on/off, volume up/down, channel change, multiplexed audio switching, and input signal switching, for example; in the case of the PC 12, the realizable various operations of the HDD video recorder 92, the audio data transmission service 93, and photograph data transmission service 94 for example) and the information about the operator buttons being displayed in the control panel 106 when controlling network devices.

In response to this request, the home server 11 requests the TV set 13 constituting the home network 2 for the detail information in step S93.

In response to this request, the TV set 13 supplies the detail information to the home server 11 in step S102. In step S94, the home server 11 supplies the detail information received from each network device to the virtual home viewer program 51 via the Internet 5 and the base station 4.

In step S83, the virtual home viewer program 51 requests the home server 11 via the base station 4 and the Internet 5 for the current status information of each network device. In response to this request, the home server 11 requests the TV ser 13 for the current status information in step S95.

In step S103, in response to this request, the TV set 13 supplies the current status information to the home server 11. The current status information of the TV set 13 includes a channel being tuned in and a volume setting for example. In step S96, the home server 11 supplies the current status information received from each network device to the virtual home viewer program 51 via the Internet 5 and the base station 4. This is the end of the description of the home network information acquisition processing.

It should be noted that, on the basis of the current status information received from each network device, the virtual home viewer program 51 changes the displaying of icons in the main panel 105 representative of the network devices arranged in the virtual room. For example, if the TV set 13 of user A is receiving a television program, an image is displayed on the screen of the TV set icon 126.

Figure 13:
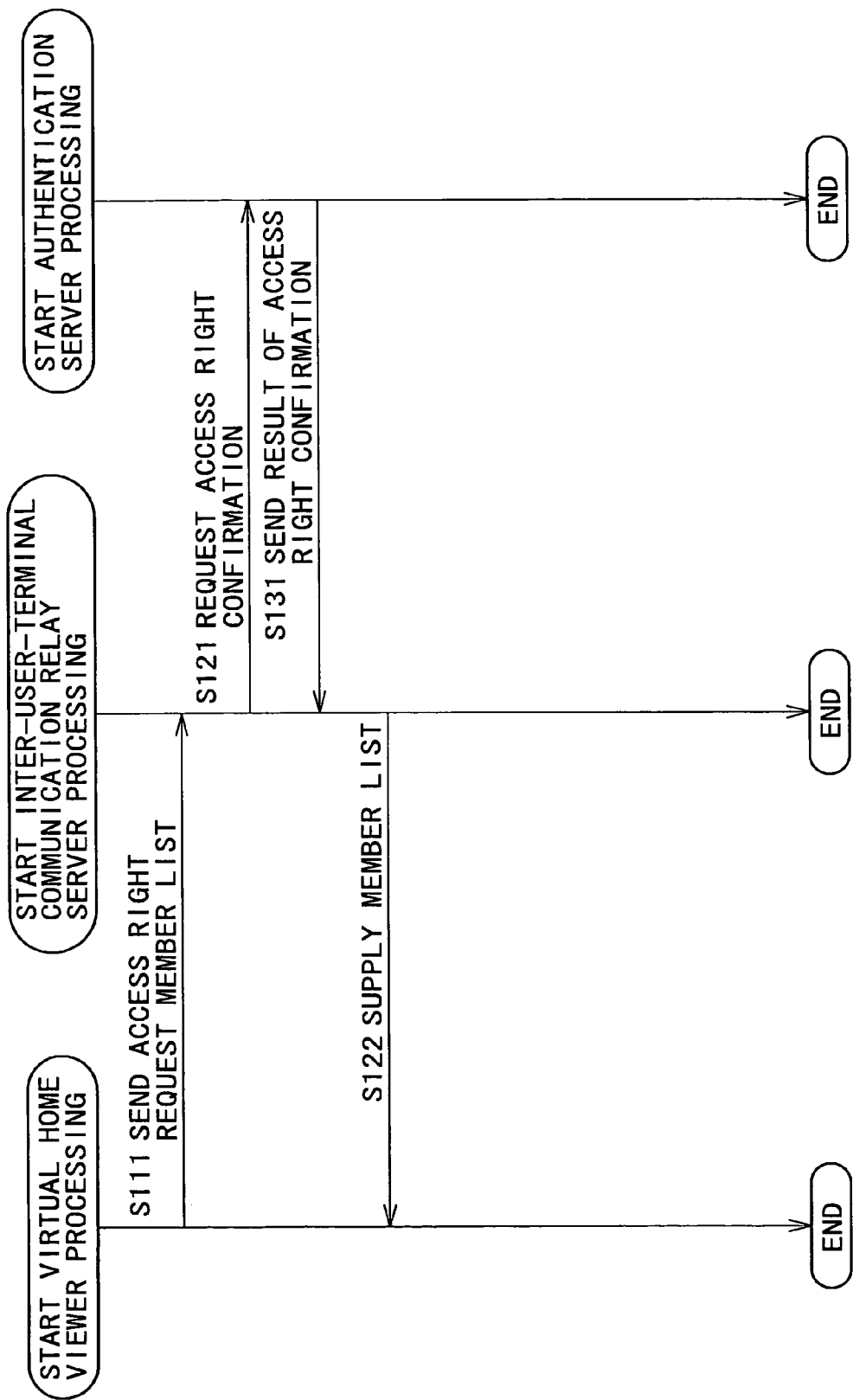
FIG. 13 is a flowchart for describing member information acquisition processing.

Next, in order to obtain the member list of the user group to which user A belongs, member list acquisition processing is executed. The following describes this member list acquisition processing with reference to the flowchart shown in FIG. 13.

In step S111, the virtual home viewer program 51 accesses the inter-user-terminal communication relay server 23 via the base station 4 and the Internet 5 to send the server 23 the access right granted from the authentication server 22 in the above-mentioned login processing, thereby requesting for the member list.

In response to this request, in step S121, the inter-user-terminal communication relay server 23 requests the authentication server 22 for the verification of the access right received from the virtual home viewer program 51. In response to this request, the authentication server 22 verifies the access right and supplies the result of the verification to the user information holding server 24 in step S131.

In step S122, if the verification result received from the authentication server 22 indicates that the access right is authentic, the inter-user-terminal communication relay server 23 supplies the member list of the user group to which user A belongs to the virtual home viewer program 51 via the Internet 5 and the base station 4. This is the end of the description of the member list acquisition processing.

After the completion of the sequence of processing operations described so far, various standalone processing and communication processing (each will be described later) are ready for execution.

Figure 14:
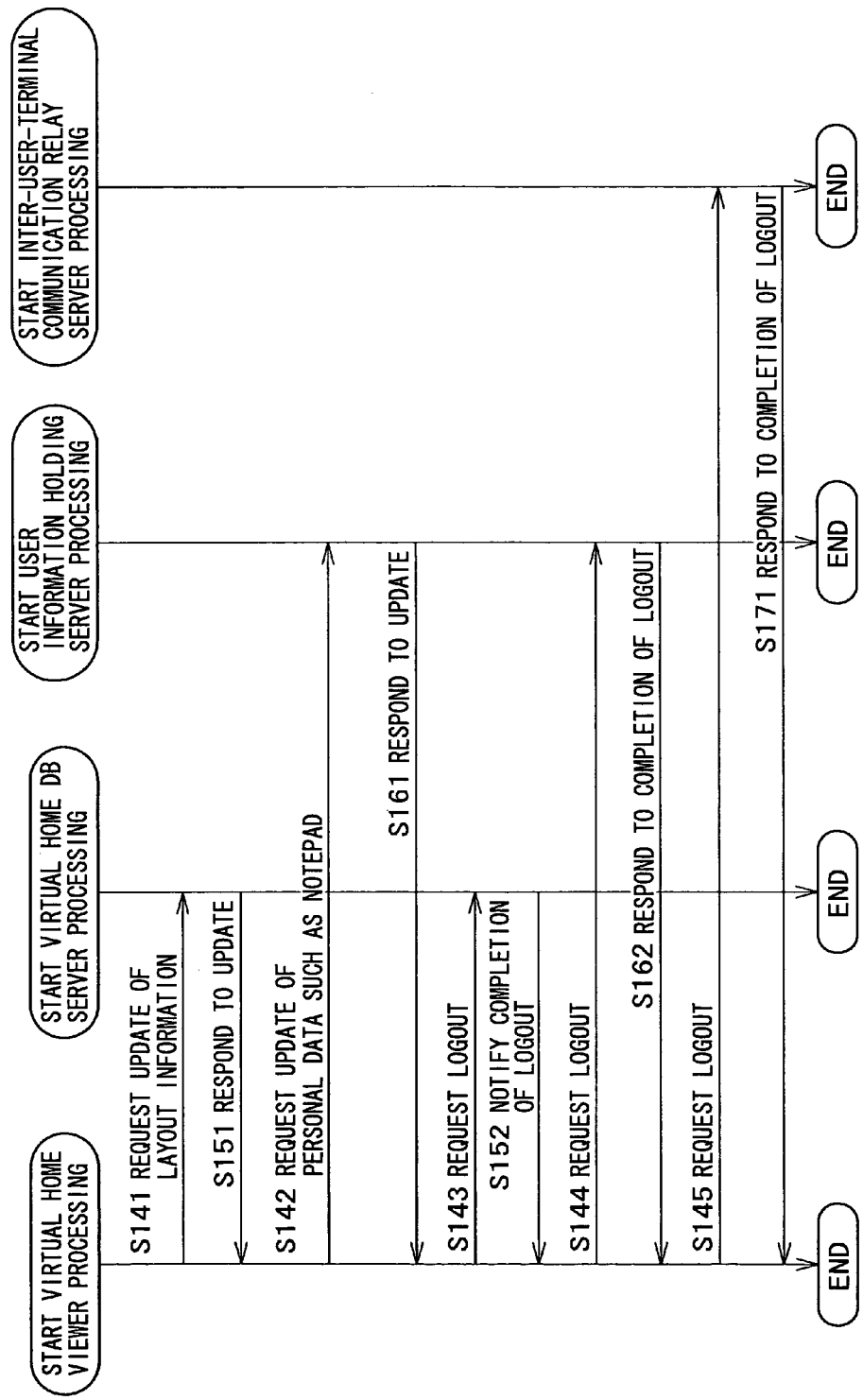
FIG. 14 is a flowchart for describing logout processing.

The following describes logout processing for exiting the virtual home viewer program 51 with reference to the flowchart shown in FIG. 14. The logout processing starts when the user clicks "Close" button 102 in the virtual home viewer window 101. Alternatively, the logout processing starts when "Logout" button 137, among various buttons (to be detailed later with reference to FIG. 75), which are displayed in the control panel 106 upon clicking of the door icon 122 shown in the main panel 105, is clicked as shown in FIG. 15.

In step S141, the virtual home viewer program 51 sends the current layout information (indicative of the arrangement and orientation of each icon in the virtual room) to the virtual home DB server 21 via the base station 4 and the Internet 5, thereby requesting for the updating of the layout information stored in the virtual home DB server 21. In step S151, in response to this update request, the virtual home DB server 21 updates the layout information stored therein. Then, the virtual home DB server 21 supplies the virtual home viewer program 51 with the completion of the updating of the current layout information via the Internet 5 and the base station 4.

In step S142, the virtual home viewer program 51 sends the personal data, including the text data, such as a memo entered by use of the notepad capability (to be described later with reference to FIGS. 47 through 50), to the user information holding server 24 via the base station 4 and the Internet 5 to request the updating of the personal data stored in the user information holding server 24. In step S161, in response to this update request, the user information holding server 24 updates the personal data of user A stored therein. Subsequently, the user information holding server 24 notifies the virtual home viewer program 51 of the completion of the updating of the personal information via the Internet 5 and the base station 4.

In step S143, the virtual home viewer program 51 requests the virtual home DB server 21 for logout via the base station 4 and the Internet 5. In step S152, in response to this logout request, the virtual home DB server 21 sets itself so as to reject any access from the virtual home viewer program 51 until logged in again and notifies the virtual home viewer program 51 of the completion of logout via the Internet 5 and the base station 4.

In step S144, the virtual home viewer program 51 requests the user information holding server 24 for logout via the base station 4 and the Internet 5. In step S162, in response to this logout request, the user information holding server 24 sets itself so as to reject any access from the virtual home viewer program 51 until logged in again and notifies the virtual home viewer program 51 of the completion of logout via the Internet 5 and the base station 4.

In step S145, the virtual home viewer program 51 requests the inter-user-terminal communication relay server 23 for logout via the base station 4 and the Internet 5. In step S171, in response to this logout request, the inter-user-terminal communication relay server 23 sets itself so as to reject any access from the virtual home viewer program 51 until logged in again and notifies the virtual home viewer program 51 of the completion of logout via the Internet 5 and the base station 4. In response to this notification of logout completion, the processing of the virtual home viewer program 51 is completed. This is the end of the description of the login processing.

Next, standalone processing executable after a login sequence will be described.

By dragging and dropping icons to a desired position in the virtual room, the user can change the arrangement of desired icons (however, some icons such as the mailbox icon 123, which belongs to the door icon 122, cannot be moved).

For example, the user can drag the sofa icon 127 of the virtual room shown in FIG. 16 and drop the icon at the upper right side of the table icon 128, thereby changing the arrangement of the sofa icon 127 as shown in FIG. 17.

In addition, by double-clicking a desired icon in the virtual room, the user can switch between its orientations, the left-oblique and the right-oblique toward the user (however, some icons cannot be changed in orientation).

For example, double-clicking the sofa icon 127 in the right-oblique orientation in the virtual room shown in FIG. 17 can switch the position to the left-oblique orientation as shown in FIG. 18.

For example, again, dragging a board game set icon 141 in the virtual room shown in FIG. 18 and dropping it on the table icon 128 can arrange the board game set icon 141 on the table icon 128 as shown in FIG. 19.

Figure 20A:
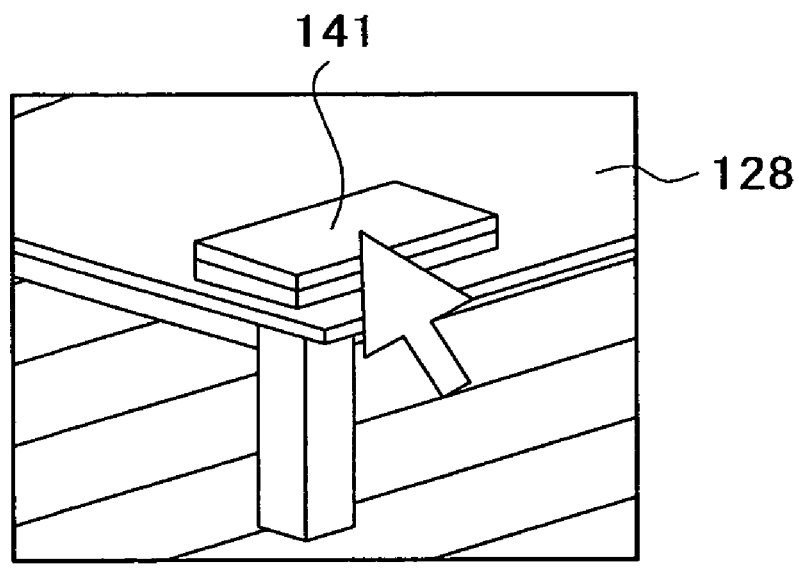
FIG. 20A illustrates a difference between an operation for arranging an icon by superimposing the icon on another icon and an operation for arranging an icon behind another icon.

It should be noted that the board game set icon 141 may be arranged behind the table icon 128. To be more specific, dragging the board game set icon 141, from the lower right to the upper left in the screen, to the table icon 128 and dropping the board game set icon 141 thereon can arrange the board game set icon 141 on the table icon 128 as shown in FIG. 20A.

Figure 20B:
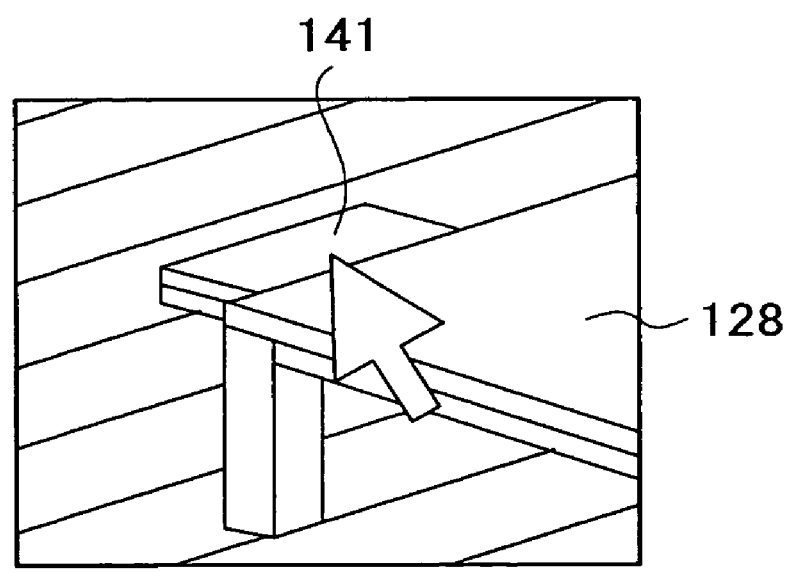
FIG. 20B also illustrates a difference between an operation for arranging an icon by superimposing the icon on another icon and an operation for arranging an icon behind another icon.

Conversely, dragging the board game set icon 141, from the upper left to the lower right in the screen, to the table icon 128 and dropping the board game set icon 141 thereon can arrange the board game set icon 141 behind the table icon 128 as shown in FIG. 20B.

Every time the arrangement or orientation of each icon has been changed as described above, the layout information is updated accordingly and the updated layout information is sent to the virtual home DB server 21 in a predetermined period.

The user can drag a desired icon in the virtual room and drop the icon onto the closet icon 131, thereby accommodating the icon into the closet (however, some icons cannot be accommodated in the closet).

For example, as shown in FIG. 21, when the board game set icon 141 is dragged to the closet icon 131, the door of the closet icon 131 opens. When the board game set icon 141 is dropped in this state, the board game set icon 141 is accommodated in the closet.

Figure 22:
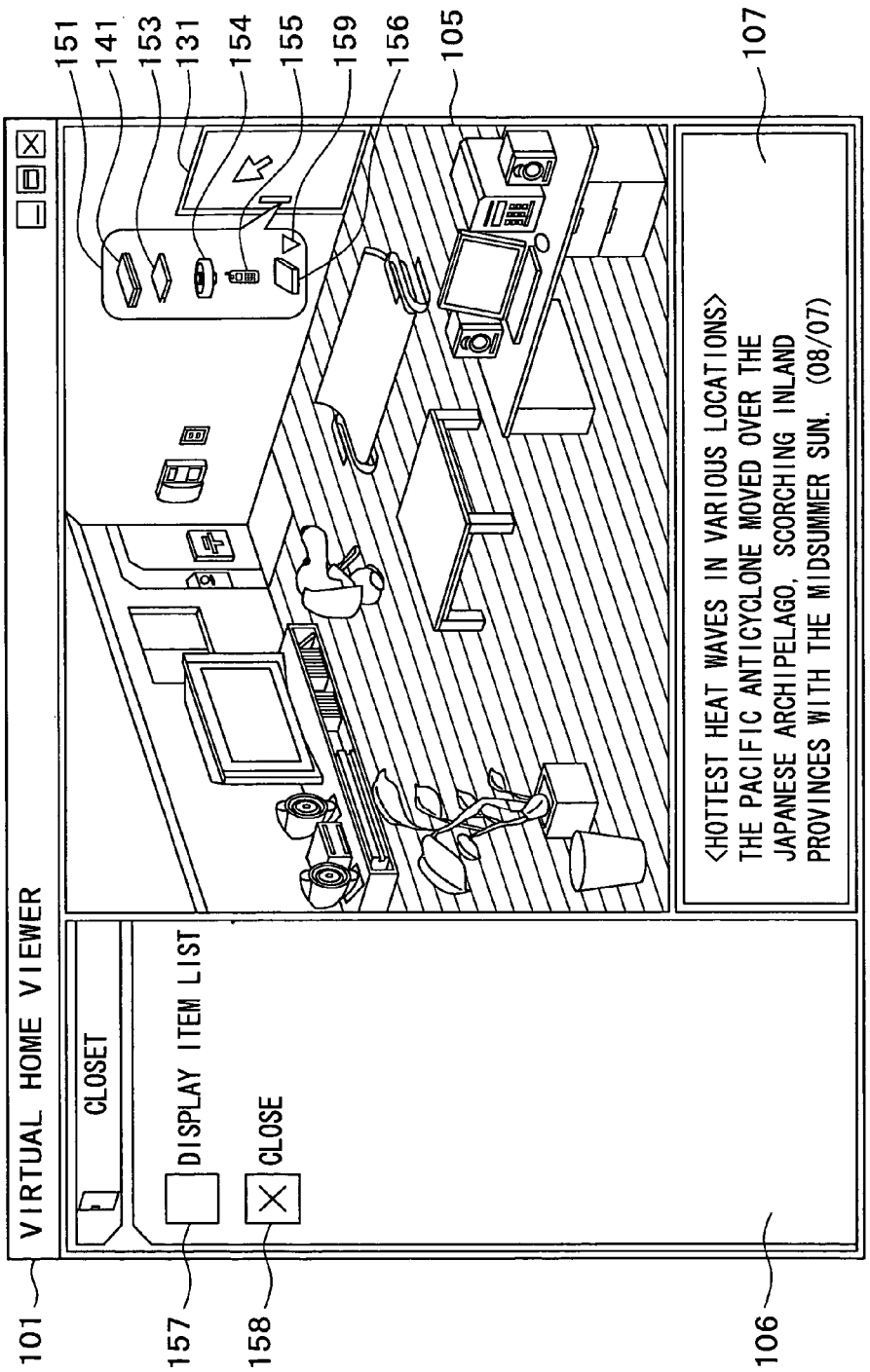
FIG. 22 illustrates an exemplary display upon selection of a closet icon.

When an icon has been accommodated in the closet icon 131, the closet icon 131 becomes the selected state (in the figure, the framed state) as shown in FIG. 22. When the closet icon 131 is in the selected state, a popup list 151 is displayed adjacent to the closet icon 131.

The popup list 151 shows the accommodated icons in reduced size in the order of accommodation and up to the predetermined number (five in the case of FIG. 22). If more than the predetermined number of icons are accommodated in the closet, a scroll button 159 is shown in the popup list 151. This scroll button 159 is clicked to display all the accommodated icons by scrolling.

When the closet icon 131 is in the selected state, the control panel 106 shows "Display Item List" button 157 and "Close" button 158.

Figure 23:
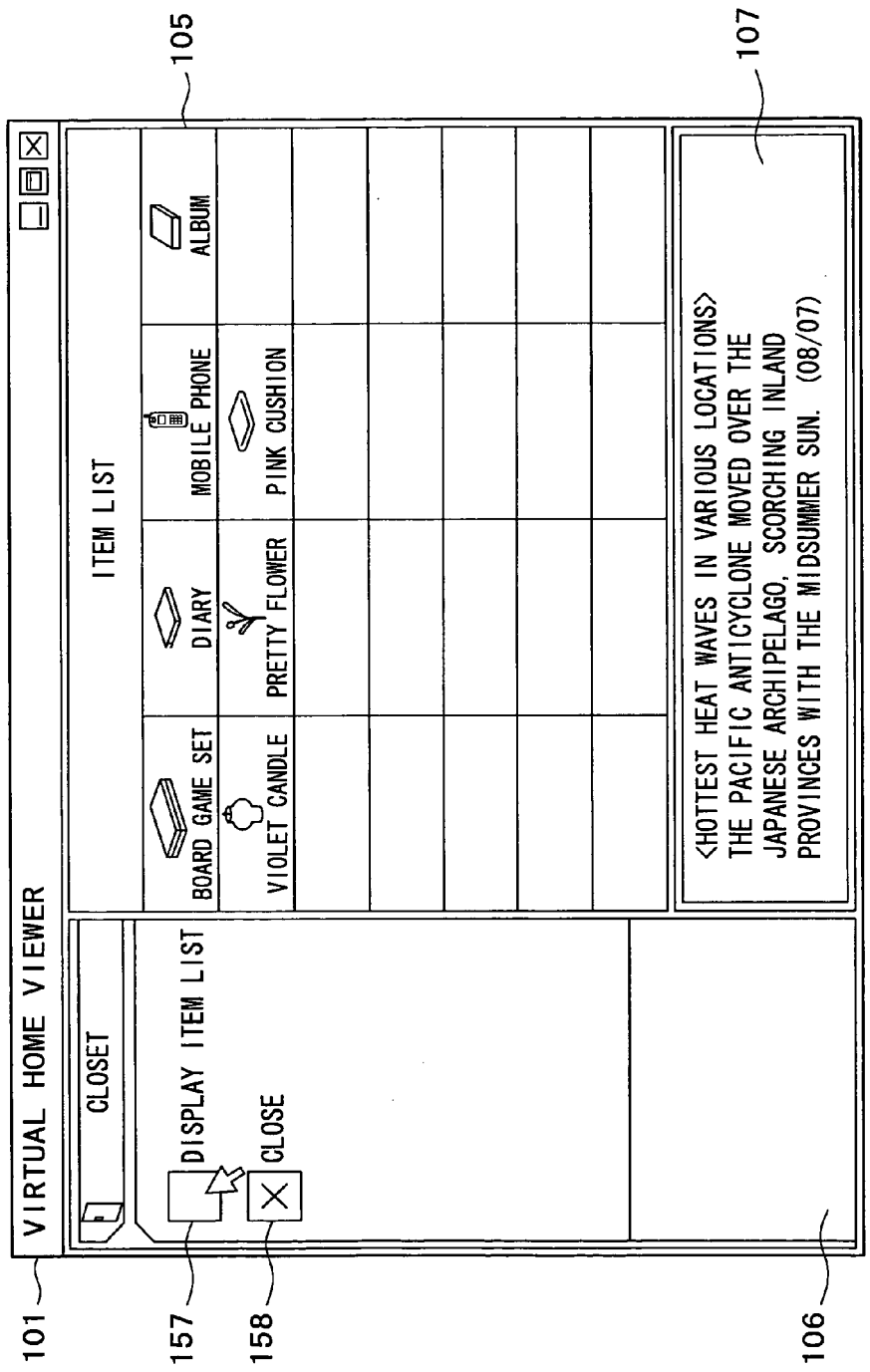
FIG. 23 illustrates an exemplary display of an item list.

The "Display Item List" button 157 is clicked when displaying all icons accommodated in the closet into the main panel 105 as shown in FIG. 23. The "Close" button 158 is clicked when returning the display of the main panel 105 to the virtual room when the item list is displayed in the main panel 105.

Figure 24:
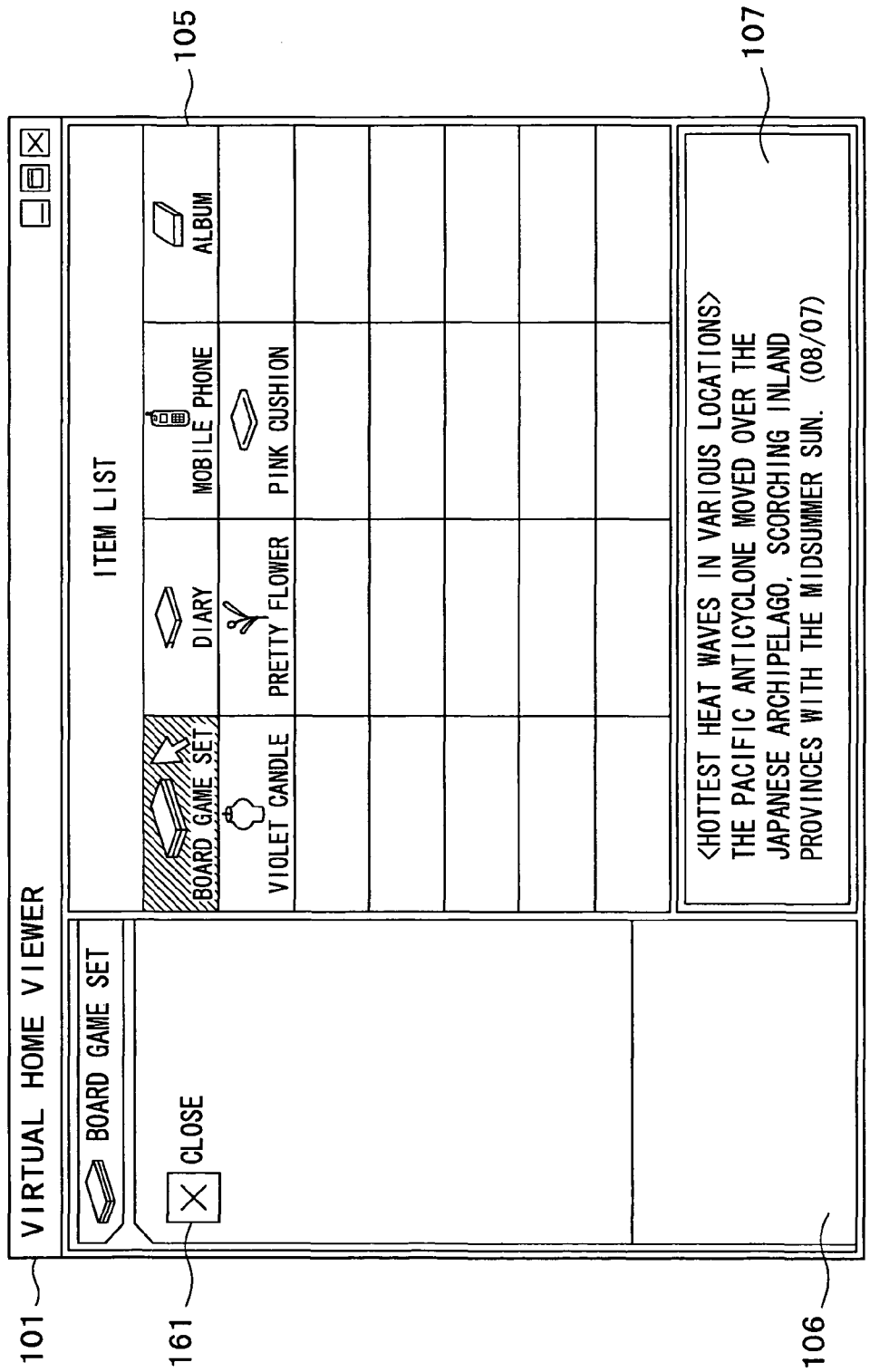
FIG. 24 illustrates an exemplary display in which one item has been selected from the item list.

As shown in FIG. 24, when the user selects one of the items in the item list shown in the main panel 105 (in the example of FIG. 24, the board game set icon 141 accommodated in the closet), the control panel 106 shows the property of the selected icon and "Close" button 161 which is clicked to return the display of the main panel 105 to the virtual room.

Figure 25:
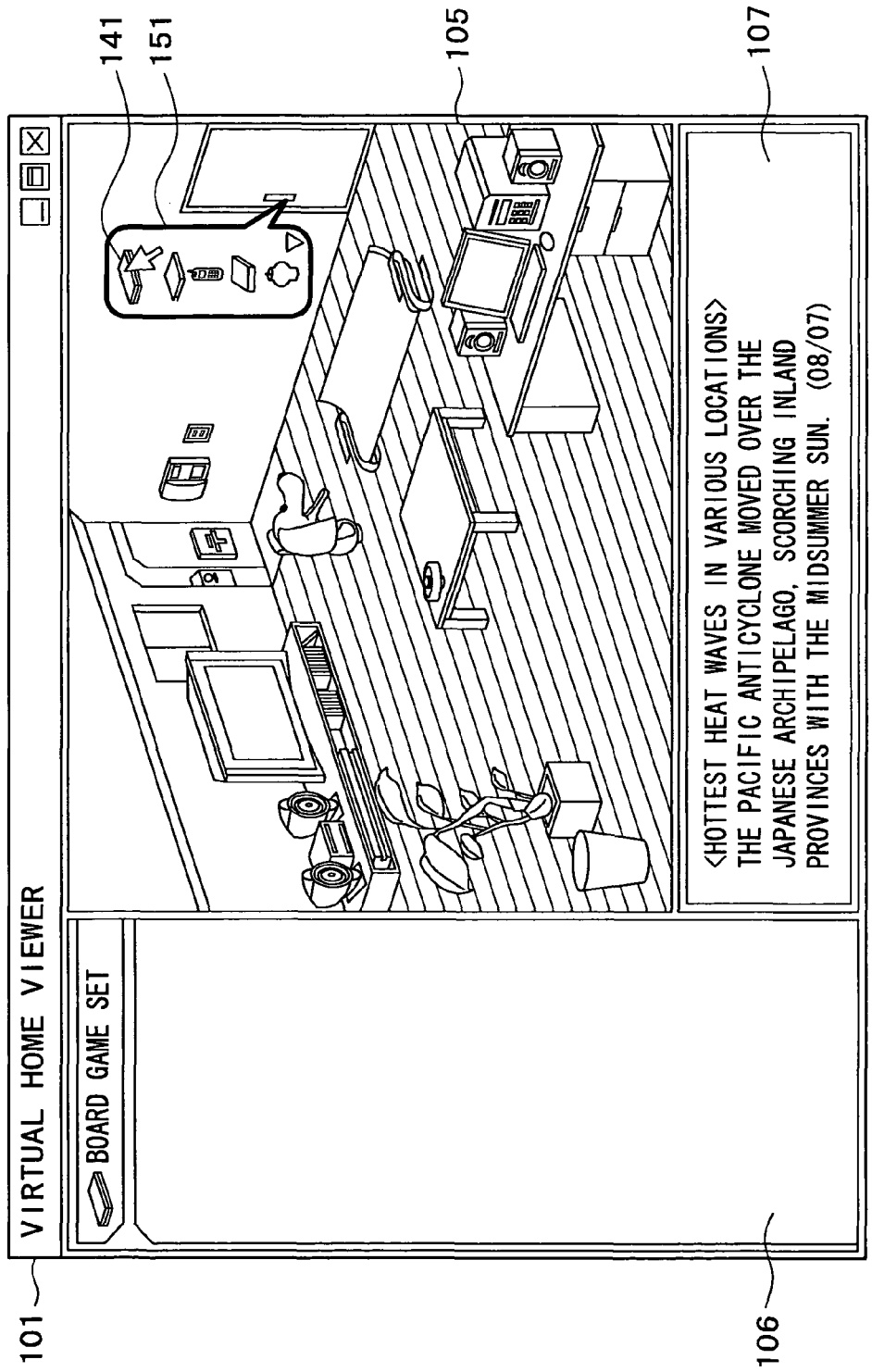
FIG. 25 illustrates an operation for getting an icon from the closet into the room.

However, in the example of FIG. 24, the property of the selected board game set icon 141 does not especially exist, so that only the "Close" button 161 is shown. When the "Close" button 161 is clicked, the display of the main panel 105 is returned to the virtual room as shown in FIG. 25.

Figure 26:
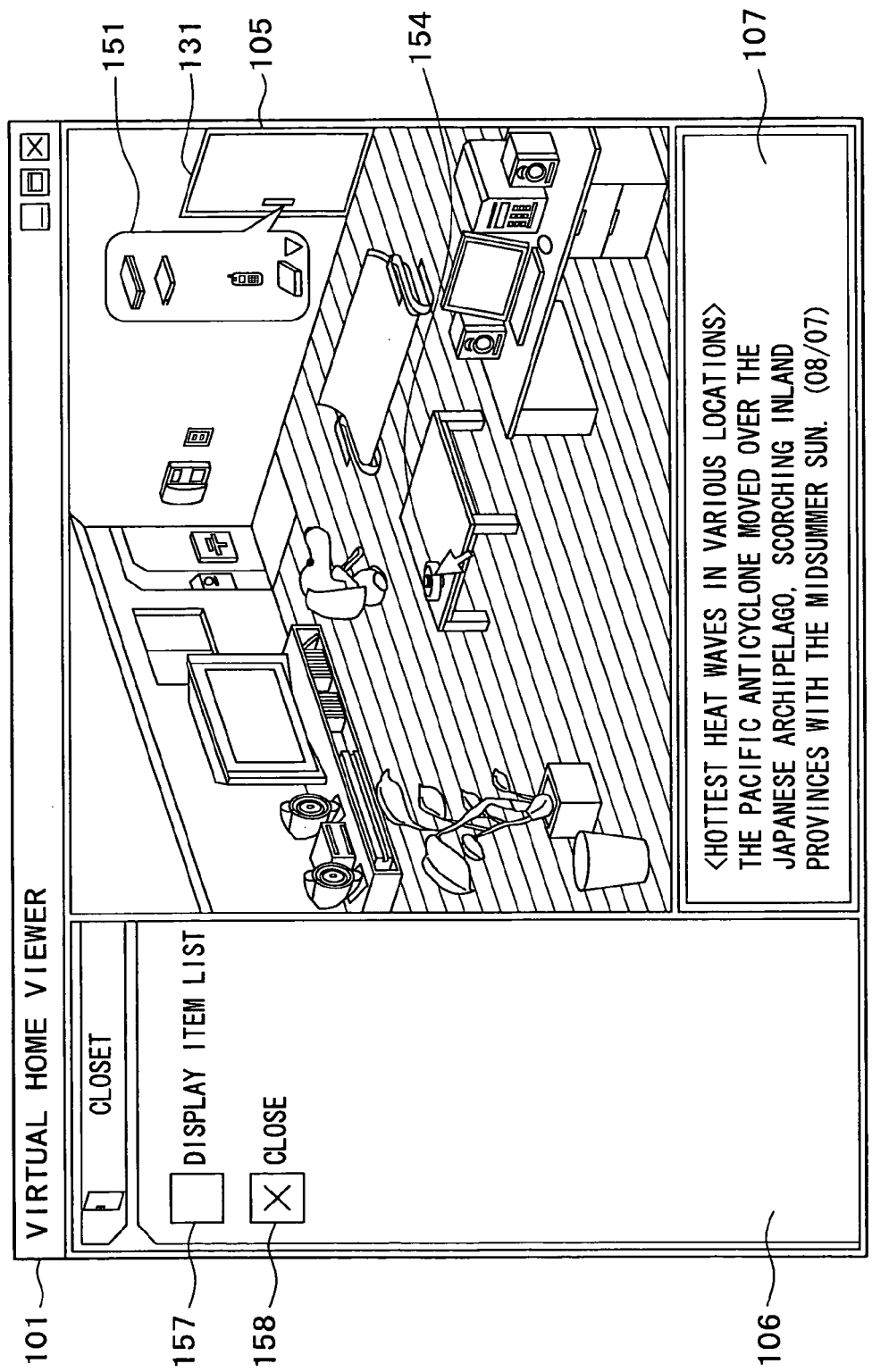
FIG. 26 also illustrates an operation for getting an icon from the closet into the room.

By dragging a desired icon from the popup list 151 and dropping the icon at a desired place in the virtual room, the user can arrange any icons accommodated in the closet into the virtual room again. For example, FIG. 26 shows that an ashtray icon 154 accommodated in the closet is arranged on the table icon 128 in the virtual room.

Figure 27:
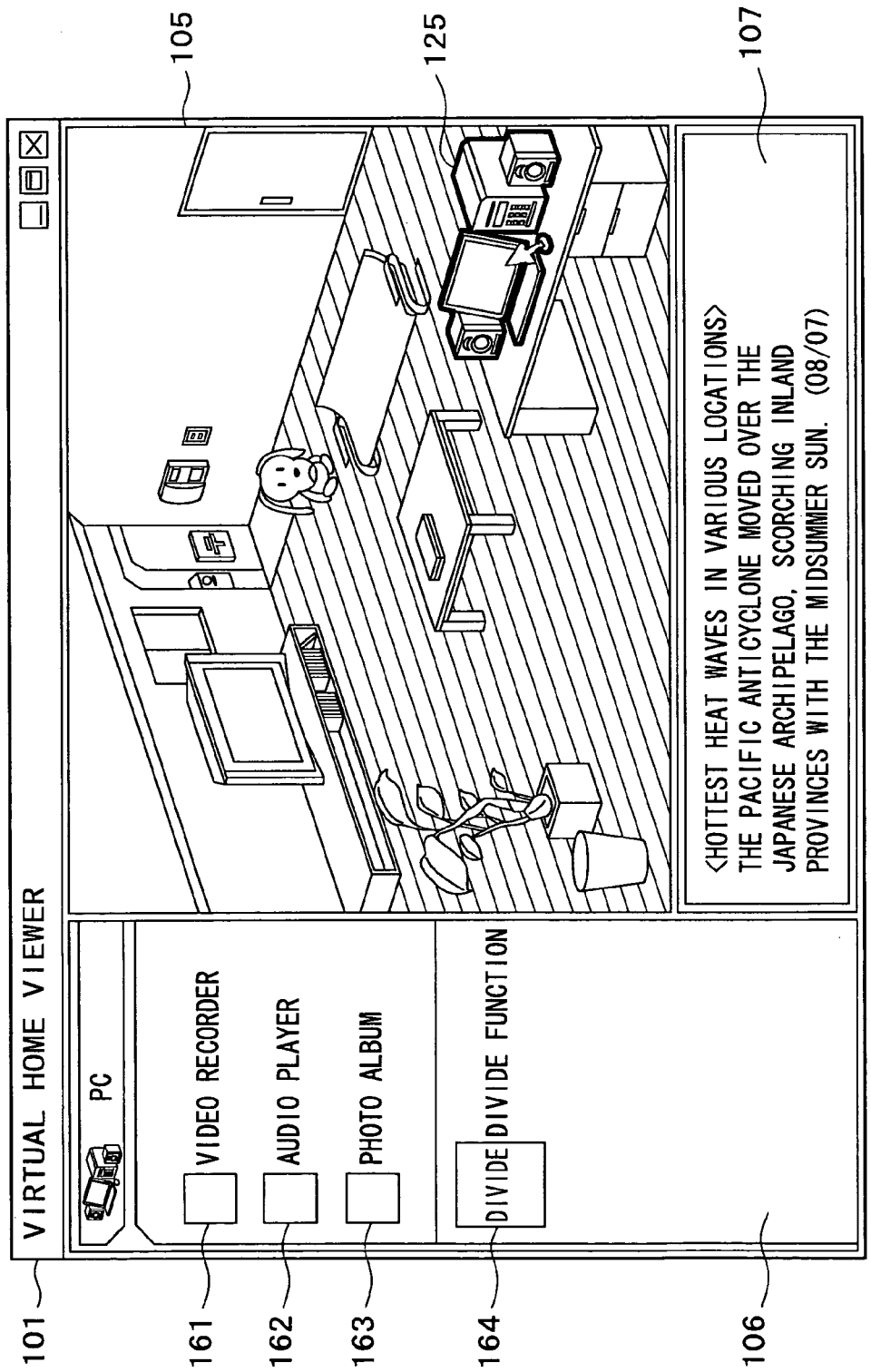
FIG. 27 illustrates an exemplary display upon selection of a PC icon.

Referring to FIG. 27, there is shown a state in which the PC icon 125 is selected in the virtual room shown in the main panel 105. When the user selects the PC icon 125, the control panel 106 shows a "Video Recorder" button 161, "Audio Player" button 162, and "Photo Album" button 163. The button correspond to the capabilities realized by the PC 12 in user A's home controllable from the virtual home viewer program 51.

The "Video Recorder" button 161 is clicked when controlling the HDD video recorder 92, which can be realized by the PC 12. The "Audio Player" button 162 is clicked when controlling the audio data transmission service 93, which can be realized by the PC 12. The "Photo Album" button 163 is clicked when controlling the photograph data transmission service 94, which can be realized by the PC 12.

In addition to the PC icon 125 corresponding to the PC 12, the control panel 106 shows "Divide Function" button 164 that is clicked to show the icons, which correspond to the HDD video recorder 92, the audio data transmission service 93, and the photograph data transmission service 94, in the virtual room. Namely, when the "Divide Function" button 164 is clicked, a video recorder icon 171, an audio player icon 172, and a photo album icon 173 appear in an empty place on the floor in addition to the PC icon 125. As with the other icons, the user can change the arrangement of the video recorder icon 171, the audio player icon 172, and the photo album icon 173 as desired.

Figure 28:
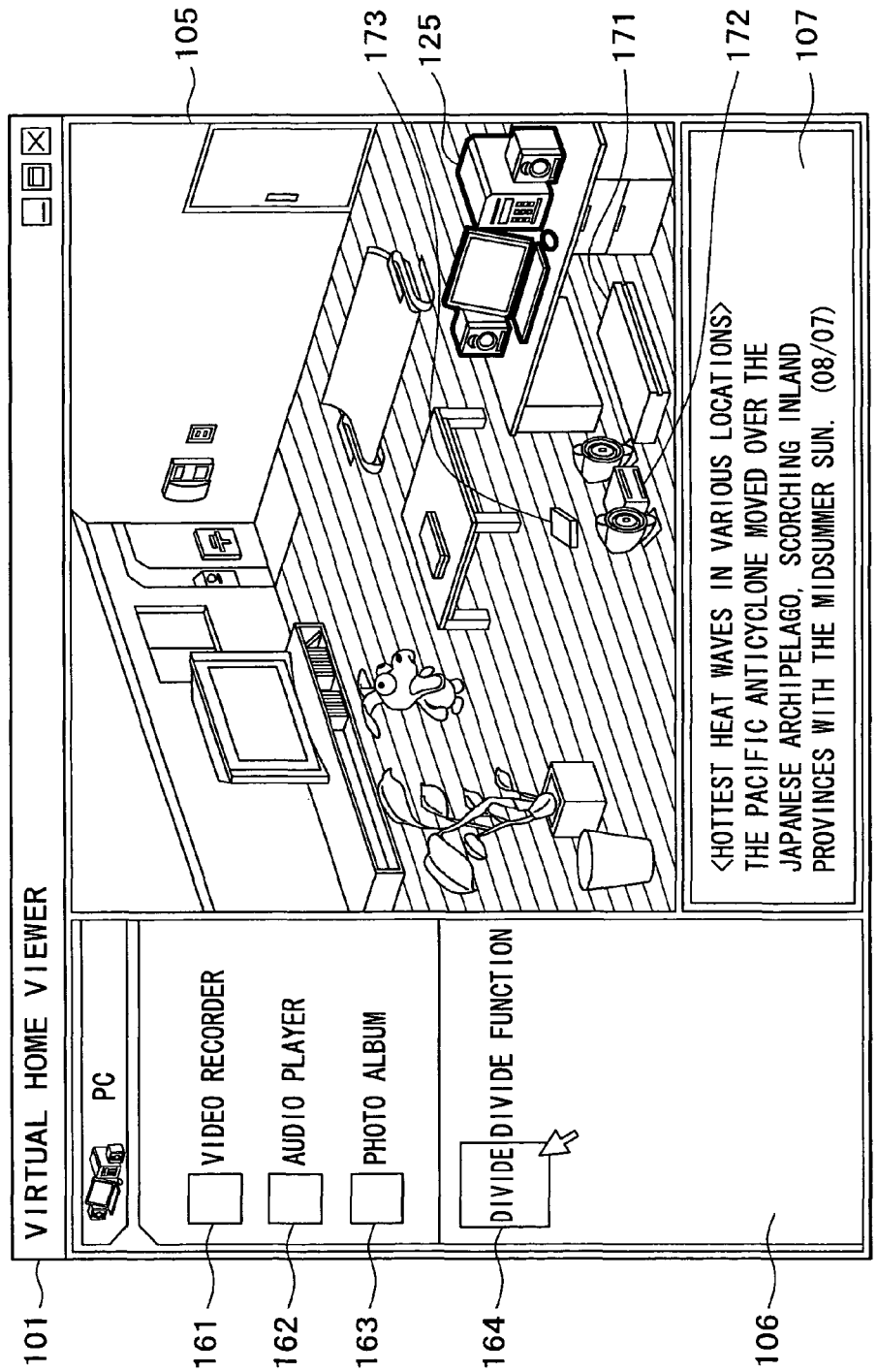
FIG. 28 illustrates an exemplary display in which a video recorder icon, an audio player icon, and a photo album icon have been separated from the PC icon.
Figure 29:
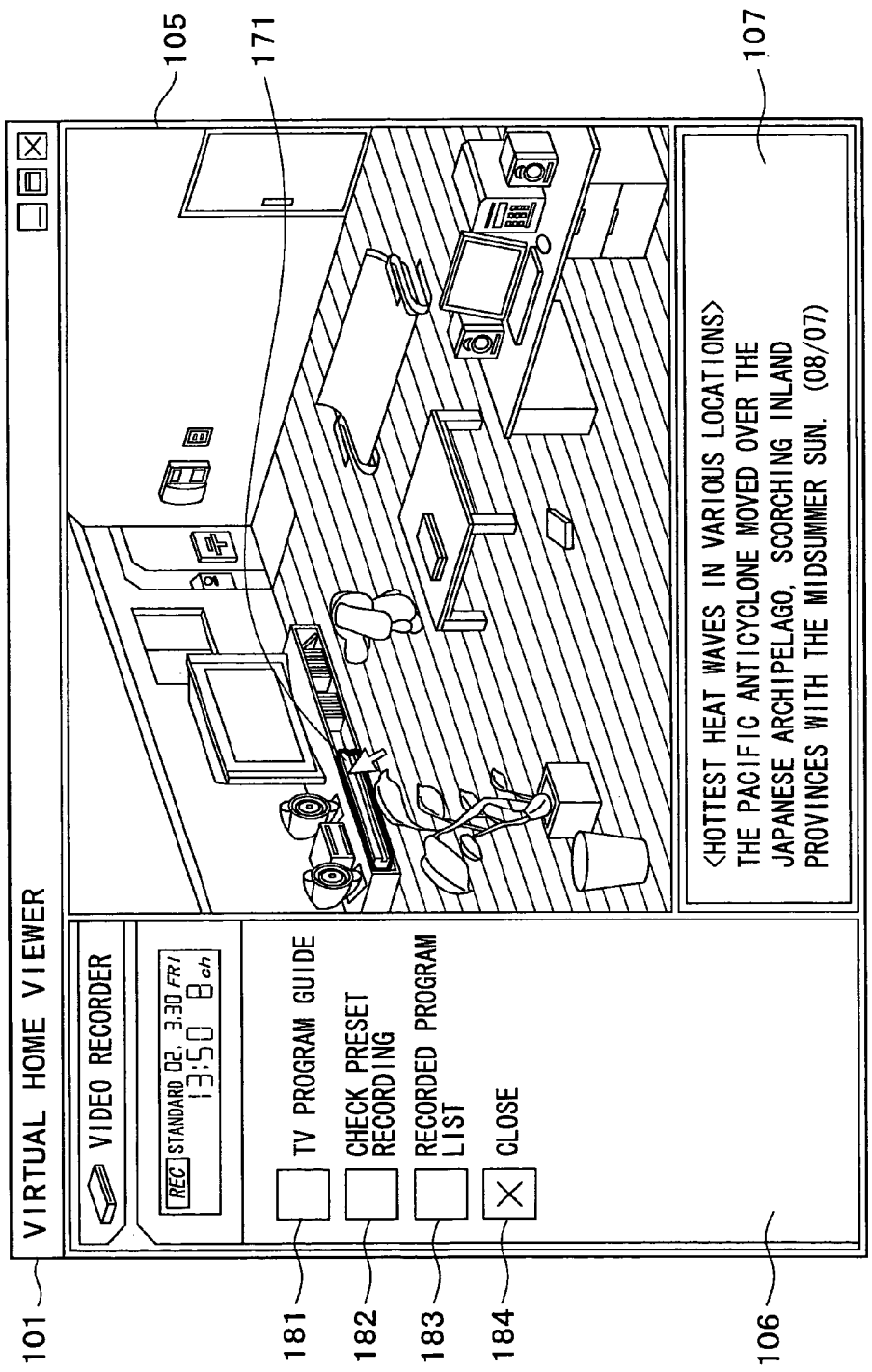
FIG. 29 illustrates an exemplary display in which the video recorder icon has been separated.

Referring to FIG. 29, there is shown a state in which the arrangement of the video recorder icon 171 and the audio player icon 172 has been changed from the state shown in FIG. 28 and the video recorder icon 171 is selected by the user. When the video recorder icon 171 is selected, the control panel 106 shows the current state of the HDD video recorder 92 as the property of the video recorder icon 171. It should be noted that, in order to show the current state of the HDD video recorder 92, the current status information of the PC 12 obtained by the home network information acquisition processing executed earlier is used.

In addition, the control panel 106 shows "TV Program Guide" button 181 being clicked to show a television program guide (hereafter referred to as a TV program guide) in the main panel 105, "Check Preset Recording" button being clicked to show the information about preset recording in the main panel 105, "Recorded Program List" button 183 being clicked to show a list of recorded programs in the main panel 105, and "Close" button 184 being clicked to return the display of the main panel 105 to the display of the virtual room.

Figure 30:
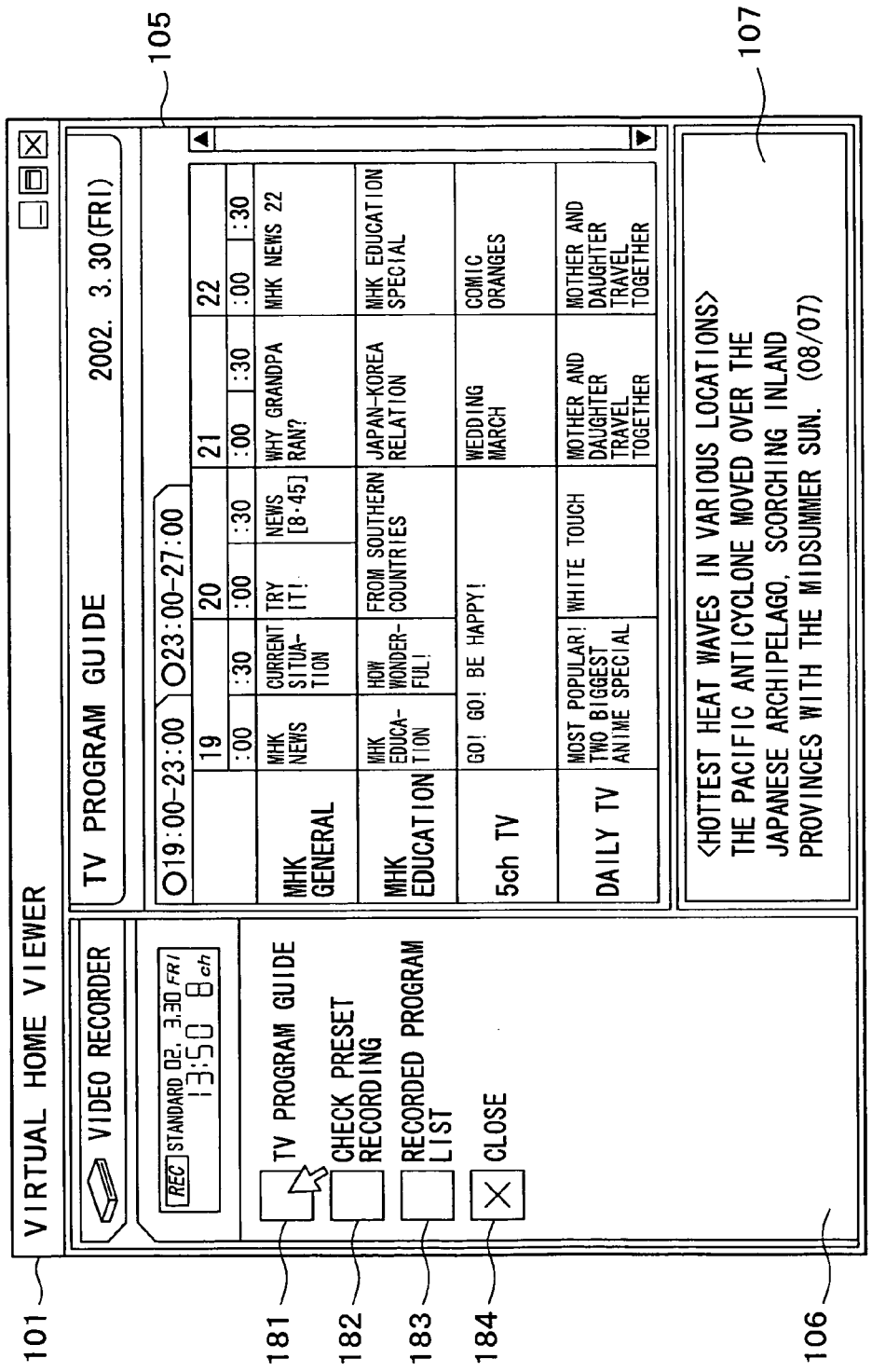
FIG. 30 illustrates an exemplary display of a television program guide.

Referring to FIG. 30, there is shown a state in which a TV program guide is shown in the main panel 105 in response to the clicking of the "TV Program Guide" button 181. For the displaying of a TV program guide, the EPG information obtained by the virtual home viewer program 51 from the EPG server 25 is used.

Figure 31:
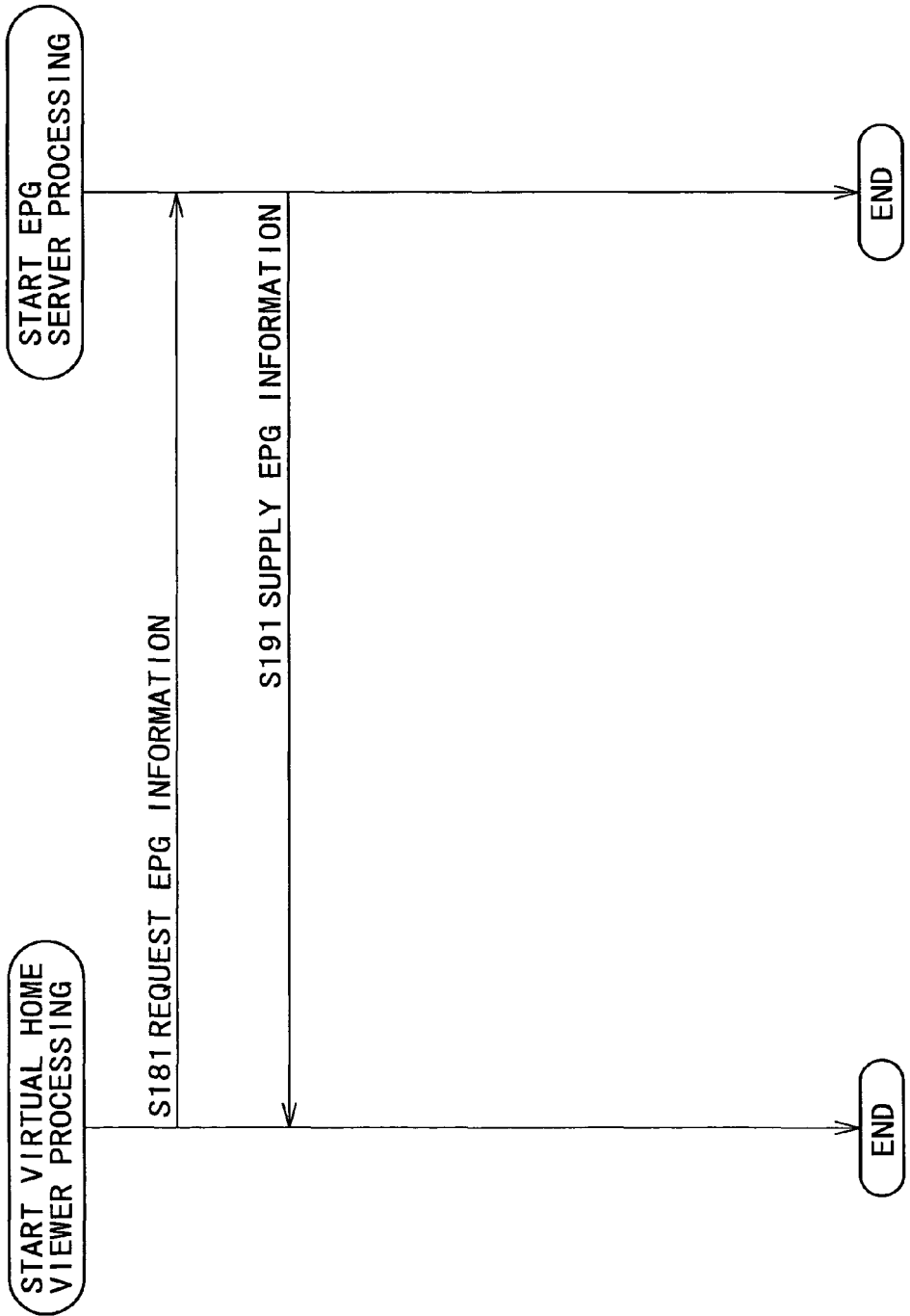
FIG. 31 is a flowchart for describing EPG information acquisition processing.

The following describes the EPG information acquisition processing being executed by the virtual home viewer program 51, with reference to the flowchart shown in FIG. 31. In step S181, the virtual home viewer program 51 accesses the EPG server 25 via the base station 4 and the Internet 5 to request for EPG information. In response to this request, the EPG server 25 supplies the requested EPG information to the virtual home viewer program 51 via the Internet 5 and the base station 4 in step S191. This is the EPG information acquisition processing.

Figure 32:
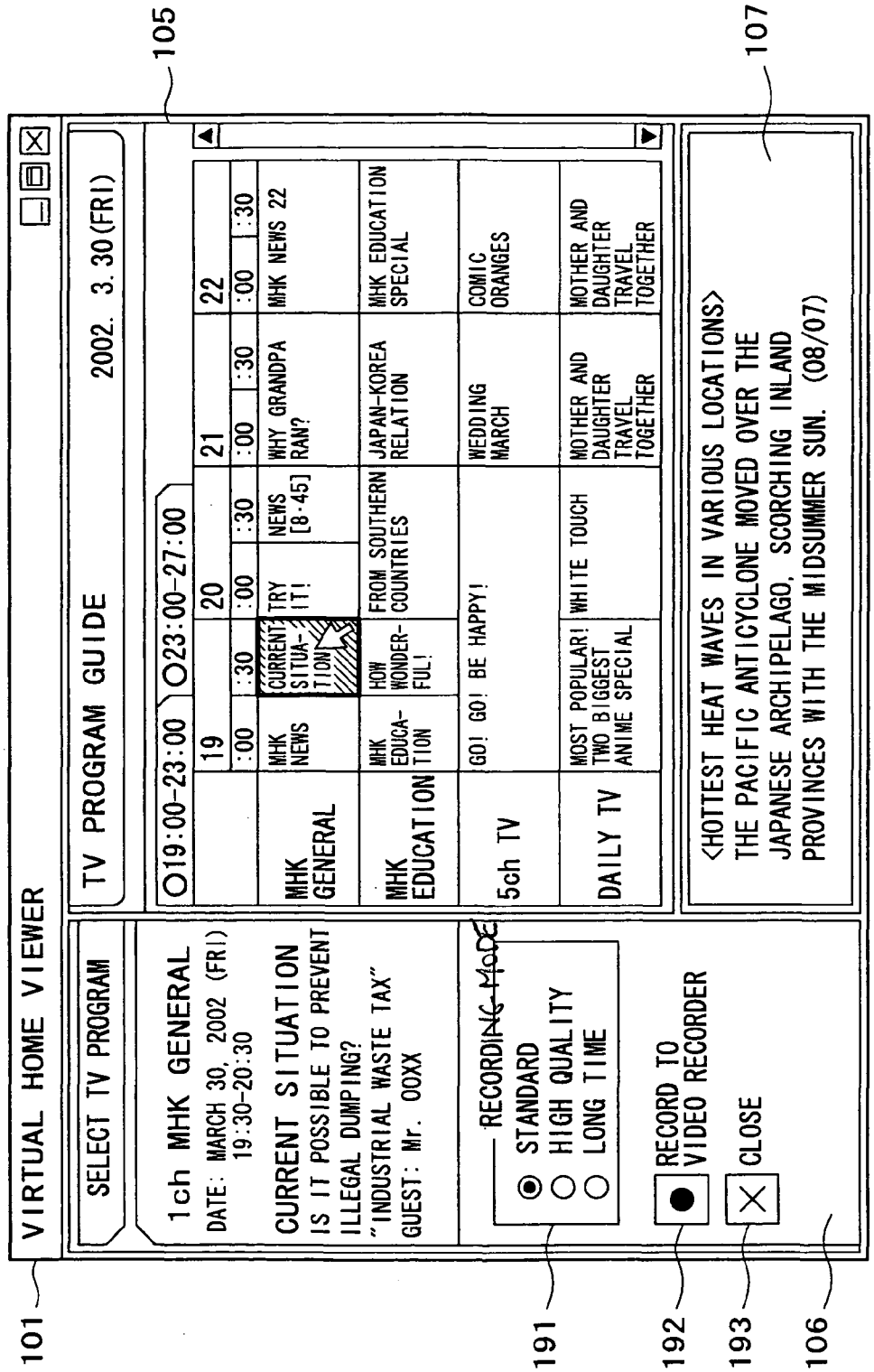
FIG. 32 illustrates an exemplary display upon selection of the television program guide.

As shown in FIG. 32, when one of the program names listed in the TV program guide shown in the main panel 105 is selected by the user, the control panel 106 shows "Record Mode" setting box 191 being clicked to set the recording mode for recording the selected program to the standard mode, the high quality mode, or the long time mode, "Record" button 192 being clicked to preset the recording of the selected program, and "Close" button 193 being clicked to return the display of the main panel 105 to the state in which the video recorder icon 171 is selected in the virtual room.

Figure 33:
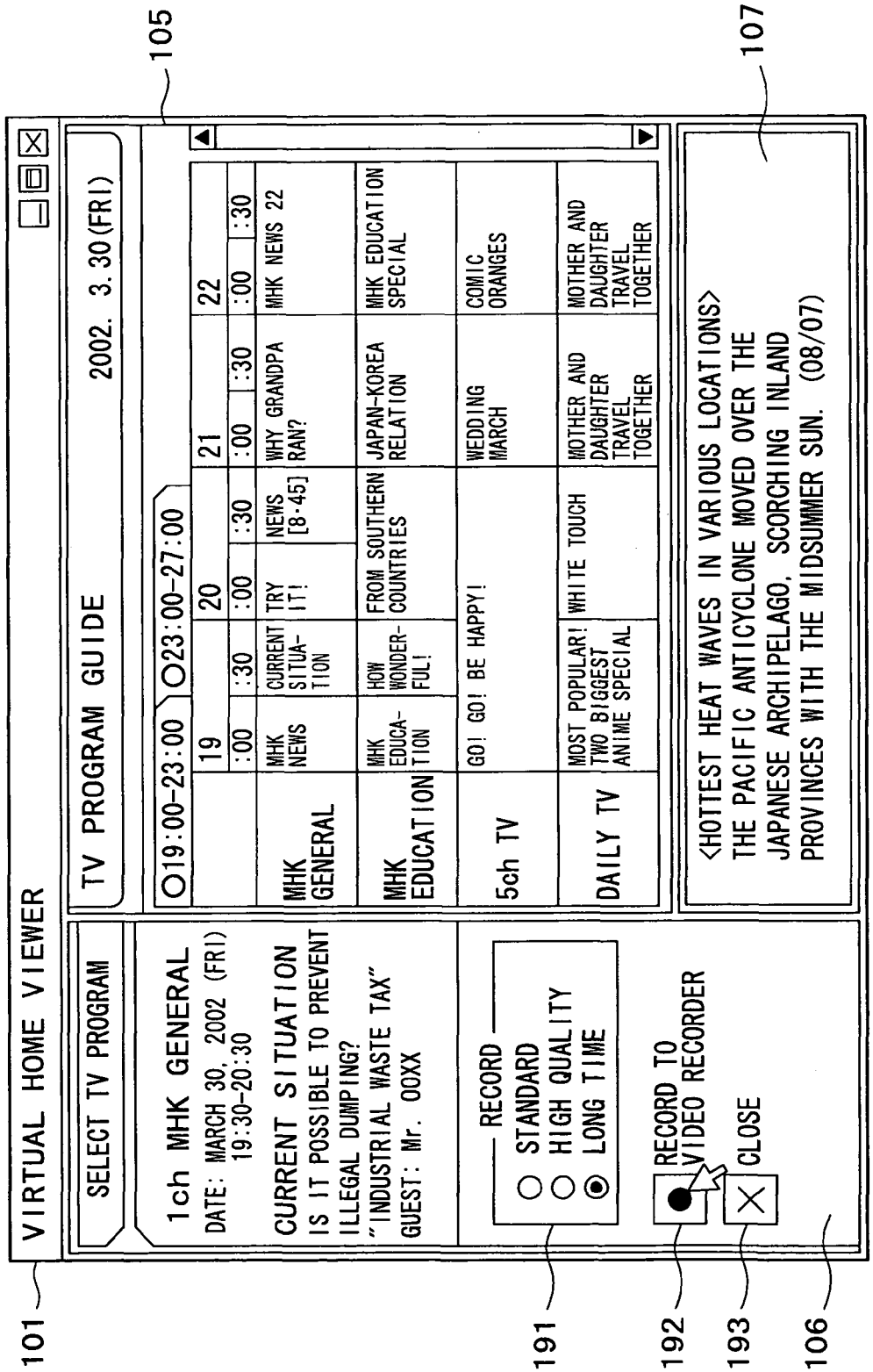
FIG. 33 illustrates a recording operation.

As shown in FIG. 33, when the "Record" button 192 is clicked with one of the program names listed in the TV program guide shown in the main panel 105 selected, the virtual home viewer program 51 sends to the home server 11, via the base station 4 and the Internet 5, a control signal for instructing the HDD video recorder 92 to preset the recording of the selected program. The home server 11 sends this control signal to the PC 12 via the data bus 14. Receiving this control signal, the HDD video recorder 92 of the PC 12 executes the preset recording in accordance with this control signal. Thus, user A can remotely control the preset recording of TV programs through the PC 12 of user A's home from the operator screen of the virtual home viewer program 51, which is executed on the portable user terminal 1.

Returning to the description of the control panel 106 when the video recorder icon 171 is selected. Clicking "Recorded Program List" button 183 causes the main panel 105 to show a list of programs recorded by the HDD video recorder 92 of the PC 12.

It should be noted that the processing by the virtual home viewer program 51 executed on the portable user terminal 1 can also be executed by the virtual home viewer 91, which is realized by executing the virtual home viewer program 81 by the PC 12 of user A's home.

The following describes the processing being executed by the virtual home viewer 91, associated with the video recorder icon 171, and is conclusive only in user A's home.

Figure 34:
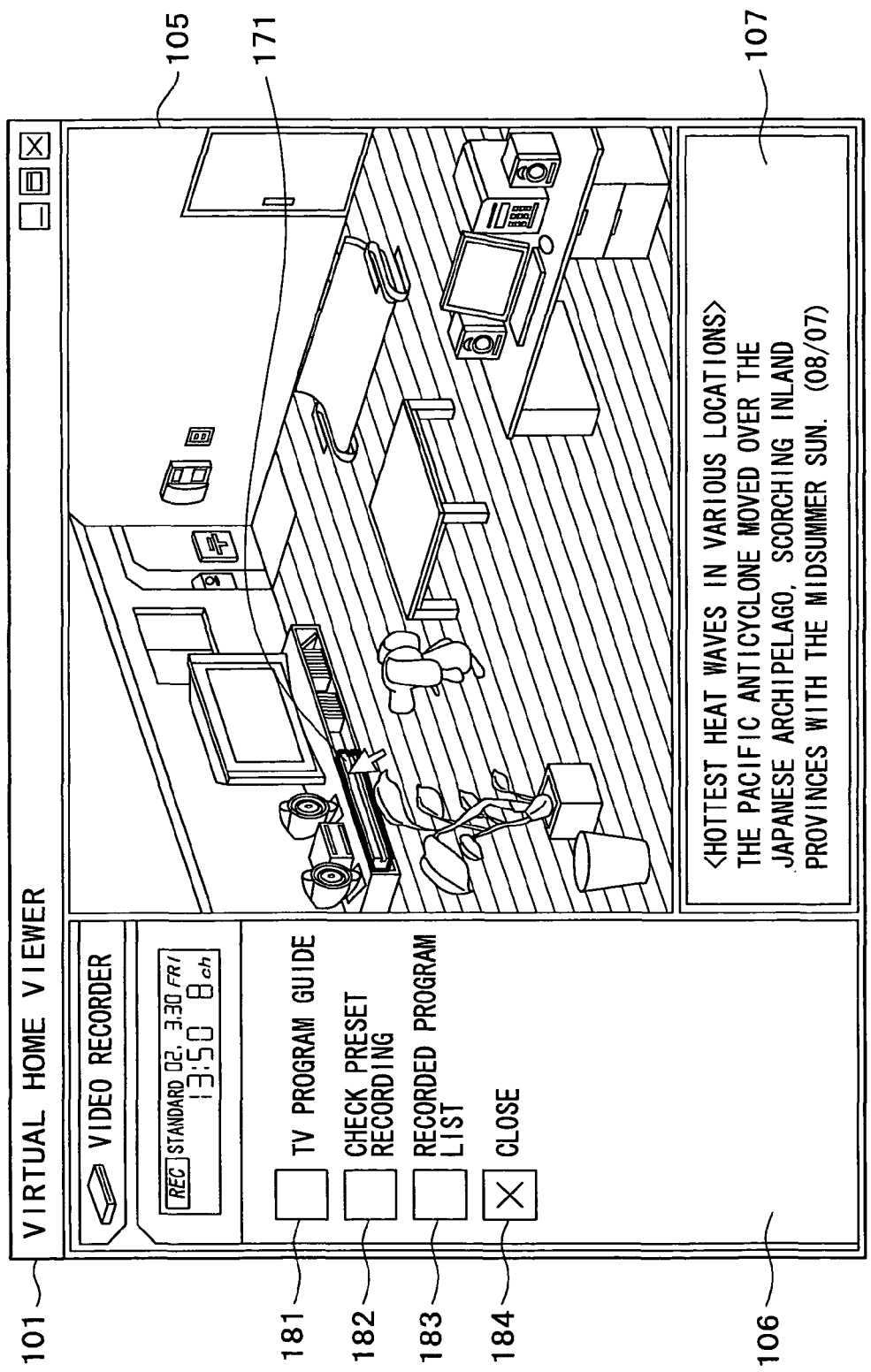
FIG. 34 illustrates an exemplary display in which the video recorder icon is selected.
Figure 35:
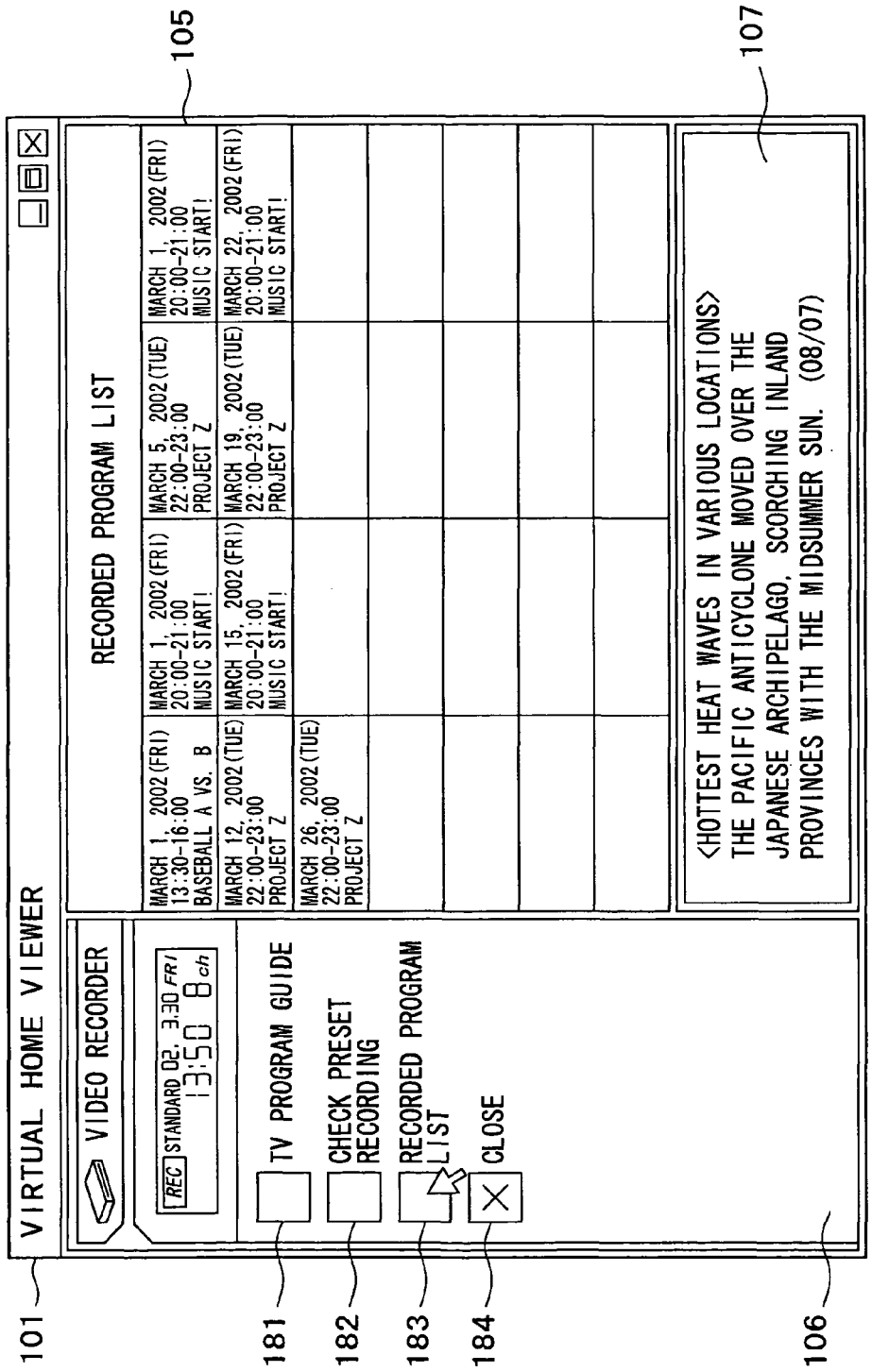
FIG. 35 illustrates an exemplary display of a recorded program list.

As shown in FIG. 34, when the "Recorded Program List" button 183 is clicked in the state in which the virtual room is displayed in the main panel 105 of the virtual home viewer 91, the video recorder icon 171 is selected, and the "TV Program Guide" button 181 through the "Close" button 184 are displayed in the control panel 106, a recorded program list indicative of the programs already recorded by the HDD video recorder 92 is shown in the main panel 105 of the virtual home viewer 91 as shown in FIG. 35.

Figure 36:
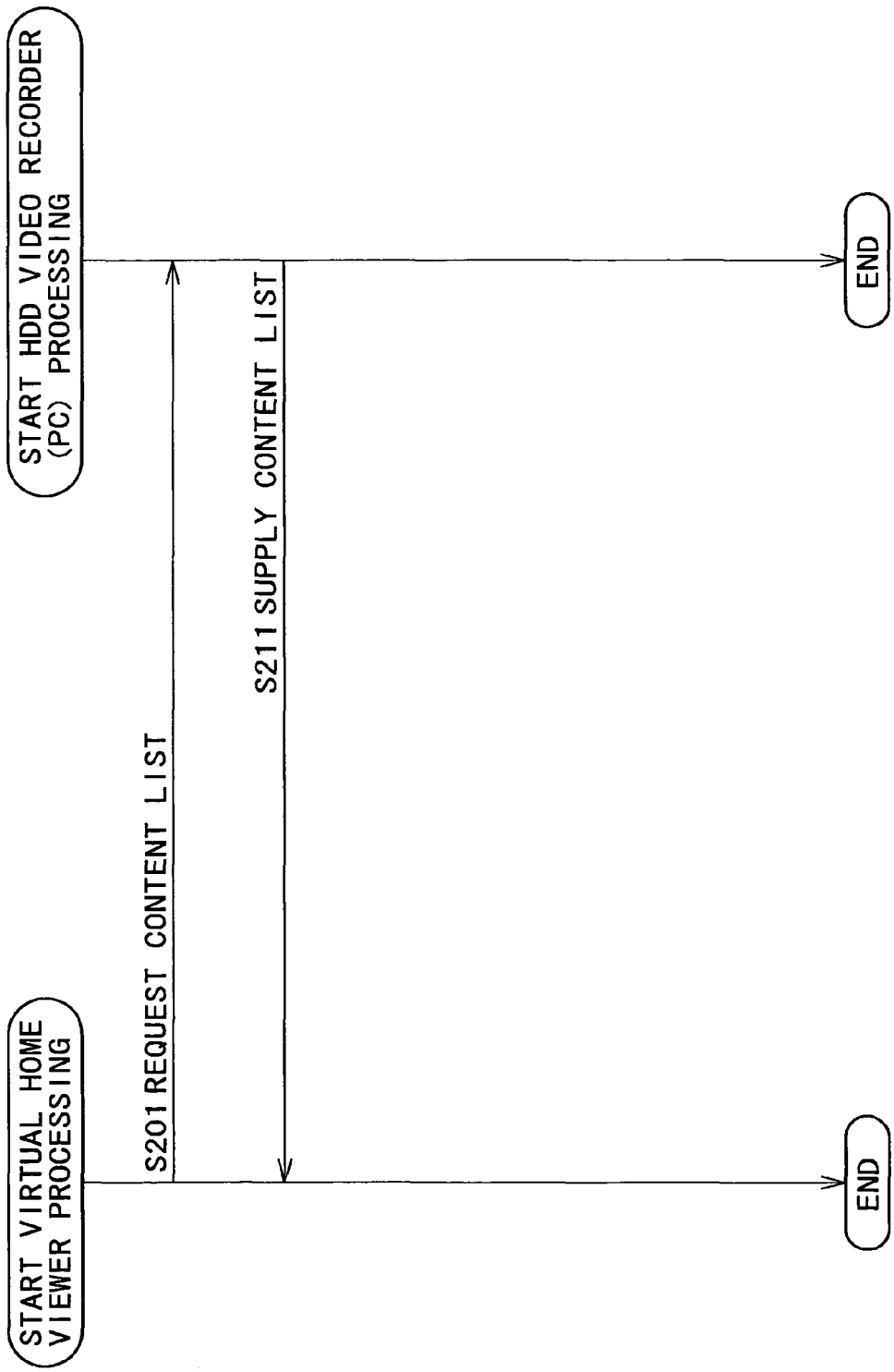
FIG. 36 is a flowchart for describing content list information acquisition processing.

In order to display this recorded program list, the virtual home viewer 91 gets content list information from the HDD video recorder 92. The following describes this content list information acquisition processing with reference to the flowchart shown in FIG. 36.

In step S201, the virtual home viewer 91 requests the HDD video recorder 92 for content list information. In step S211, in response to this request, the HDD video recorder 92 supplies the content list information to the virtual home viewer 91. This is the end of the description of the content list information acquisition processing.

Figure 37:
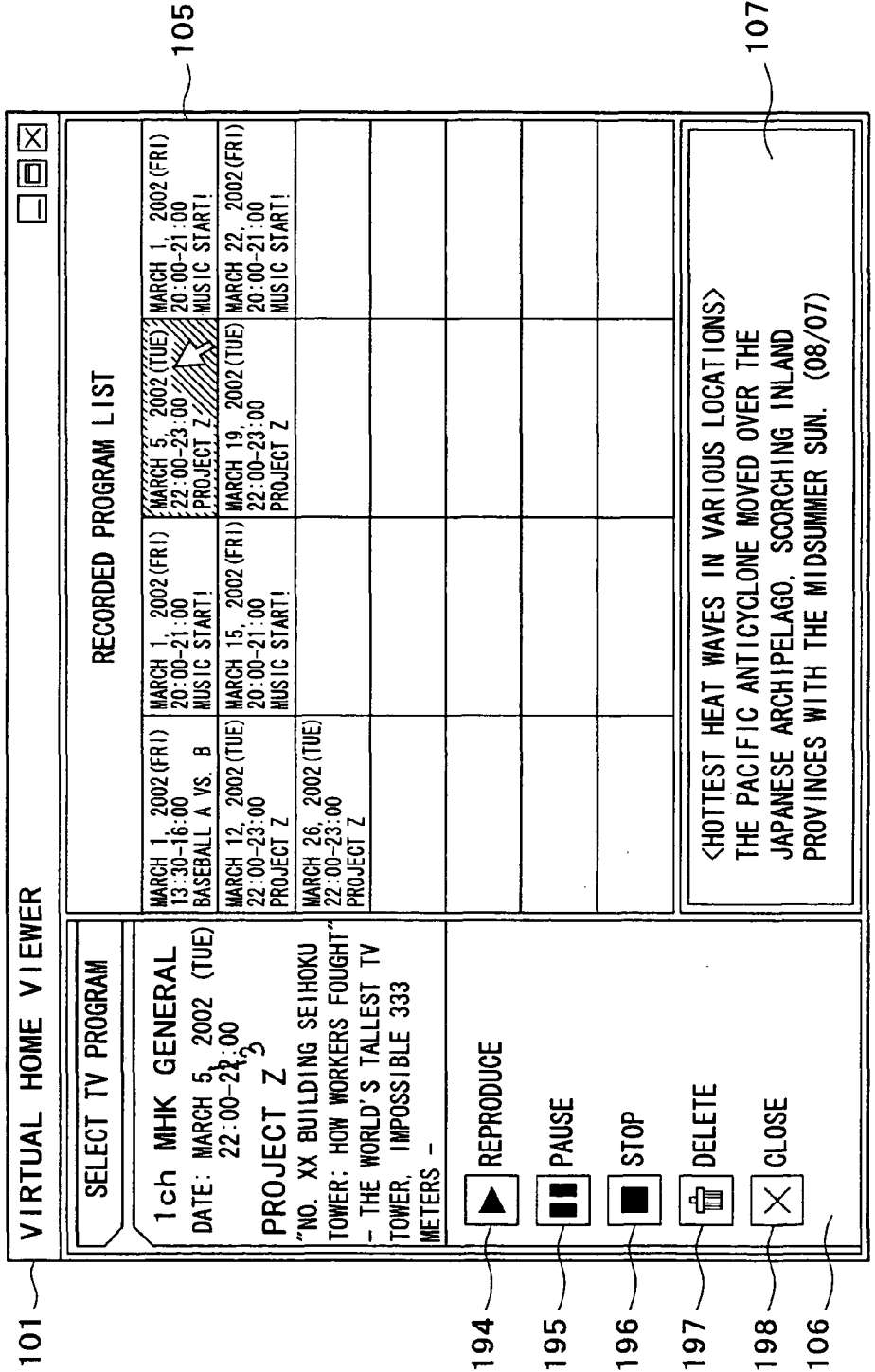
FIG. 37 illustrates an exemplary display upon selection of one of recorded programs.

If the user selects one of the program names in the recorded program list shown in the main panel 105, the control panel 106 shows, as shown in FIG. 37, the information about the contents of the selected recorded program, "Reproduce" button 194 being clicked to reproduce the selected recorded program, "Pause" button 195 being clicked to temporarily stop reproduction, "Stop" button 196 being clicked to stop reproduction, "Delete" button 197 being clicked to delete the selected recorded program, and "Close" button 198 being clicked to return the display of the main panel 105 to the state in which the video recorder icon 171 is selected in the virtual room.

As shown in FIG. 37, when the "Reproduce" button 194 is clicked with one of the recorded programs in the recorded program list shown in the main panel 105 selected, "Main Panel" button 194A and "TV Set" button 194B for switching between the destinations to which the TV program to be reproduced is outputted are shown adjacent to the "Reproduce" button 194.

Figure 39:
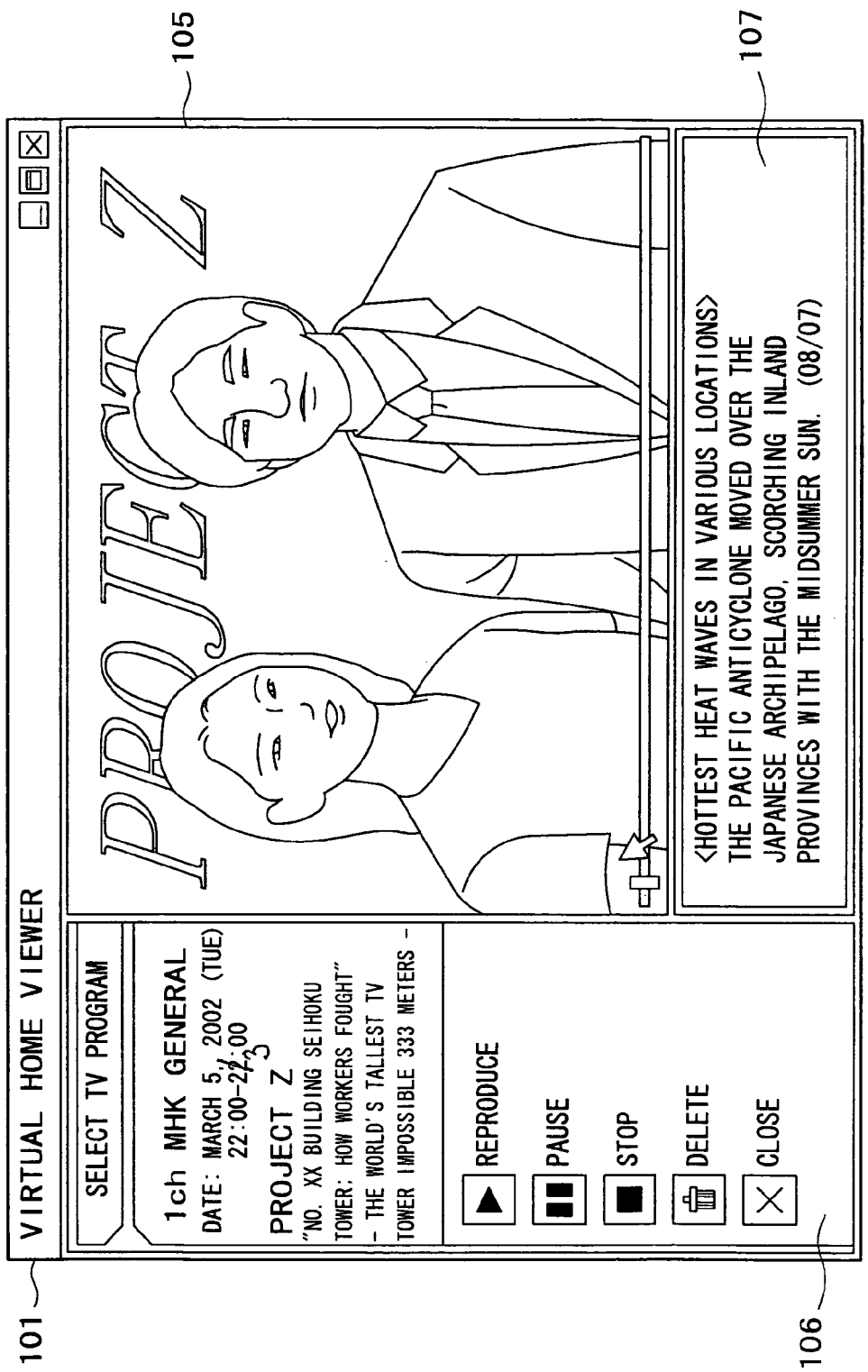
FIG. 39 illustrates an exemplary display when the video of the recorded program is displayed on a main panel.
Figure 40:
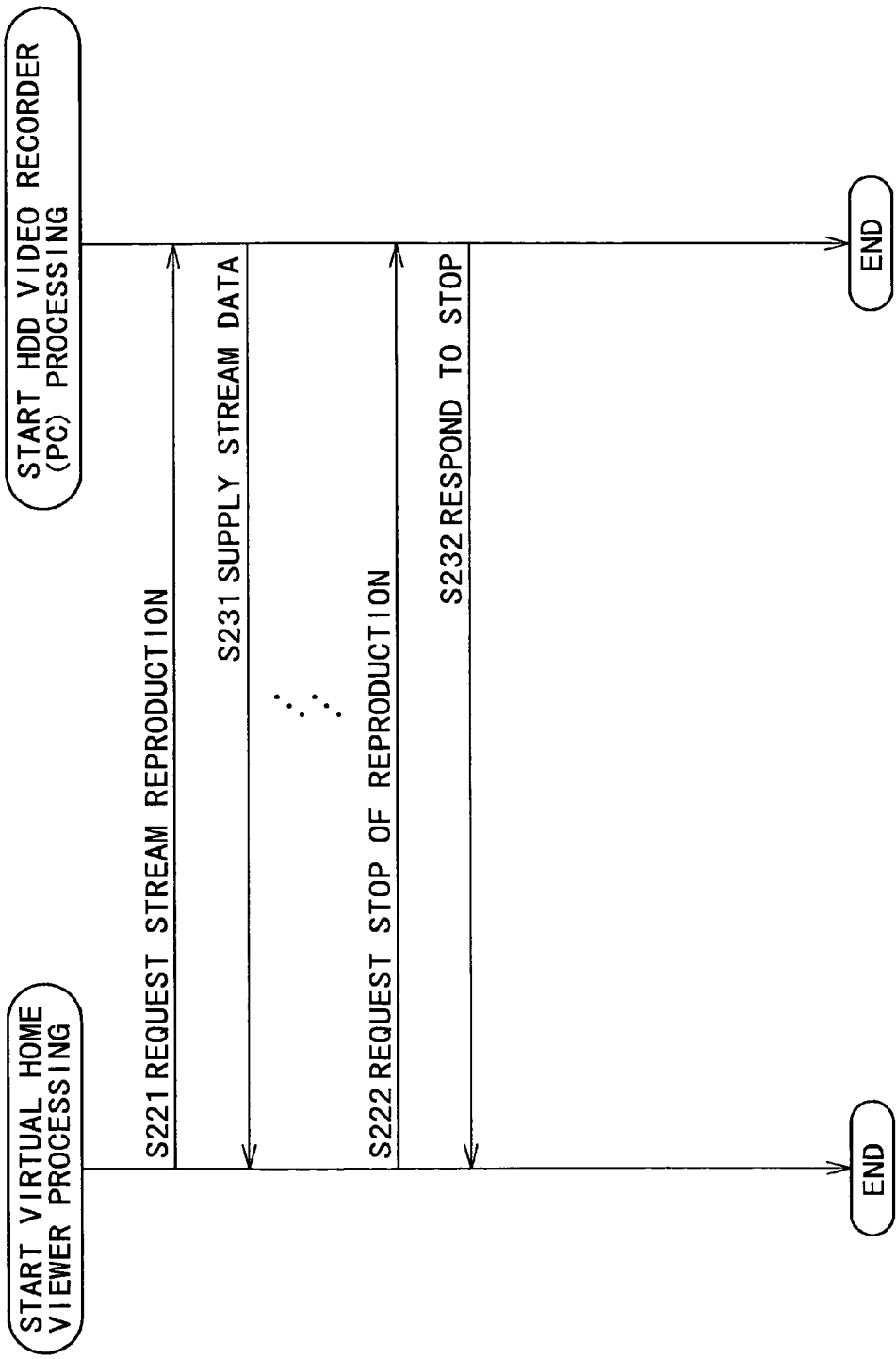
FIG. 40 is a flowchart for describing the processing of displaying the video of the recorded program on the main panel.

When "Main Panel" button 194A is clicked, the video of the TV program to be reproduced is displayed in the main panel 105 as shown in FIG. 39. The following describes this processing of displaying the reproduced video of each recorded program in the main panel 105, with reference to the flowchart shown in FIG. 40.

In step S221, the virtual home viewer 91 requests the HDD video recorder 92 for the stream reproduction of a selected recorded program. In step S231, in response to this request, the HDD video recorder 92 starts reproducing the recorded program and supplies its stream data to the virtual home viewer 91.

Next, when the user clicks "Pause" button 195 or the "Stop" button 196 shown in the control panel 106 of the virtual home viewer 91, the virtual home viewer 91 requests the HDD video recorder 92 to stop reproduction in step S222. In step S232, in response to this request, the HDD video recorder 92 stops reproduction of the recorded program, thereby stopping the supply of the stream data to the virtual home viewer 91 and notifies the virtual home viewer 91 of the stop of supplying the stream data. This is the end of the description of the processing of displaying a recorded program onto the main panel.

Figure 38:
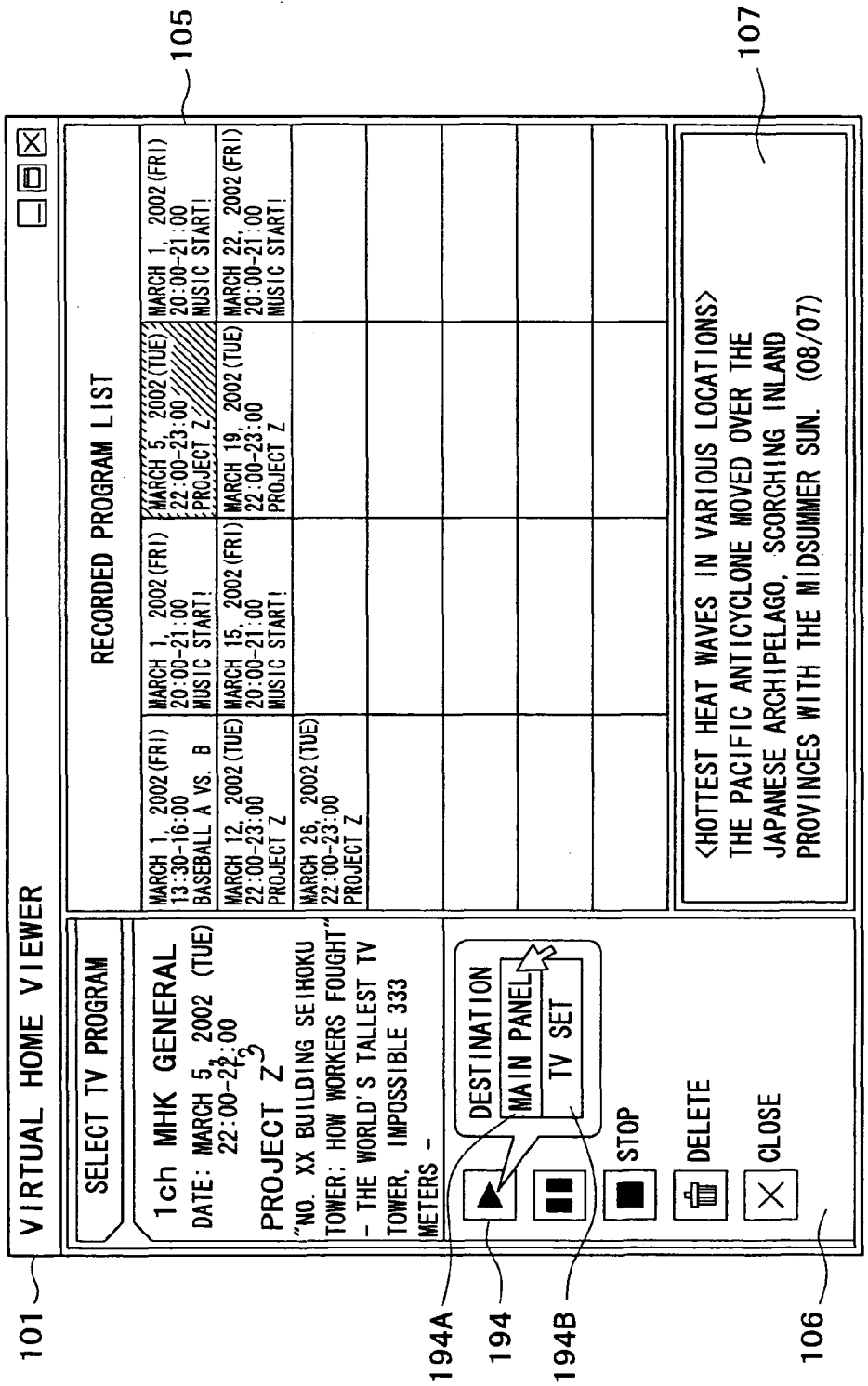
FIG. 38 illustrates an operation for selecting a destination to which the reproduction of a recorded program is outputted.
Figure 41:
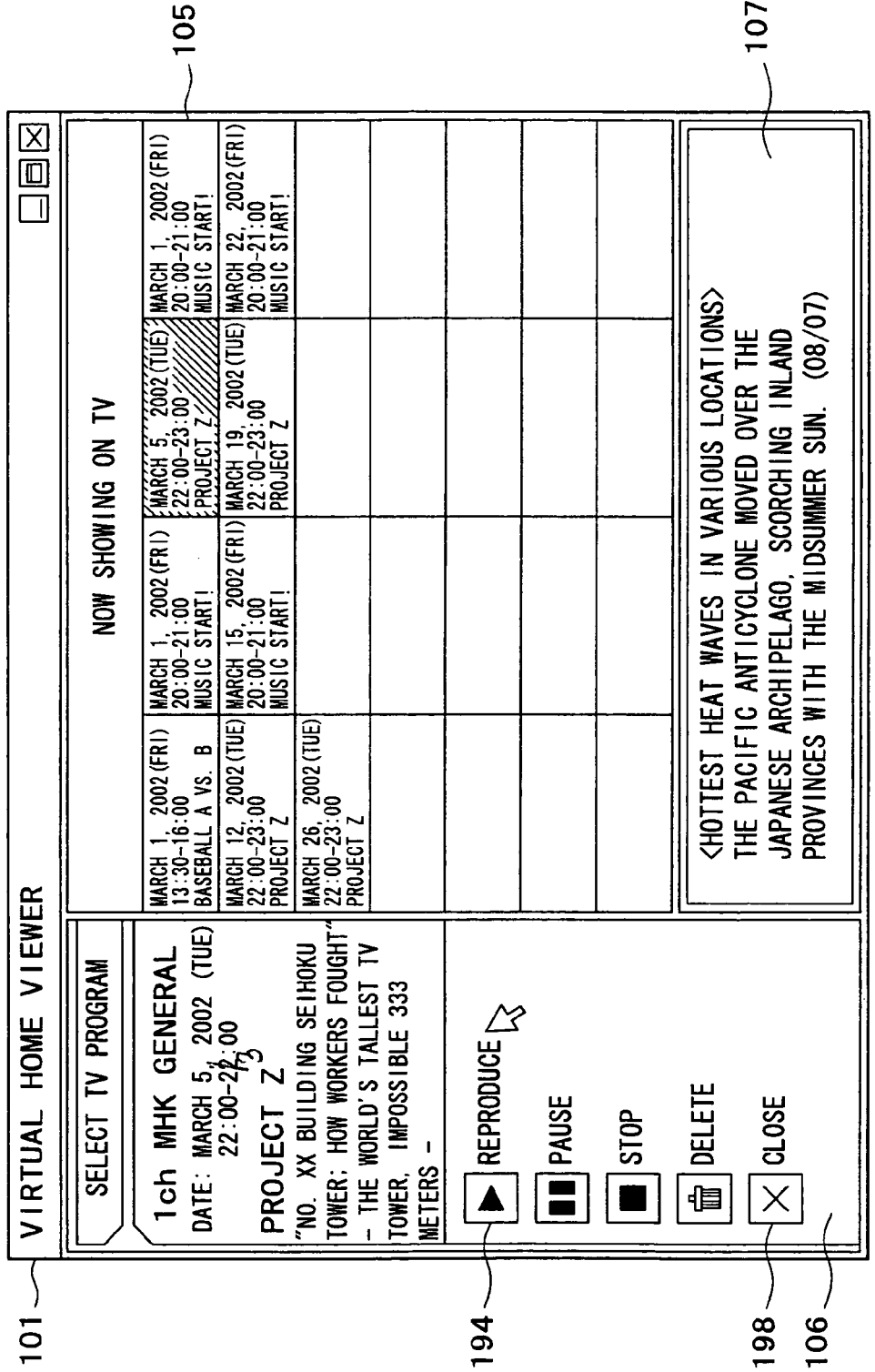
FIG. 41 illustrates an exemplary display of the main panel when the video reproduced from the recorded program is displayed on a real TV set.
Figure 42:
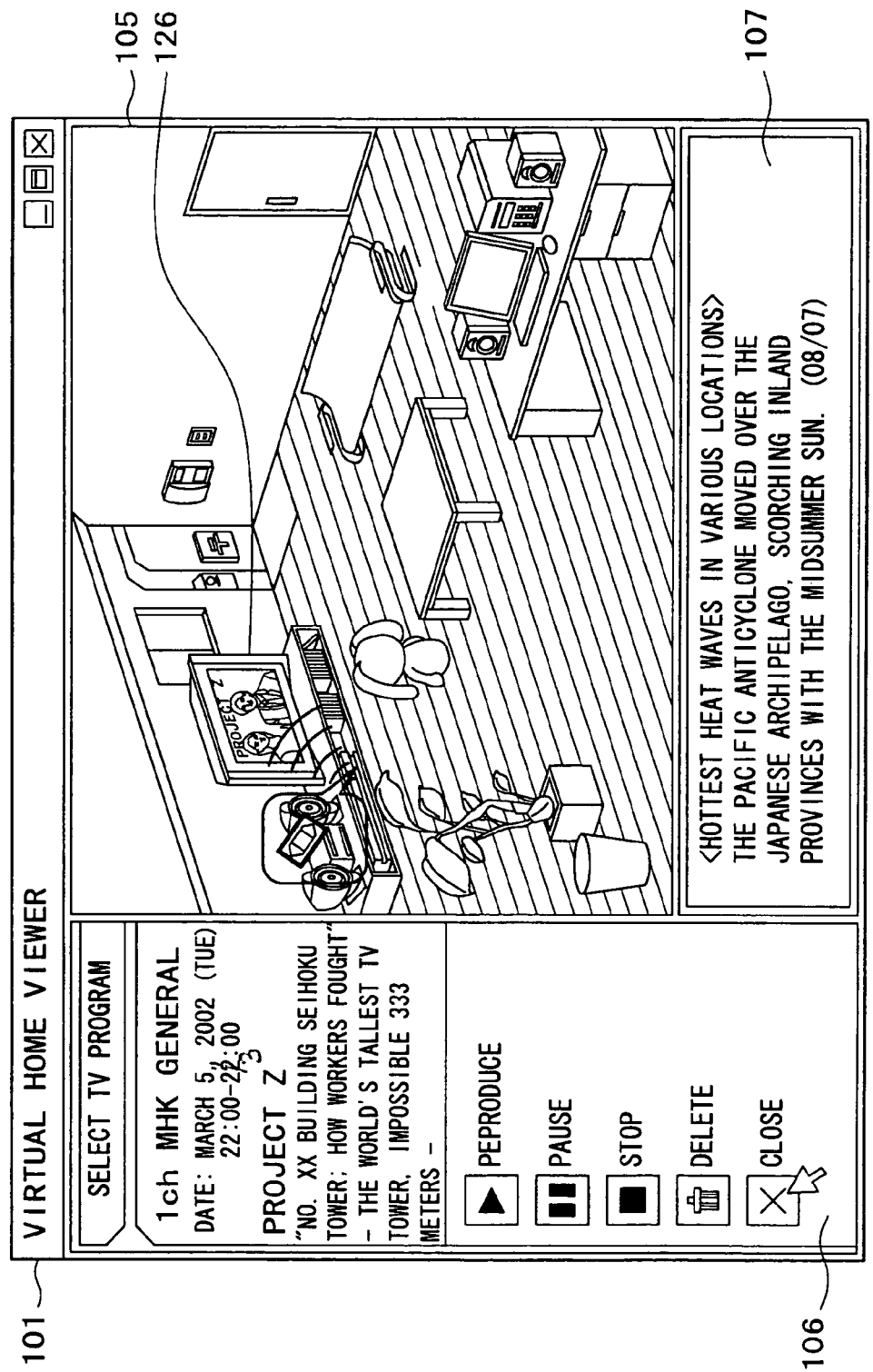
FIG. 42 is another exemplary display illustrating the main panel when the video reproduced from the recorded program is displayed on the real TV set.

Now, returning to FIG. 38, if "TV Set" button 194B is clicked, character string "Recorded Program List" so far displayed in the upper portion of the main panel 105 is superseded with character string "Now showing on TV" as shown in FIG. 41. When the "Close" button 198 is clicked in this state, the display of the main panel 105 is returned to the virtual room as shown in FIG. 42 and the video of the reproduced recorded program is displayed on the screen of the TV set icon 126.

If really existing "TV Set" button 194B is clicked, the video of the recorded program reproduced by the HDD video recorder 92 is displayed on the TV set 13.

Figure 43:
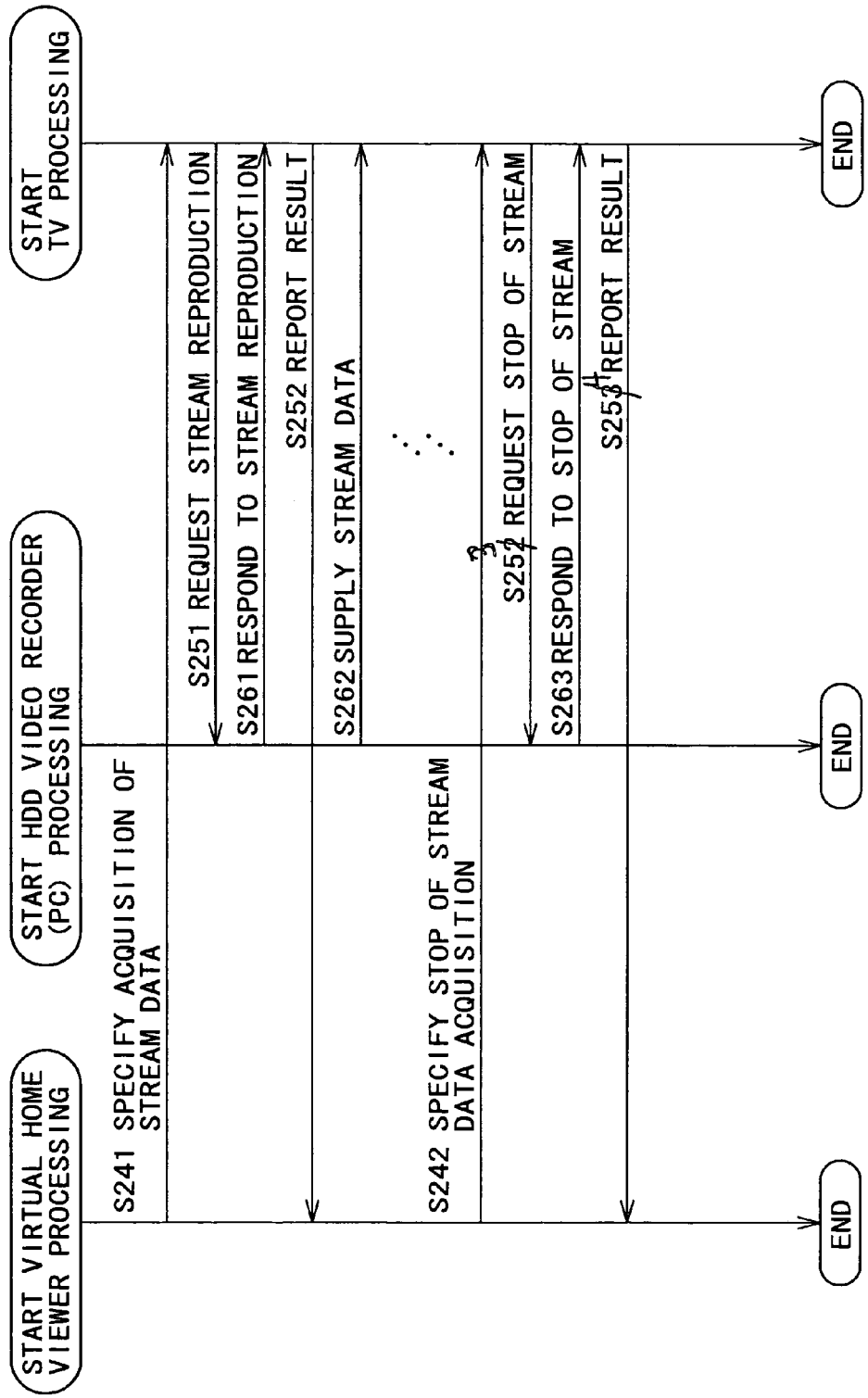
FIG. 43 is a flowchart for describing the processing of displaying the video of the recorded program on the real TV set.

The following describes the processing of displaying the video of a recorded program reproduced by the HDD video recorder 92 onto the TV set 13, with reference to the flowchart shown in FIG. 43.

In step S241, the virtual home viewer 91 outputs a control signal to the TV set 13 via the data bus 14 that instructs the TV set 13 to get the stream data of the recorded program from the HDD video recorder 92. In step S251, in response to this control signal, the TV set 13 requests the HDD video recorder 92 via the data bus 14 for the stream reproduction of the recorded program. In step S261, the HDD video recorder 92 notifies the TV set 13 via the data bus 14 of the acknowledgement for this request. In step S252, the TV set 13 notifies the virtual home viewer 91 via the data bus 14 of the acknowledgement by the HDD video recorder 92 for the stream reproduction.

In step S262, the HDD video recorder 92 starts reproducing the recorded program and supplies the stream data to the TV set 13 via the data bus 14.

Next, when the user clicks the "Pause" button 195 or the "Stop" button 196 of the control panel 106 of the virtual home viewer 91, the virtual home viewer 91 outputs, in step S242, a control signal to the TV set 13 via the data bus 14 that instructs the TV set 13 to stop the acquisition of the stream data of the recorded program from the HDD video recorder 92. In step S252, in response to this control signal, the TV set 13 requests the HDD video recorder 92 via the data bus 14 for stopping the supply of the stream data.

In step S263, in response to this request, the HDD video recorder 92 stops reproducing the recorded program, thereby stopping the supply of the stream data to the TV set 13, notifying the TV set 13 of the stopping of the supply of the stream data. In step S253, TV set 13 notifies the virtual home viewer 91 via the data bus 14 of the acknowledgement by the HDD video recorder 92 of the stopping of the stream data supply. This is the end of the description of the above-mentioned processing.

Figure 44:
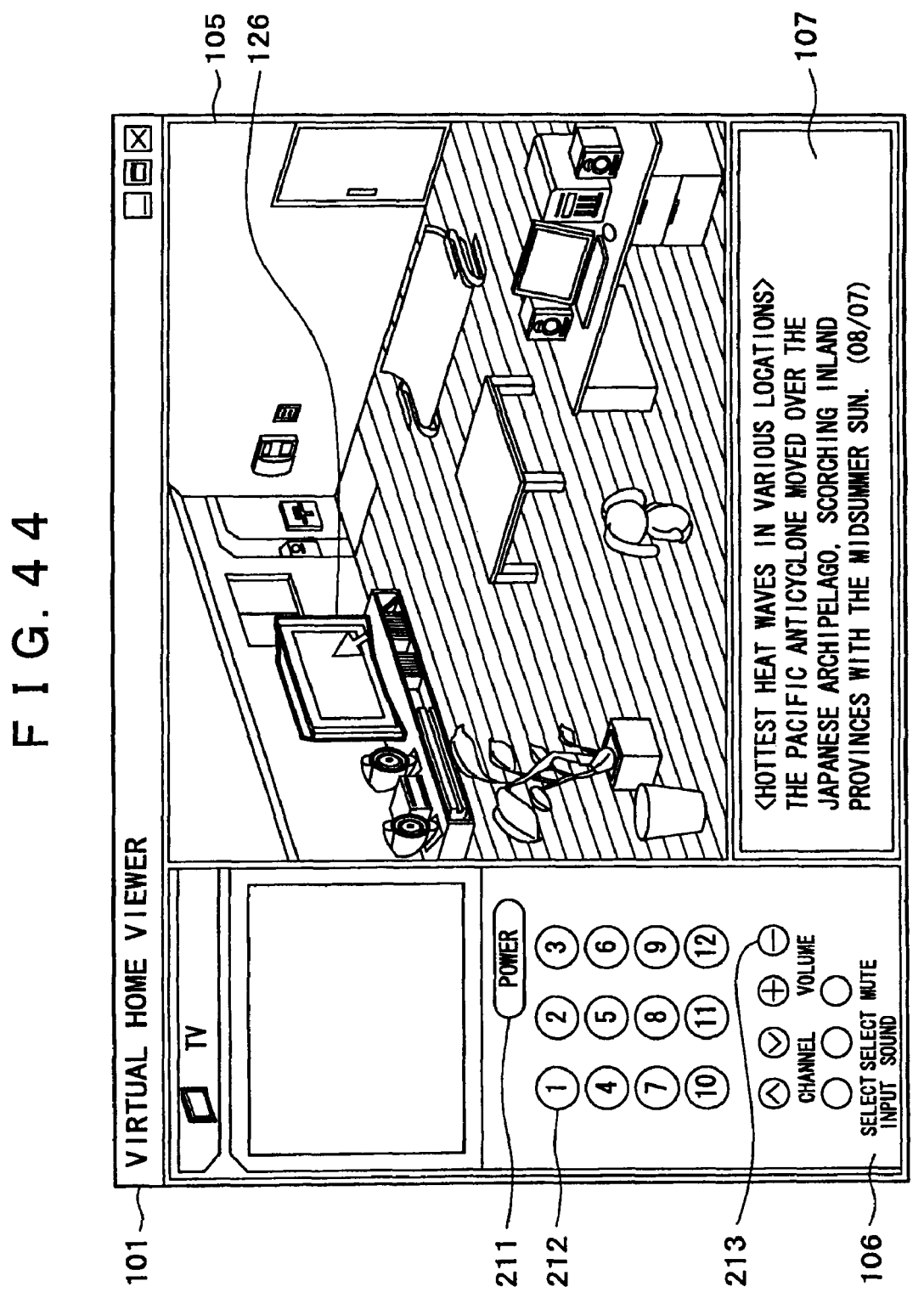

Referring to FIG. 44, there is shown a state in which the user selects TV set icon 126 in the virtual room in the main panel 105. Selection of the TV set icon 126 displays, on the control panel 106, the state of the TV set 13, which really exists in user A's home (currently, nothing is displayed because the power to the TV set 13 is off), and the buttons for controlling the TV set 13, namely, "POWER" button 211 for tuning on/off the power, numeric buttons 212 for specifying channels of the TV set 13, and "Volume" button 213 for controlling the volume as the property of the TV set icon 126.

When the user clicks the "POWER" button 211, the virtual home viewer 91 outputs a control signal to the home server 11 to turn on the power to the TV set 13. The home server 11 relays this control signal to the TV set 13. In response to this control signal from the virtual home viewer 91, the TV set 13 turns on its power, starting the reception of the channel (for example, 10 ch) currently set.

Figure 45:
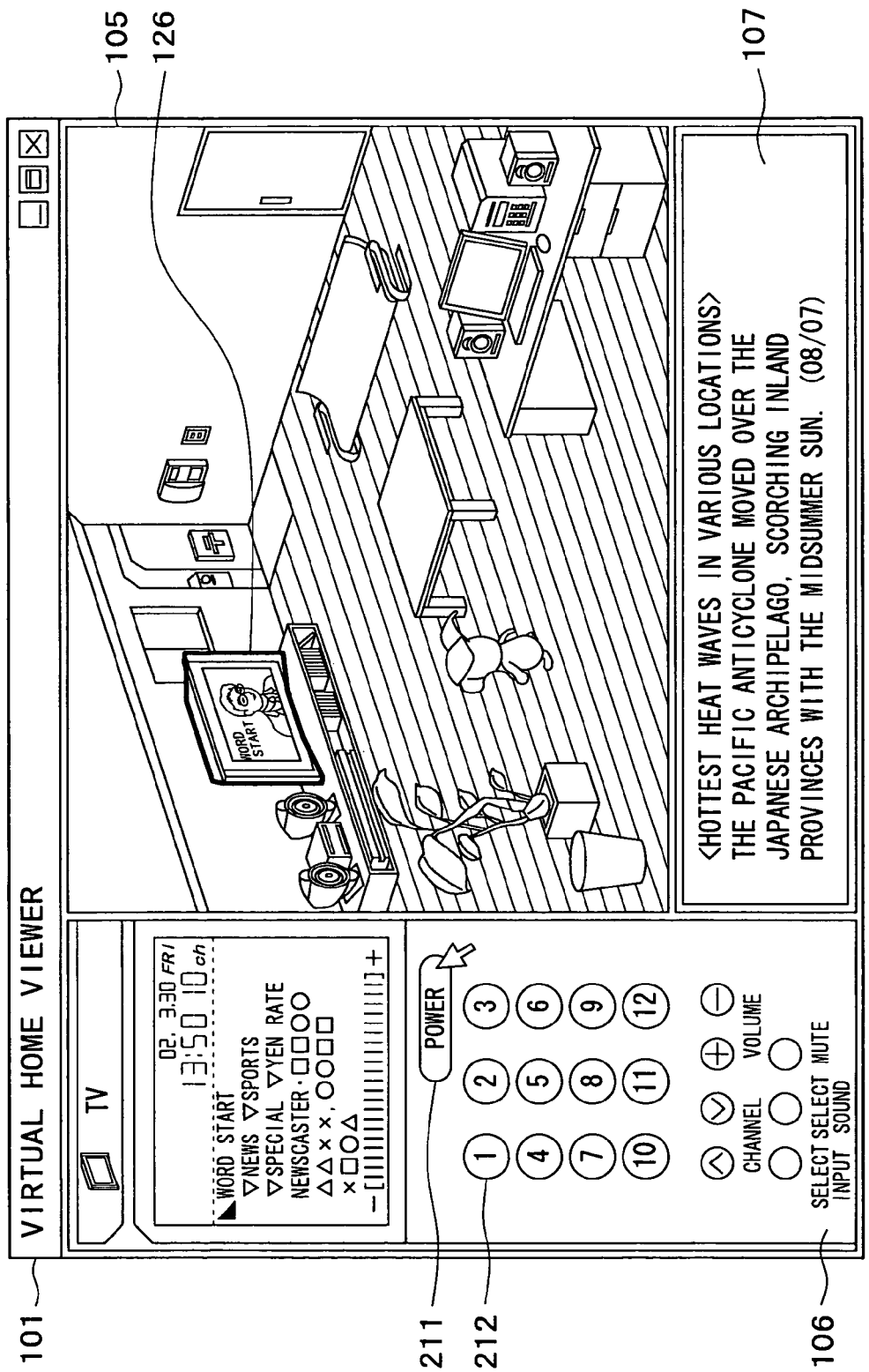
FIG. 45 illustrates an operation for controlling the real TV set.

In response to the TV set 13, the virtual home viewer 91 changes the TV set icon 126 to the power-on state as shown in FIG. 45. Namely, an image is displayed on the screen of the TV set icon 126. Also, the virtual home viewer 91 displays the channel currently received (10ch in this example) and the information associated with that program onto the control panel 106 as the property of the TV set icon 126.

Next, when the user clicks numeric key 212-6 to specify the reception of 6ch for example, the virtual home viewer 91 outputs a control signal to the home server 11 to instruct the TV set 13 to receive 6ch. The home server 11 relays this control signal to the TV set 13. The TV set 13 responds to the virtual home viewer 91 and switches channel from 10ch to 6ch.

Figure 46:
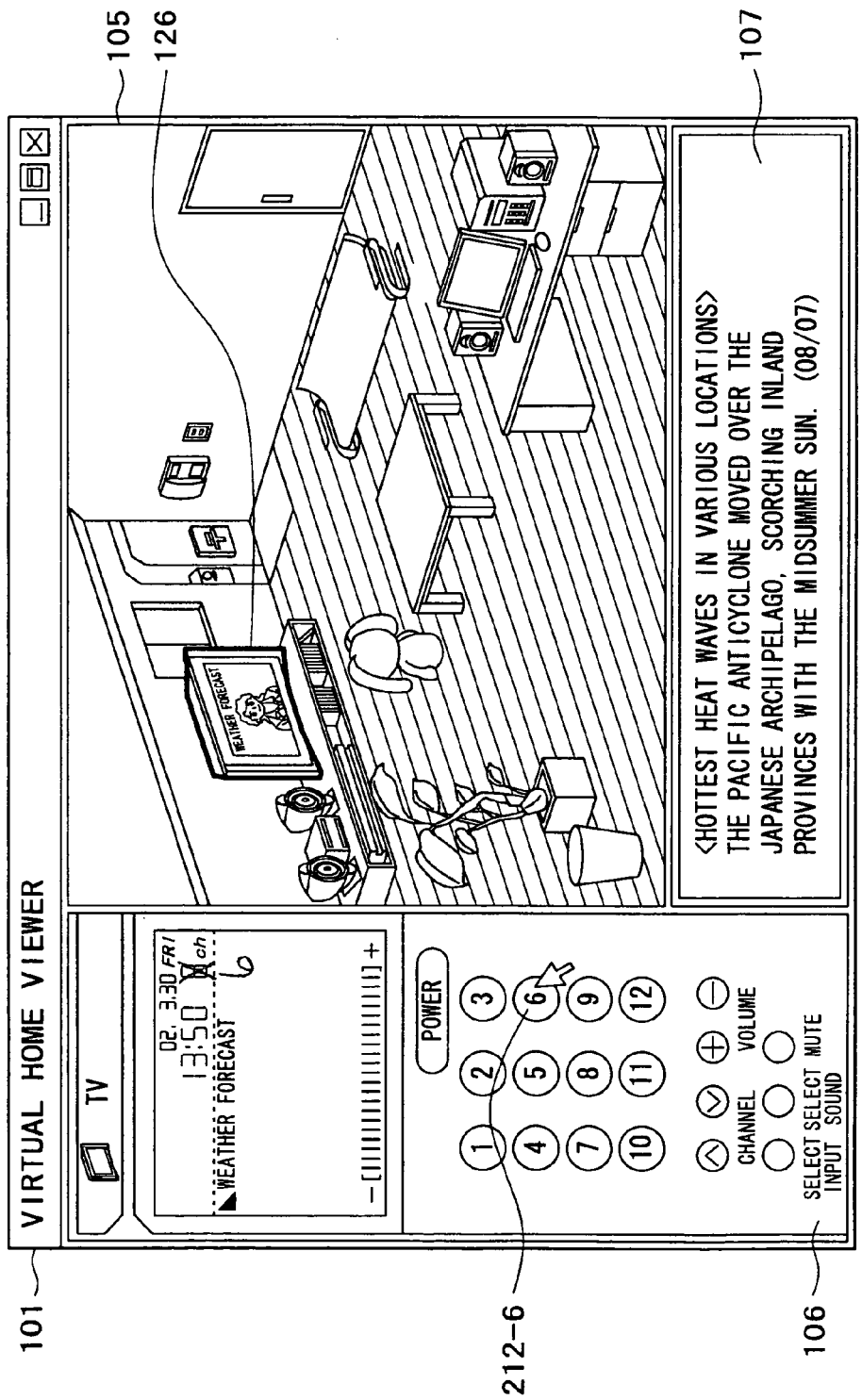
FIG. 46 illustrates another operation for controlling the real TV.

In response to the TV set 13, the virtual home viewer 91 changes the image shown on the screen of the TV set icon 126 as shown in FIG. 46. Also, the virtual home viewer 91 displays on the control panel 106 the channel currently received by the TV set 13 (6ch in this example) and the information about that program as the property of the TV set icon 126.

Figure 47:
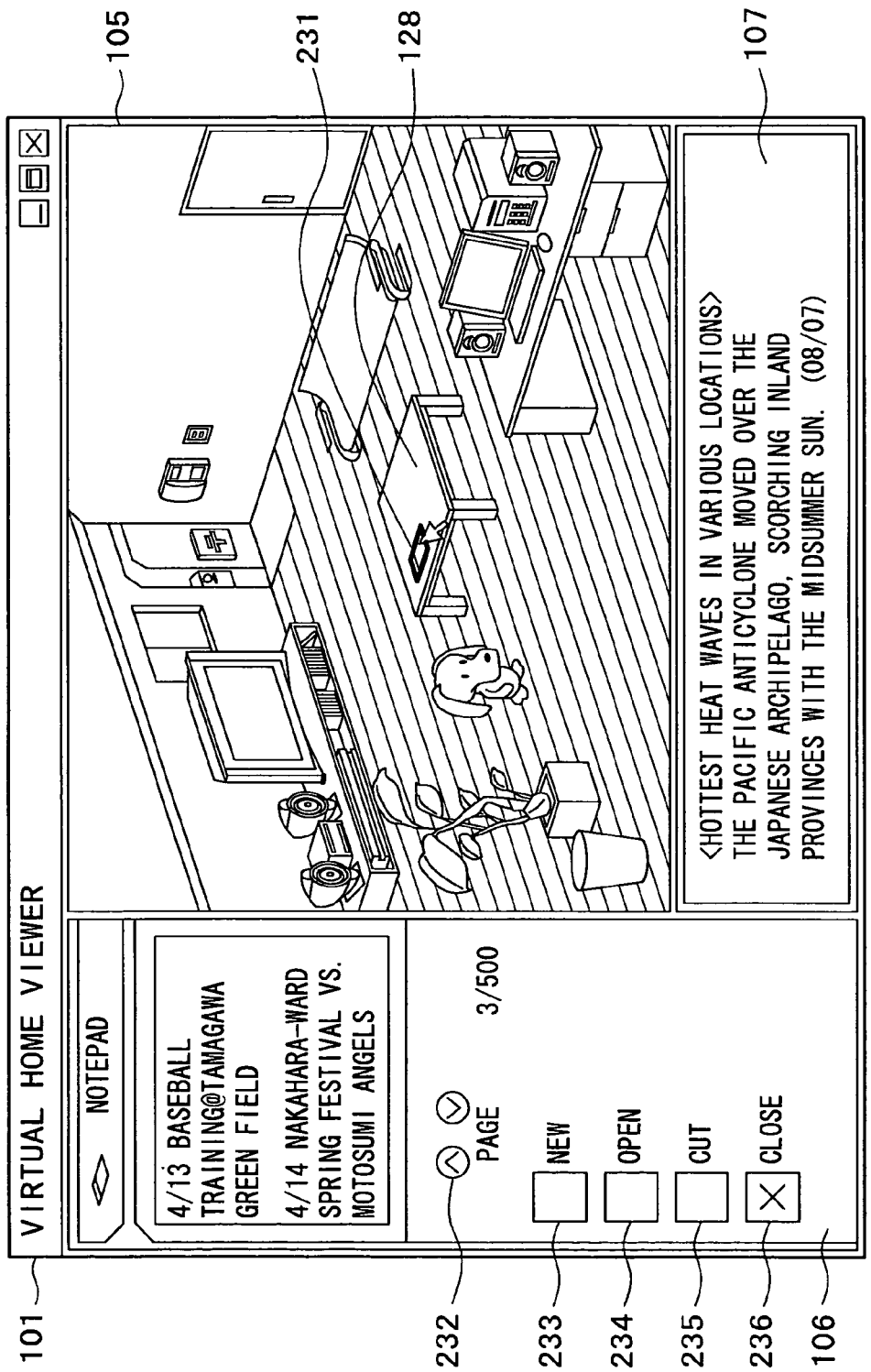
FIG. 47 illustrates an exemplary display upon selection of a notepad icon.

The following describes a simplified memo capability using a notepad icon 231 (FIG. 47) of the virtual room. Referring to FIG. 47, there is shown a state in which the notepad icon 231 on the table icon 128 is selected in the virtual room shown in the main panel 105. When the notepad icon 231 is selected, the control panel 106 displays the head portion "4/13 Baseball Training . . . " of the page (in this example, page 3/500) opened last, as the property of the notepad icon 231.

The control panel 106 also displays "Page" button 232 being clicked to select a page of the notepad to be displayed as the property, "New" button 233 being clicked to open a new page in the main panel 105, "Open" button 234 being clicked to display the entire selected page as the property in the main panel 105, "Cut" button 235 being clicked to cut a selected page from the notepad to generate a separate memo sheet icon 241 (FIG. 50), and "Close" button 236 being clicked to return from the opened page of the notepad to the virtual room.

Figure 48:
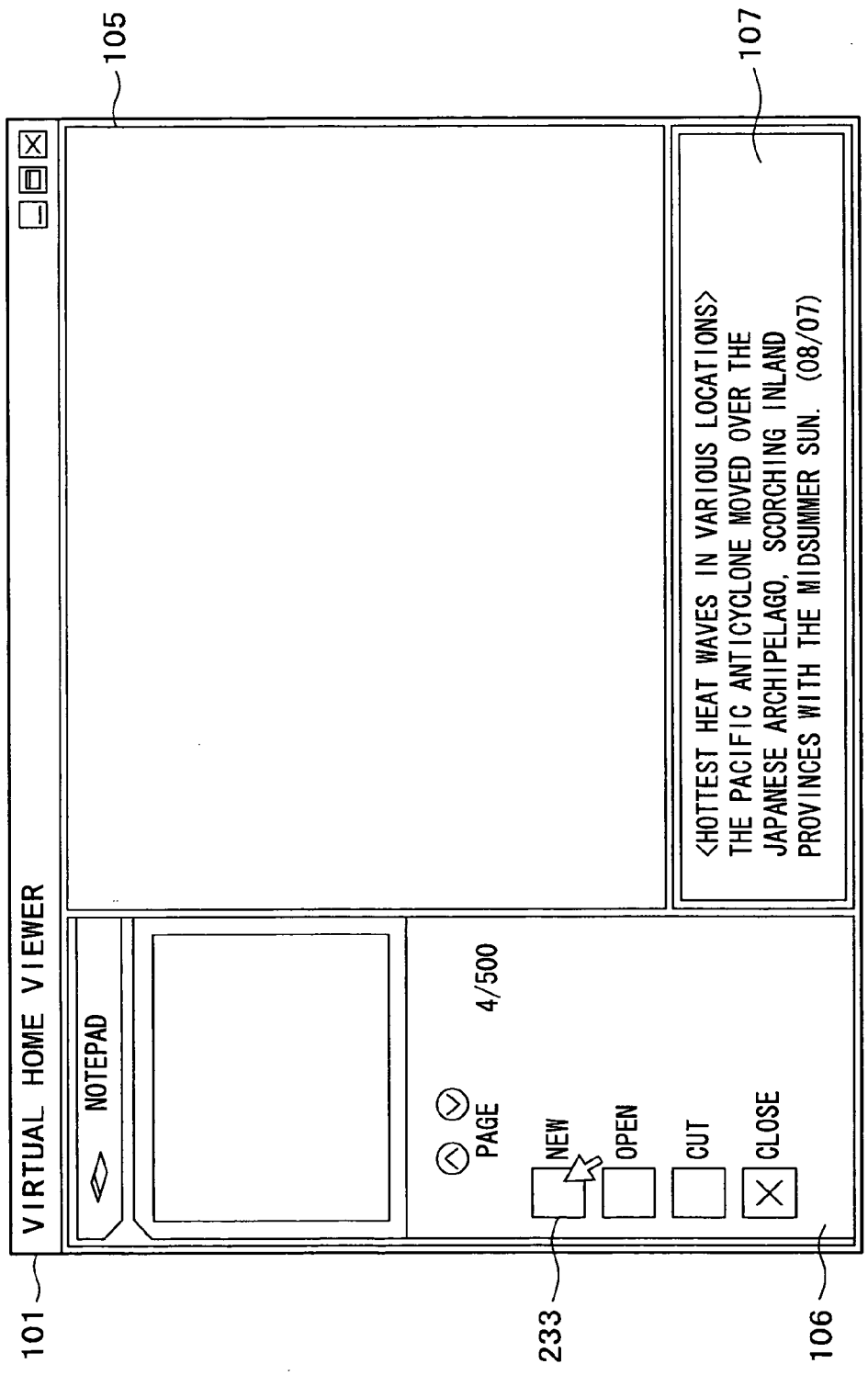
FIG. 48 illustrates an exemplary display upon pressing of "New" button shown in FIG. 47.
Figure 49:
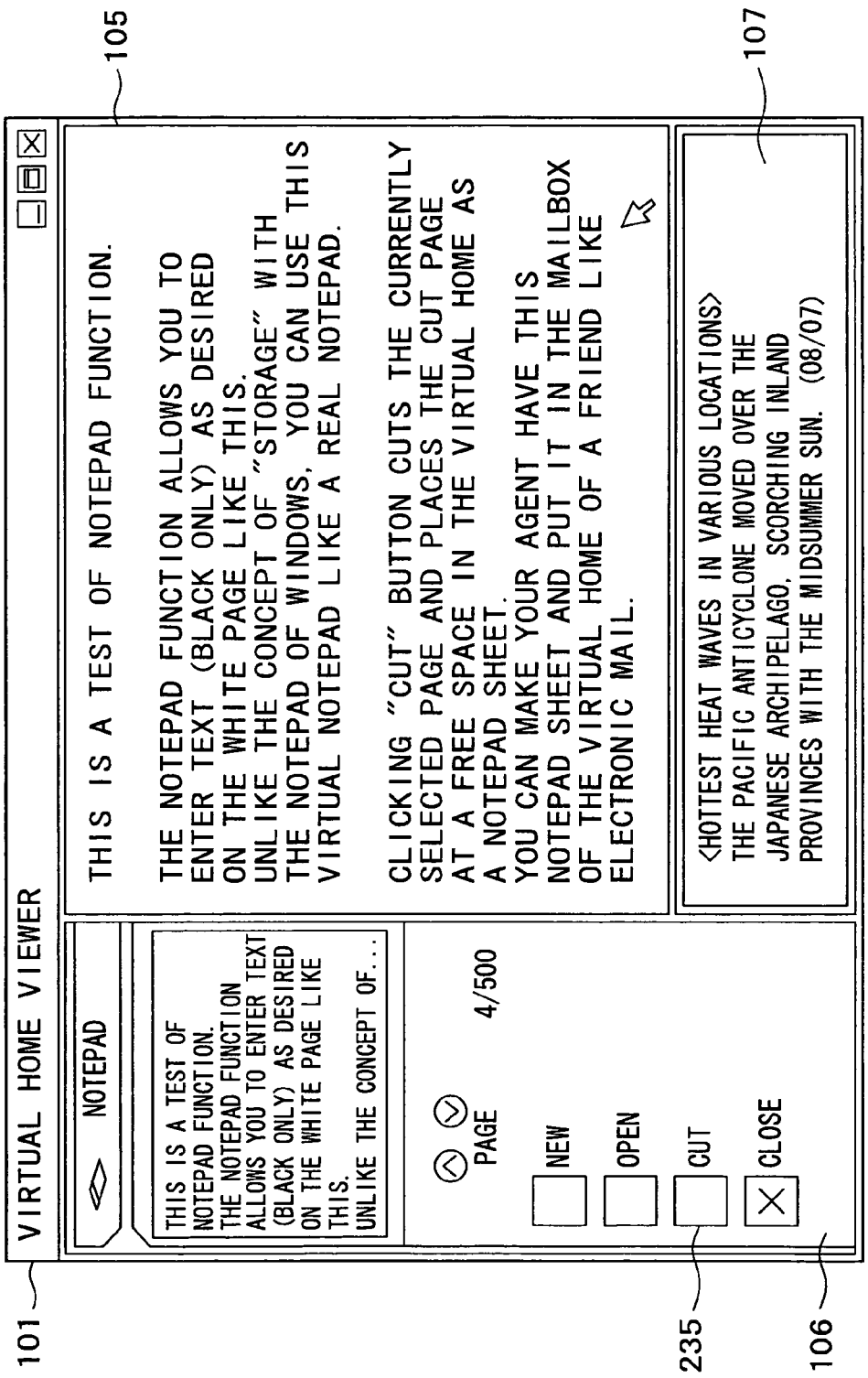
FIG. 49 illustrates an exemplary display when text is written to a page of a notepad.

Referring to FIG. 48, there is shown a state in which a new page is displayed in the main panel 105 upon clicking of the "New" button 233. The user can enter text into the page displayed in the main panel 105 as shown in FIG. 49.

Figure 50:
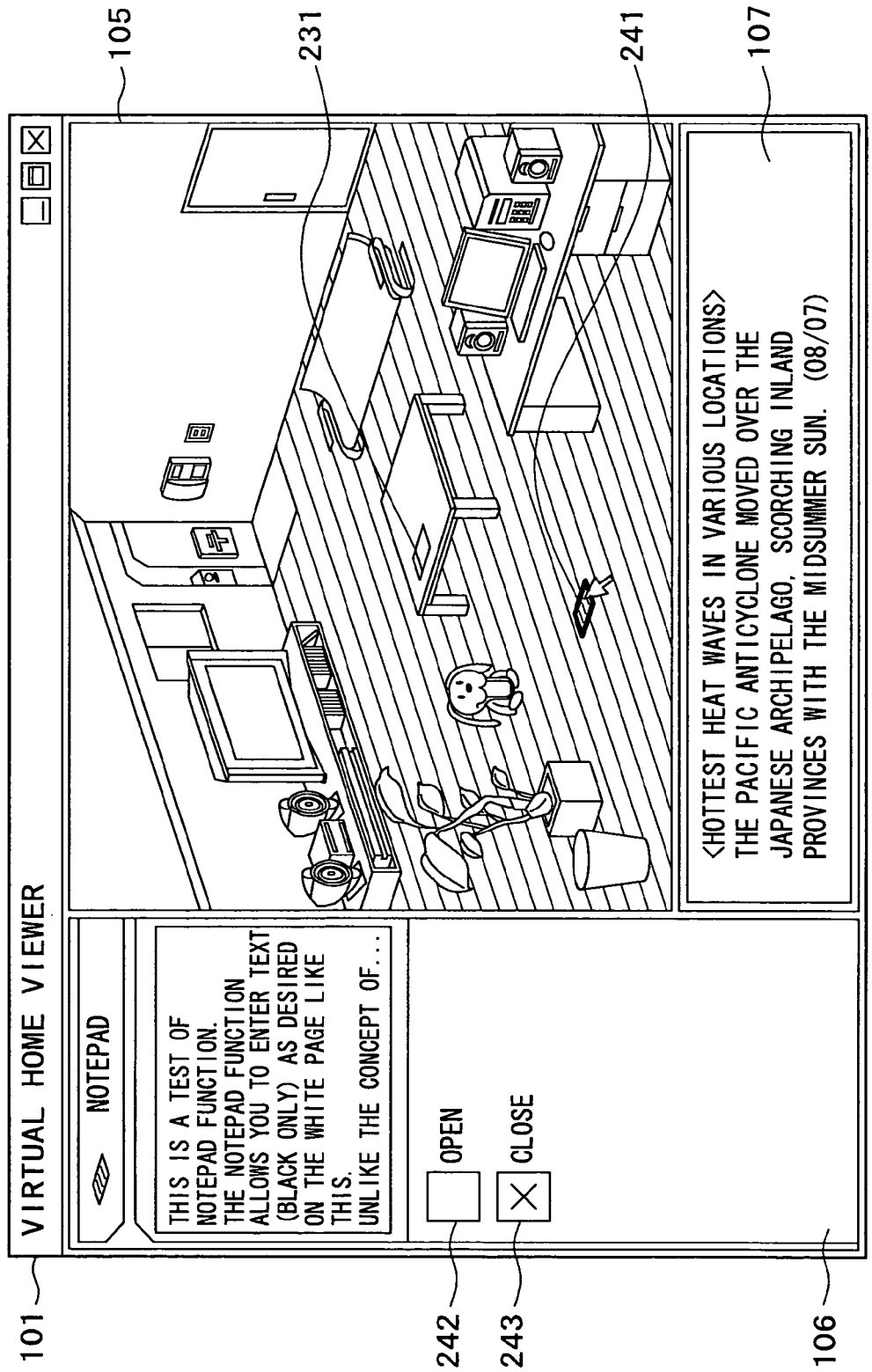
FIG. 50 illustrates an exemplary display upon selection of a memo sheet icon.

Referring to FIG. 50, there is shown a state in which, upon clicking of the "Cut" button 235, a selected page is cut from the notepad and the memo sheet icon 241 corresponding to one sheet of notepad has appeared separate from the notepad icon 231. At this moment, in the virtual room shown in the main panel 105, the memo sheet icon 241 is selected and the control panel 106 displays the head portion ("This is a test of notepad . . . ") of the text written in the memo sheet 241 as the property of the memo sheet icon 241. In addition, the control panel 106 displays "Open" button 242 being clicked to display the text written on the notepad onto the main panel 105 and "Close" button 243 being clicked to return the display of the main panel 105 from the text to the virtual room.

The memo sheet icon 241 may be passed to other users in the communication processing, which will be described later.

It should be noted that the text written in each page of the notepad, the arrangement and orientation of the newly created memo sheet icon 241, and the text written on the memo sheet are uploaded to the user information holding server 24 at predetermined time intervals as the user's personal data.

This is the end of the description of various standalone processing operations, not associated with other users.

The following describes various communication processing operations based on the virtual space remote control system in which a plurality of users involve. The parties with whom user A can execute communication processing are restricted to the members of the user group to which user A belongs.

By selecting the telephone icon 124 in the virtual room and clicking buttons shown in the control panel 106, user A can talk (actually, exchange messages by chat) with any member of the user group to which user A belongs.

Figure 51:
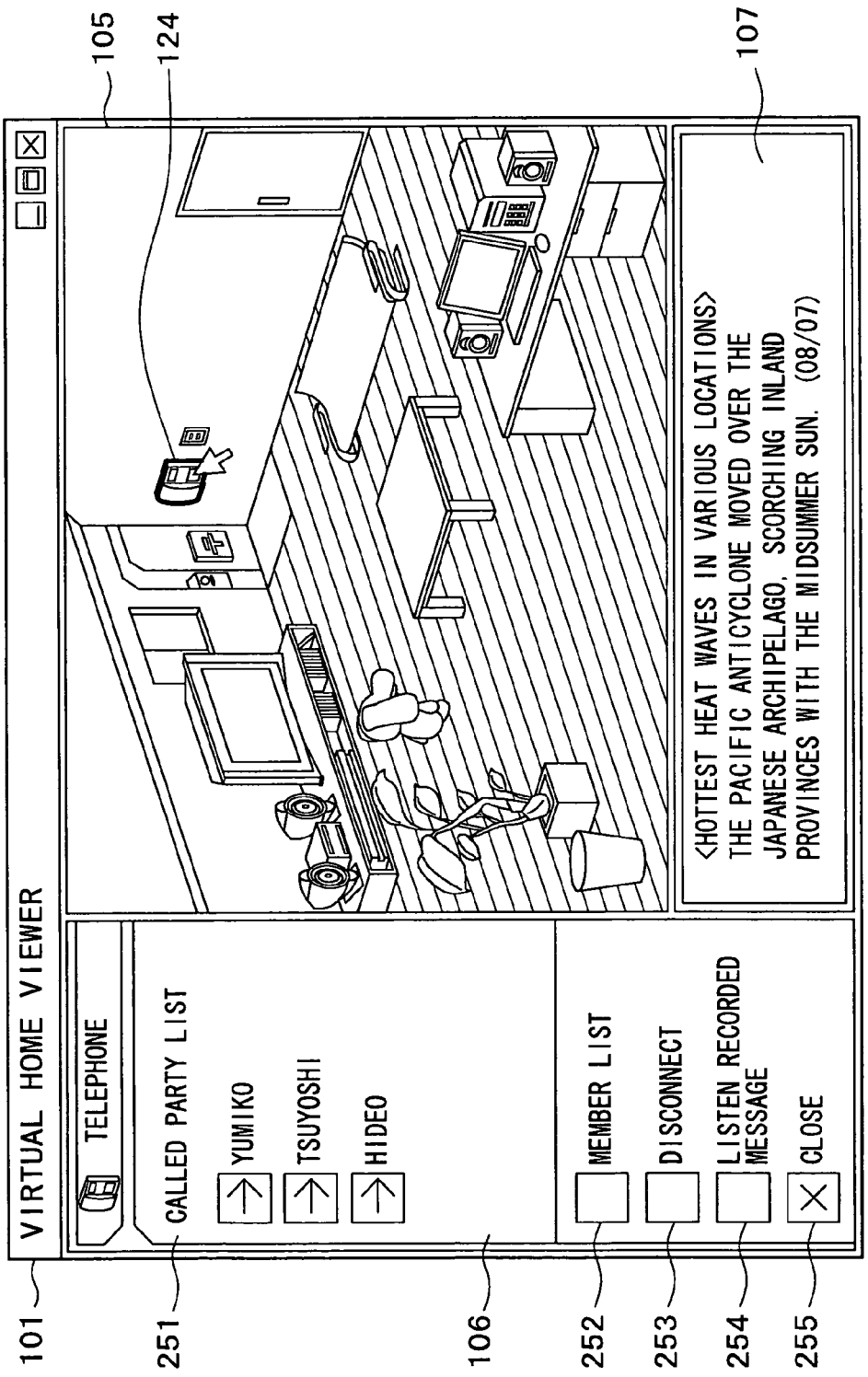
FIG. 51 illustrates an exemplary display upon selection of a telephone icon.

When the telephone icon 124 in the virtual room is selected as shown in FIG. 51, the control panel 106 displays parties whom user A can call, namely, a called party list 251 indicative of the names of members in the user group to which user A belongs, as the property of the telephone icon 124.

The called party list 251 shows the names of members of the user group to which user A belongs, in the predetermined number. If the number of members of this user group exceeds a predetermined number, a scroll button (not shown) is displayed by which all member names are scrolled to be shown. Beside each member name, a call button is shown. For example, the call button for "Yumiko" is clicked, user A can talk with "Yumiko" who is a member of the same user group as user A (details of which will be described later).

It should be noted that, for the displaying of the called party list 251, the member list obtained in the startup sequence is referenced. When the called party list 251 is displayed, the member list acquisition processing described above with reference to FIG. 13 is executed again to get the most recent member list, thereby updating the display of the called party list 251.

Also, the control panel 106 displays "Member List" button 252 being clicked to display on the main panel 105 the list of members of the user group to which user A belongs, "Disconnect" button 253 being clicked to end talk, "Listen Recorded Message" button 254 being clicked to listen to a recorded message (actually, text data) recorded by a user who called user A, and "Close" button 255 being clicked to return the display of the main panel 105 from the contents of recorded message to the virtual room.

Figure 52:
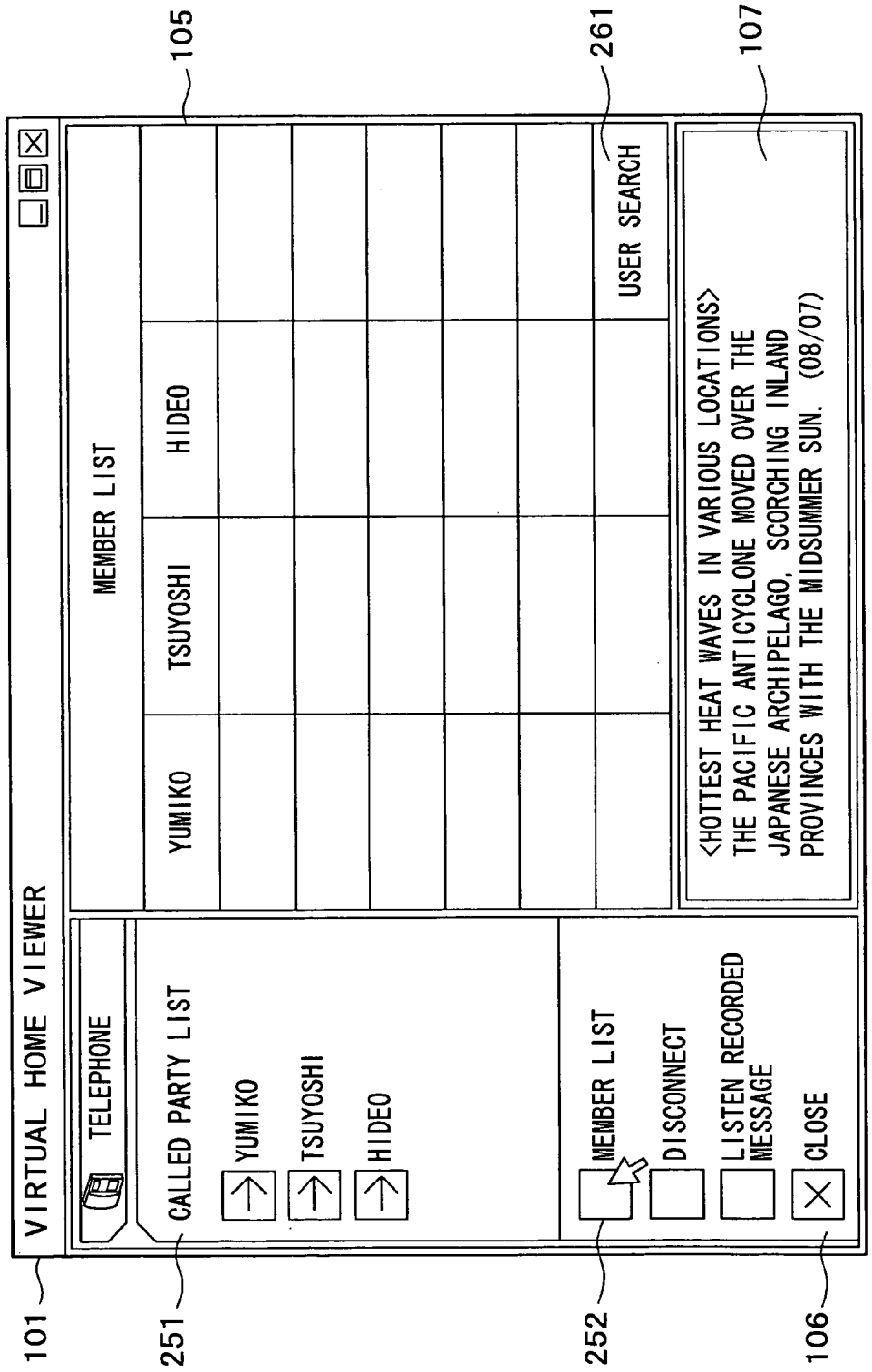
FIG. 52 illustrates an exemplary display upon pressing of "Member List" button shown in FIG. 51.

The following describes the processing of adding new members to the user group to which user A belongs. When the "Member List" button 252 is clicked, the main panel 105 displays a list of members of the user group to which user A belongs as shown in FIG. 52. The member list shown in the main panel 105 includes "User Search" button 261 in addition to member names.

Figure 53:
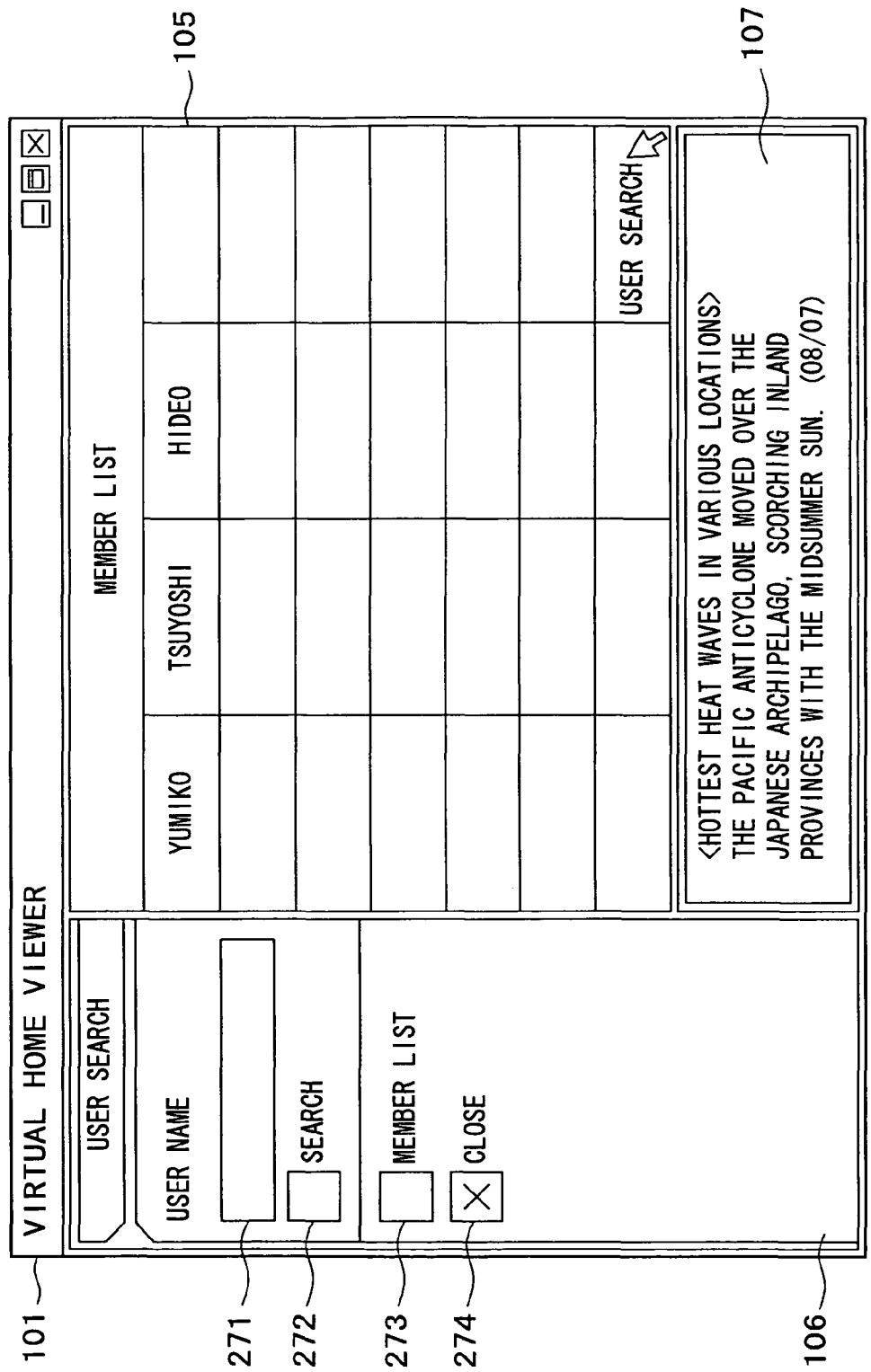
FIG. 53 illustrates an exemplary display upon pressing of "User Search" button shown in FIG. 52.

When the "User Search" button 261 is clicked, the control panel 106 is switched from the display of the called party list 251 for example to the display for user search, as shown in FIG. 53. To be more specific, the control panel 106 displays an entry box 271 in which a user name is entered as a search condition, "Search" button 272 being clicked to start a search operation and display a search result in the main panel 105, "Member List" button 271 being clicked to return the display of the main panel 105 from search result to member list, and "Close" button 274 being clicked to return the display of the main panel 105 to the virtual room.

Figure 54:
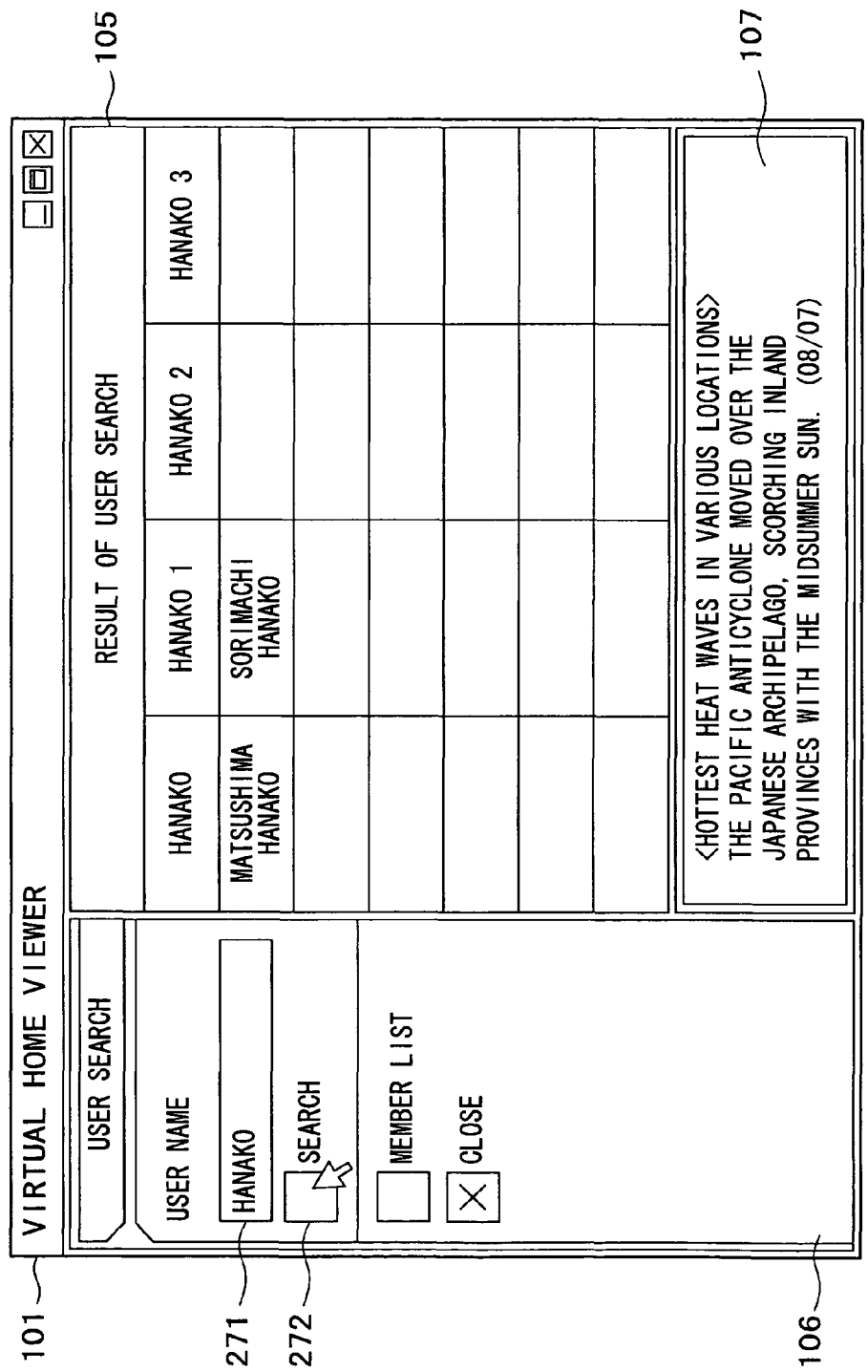
FIG. 54 illustrates an operation for user search.

For example, as shown in FIG. 54, when "Hanako" is entered in the entry box 271 and the "Search" button 272 is clicked, the search condition "Hanako" is sent to the inter-user-terminal communication relay server 23 via the base station 4 and the Internet 5. The inter-user-terminal communication relay server 23 executes a search operation on all users and sends back the search result, thereby displaying a list of user names including "Hanako" in the main panel 105.

Figure 55:
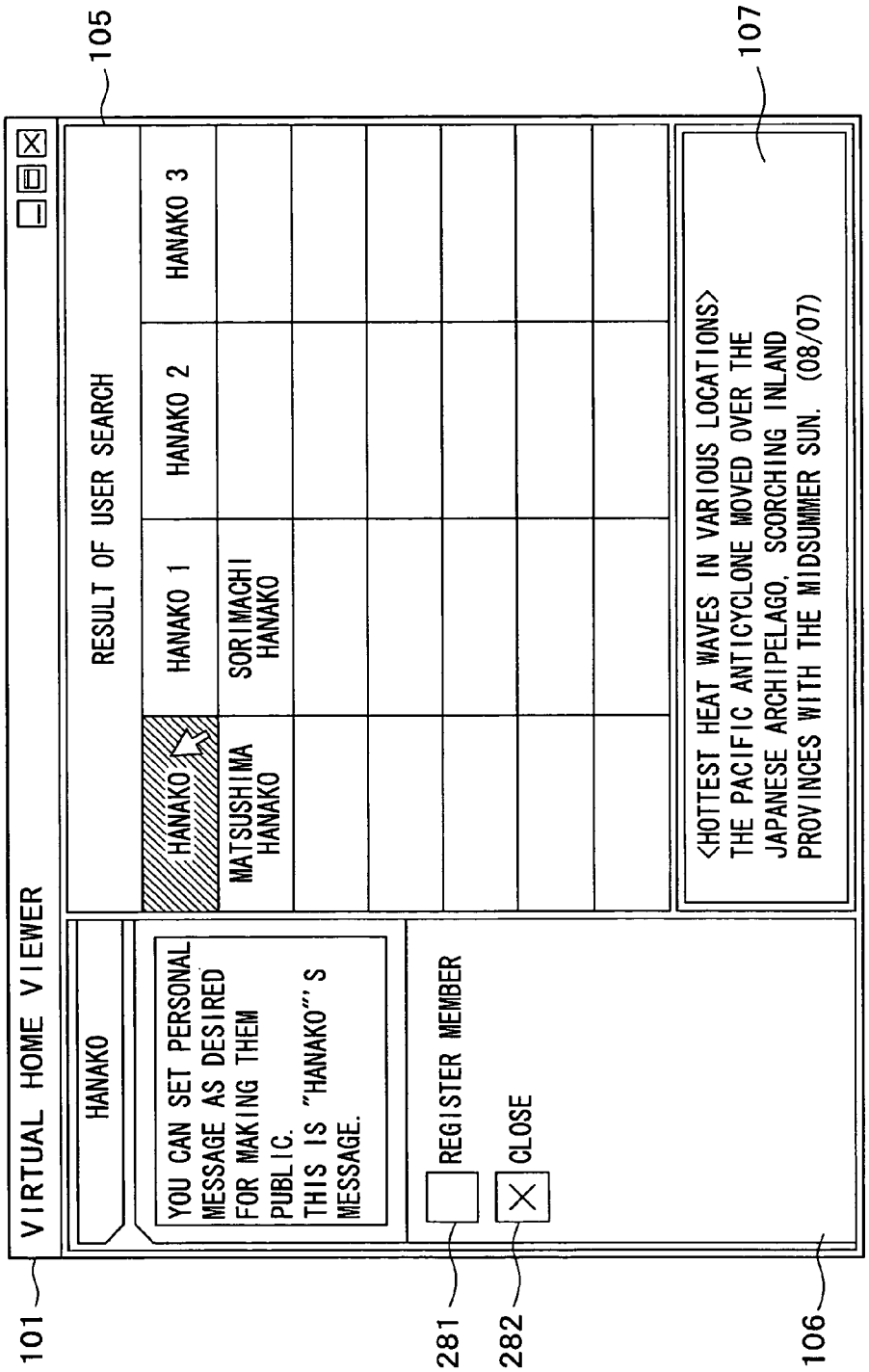
FIG. 55 illustrates an operation for provisionally registering "Nanako" with a member list.

If the user name "Hanako" displayed as the search result in the main panel 105 is selected by the user as shown in FIG. 55, for example, the control panel 106 displays the property of the selected user name "Hanako" (the text prepared and intended for public display by "Hanako" herself), "Register Member" button 281 being clicked to additionally register the user having the selected user name with the user group, and "Close" button 282 being clicked to return the display of the main panel 105 to the member list.

Figure 56:
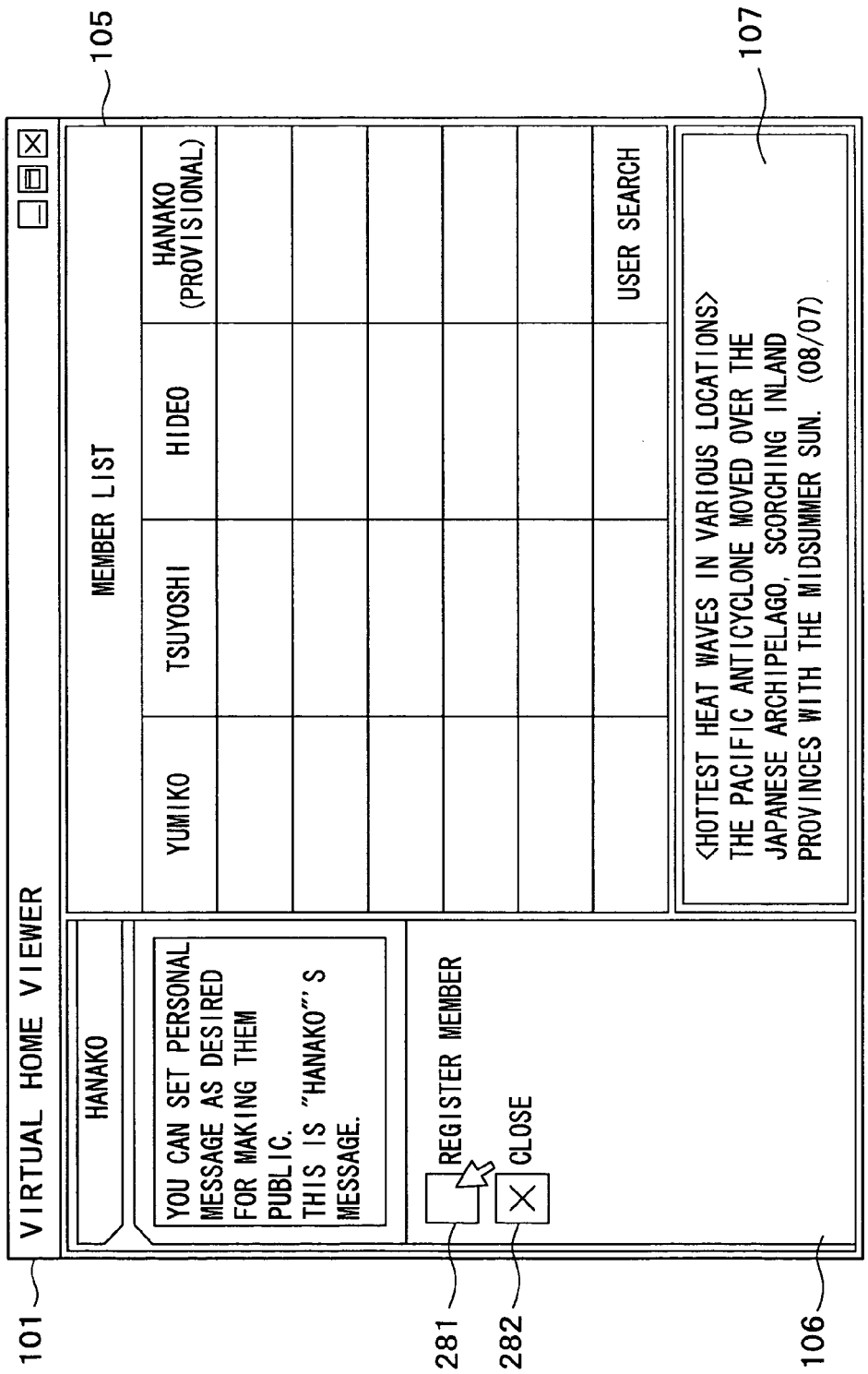
FIG. 56 illustrates an exemplary display upon provisional registration of "Nanako".

When "Register Member" button 281 is clicked with the user name "Hanako" selected in the search result shown in the main panel 105, a request for provisionally registering "Hanako" with the user group to which user A belongs is sent to the inter-user-terminal communication relay server 23 via the base station 4 and the Internet 5. After the provisional registration of "Hanako" by the inter-user-terminal communication relay server 23, the display of the main panel 105 is switched to the member list as shown in FIG. 56, thereby additionally displaying the user name "Hanako" (Provisional) following existing member names. It should be noted that the details of this processing will be described later with reference to FIG. 60.

Figure 57:
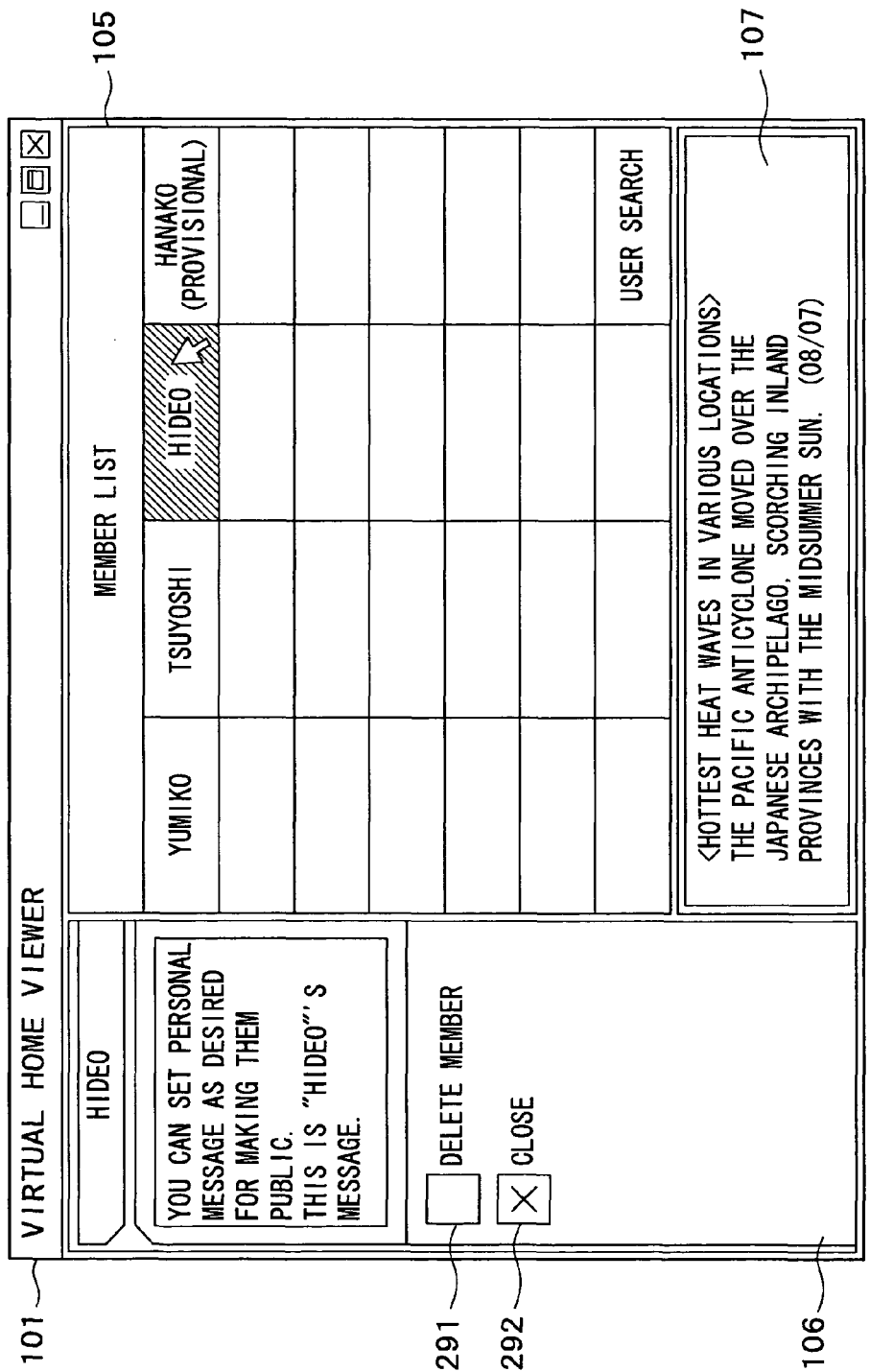
FIG. 57 illustrates an operation for deleting "Hideo" from the member list.

The following describes the processing of deleting a member from the user group to which user A belongs. For example, as shown in FIG. 57, if "Hideo" is selected from the members of the user group with the member list displayed in the main panel 105, the control panel 106 displays the property (the text prepared and intended for public display by "Hideo" himself), "Delete Member" button 291 being clicked to delete the user having the selected user name from the user group and "Close" button 292 being clicked to return the display of the main panel 105 to the virtual room.

Figure 58:
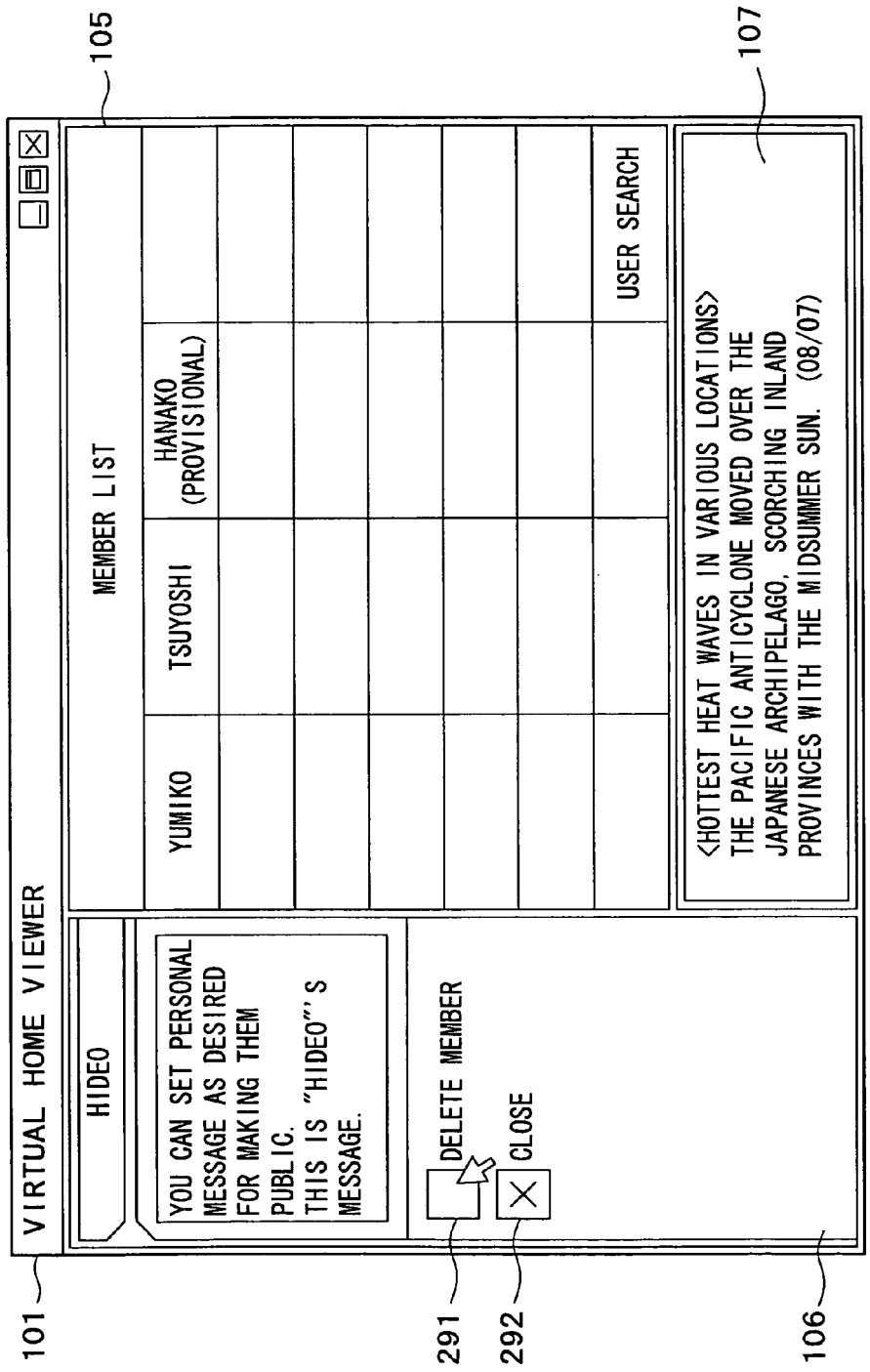
FIG. 58 is an exemplary display after deletion of "Hideo" from the member list.

When the "Delete Member" button 291 is clicked with "Hideo" selected in the member list displayed in the main panel 105, a request for deleting "Hideo" from the user group to which user A belongs is sent to the inter-user-terminal communication relay server 23 via the base station 4 and the Internet 5. In response, the inter-user-terminal communication relay server 23 deletes "Hideo" from the user group and then "Hideo" is deleted from the member list shown in the main panel 105 as shown in FIG. 58.

The following describes the processing being executed when "Hanako" has been provisionally registered by user A with the user group to which user A belongs (in what follows, "Hanako" will be referred to as user B until otherwise noted). Before describing this processing, the virtual room of user B will be described with reference to FIG. 59.

Figure 59:
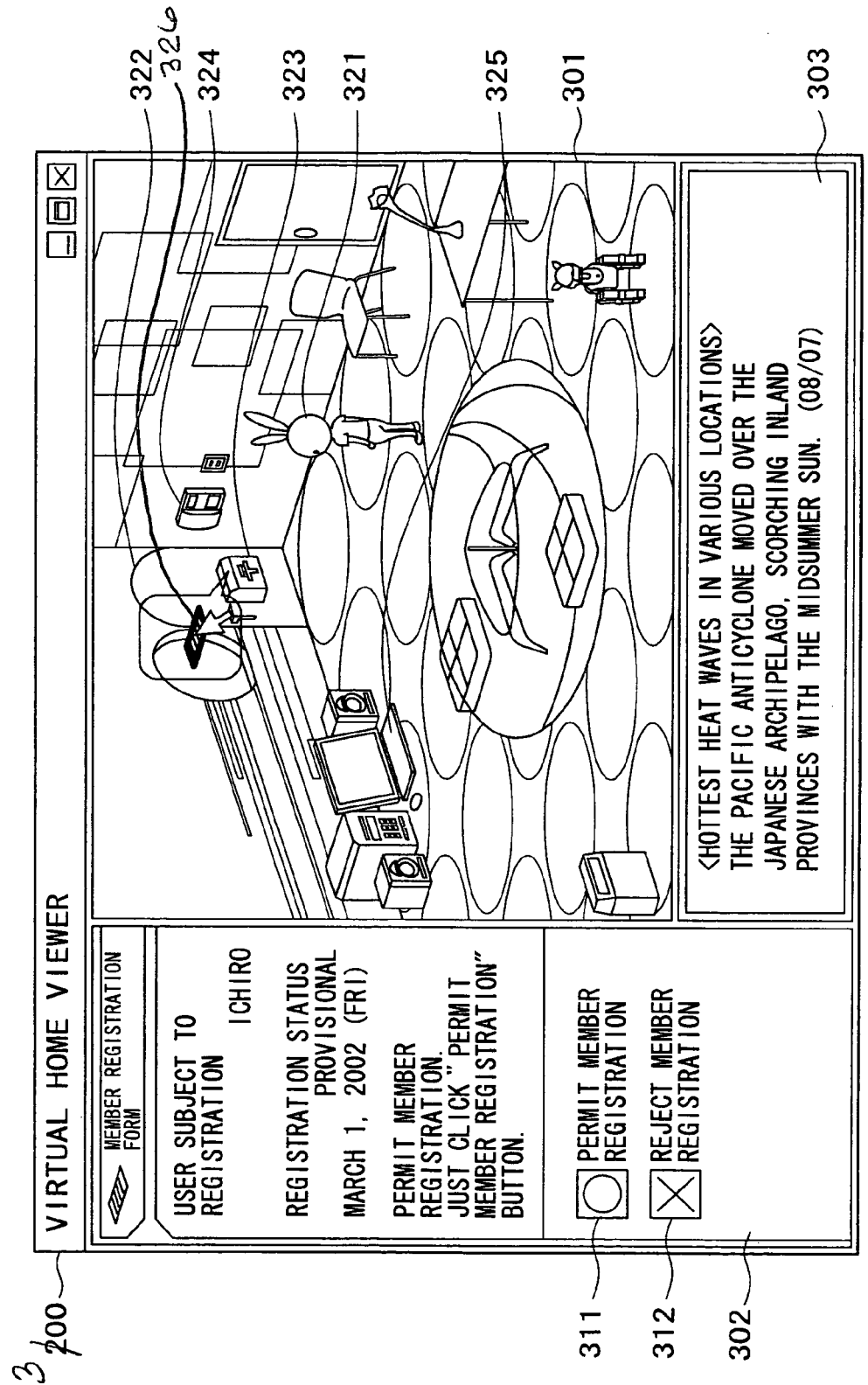
FIG. 59 illustrates an exemplary display of a virtual room of provisionally registered "Nanako".

FIG. 59 shows the window 300 of a virtual home viewer being displayed on the screen of the PC 3, which is operated by user B. This window is also divided into a main panel 301, a control panel 302, and a communication panel 303. The main panel 301 shows the virtual room of user B. Like the virtual room of user A, the virtual room of user B is arranged with a mascot 321, a door icon 322, a mailbox icon 323, a telephone icon 324, and a PC icon 325, for example.

Figure 60:
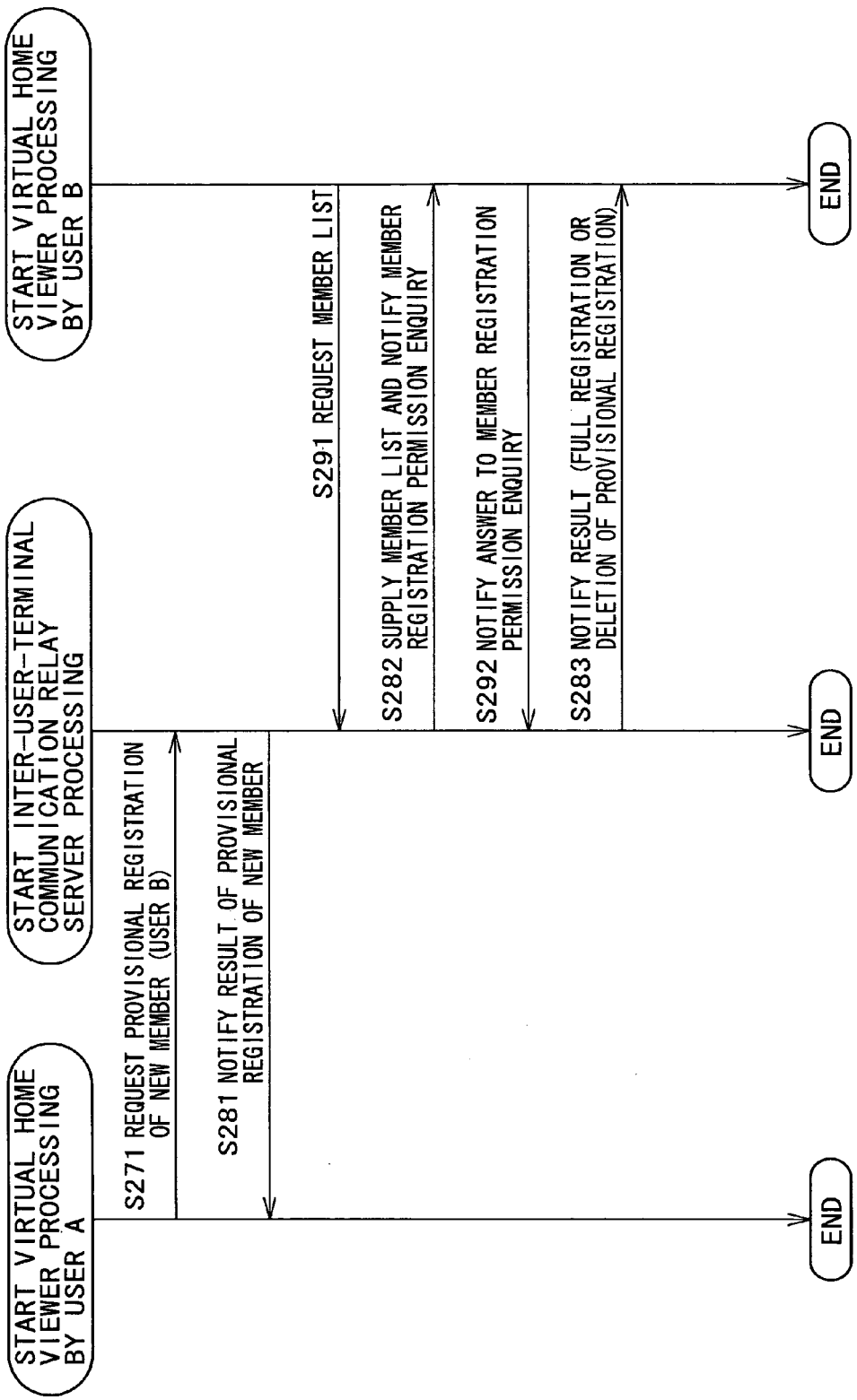
FIG. 60 is a flowchart for describing the processing of provisional registration.

The following describes the above-mentioned processing being executed when user B has been provisionally registered by user A with the user group to which user A belongs, with reference to the flowchart shown in FIG. 60. In step S271, the virtual home viewer program 51 (hereafter referred to as virtual home viewer A) of the portable user terminal 1 of user A requests the inter-user-terminal communication relay server 23 for the provisional registration of user B via the base station 4 and Internet 5. In response to this request, in step S281, the inter-user-terminal communication relay server 23 provisionally registers user B with the user group to which user A belongs and notifies the virtual home viewer A of the completion of the provisional registration.

The user B recognizes its provisional registration with the user group to which user A belongs only when user B obtains the member list of the user group to which user B belongs from the inter-user-terminal communication relay server 23.

To be more specific, in step S291, the virtual home viewer program of the PC 3 of user B (hereafter referred to as a virtual home viewer B) requests the inter-user-terminal communication relay server 23 for the member list via the Internet 5 as a startup sequence. In response to this request, in step S282, the inter-user-terminal communication relay server 23 sends, to virtual home viewer B via the Internet 5, the member list of the user group to which user B belongs (user A is not yet included in this member list) and a member registration permission enquiry for confirming whether user B can be registered with the user group to which user A belongs.

When the member registration permission enquiry comes from the inter-user-terminal communication relay server 23, a member registration form icon 326 is delivered to the mailbox icon 323 of the virtual room of user B as shown in FIG. 59. When the user B chooses the member registration form icon 326, the control panel 302 displays the information indicative of the provisional registration of user B with the user group to which user A belongs, "Permit Member Registration" button 311 being operated to permit the full registration and "Reject Member Registration" button 312 being operated to reject the registration.

If user B clicks "Permit Member Registration" button 311 or "Reject Member Registration" button 312, then the virtual home viewer B notifies the inter-user-terminal communication relay server 23 via the Internet 5 of the operation done by user B in step S292.

In response to this notification, in step S283, the inter-user-terminal communication relay server 23 fully registers user B with the user group to which user A belongs or deletes user B from the user group of user A with which user B is provisionally registered, notifying the virtual home viewer B thereof via the Internet 5.

It should be noted that the notification of the full registration of user B is not explicitly sent to virtual home viewer A. However, subsequently, user A can determine whether user B has been fully registered as the member by checking the member list for the name of user B when the member list is displayed in virtual home viewer A.

This is the end of the description of the processing to be executed upon the provisional registration of user B by user A with the user group to which user A belongs.

The following describes the processing of talking (actually, chatting in text) with other users. As described above, talk can be executed between the members of the same user group.

Figure 61:
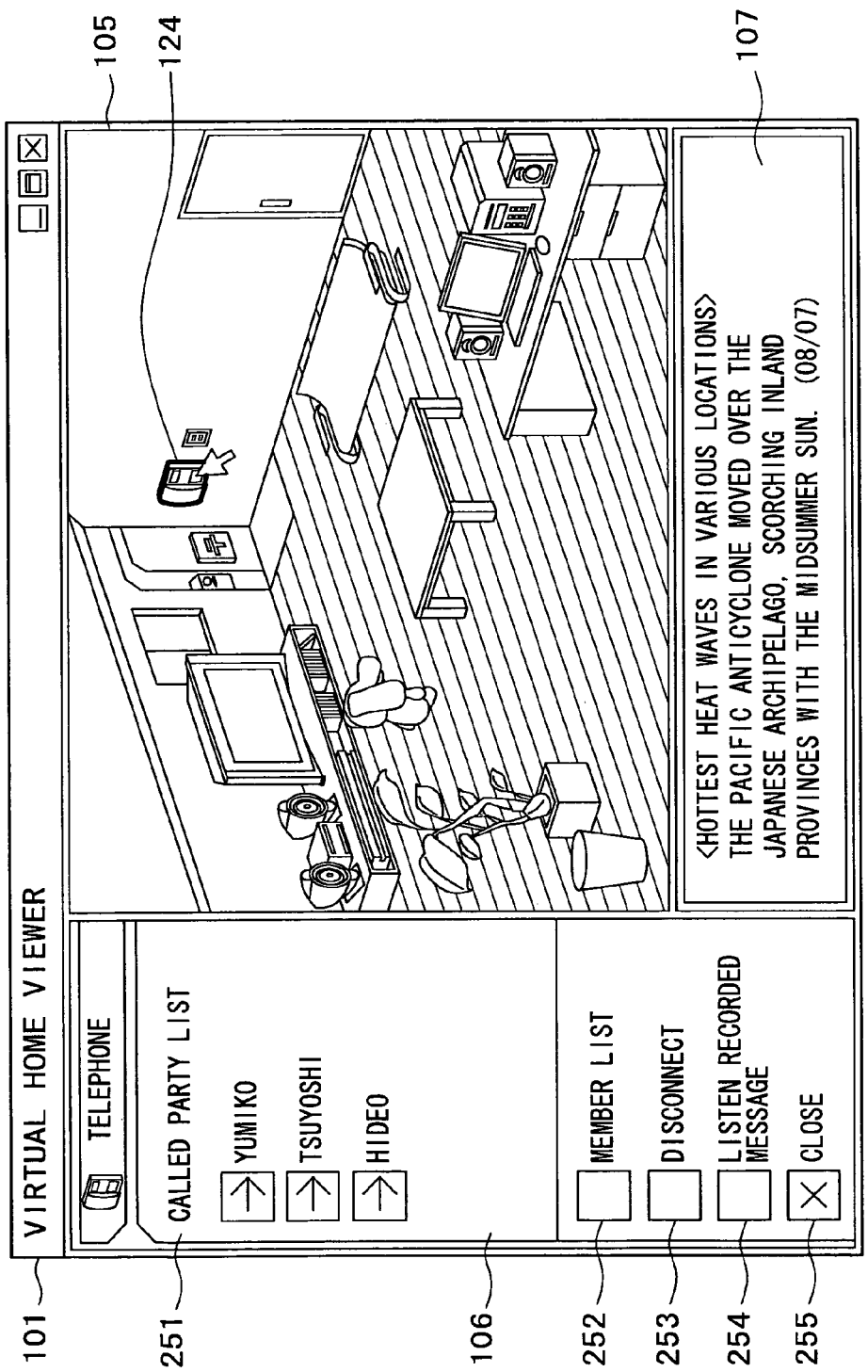
FIG. 61 illustrates an exemplary display upon selection of the telephone icon.
Figure 62:
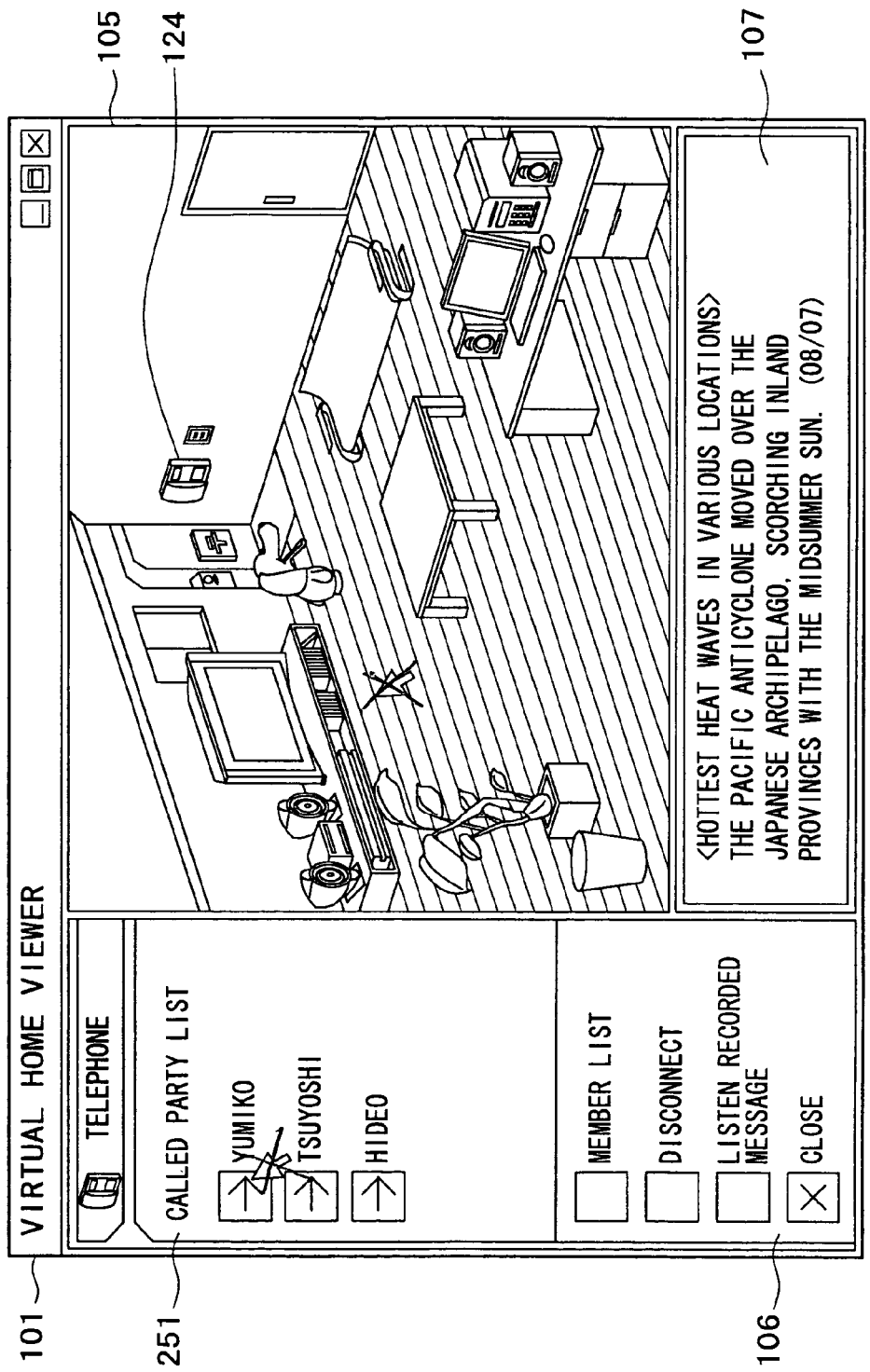
FIG. 62 illustrates an operation for making a call to "Yumiko".

For example, to start talking with "Yumiko" who is the member of the user group to which user A belongs, user A may only select the telephone icon 124 in the virtual room to display the called party list 251 in the control panel 106 as shown in FIG. 61 and click "Yumiko" button in the members included in the called party list 251 as shown in FIG. 62.

Figure 63:
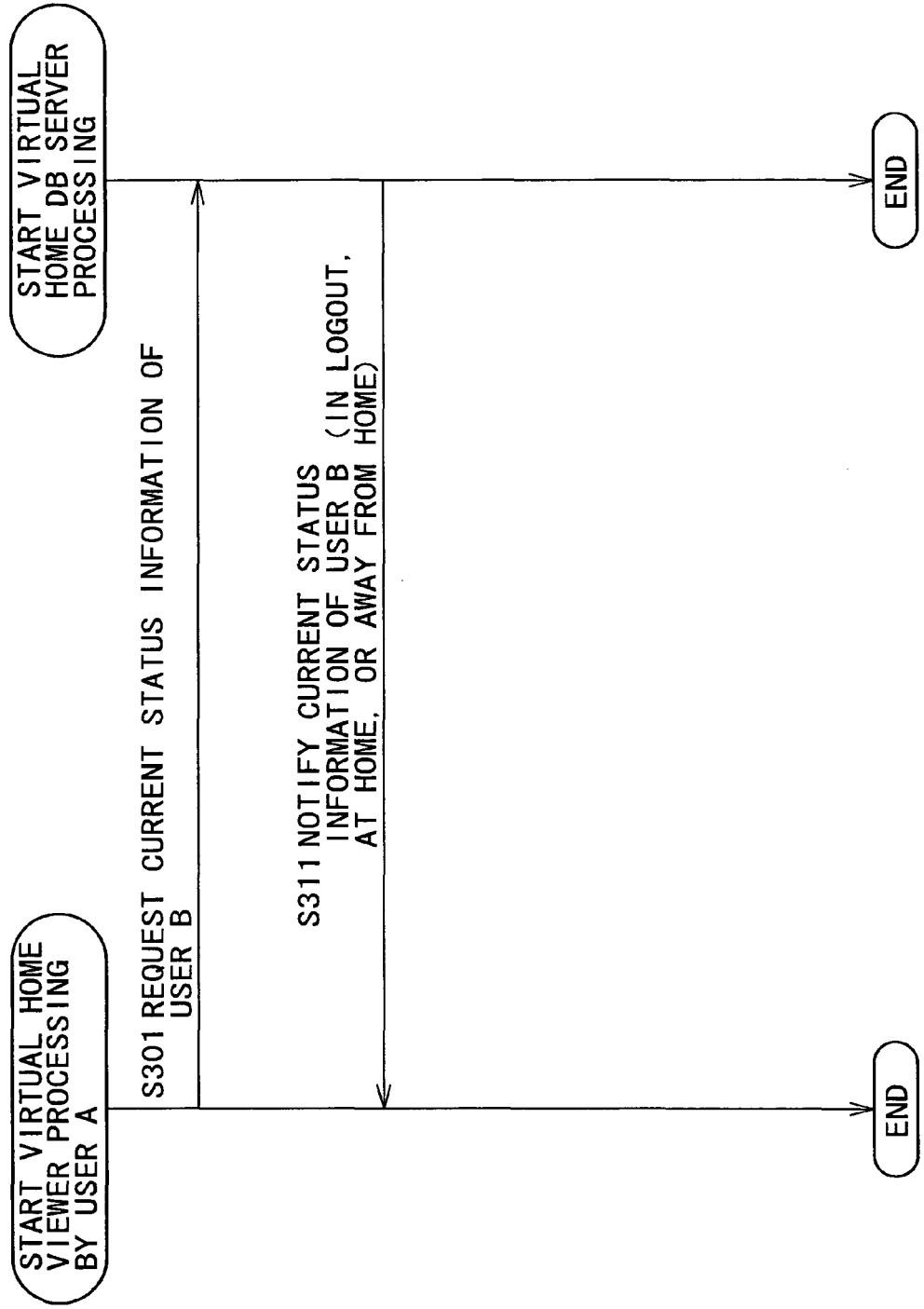
FIG. 63 is a flowchart for describing current status information acquisition processing.

When "Yumiko" button is clicked, the information about the current status of "Yumiko" (hereafter referred to as user B until otherwise noted) is obtained from the virtual home DB server 21. The following describes this current status information acquisition processing with reference to the flowchart shown in FIG. 63. In step S301, virtual home viewer A requests the virtual home DB server 21 via the base station 4 and the Internet 5 for the current status of user B.

In response to this request, in step S311, the inter-user-terminal communication relay server 23 sends, to virtual home viewer A via the Internet 5 and the base station 4, the current status of user B; namely, user B is in the logout state (talk disabled), in the login state and at home (talk enabled), in the login state and at home but talking with an other user (talk disabled), or in the login state and visiting an other user's virtual room (talk disabled). This is the end of the description of the current status information acquisition processing.

Figure 64:
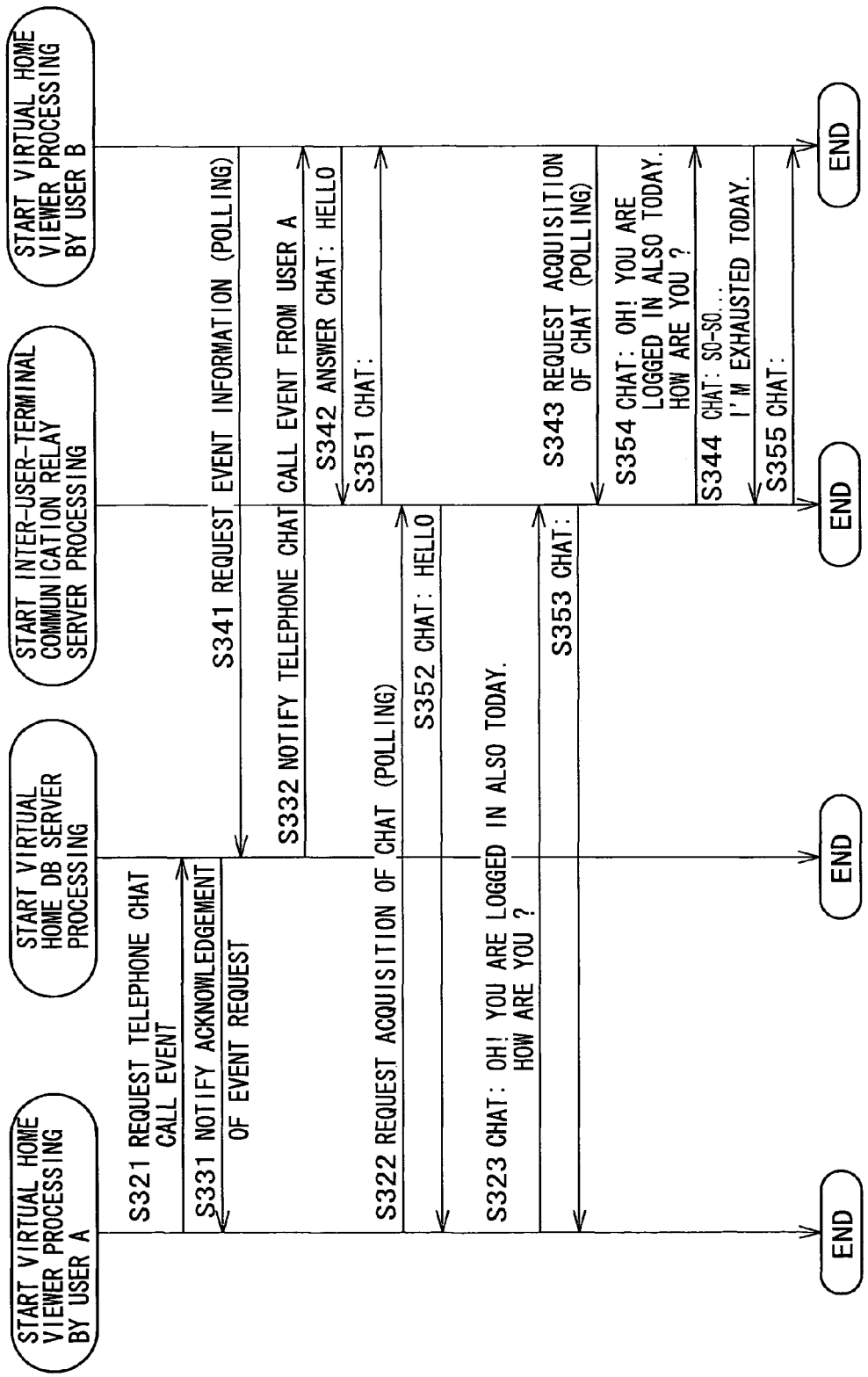
FIG. 64 is a flowchart for describing telephone chat processing.

If the current status information acquisition processing indicates that user B is in the login state and at home in the virtual room (talk enabled), virtual home viewer A starts telephone chat processing. The following describes this telephone chat processing with reference to the flowchart shown in FIG. 64.

In step S321, virtual home viewer A requests the virtual home DB server 21 via the base station 4 and the Internet 5 for a telephone chat call event for user B. In step S331, the virtual home DB server 21 generates the telephone chat call event for user B and notifies virtual home viewer A via the Internet 5 and the base station 4 of the acknowledgement of this event request. In response to this notification, virtual home viewer A subsequently periodically requests the inter-user-terminal communication relay server 23 via the base station 4 and Internet 5 for a telephone chat text, which is sent from user B to user A. It should be noted that, if user B does not answer the telephone chat call, nothing is sent back. On the other hand, in step S341, by the event information acquisition processing, which is periodically executed, virtual home viewer B requests the virtual home DB server 21 via the Internet 5 for event information. In response to this request, in step S332, the virtual home DB server 21 notifies virtual home viewer B via the Internet 5 of the generation of a telephone chat event upon request by user A.

Figure 65:
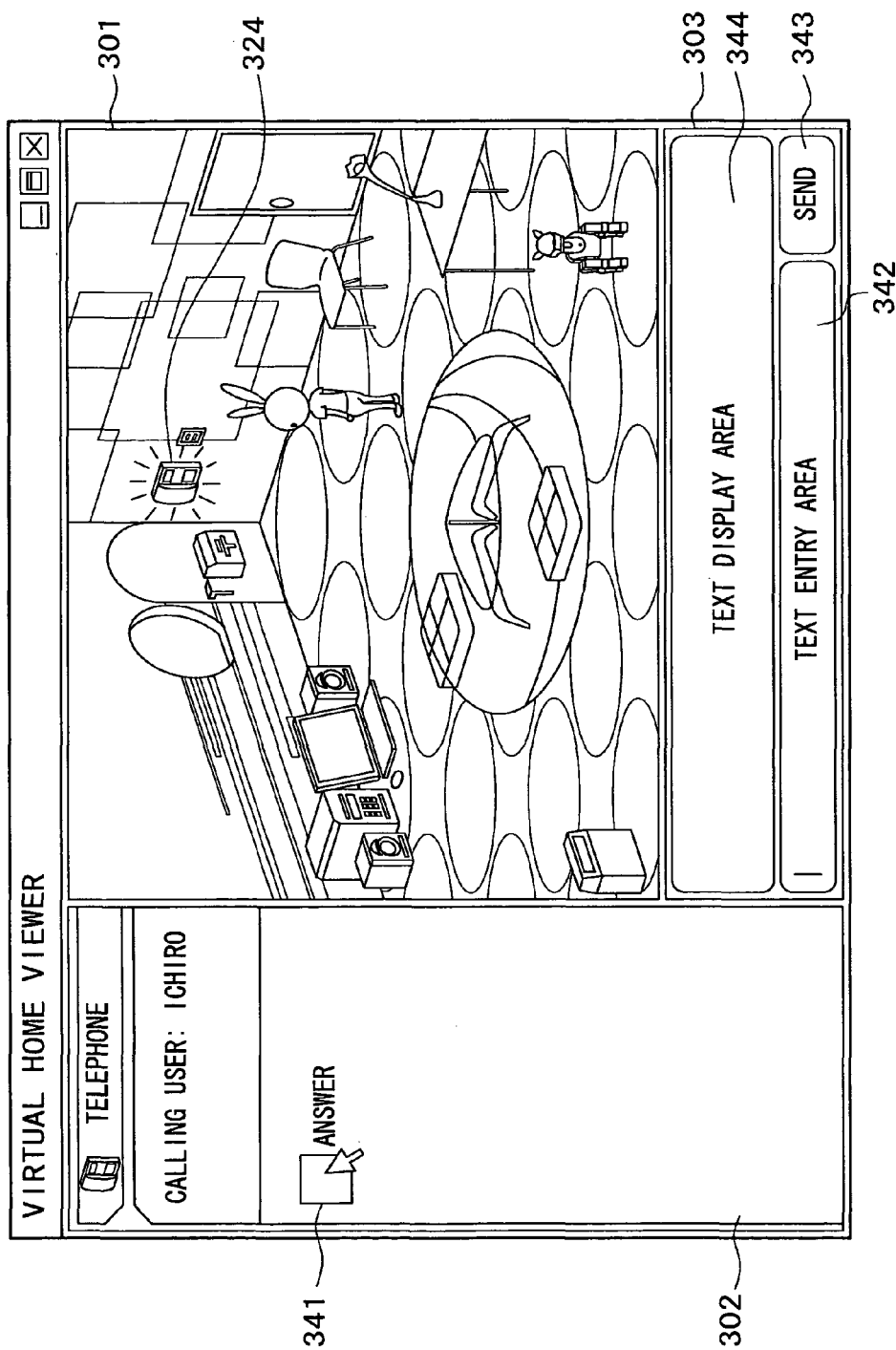
FIG. 65 illustrates an exemplary display when a call has come.

In response to this notification that a telephone chat event has been generated upon request by user A, virtual home viewer B displays the telephone icon 324 in the virtual room shown in the main panel 301 in a highlighted manner (the icon is partially lighted or entirely blinked) and generates the sound of the beep for the telephone as shown in FIG. 65. Also, virtual home viewer B displays the name of telephone chat originator and "Answer" button 341 being clicked to answer the call of telephone chat in the control panel 302.

If user B clicks the "Answer" button 341, the communication panel 303 displays an text entry area 342 being entered the telephone chat text, "SEND" button 343 being clicked to send the text entered in the text entry area 342, and a text display area 344 being displayed the telephone chat text.

When user B clicks the "Answer" button 341, enters text "Hello" in the text entry area 342, and clicks the "SEND" button 343, then, in step S342, virtual home viewer B sends the information that the telephone chat call has been answered and telephone chat text "Hello" to the inter-user-terminal communication relay server 23 via the Internet 5.

In response to this notification, in step S351, the inter-user-terminal communication relay server 23 returns the telephone chat text addressed to user B from user A. It should be noted that, in the phase of step S351, the telephone chat text from user A to user B does not exist, so that nothing is sent back.

On the other hand, virtual home viewer A waiting for the answer from user B to which telephone chat call was sent has been periodically requesting the inter-user-terminal communication relay server 23 via the base station 4 and the Internet 5 for telephone chat text to be sent from user B to user A. However, nothing has been sent back to virtual home viewer B.

However, if virtual home viewer A requests the inter-user-terminal communication relay server 23 via the base station 4 and the Internet 5 for telephone chat text to be sent from user B to user A in step S322, the inter-user-terminal communication relay server 23 sends, via the Internet 5 and the base station 4, information that user B has answered the telephone chat call and text "Hello" of the telephone chat sent from user B to user A to virtual home viewer A in response to this request in step S352.

Figure 66:
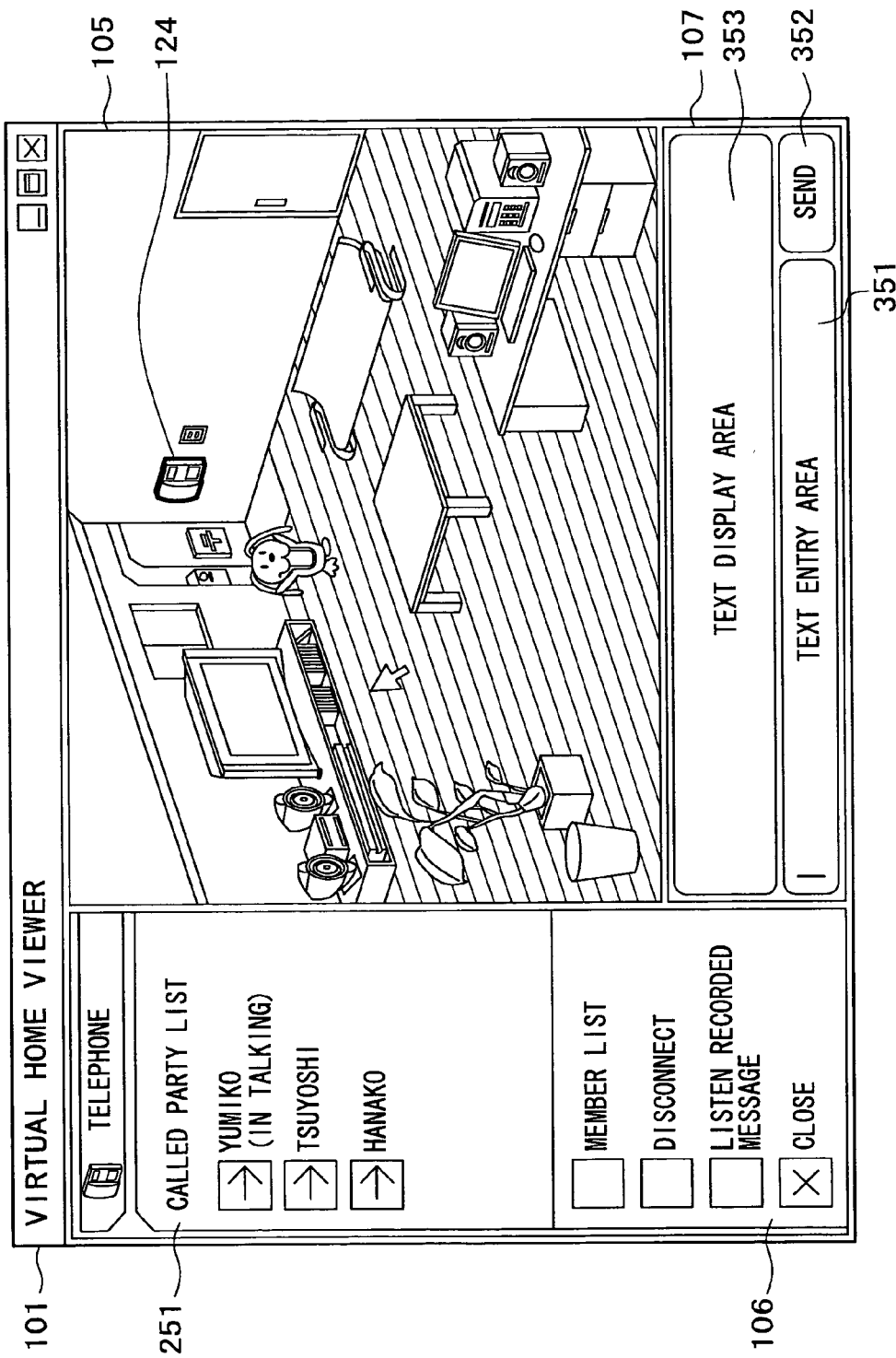
FIG. 66 illustrates an exemplary display showing that a talk is being made.

In response to this notification, virtual home viewer A displays that talk is being made with "Yumiko" in the called party list 251 of the control panel 106 as shown in FIG. 66. Also, virtual home viewer A changes the display of the communication panel 107 to a text entry area 351, which is entered the telephone chat text, "SEND" button 352, which is clicked to send the telephone chat text entered in the text entry area 351, and a text display area 353, which is displayed the telephone chat text.

Figure 67:
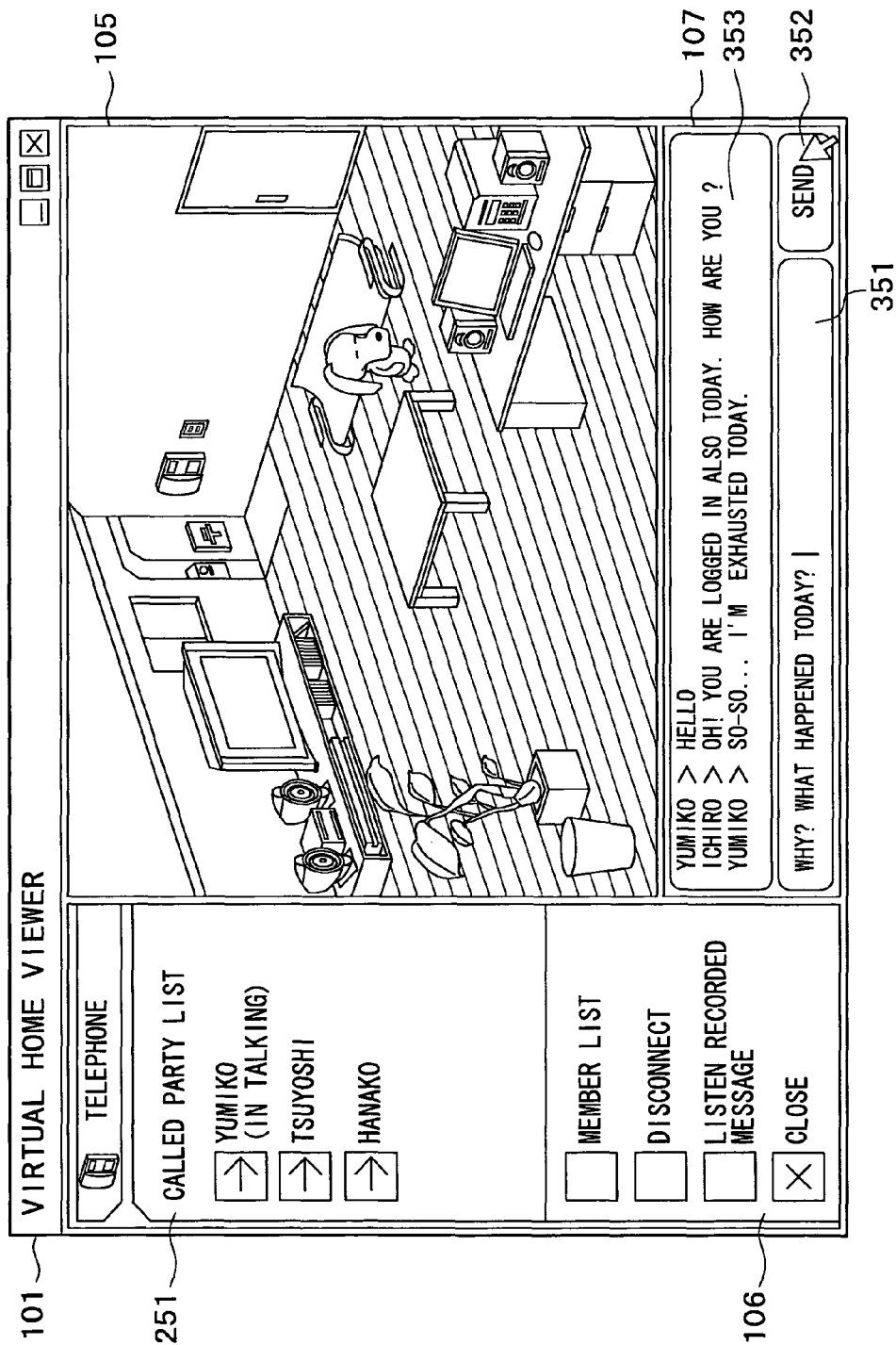
FIG. 67 illustrates an operation for a telephone chat.

Subsequently, every time "SEND" button 352 is clicked, virtual home viewer A displays, in the text display area 353, the telephone chat text addressed to B entered in the text entry area 351, sends the telephone chat text to the inter-user-terminal communication relay server 23 via the base station 4 and the Internet 5, obtains a telephone chat text addressed to user A held in the inter-user-terminal communication relay server 23 at that moment, and also displays the obtained telephone chat text in the text display area 353 as shown in FIG. 67. Further, virtual home viewer A periodically gets the telephone chat text addressed to user A from the inter-user-terminal communication relay server 23 via the base station 4 and the Internet 5 and also displays the obtained telephone chat text in the text display area 353. Virtual home viewer B also executes the similar processing.

Figure 68:
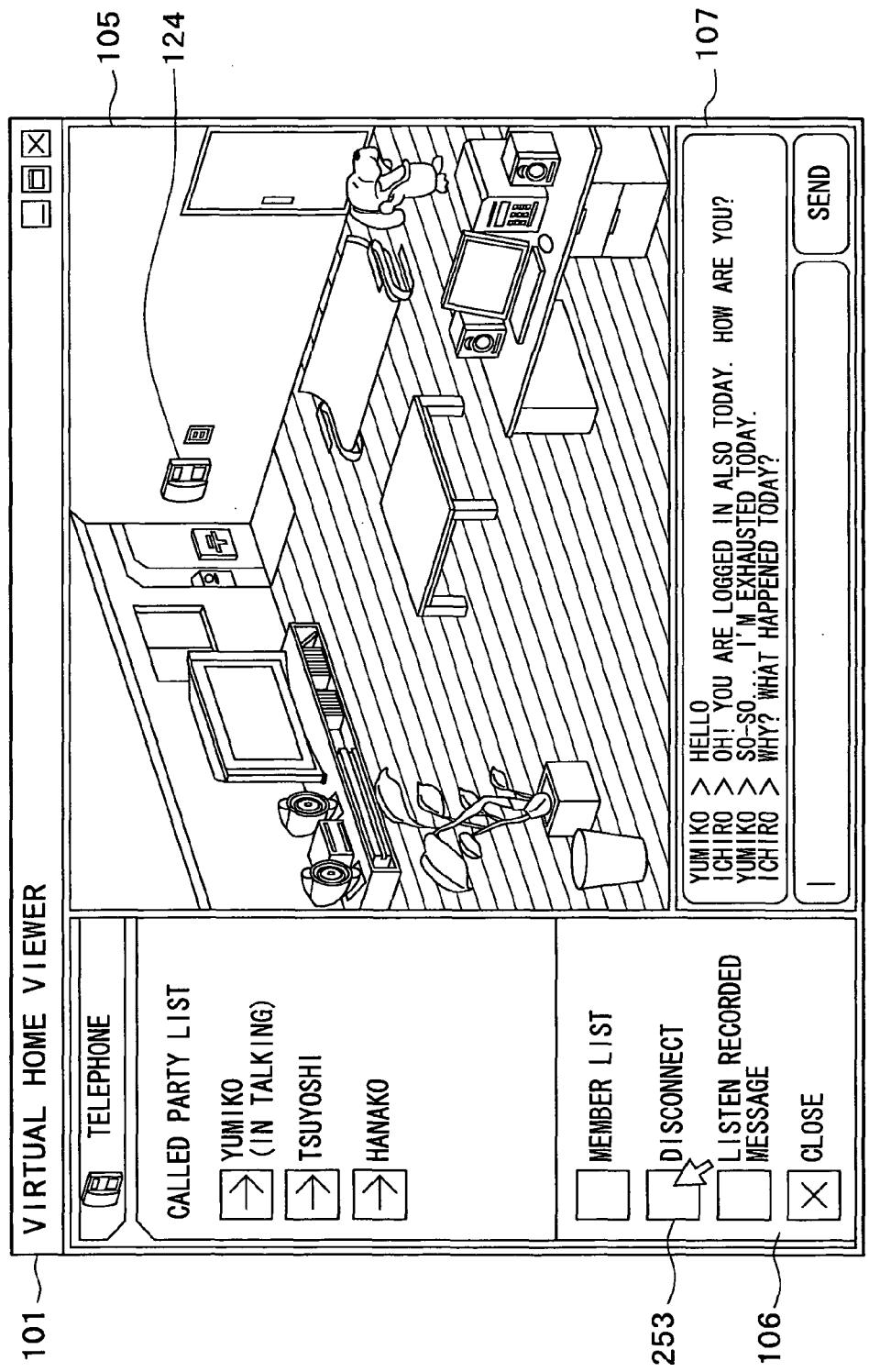
FIG. 68 illustrates an operation for ending a telephone chat.

These processing operations by virtual home viewers A and B are executed until "Disconnect" button 253 shown in the control panel 106 is clicked by user A as shown in FIG. 68.

Figure 69:
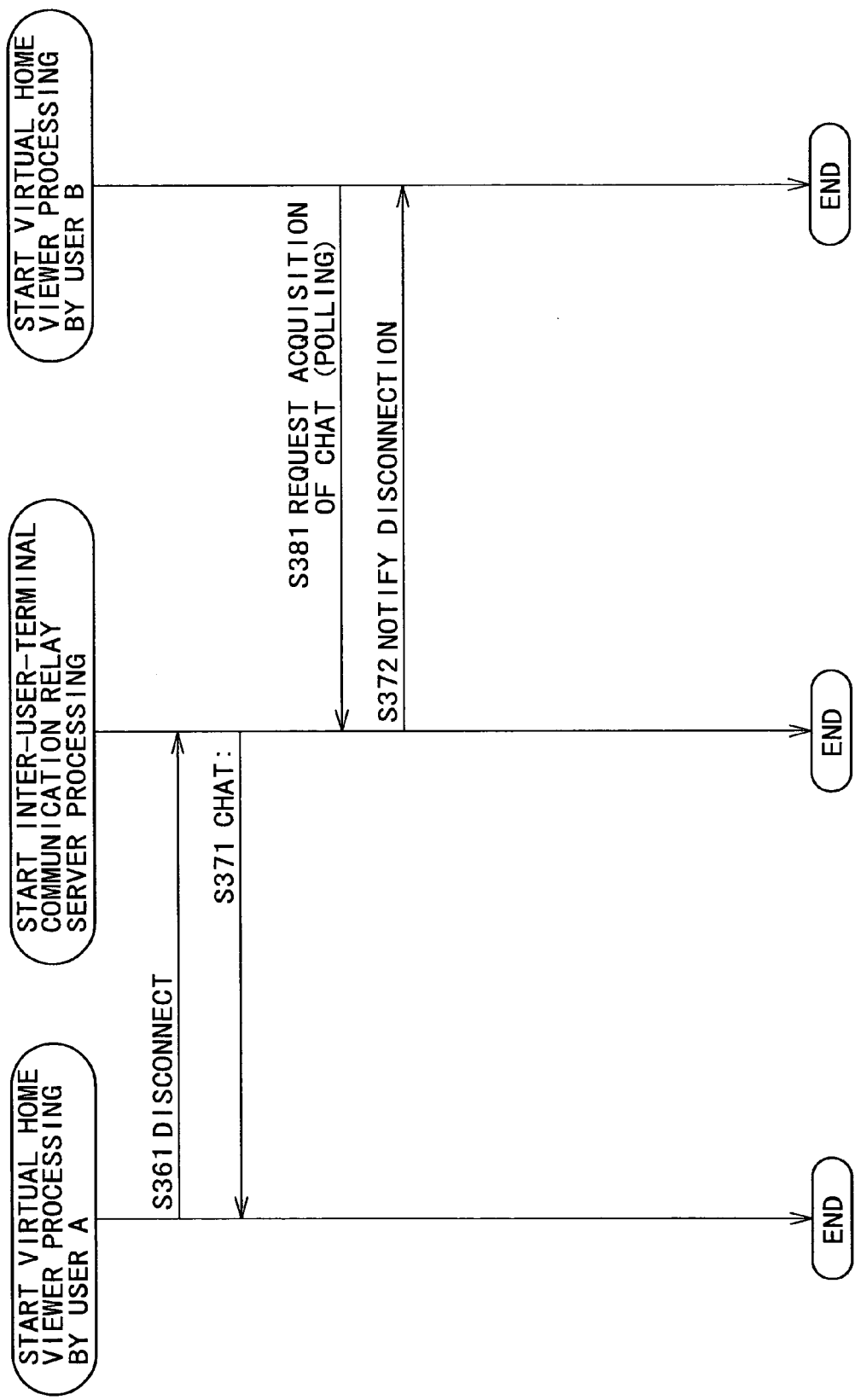
FIG. 69 is a flowchart for describing telephone chat end processing.

The following describes the telephone chat end processing to be executed when the "Disconnect" button 253 is clicked, with reference to the flowchart shown in FIG. 69. In step S361, virtual home viewer A notifies the inter-user-terminal communication relay server 23 via the base station 4 and the Internet 5 of the disconnection, namely the end of telephone chat.

In response to this notification, in step 371, the inter-user-terminal communication relay server 23 sends back the acknowledgement of the disconnect operation and the telephone chat addressed to user A received up to this moment. In response, virtual home viewer A returns the displays of the main panel 105 and the control panel 106 to the state as it was before the starting of the telephone chat.

On the other hand, when virtual home viewer B periodically requests the inter-user-terminal communication relay server 23 via the Internet 5 for a telephone chat text addressed to user B in step S381, then, in response to this request, the inter-user-terminal communication relay server 23 notifies virtual home viewer B via the Internet 5 of the disconnection with user A, namely the end of the telephone chat in step S372. In response to this notification, virtual home viewer B returns the displays of the control panel 302 and the communication panel 303 to the state at it was before the starting of the telephone chat. This is the end of the description of the telephone chat end processing.

Figure 70:
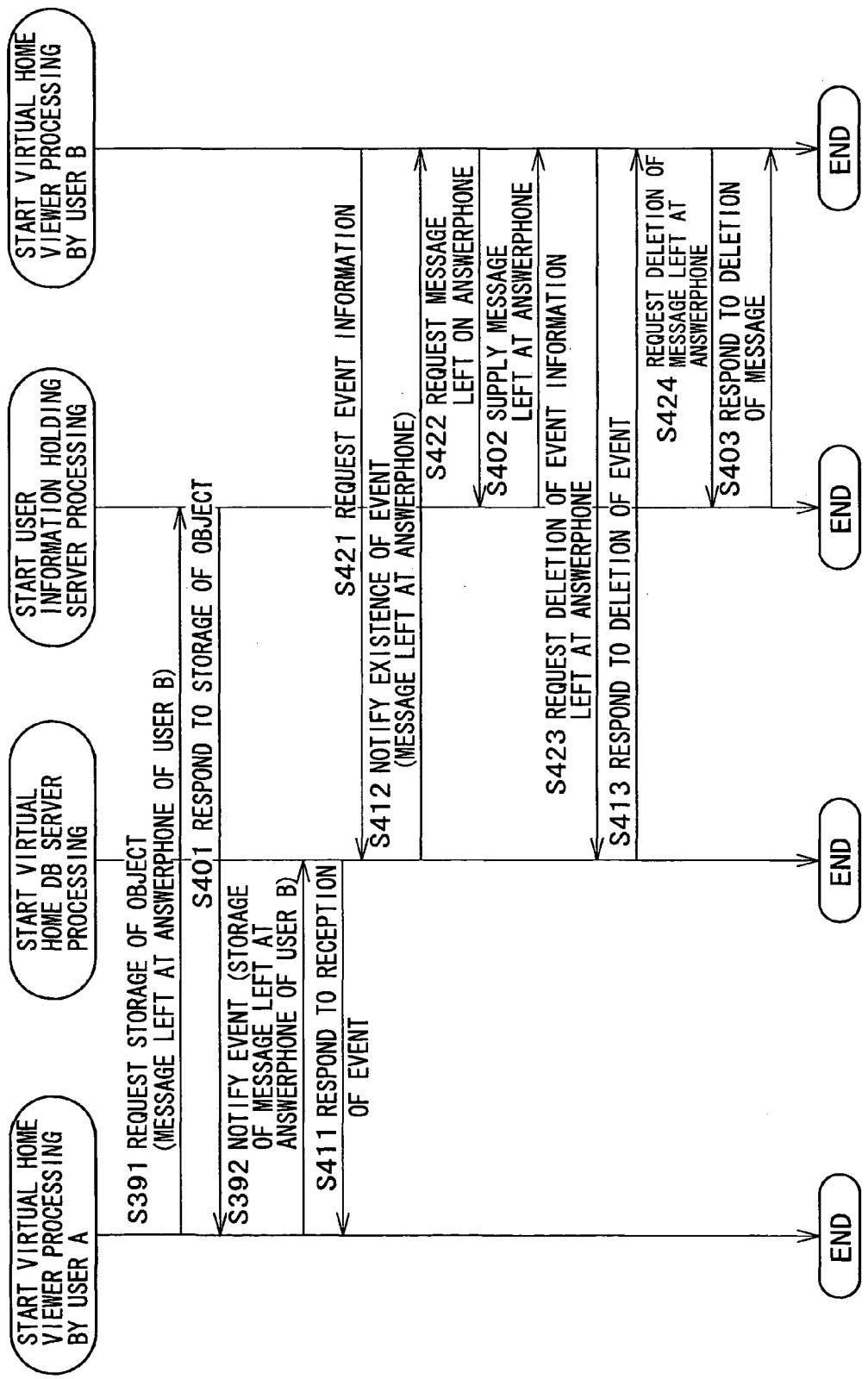
FIG. 70 is flowchart for describing recorded message recording processing.

The following describes answerphone message recording processing, which is executed when user A leaves a message to user B because user B is in the talk disabled state, with reference to FIG. 70. This answerphone recording processing is executed if the current status of user B obtained by the above-mentioned current status information acquisition processing indicates that user B is in the login state and not at home (talk enabled) in the virtual home.

Figure 71:
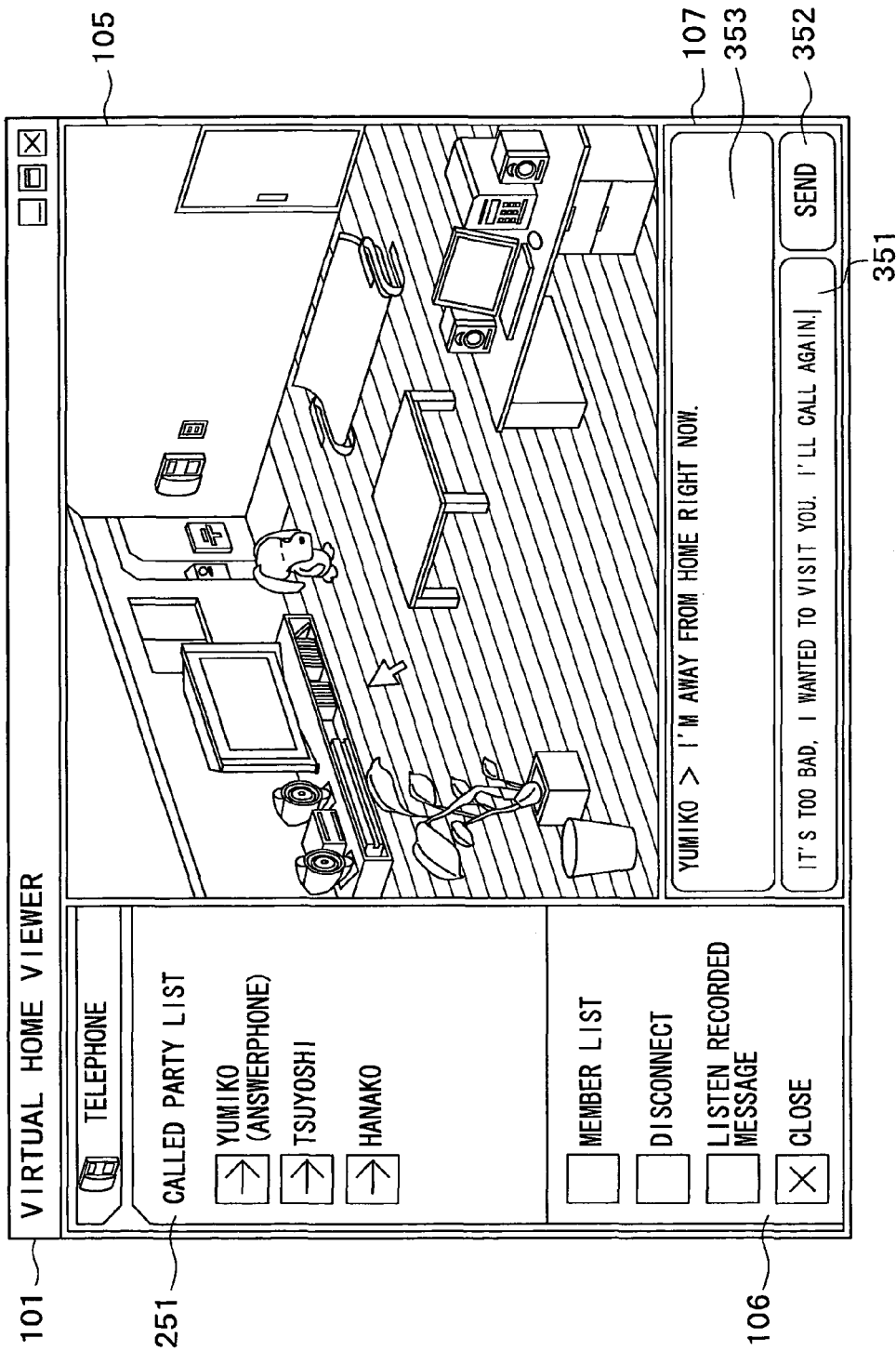
FIG. 71 illustrates an exemplary display if a called party is an automatic answering machine.

In step S391, virtual home viewer A displays (Answerphone) in the called party list 251 of the control panel 106 as the information indicative that the called party is in the talk disabled state as shown in FIG. 71. Also, virtual home viewer A switches the display of the communication panel 107 to the display of talk chat, thereby displaying preset message "I'm away from home right now." in the text display area 353.

At this moment, when user A enters a message (for example, "It's too bad, I wanted to visit you. I'll call again") in the text entry area 351 and clicks the "SEND" button 352, virtual home viewer A requests the user information holding server 24 via the base station 4 and the Internet 5 for the storage of an object (the message to the answerphone of user B) and sends the above-mentioned message "It's too bad, I wanted . . . ."

In response to this request, in step S401, the user information holding server 24 stores the message and notifies virtual home viewer A via the Internet 5 and the base station 4 of the acknowledgement of the request for storing the object.

In step S392, virtual home viewer A notifies the virtual home DB server 21 via the base station 4 and the Internet 5 of the event information (the leaving of the message at the answerphone of user B). In response to this notification, in step S411, the virtual home DB server 21 notifies the virtual home viewer A via the Internet 5 and the base station 4 of the reception of the event information.

Subsequently, if virtual home viewer B requests the virtual home DB server 21 for event information as a periodical operation in step S421, then, the virtual home DB server 21 sends the event information (that there is a message left at the answerphone of user B) to virtual home viewer B via the Internet 5 in step S412. It should be noted that this event information is held in the virtual home DB server 21 until virtual home viewer B requests its deletion.

In response to this notification, in step S422, virtual home viewer B requests the user information holding server 24 via the Internet 5 for the message left at the answerphone of user B. In response to this request, in step S402, the user information holding server 24 sends the message left at the answerphone of user B to virtual home viewer B via the Internet 5. It should be noted that, subsequently, the message left at the answerphone of user B is held in the user information holding server 24 until virtual home viewer B requests its deletion.

Figure 72:
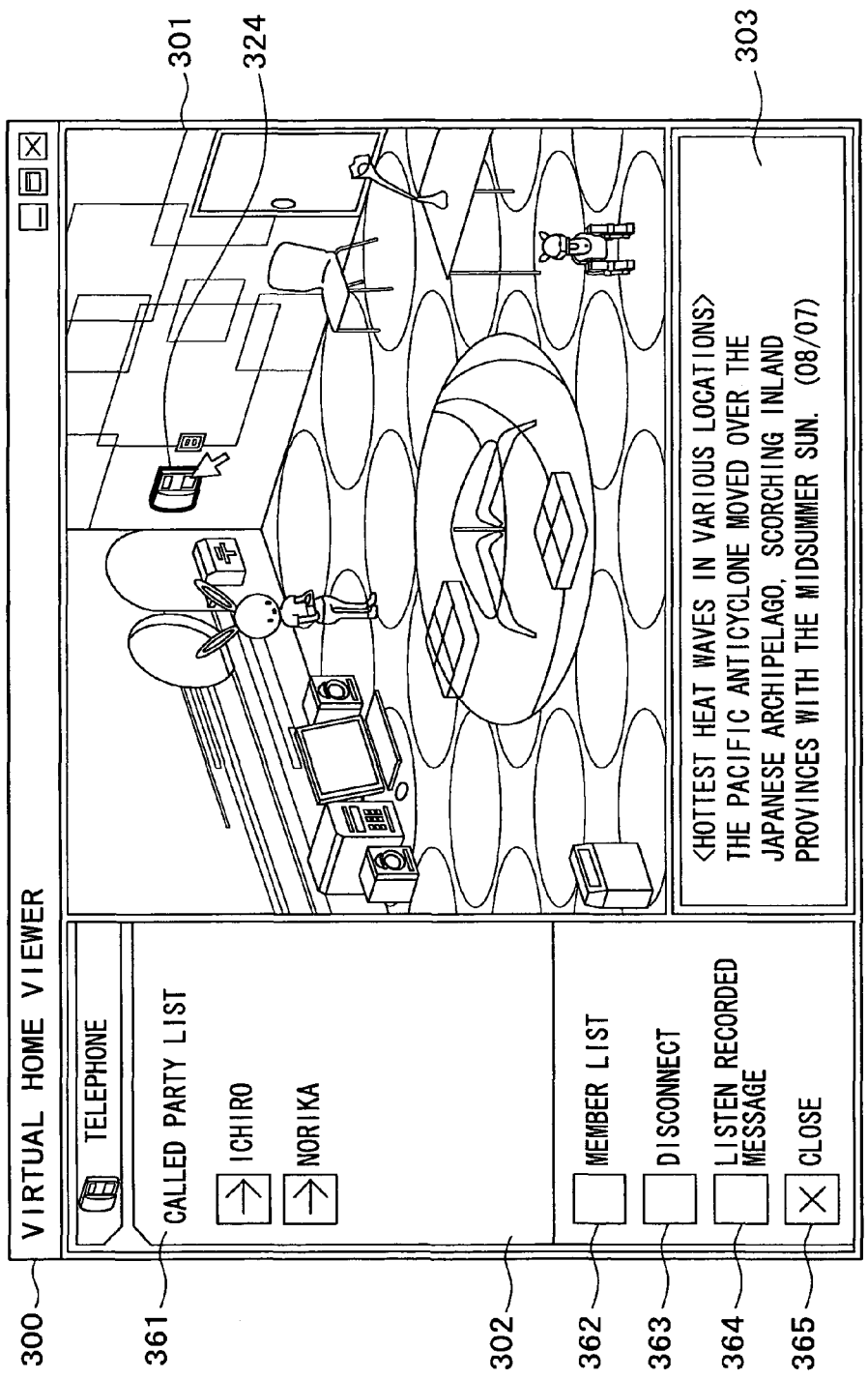
FIG. 72 illustrates an exemplary display upon selection of the telephone icon.

In response, virtual home viewer B draws user B's attention to the existence of the message left at its answerphone by blinking, for example, the telephone icon 324 in the virtual room in the main panel 301. When user B selects the blinking telephone icon 324, the control panel 302 displays a called party list 361 indicative of members of the user group to which user B belongs, "Member List" button 362, "Disconnect" button 363, "Listen Recorded Message" button 364, and "Close" button 365 as shown in FIG. 72. It should be noted that the buttons "Member List" through "Close" are similar to those buttons "Member List" 252 through "Close" 255 shown in FIG. 51, so that their description will be skipped.

Figure 73:
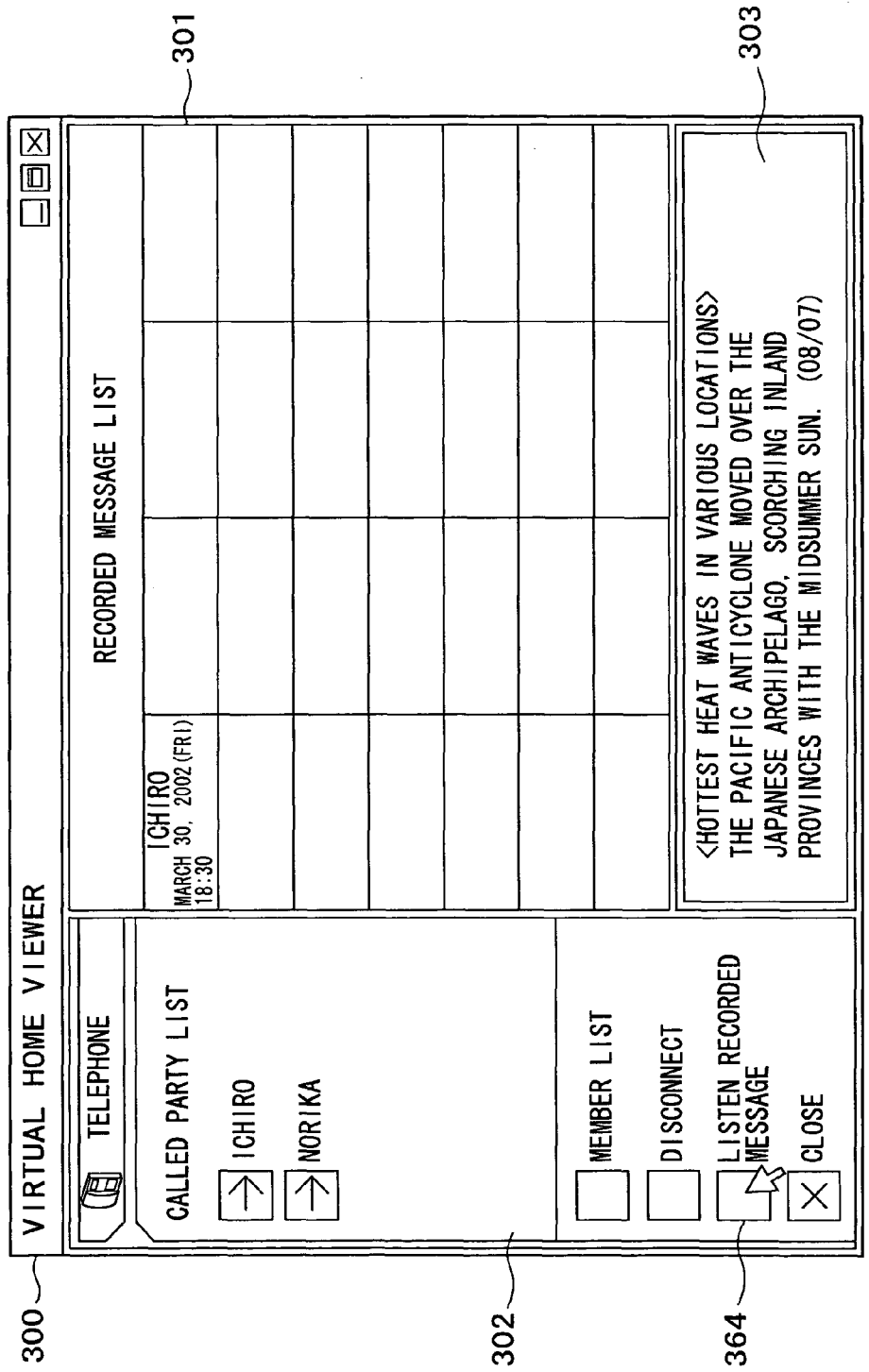
FIG. 73 is an exemplary display of a recorded message list.

When the "Listen Recorded Message" button 364 in the control panel 302 is clicked, the main panel 301 displays a recorded message list formed by boxes in each of which the name of the user who left a message and the recording date thereof as shown in FIG. 73 (in the example shown in FIG. 73, only one box is used).

Figure 74:
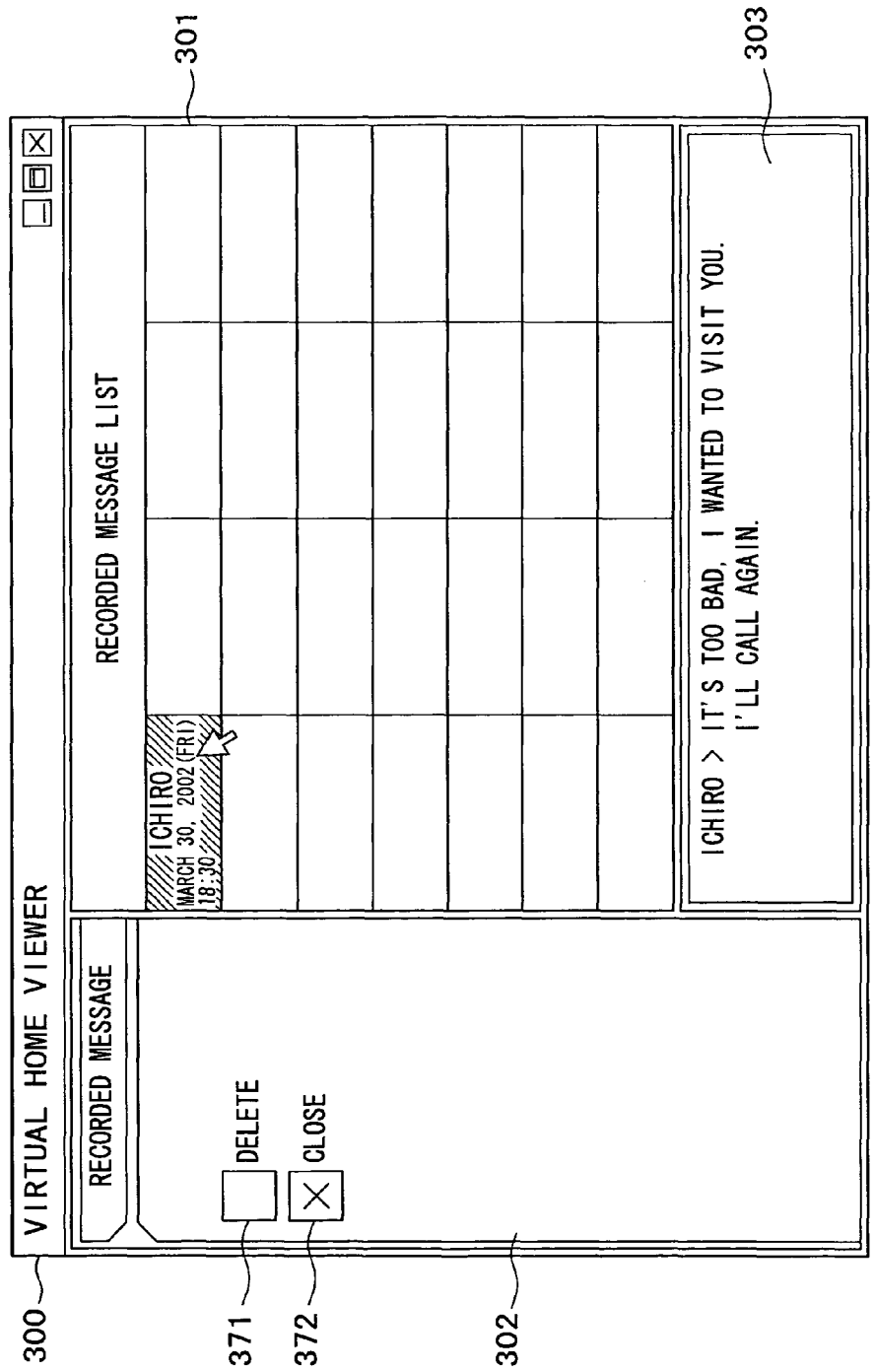
FIG. 74 illustrates an operation for making a confirmation of recorded messages.

When one of the boxes of the recorded message list displayed in the main panel 301 is selected, the communication panel 303 displays corresponding message "It's too bad, I wanted to visit you. I'll call again." as shown in FIG. 74. The control panel 302 displays "Delete" button 371 to be clicked to delete the record associated with the message corresponding to the box selected in the recorded message list from the virtual home DB server 21 and the user information holding server 24 and "Close" button 372 to be clicked to return the display of the main panel 301 from the recorded message list to the virtual room.

When user B clicks the "Delete" button 371, virtual home viewer B requests the virtual home DB server 21 via the Internet 5 for the deletion of the event information (that there is a message left at the answerphone of user B) in step S423. In response to this request, the virtual home DB server 21 deletes the specified event information from own record and then notifies virtual home viewer B via the Internet 5 of the completion of the requested deletion in step S413.

In step S424, virtual home viewer B requests the user information holding server 24 via the Internet 5 for the deletion of the corresponding message. In response to this message, in step S403, the user information holding server 24 deletes the specified message from own record and then notifies virtual home viewer B via the Internet 5 of the completion of the requested deletion. This is the end of the description of the answerphone recording processing.

The following describes the processing of visiting the virtual room of a member by an other who belongs to the same user group, thereby chatting each other and passing presents for example (it should be noted that, on the screen, the visit is made by the mascot). In the following example, user A visits the virtual room of user B.

Figure 75:
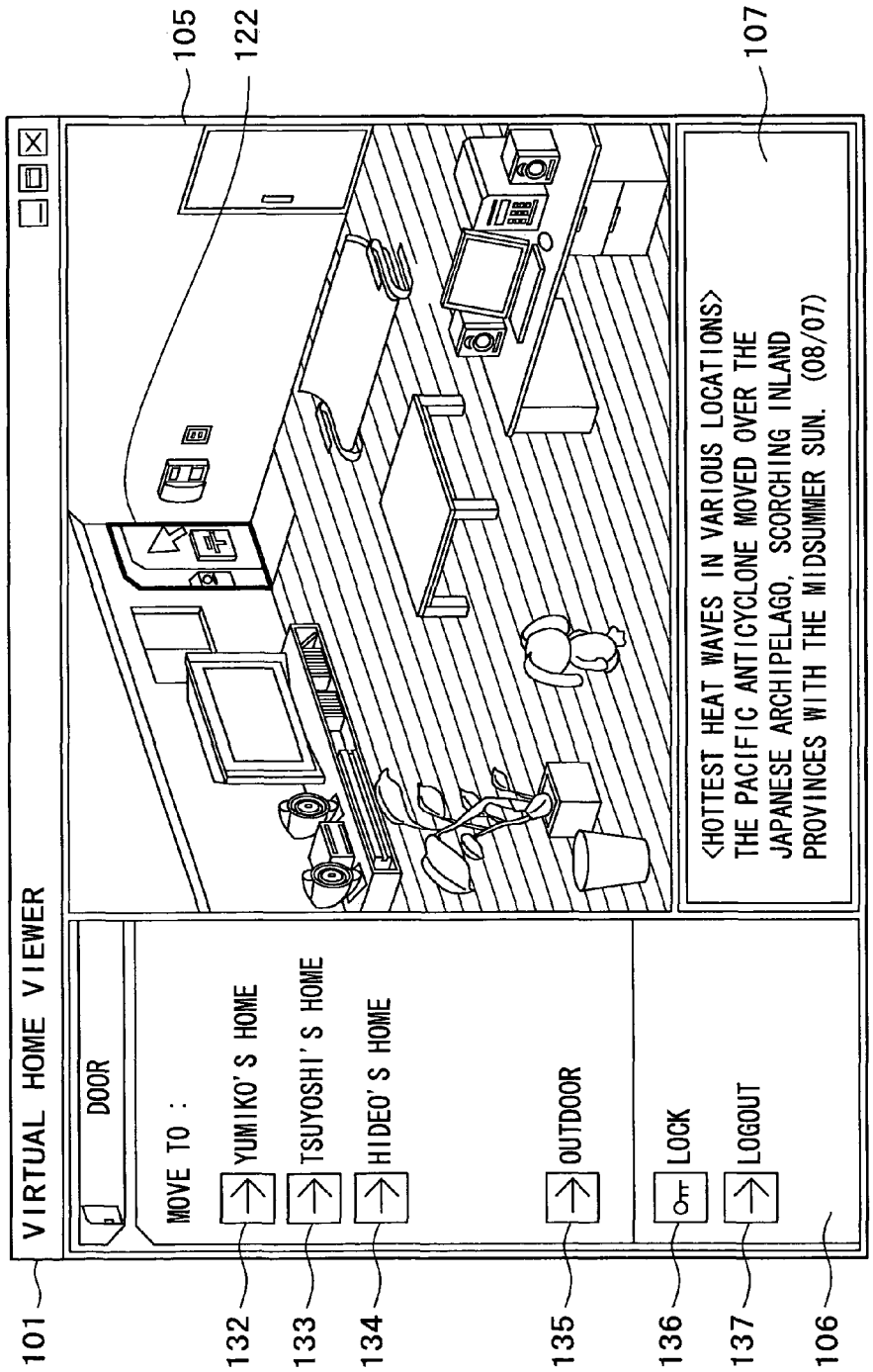
FIG. 75 is an exemplary display upon selection of a door icon.

When visiting the virtual room of an other member, user A may only select the door icon 122 of the virtual room shown in the main panel 105 and then click the button corresponding to the virtual home that user A wants to visit, among the buttons shown in response to the selection of the door icon 122 as its property, as shown in FIG. 75.

The following describes the buttons being displayed in the control panel 106 as the property of the door icon 122; "Yumiko's Home" button 132 is clicked to make the mascot 121 visit the virtual room of "Yumiko." The same holds with "Tsuyoshi's Home" button 133 and "Hideo's Home" button 134. "Outdoor" button 135 is clicked to make the mascot 121 get out of the virtual room. "Lock" button 136 is clicked to lock the door of the virtual room. "Logout" button 137 is clicked to end virtual home viewer A.

Figure 76:
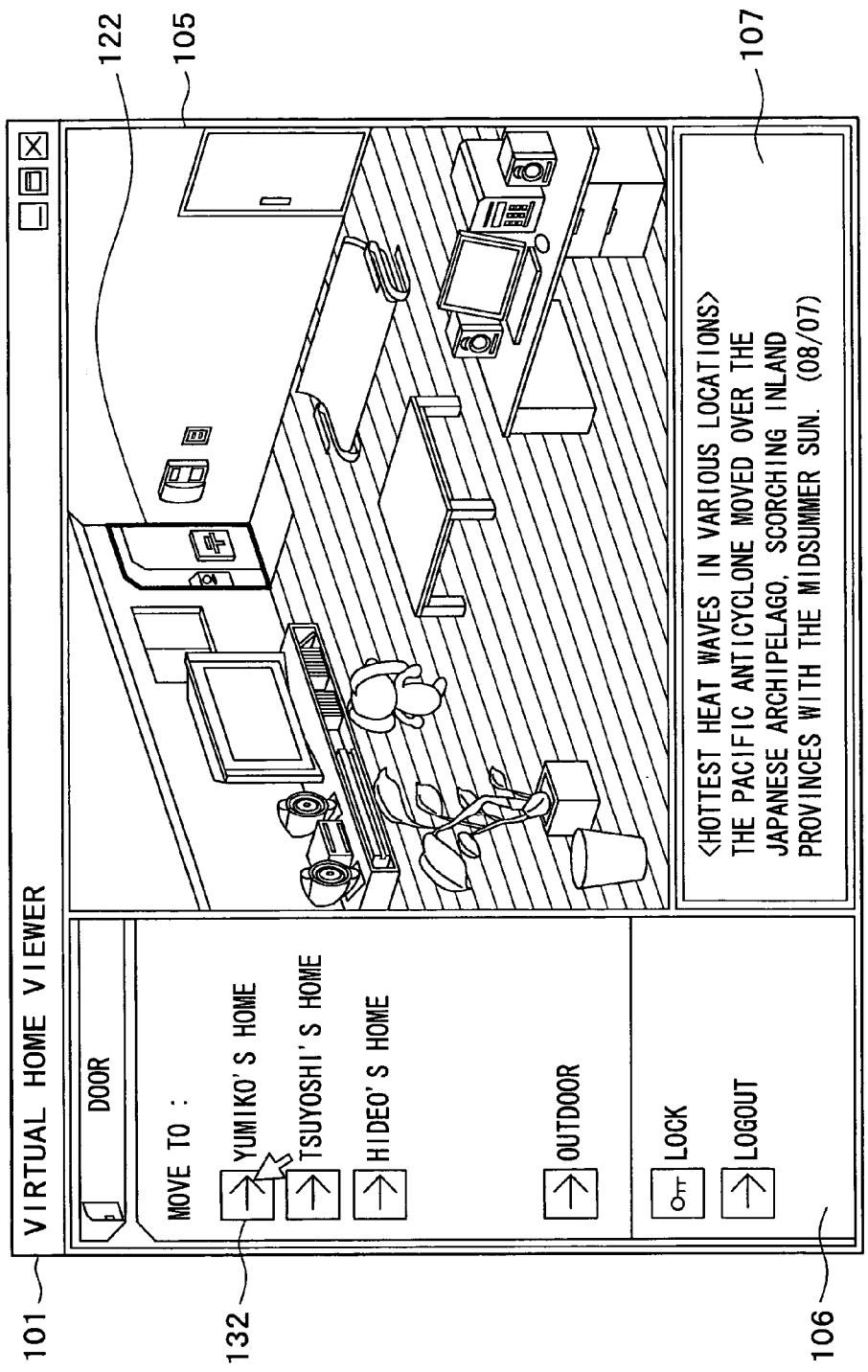
FIG. 76 illustrates an operation for visiting "Yumiko's Home".
Figure 77:
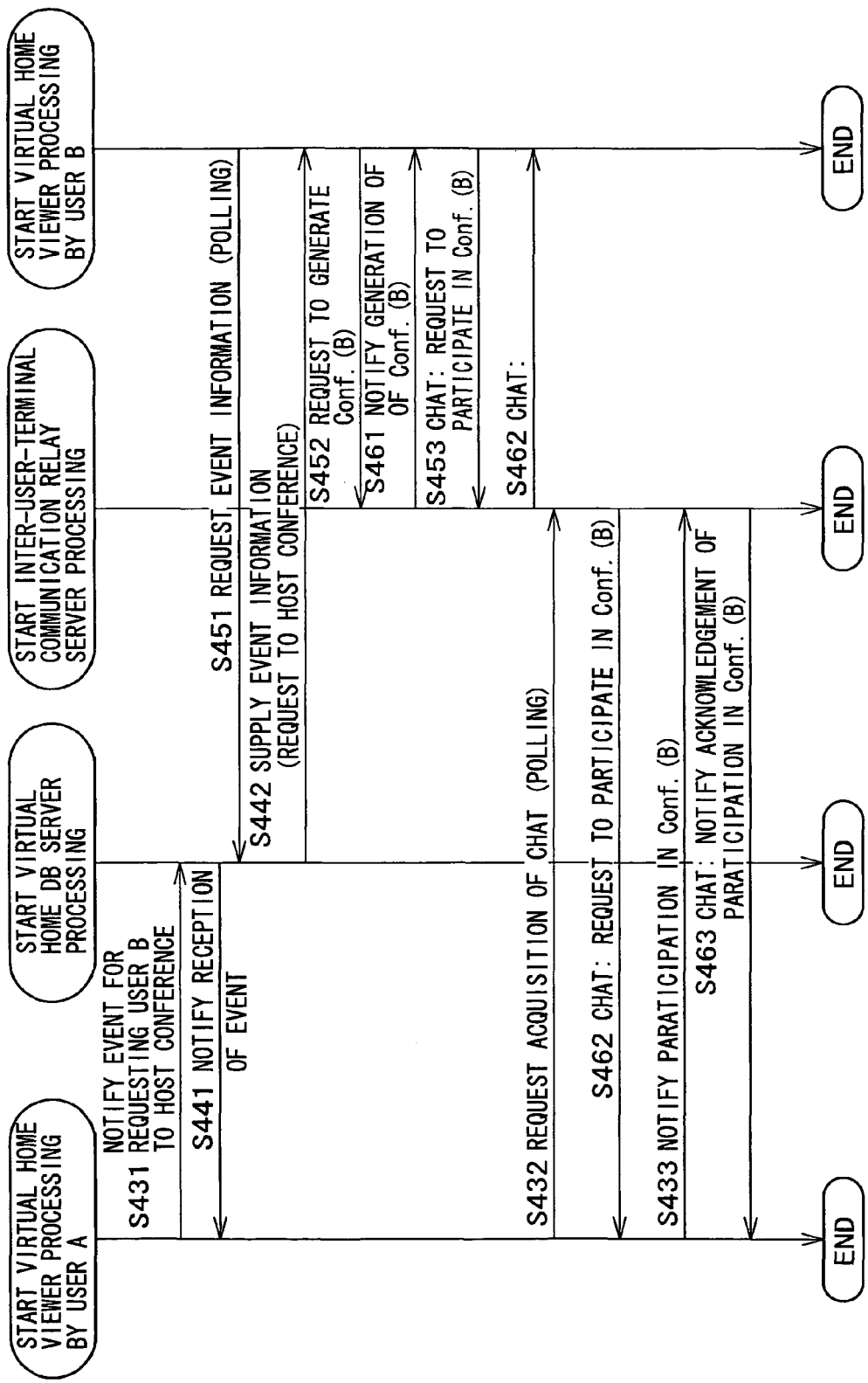
FIG. 77 is a flowchart for describing conference generation processing.

For example, the following describes conference generation processing being started upon clicking of "Yumiko's Home" button 132 as shown in FIG. 76, with reference to the flowchart shown in FIG. 77. In what follows, "Yumiko" belonging to the user group to which user A belongs is referred to as user B until otherwise noted.

In step S431, virtual home viewer A notifies the virtual home DB server 21 via the base station 4 and the Internet 5 of an event for requesting "generation of a conference hosted by user B." A conference herein denotes a collection of two or more users who share a virtual room. Various data are communicated as conference synchronous information almost realtime between the users belonging to the conference.

In response to the notification from virtual home viewer A, in step S441, the virtual home DB server 21 stores the notified event and notifies virtual home viewer A via the Internet 5 and the base station 4 of the reception of the notification. Subsequently, virtual home viewer A periodically requests the inter-user-terminal communication relay server 23 via the base station 4 and Internet 5 to get chat addressed to user A.

When virtual home viewer B requests the virtual home DB server 21 for event information via the Internet 5 as a periodical operation in step S451, then the virtual home DB server 21 sends the event information (the request for generating a conference hosted by user B) to virtual home viewer B via the Internet 5 in step S442.

In response to the notification of this event information, in step S452, virtual home viewer B requests the inter-user-terminal communication relay server 23 via the Internet 5 for the generation of conference (B) to be hosted by virtual home viewer B ((B) denotes the term for identifying a conference). (In the drawings, conference (B) is shown as Conf. (B)). In step S461, the inter-user-terminal communication relay server 23 generates conference (B) and notifies virtual home viewer B thereof via the Internet 5.

In step S453, virtual home viewer B sends a request to the inter-user-terminal communication relay server 23 via the Internet 5 for participating in conference (B) for user A as a chat addressed to virtual home viewer A. Chat herein denotes a mechanism for receiving and transmitting various data realtime or denotes the various data, which are received and transmitted realtime.

In step S462, the inter-user-terminal communication relay server 23 sends a chat addressed to virtual home viewer B (however, in this example, there is no chat addressed to virtual home viewer B, so that nothing is sent).

When virtual home viewer A requests the inter-user-terminal communication relay server 23 via the Internet 5 for the acquisition of a chat as a periodical operation in step S432, then the inter-user-terminal communication relay server 23 sends to virtual home viewer A via the Internet 5 a request for participating in conference (B) for user A as a chat addressed to virtual home viewer A in step S462.

In response to the request for participating in conference (B), in step S433, the virtual home viewer A notifies the inter-user-terminal communication relay server 23 via the base station 4 and the Internet 5 of the participation by user A in conference (B). In response to this notification, in step S463, the inter-user-terminal communication relay server 23 adds conference (B) to user A and notifies the virtual home viewer A thereof via the Internet 5 and the base station 4. This is the end of the description of the conference generation processing.

Subsequently, since user A and user B are participating in conference (B), messages and data can be communicated realtime between virtual home viewer A and virtual home viewer B by means of chats. This also allows both the viewers to share various data (to be detailed later) as synchronous information.

Figure 78:
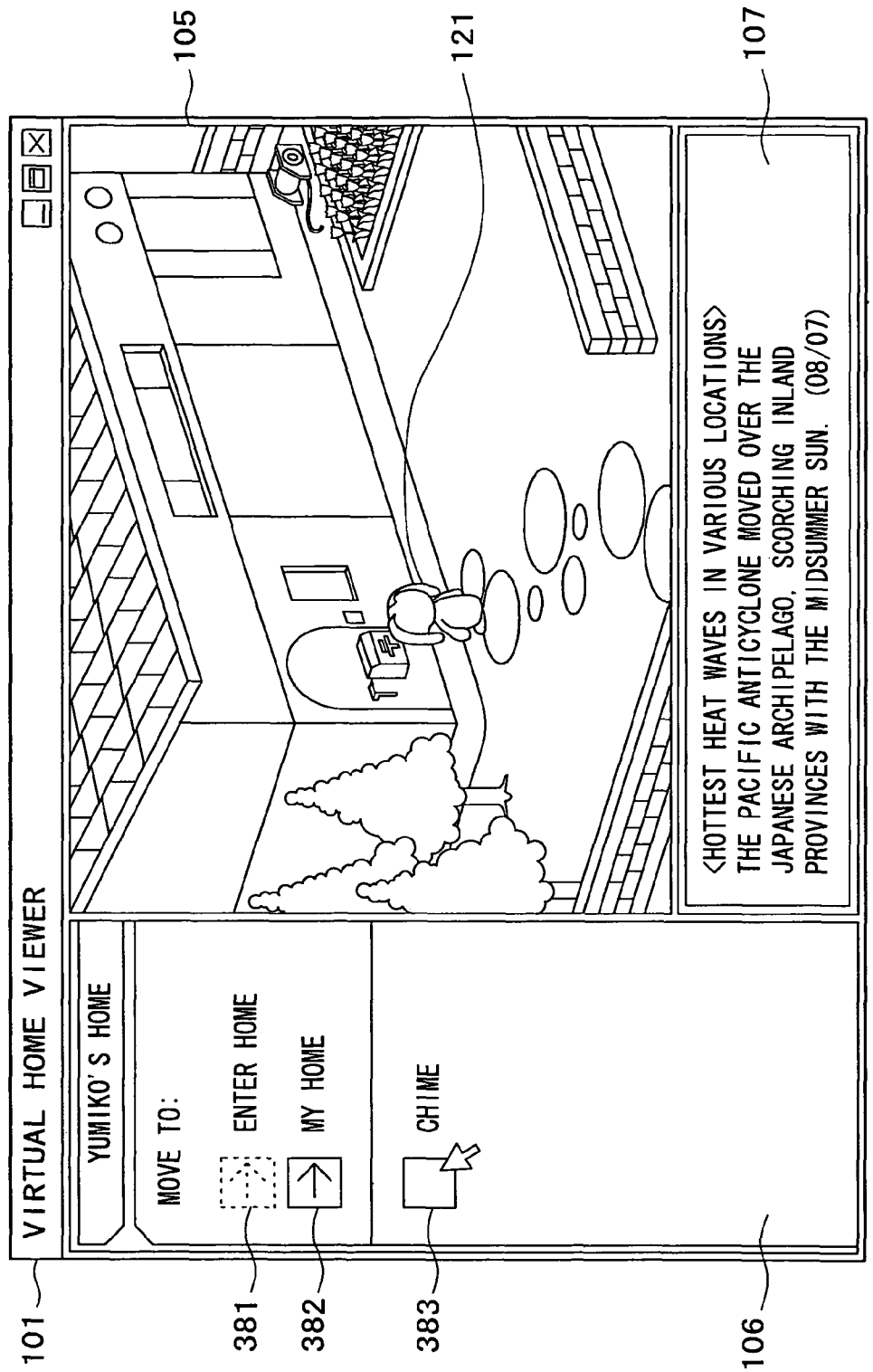
FIG. 78 illustrates an exemplary display upon visiting "Yumiko's Home".

Upon completion of the conference generation processing, the main panel 105 of virtual home viewer A displays that the mascot 121 is visiting the virtual home of user B, standing in front of the door thereof, as shown in FIG. 78. The control panel 106 shows "Enter Home" button 381, which is clicked to let the mascot 121 go into the virtual room of user B, "My Home" button 382, which is clicked to make the mascot 121 go back to the virtual room of user A, and "Chime" button 383, which is clicked to ring the chime of the interphone (common to the telephone) of the virtual room of user B. It should be noted that the "Enter Home" button 381 can be clicked only when user B unlocks the door of the virtual room.

Figure 79:
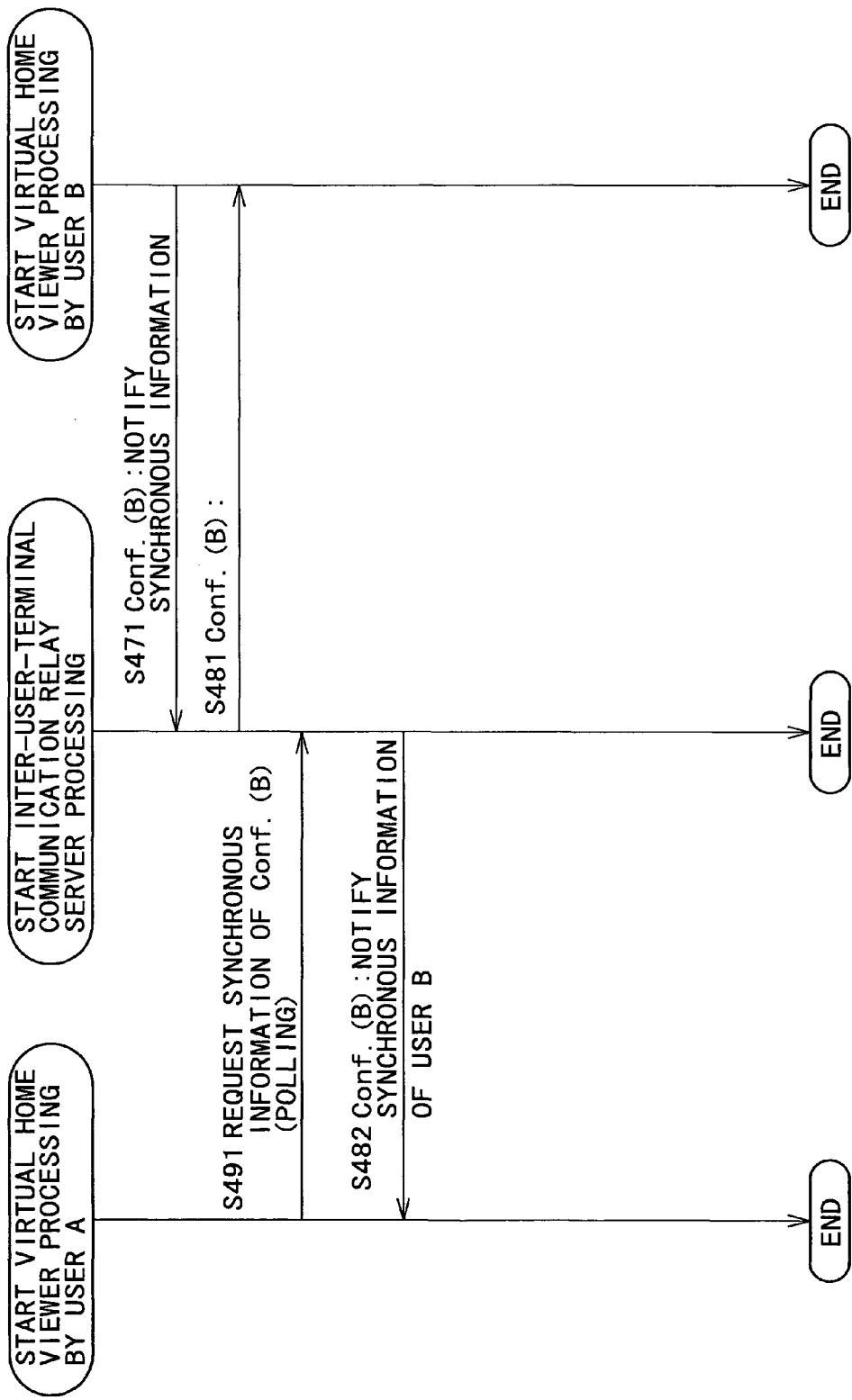
FIG. 79 is a flowchart for describing the processing of sharing information corresponding to user B's operation as conference synchronous information.

At this moment, if user B changes the layout of the external view of the virtual room, for example, the difference between the before and after update of the layout information is also sent to virtual home viewer A as the synchronous information of conference (B). The following describes the process of sharing information corresponding to the operation done by user B with reference to the flowchart shown in FIG. 79.

When user B changes the layout of the external view of the virtual room, then, in step S471, virtual home viewer B notifies the inter-user-terminal communication relay server 23 via the Internet 5 of the difference between before and after update of layout information as the synchronous information of conference (B). In response to this notification, in step S481, the inter-user-terminal communication relay server 23 holds the received synchronous information and notifies virtual home viewer B via the Internet 5 of the synchronous information of conference (B) held at this moment.

On the other hand, if virtual home viewer A requests, as a periodical operation, the inter-user-terminal communication relay server 23 via the base station 4 and the Internet 5 for the synchronous information of conference (B) in step S491, then the inter-user-terminal communication relay server 23 sends the difference between before and after update of the layout information of the virtual room of user B to virtual home viewer A as the synchronous information of conference (B) held at this moment in step S482. This is the end of the description of the processing for sharing the information corresponding to user B's operation.

Figure 80:
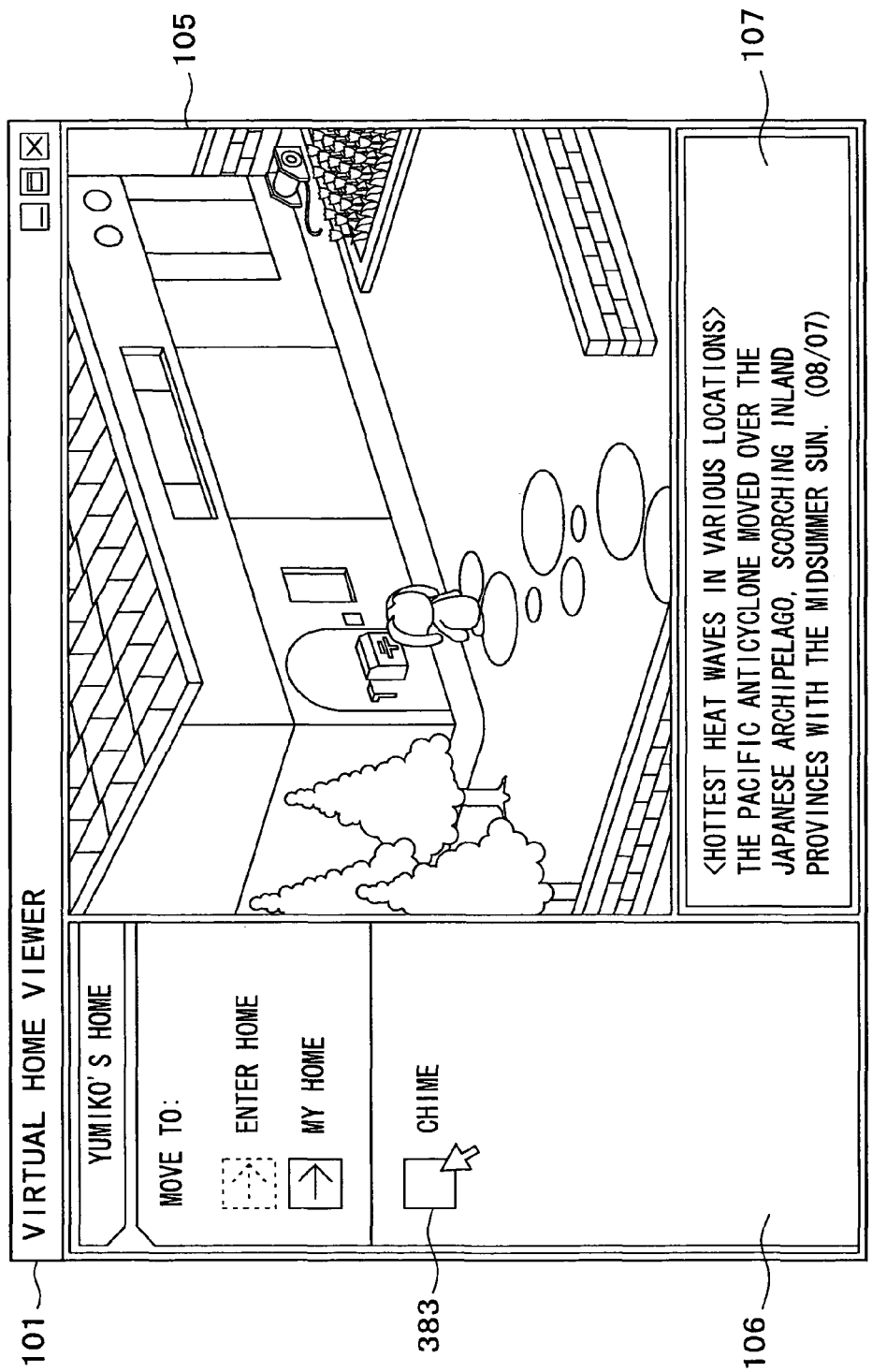
FIG. 80 illustrates an operation for calling through an interphone.
Figure 81:
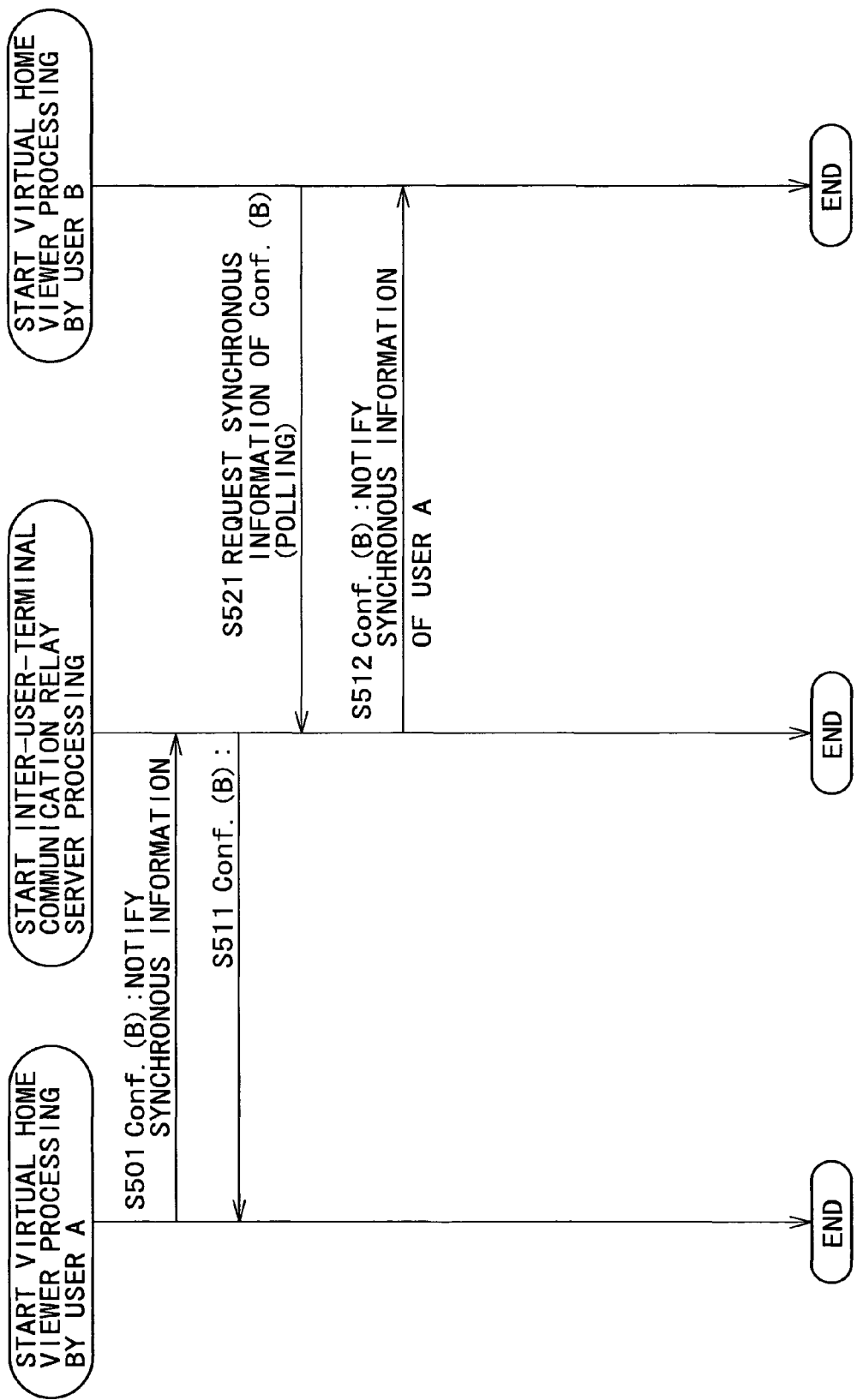
FIG. 81 is a flowchart for describing the processing of sharing information corresponding to user A's operation as conference synchronous information.

If, as shown in FIG. 80, "Chime" button 383 is clicked by user A, virtual home viewer B is also notified thereof as the synchronous information of conference (B). The following describes the processing for sharing the information corresponding to the operation by user A, with reference to the flowchart shown in FIG. 81.

When the "Chime" button 383 is clicked by user A, then, in step S501, virtual home viewer A notifies the inter-user-terminal communication relay server 23 via the base station 4 and the Internet 5 of the ringing of the chime of the virtual room of user B, as the synchronous information of conference (B). In response to this notification, in step S511, the inter-user-terminal communication relay server 23 holds the received synchronous information and sends the synchronous information of conference (B) held at this point of time to virtual home viewer A via the Internet 5 and the base station 4.

On the other hand, if virtual home viewer B requests the inter-user-terminal communication relay server 23 via the Internet 5 for the synchronous information of conference (B) as a periodical operation in step S521, then the inter-user-terminal communication relay server 23 notifies virtual home viewer B via the Internet 5 of the ringing of the chime of the virtual room of user B as the synchronous information of conference (B) held a this point of time. This is the end of the description of the processing for sharing the information corresponding to user B's operation.

The following describes processing of talking (actually, text is communicated realtime by means of chat) through the interphone between user A and user B.

Figure 82:
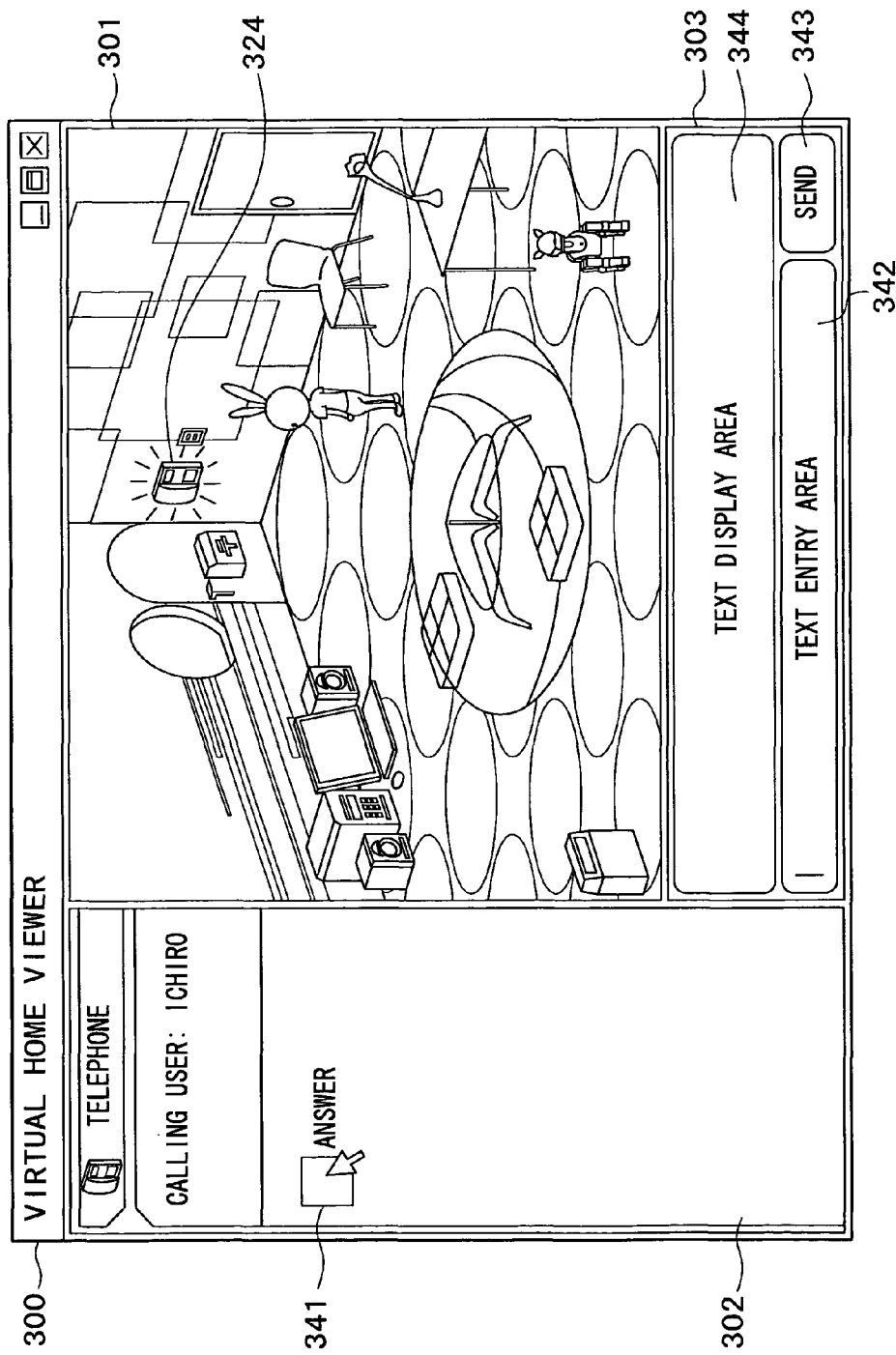
FIG. 82 illustrates an exemplary display of a virtual room corresponding to that a "Chime" button has been pressed.

Referring to FIG. 82, there is shown a screen of virtual home viewer B being displayed when the "Chime" button 383 is clicked by user A to notify virtual home viewer B thereof as the synchronous information of conference (B). At this moment, virtual home viewer B displays the telephone icon 324 in the virtual room in he main panel 301 in a highlighted manner (the icon is partially lighted or entirely blinked) and generates the sound of the beep for the interphone, which is different from the beep for the telephone. Also, virtual home viewer B displays, in the control panel 302, the name of one who clicked the interphone icon and the "Answer" button 341 being clicked to answer the call of interphone chat.

When user B clicks the "Answer" button 341, the communication panel 303 has the text entry area 342 in which chat text is entered, "SEND" button 343, which is clicked to send the text entered in the text entry area 342, and the text display area 344.

Figure 83:
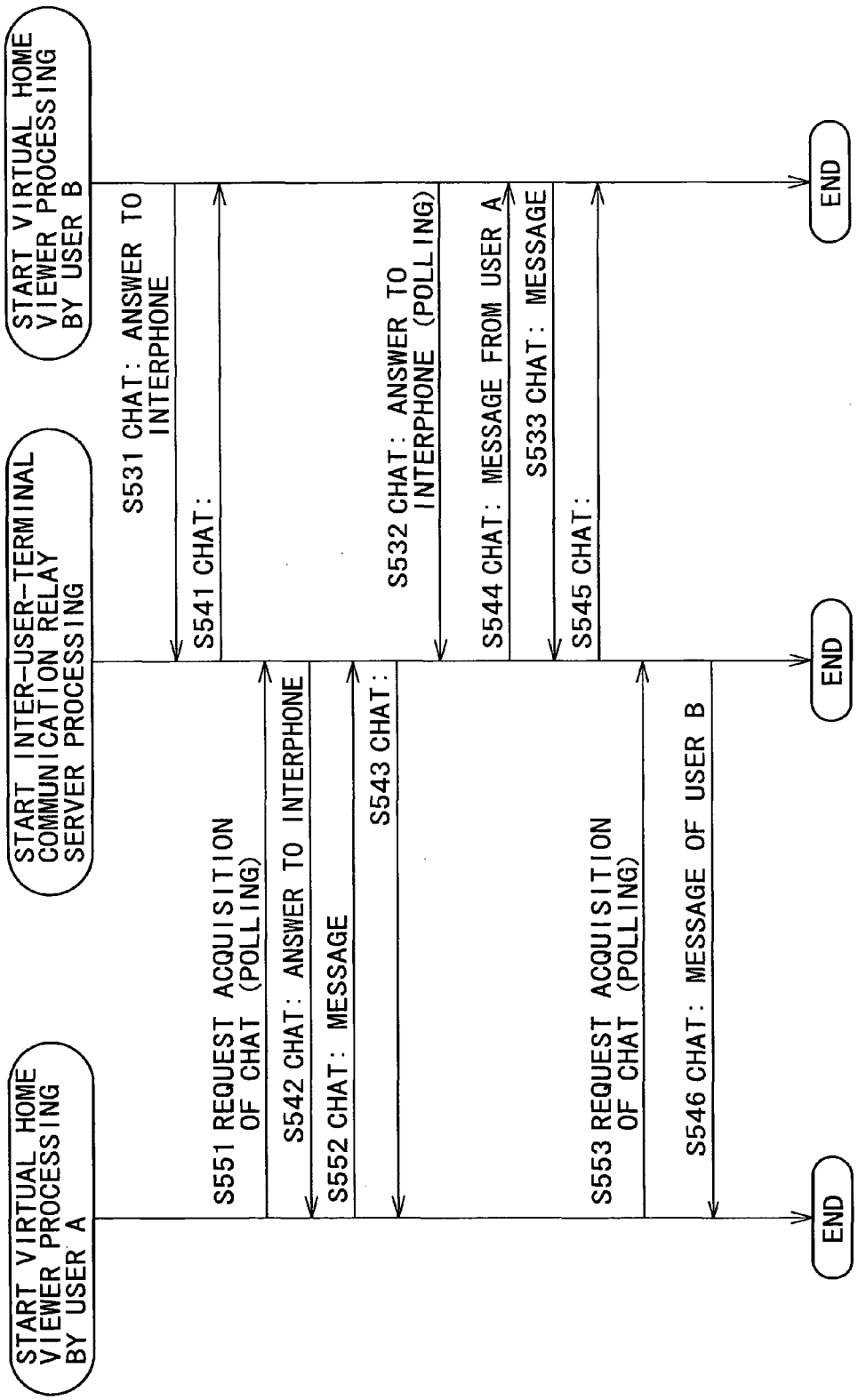
FIG. 83 is a flowchart for describing interphone chat processing.

When user B clicks the "Answer" button 341, interphone chat processing shown in FIG. 83 gets started. In step S531, virtual home viewer B notifies the inter-user-terminal communication relay server 23 via the Internet 5 of the answer by user B to the interphone as a chat addressed to virtual home viewer A. In step S541, the inter-user-terminal communication relay server 23 sends the chat addressed to virtual home viewer B (in this example, however, the chat addressed to virtual home viewer B does not exist, so that nothing is sent).

On the other hand, when virtual home viewer A requests inter-user-terminal communication relay server 23 via the Internet 5 for getting a chat as a periodical operation in step S551, then the inter-user-terminal communication relay server 23 notifies virtual home viewer A via the Internet 5 of the answer by user B to the interphone as the chat addressed to virtual home viewer A in step S542.

Figure 84:
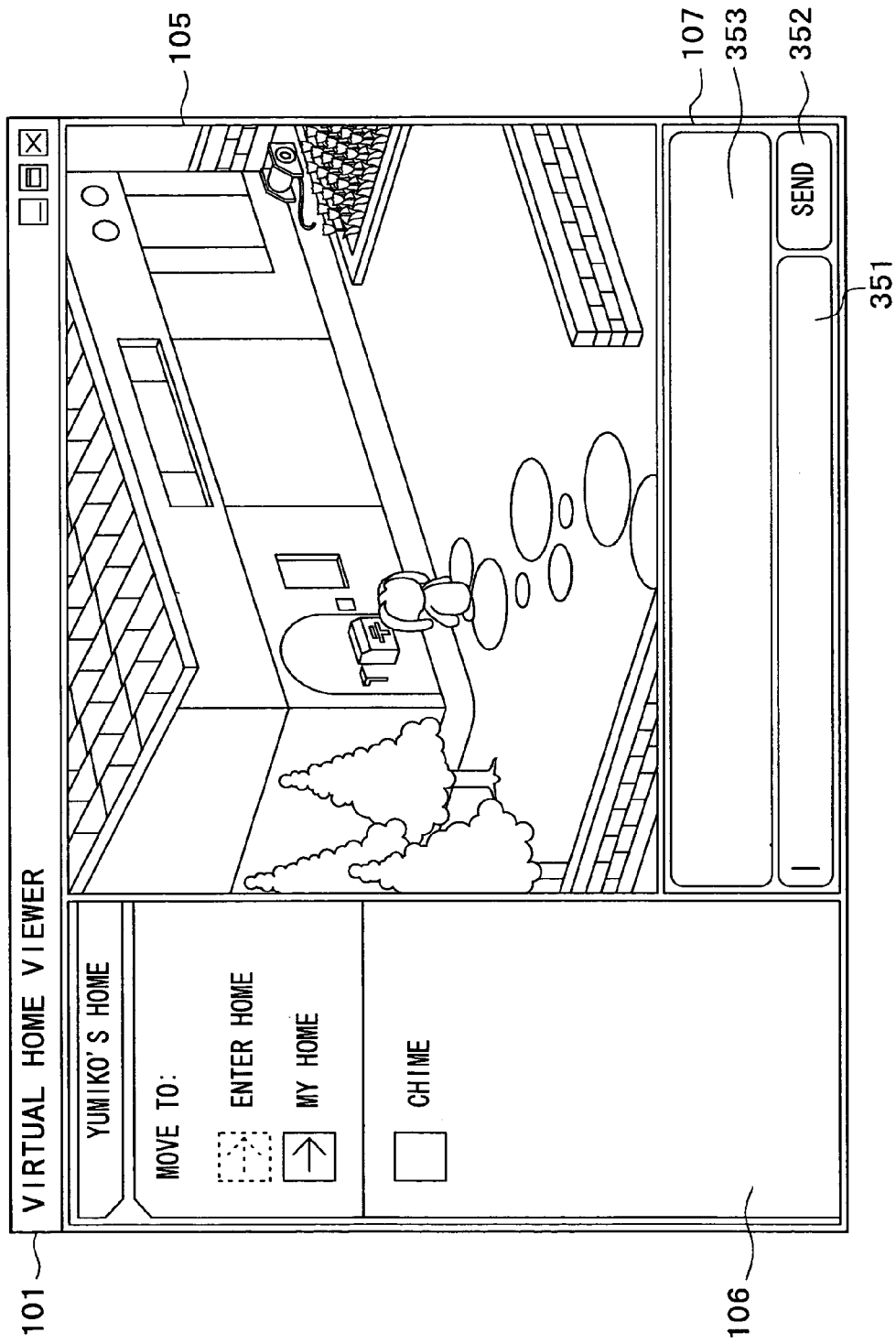
FIG. 84 illustrates an exemplary display at the time of interphone chat.

In response to this notification, virtual home viewer A switches the display of the communication panel 107 to the text entry area 351 and the text display area 353 for interphone chat as shown in FIG. 84. Subsequently, when one user sends a message, the other user receives the message by polling, thereby enabling the interphone talk between user A and user B (actually, texts are communicated realtime by chat).

Figure 85:
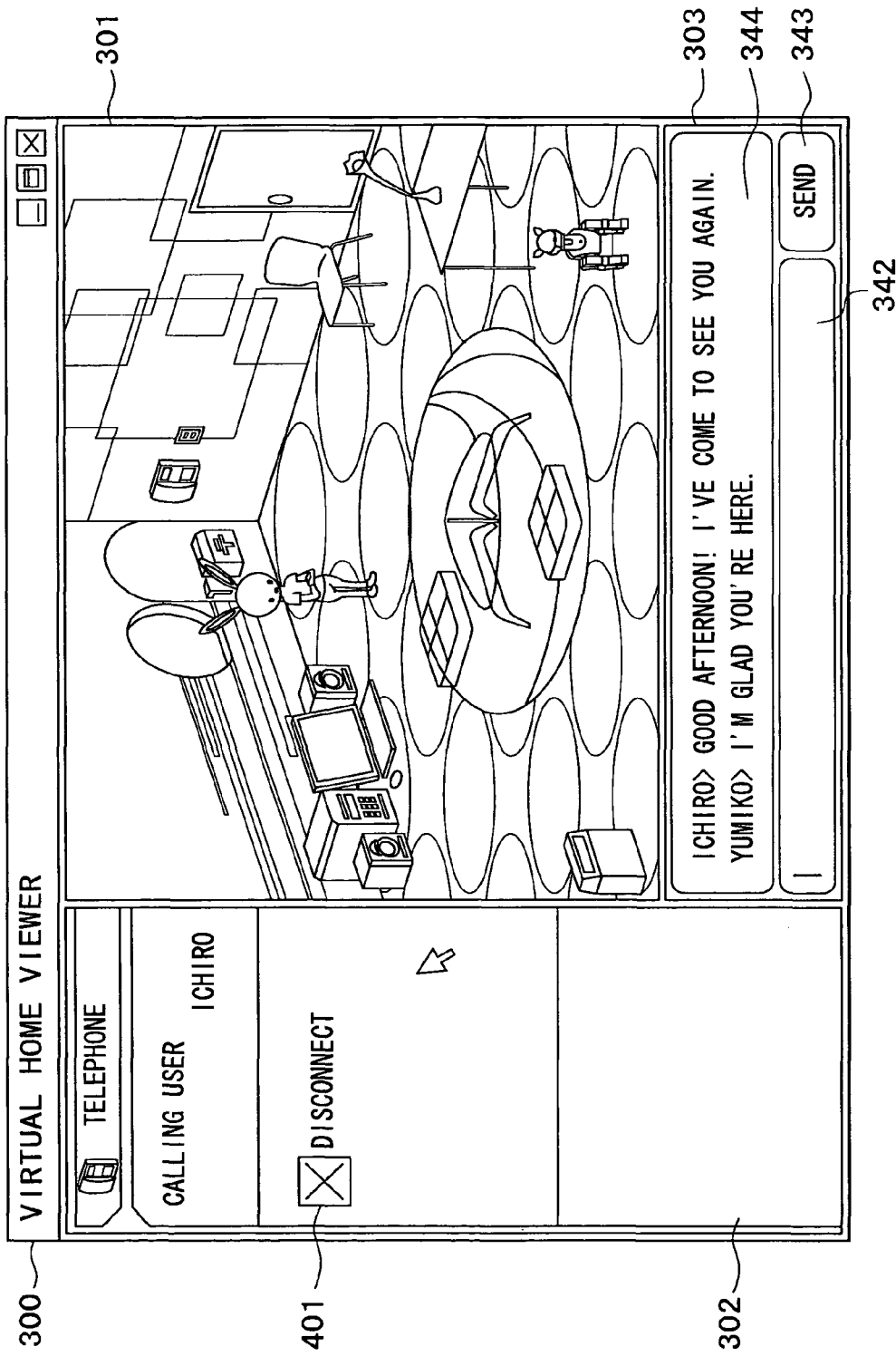
FIG. 85 illustrates an operation for ending interphone chat.

The interphone talk between user A and user B continues until "Disconnect" button 401 shown in the control panel 302 is clicked by user B as shown in FIG. 85.

Figure 86:
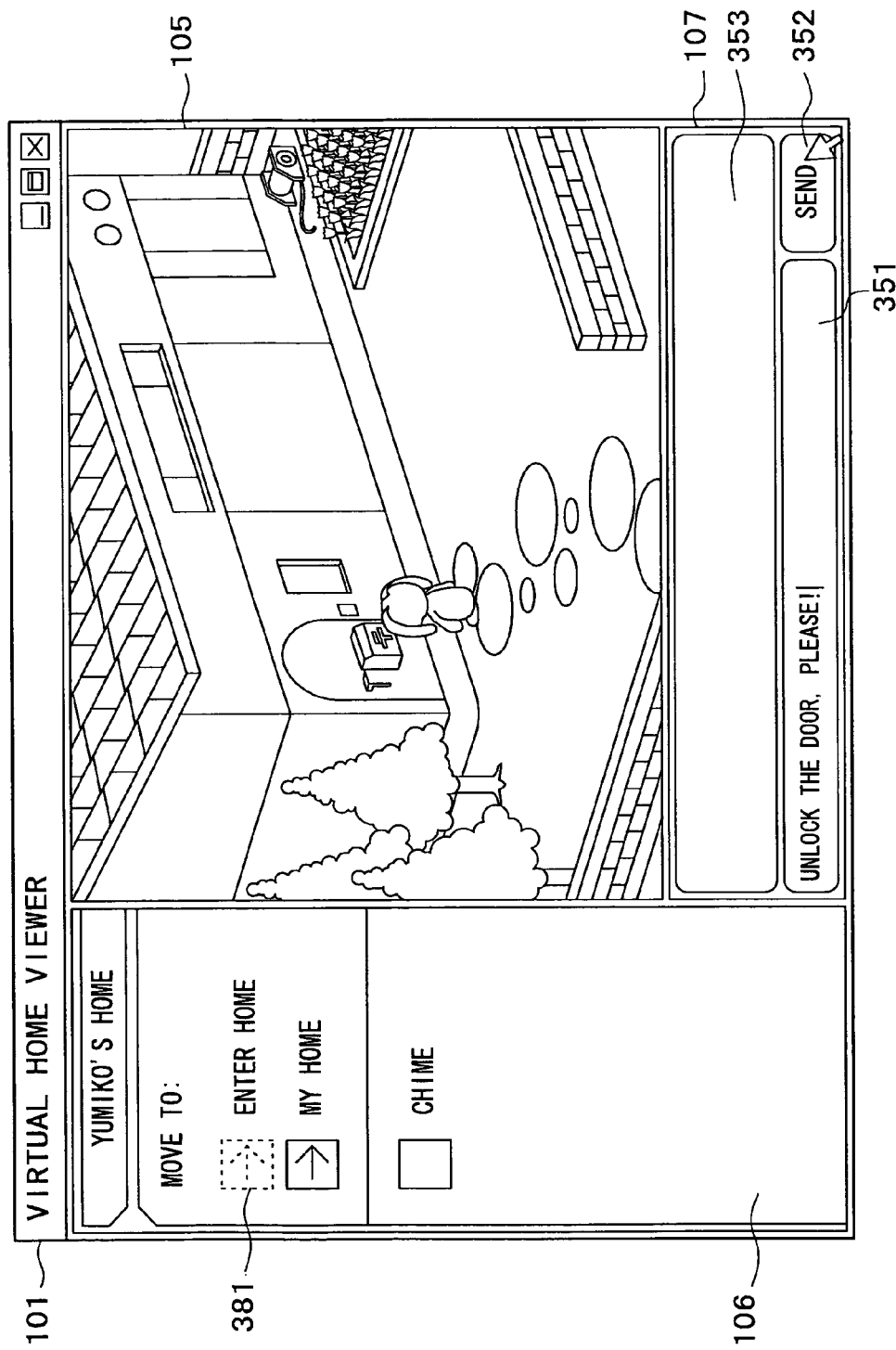
FIG. 86 illustrates an exemplary display at the time of interphone chat.
Figure 87:
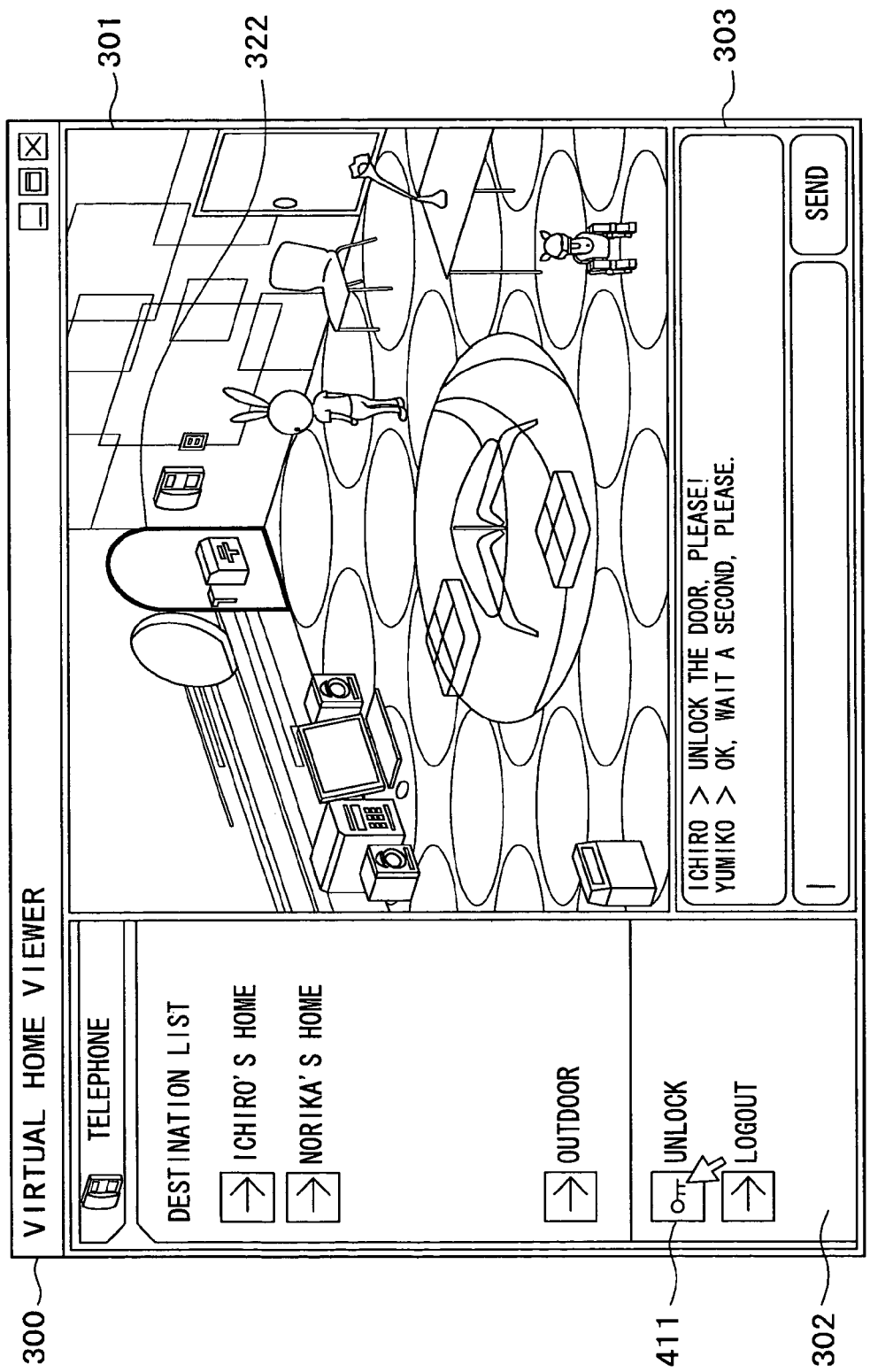
FIG. 87 illustrates an operation for unlocking the door.
Figure 88:
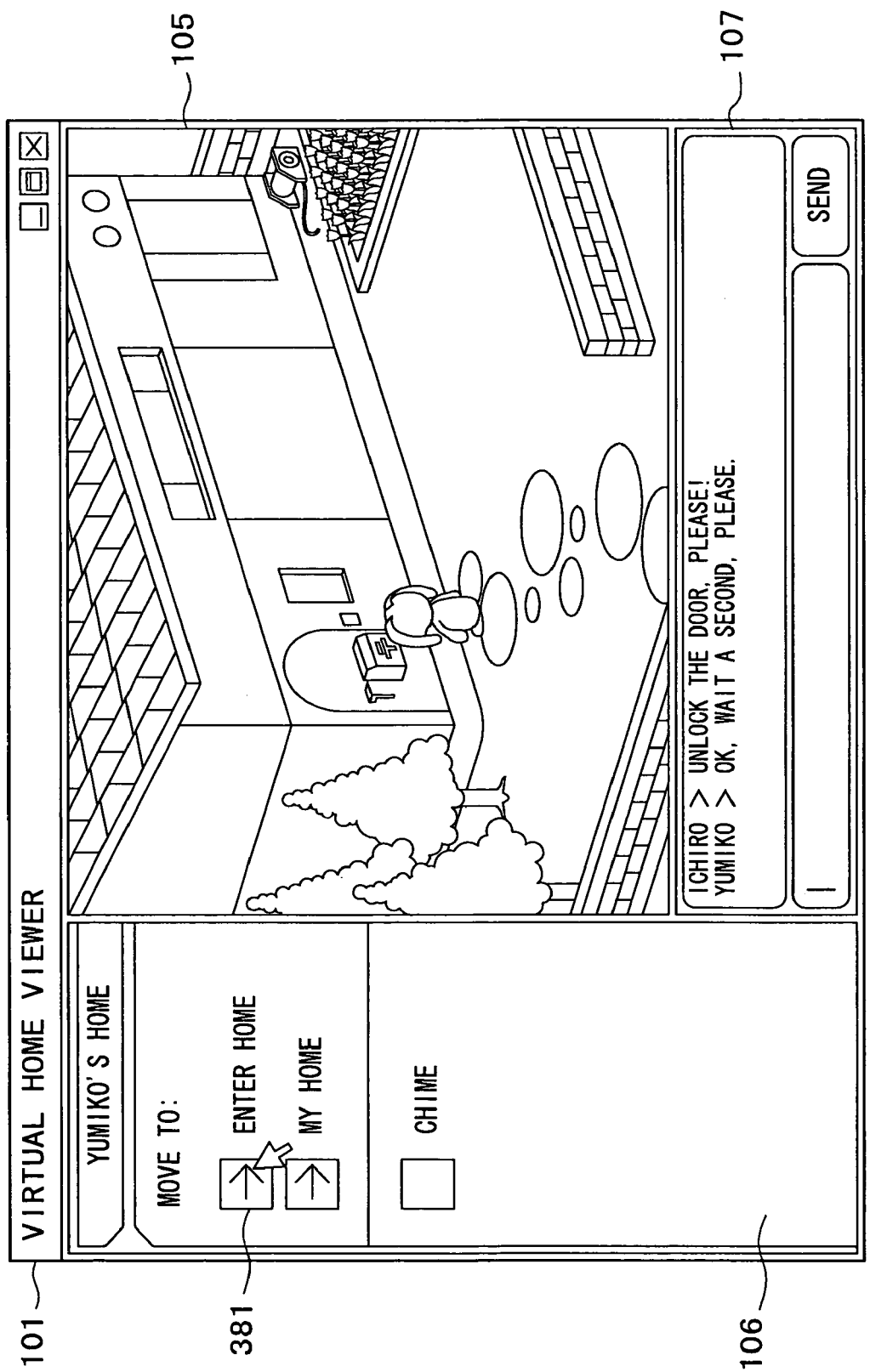
FIG. 88 illustrates an operation for entering the room.
Figure 89:
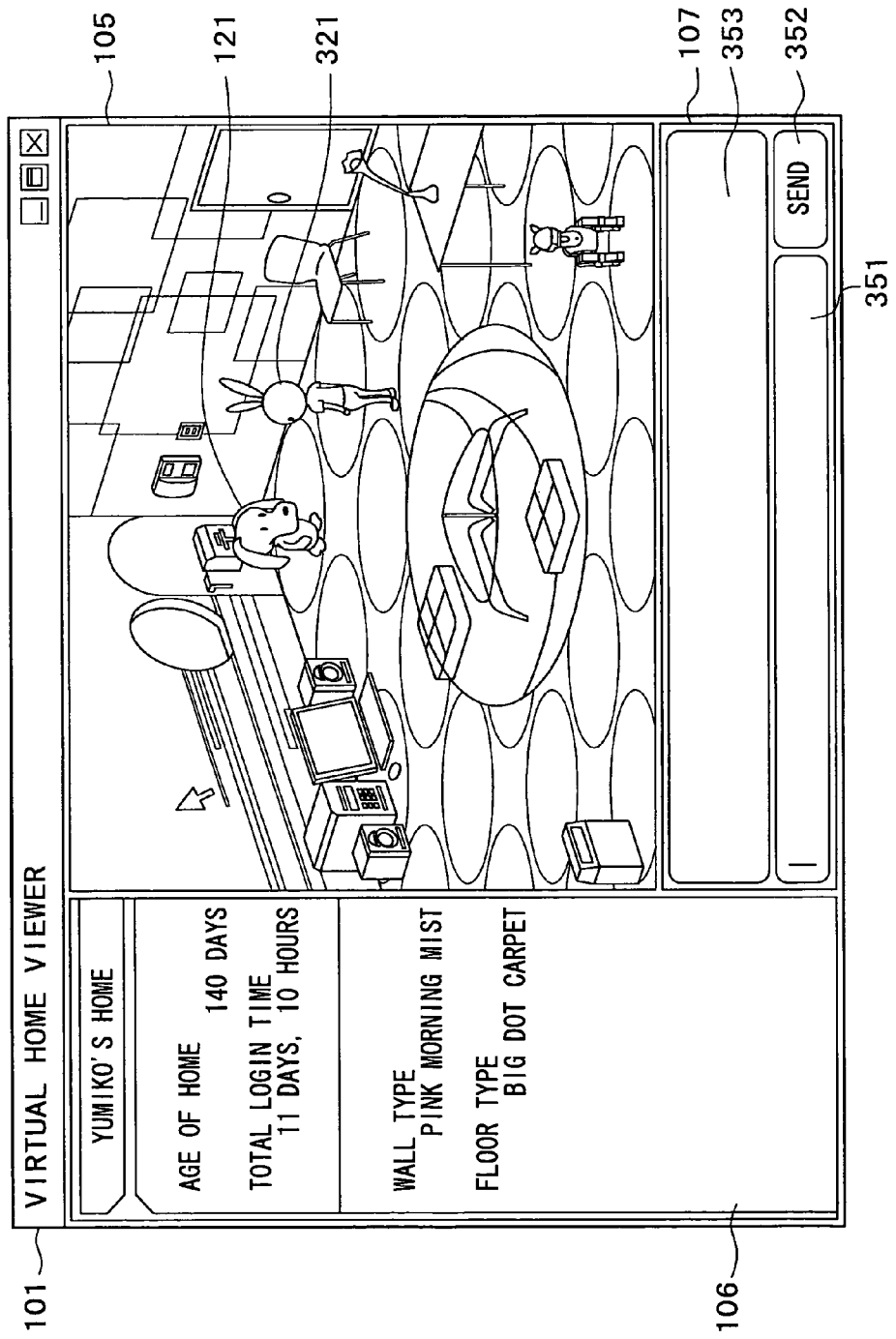
FIG. 89 illustrates an exemplary display when mascot A enters the virtual room of user B.

When user A sends message "Unlock the door, please" as shown in FIG. 86 for example, user B sends message "OK, wait a second" in response as shown in FIG. 87, user B selects the door icon 322, and clicks "Unlock" button 411 displayed in the control panel 302 upon selection of the door icon 322, the "Enter Home" button 381 in the control panel 106 is changed to clickable state on the screen of virtual home viewer A as shown in FIG. 88.

Figure 90:
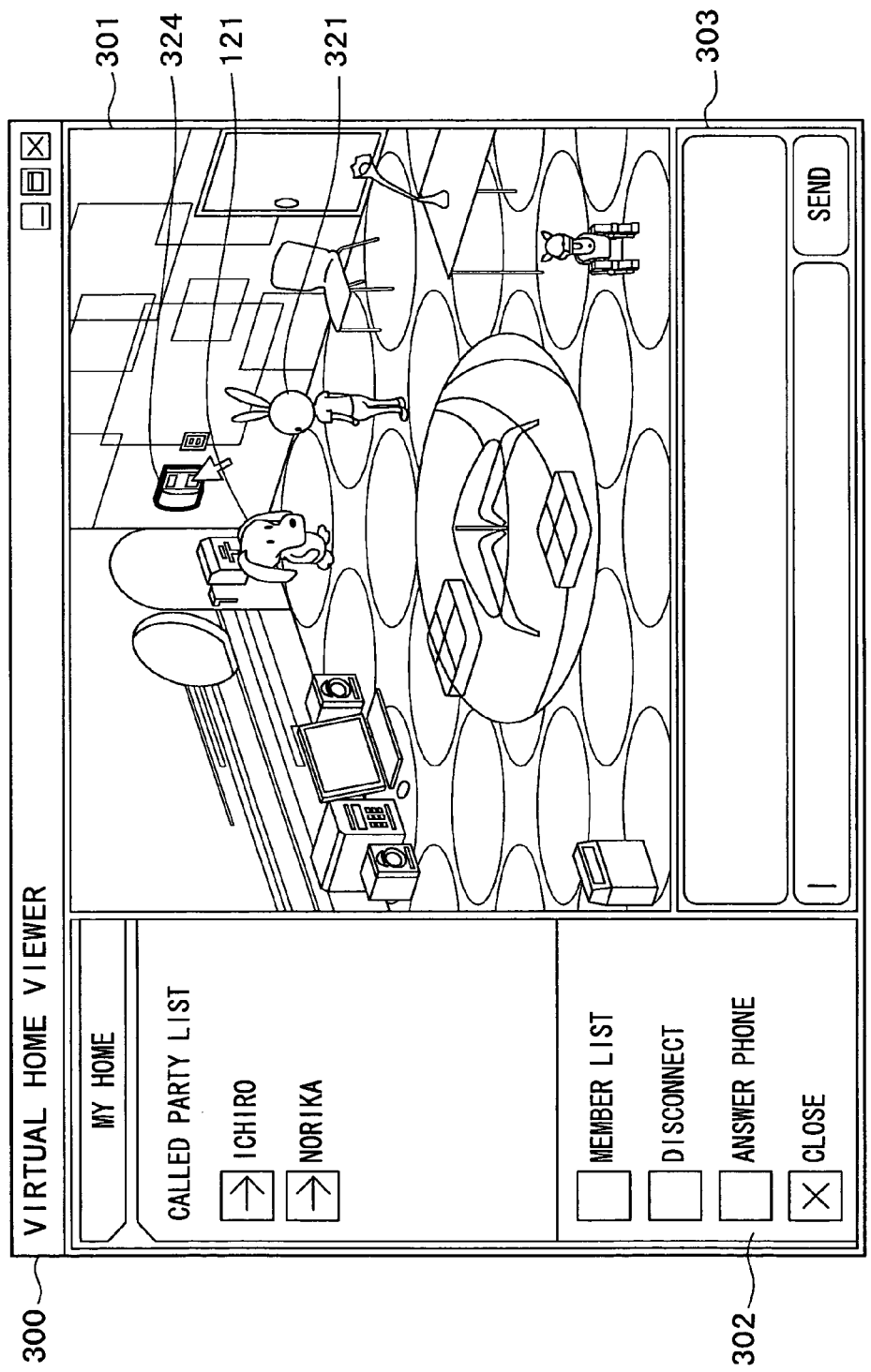
FIG. 90 illustrates another exemplary display when mascot A enters the virtual room of user B.

When user A clicks the button 381 in this state, the main panel 105 on the screen of virtual home viewer A displays the virtual room of user B in which the mascot 121 and the mascot 321 exist. Then, the text entry area 351 for chat, the "SEND" button 352, and the text display area 353 are arranged in the communication panel 107. Likewise, the screen of virtual home viewer B displays the virtual room of user B with the mascot 121 added in the main panel 301 as shown in FIG. 90.

Then, the text entry area 342 for chat, "SEND" button 343, and the text display area 344 arranged in the communication panel 303.

Figure 91:
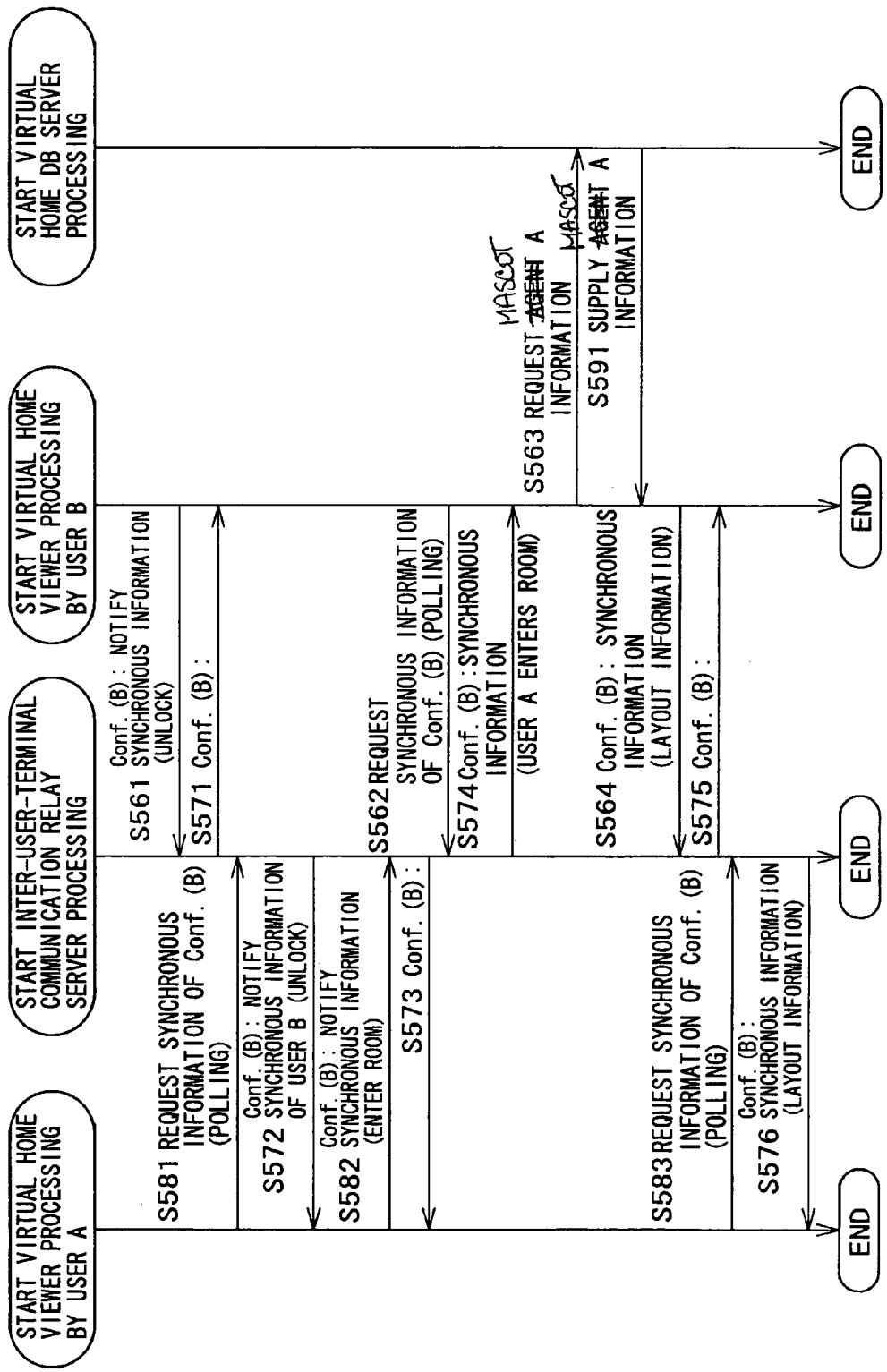
FIG. 91 is a flowchart for describing the processing from unlocking the door to the entering of the room.

The following describes the processing to be executed from unlocking to entering the room, with reference to the flowchart shown in FIG. 91. When user B clicks the "Unlock" button 411, virtual home viewer B notifies the inter-user-terminal communication relay server 23 via the Internet 5 of the unlocking of the virtual room of user B as the synchronous information of conference (B) in step S561. In response to this notification, in step S571, the inter-user-terminal communication relay server 23 holds the received synchronous information and sends the synchronous information of conference (B) held at this point of time to virtual home viewer B via the Internet 5 (in this example, the synchronous information of conference (B) is not held, so that nothing is sent).

On the other hand, if virtual home viewer A requests the inter-user-terminal communication relay server 23 via the base station 4 and the Internet 5 for the synchronous information of conference (B) as a periodical operation in step S581, then the inter-user-terminal communication relay server 23 notifies virtual home viewer A via the Internet 5 and the base station 4 of the unlocking of the door of the user B's virtual room as the synchronous information of conference (B) held at this point of time in step S572.

In response to this notification, virtual home viewer A changes the "Enter Home" button 381 in the control panel 106 to the clickable state. When the "Enter Home" button 381 is clicked by user A, virtual home viewer A notifies the inter-user-terminal communication relay server 23 via the base station base station 4 and the Internet 5 of the entering of the mascot 121 of user A into the virtual room of user B in step S582. In response to this notification, in step S573, the inter-user-terminal communication relay server 23 sends the synchronous information of conference (B) held at this point of time to virtual home viewer A via the Internet 5 and the base station 4 (in this example, the synchronous information of conference (B) is not held, so that nothing is sent).

On the other hand, if virtual home viewer B requests the inter-user-terminal communication relay server 23 via the Internet 5 for the synchronous information of conference (B) as a periodical operation in step S562, then the inter-user-terminal communication relay server 23 notifies virtual home viewer B via the Internet 5 of the entering of the mascot 121 of user A into the virtual room of user B as the synchronous information of conference (B) held at this point of time in step 574.

In response to this notification, in step S563, virtual home viewer B requests the virtual home DB server 21 via the Internet 5 for the image data of the mascot 121 of user A (hereafter also referred to as mascot A). In response to this request, in step S591, the virtual home DB server 21 supplies the image data of mascot A to virtual home viewer B via the Internet 5. Consequently, the virtual room on the screen of virtual home viewer B also displays mascot A.

In step S564, virtual home viewer B sends the layout information of user B's virtual room in which mascot A has entered to the inter-user-terminal communication relay server 23 as the synchronous information of conference (B) via the Internet 5 (the difference in layout information may be sent instead). In response, in step S575, the inter-user-terminal communication relay server 23 holds the received synchronous information and sends the synchronous information of conference (B) held at this point of time to virtual home viewer B via the Internet 5 (in this example, the synchronous information of conference (B) is not held, so that nothing is sent).

On the other hand, in step S583, if virtual home viewer A requests the inter-user-terminal communication relay server 23 via the base station 4 and the Internet 5 for the synchronous information of conference (B) as a periodical operation, then the inter-user-terminal communication relay server 23 sends the layout information of user B's virtual room in which mascot A has entered to virtual home viewer A via the Internet 5 and base station 4 as the synchronous information of conference (B) in step S576. Consequently, the main panel 105 of virtual home viewer A displays the user B's virtual room with mascot A entered. This is the end of the description of the processing to be executed from unlocking to entering the room.

The following describes the processing for one user to present an item (for example, the pot plant icon 129) to an other user. There are two methods of presenting items; one in which an item is directly presented between mascots and the other in which an item is indirectly presented through the mailbox arranged on the door.

The following describes an operation for directly passing the pot plant icon 129 from mascot 121 (mascot A) to the mascot 321 (hereafter also referred to as mascot B).

Figure 92:
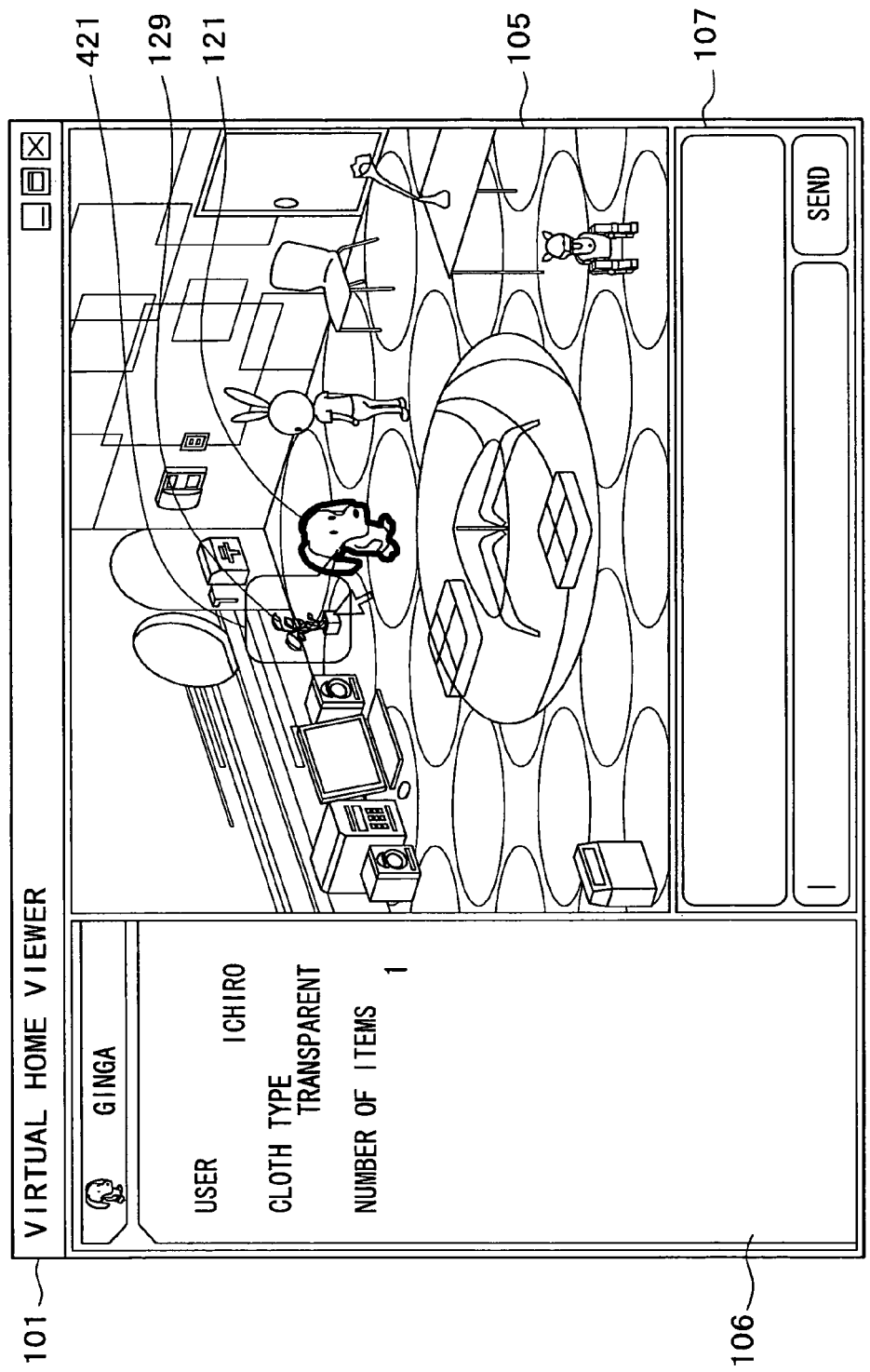
FIG. 92 illustrates a method of directly passing an item between mascots.

As shown in FIG. 92, user A chooses the mascot 121 (mascot A) shown in the main panel 105 and drags and drops the pot plant icon 129 shown in a popped up balloon 421 onto mascot B. At this moment, user A cannot drop the pot plant icon 129 onto other than mascot B (for example, the floor).

Figure 93:
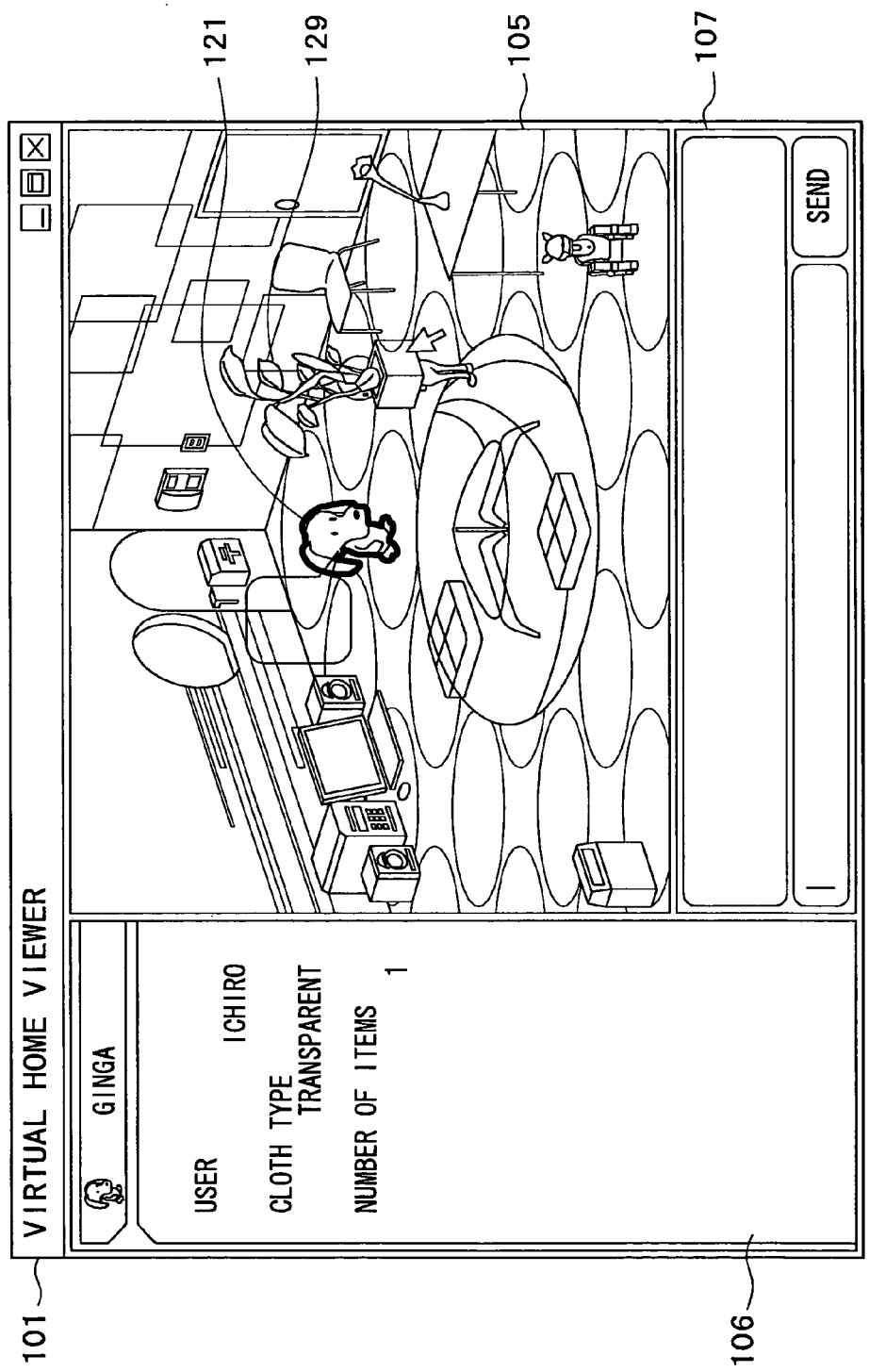
FIG. 93 illustrates a method of directly passing an item between mascots.

In the balloon 421, the pot plant icon 129 is shown in reduced size; when the pot plant icon 129 is taken out of the balloon 421, the icon 129 gains its original size as shown in FIG. 93.

Figure 94:
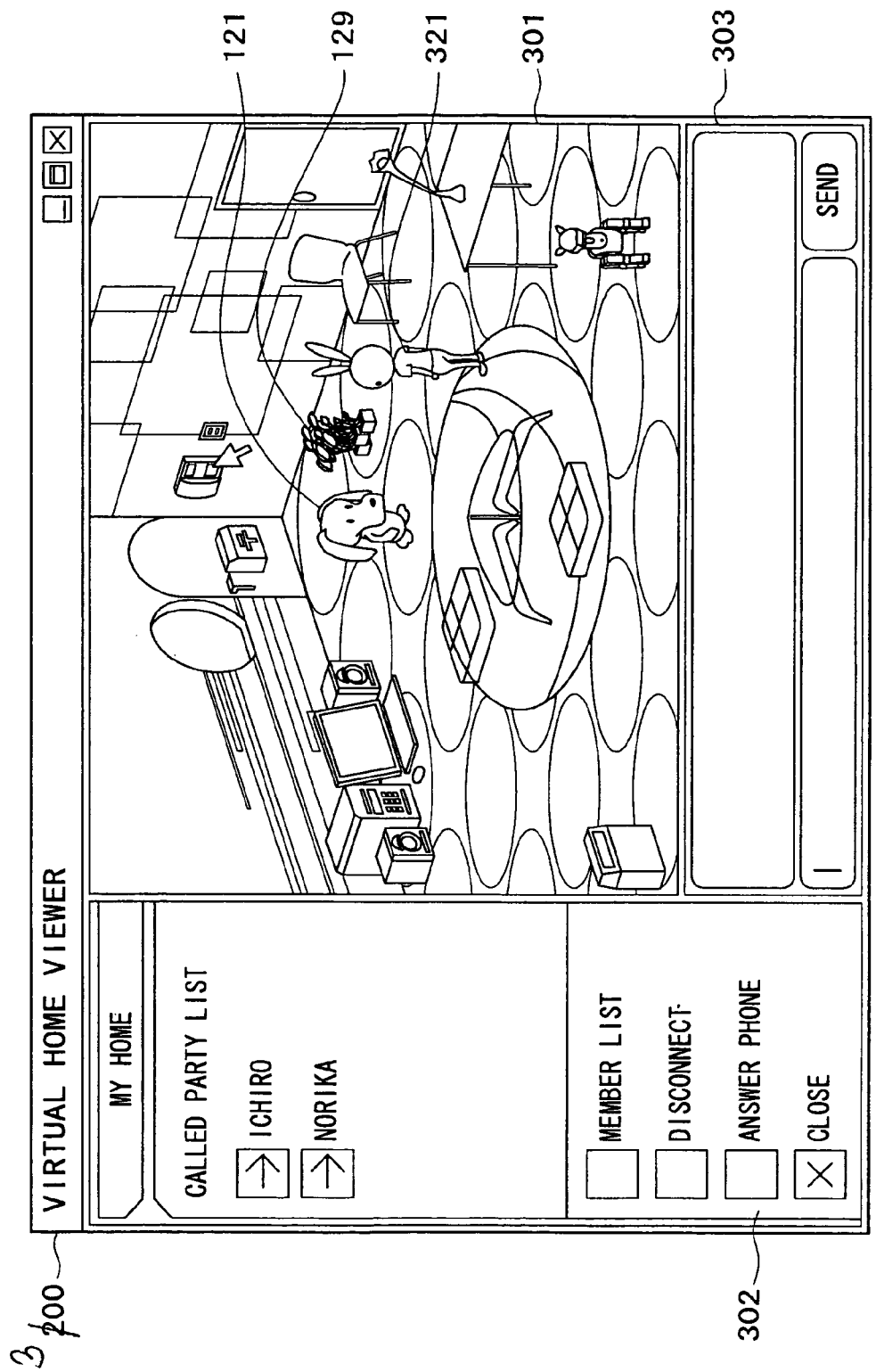
FIG. 94 illustrates a method of directly passing an item between mascots.

It should be noted that the screen of virtual home viewer B shows an animation in which mascot A passes the pot plant icon 129 to mascot B as shown in FIG. 94. If the virtual room of user B has the mascot of an other user (for example, user C), the screen of user C also shows the animation in which mascot A passes the pot plant icon 129 to mascot B.

Figure 95:
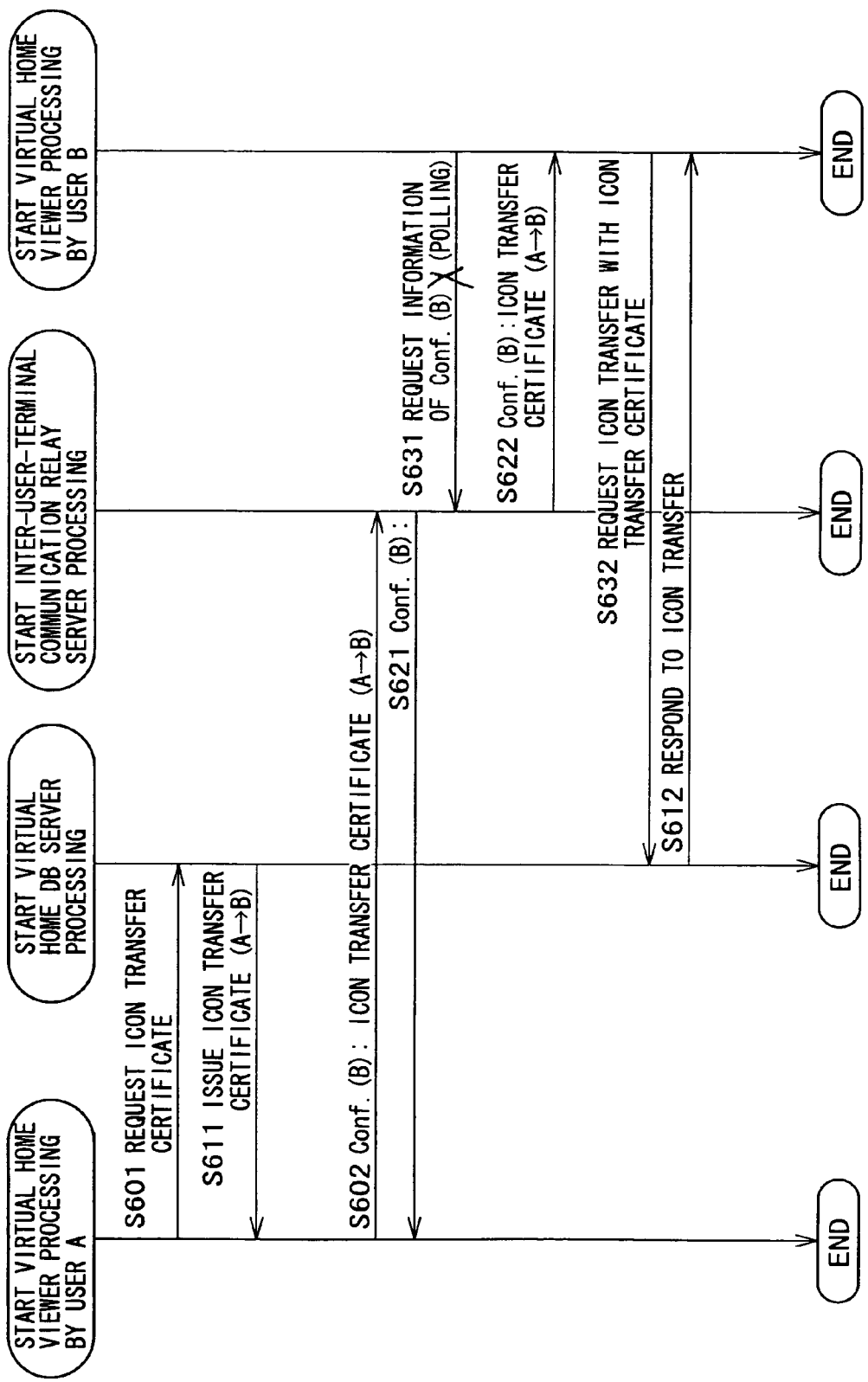
FIG. 95 is a flowchart for describing direct ownership processing.

The following describes ownership transfer processing in which an item (in this example, the pot plant icon 129) has been directly passed from mascot A to mascot B, with reference to the flowchart shown in FIG. 95. This direct ownership transfer processing starts upon dropping of the pot plant icon 129 onto mascot B on the screen of virtual home viewer A.

In step S601, virtual home viewer A request the virtual home DB server 21 via the base station 4 and the Internet 5 for an icon transfer certificate (A→B), which certifies the transfer of the ownership of the pot plant icon 129 from user A to user B. In response to this request, the virtual home DB server 21 issues the icon transfer certificate (A→B) to virtual home viewer A via the Internet 5 in step S611.

In step S602, virtual home viewer A sends the icon transfer certificate (A→B) to the inter-user-terminal communication relay server 23 via the base station 4 and the Internet 5 as the synchronous information of conference (B). In response, in step S621, the inter-user-terminal communication relay server 23 holds the received synchronous information and sends the synchronous information of conference (B) held at this point of time to virtual home viewer B via the Internet 5 (in this example, the synchronous information of conference (B) is not held, so that nothing is sent).

On the other hand, if virtual home viewer B requests the inter-user-terminal communication relay server 23 via the Internet 5 for the synchronous information of conference (B) in step S631, then the inter-user-terminal communication relay server 23 sends the icon transfer certificate (A→B) to the virtual home viewer B via the Internet 5 as the synchronous information of conference (B) held at this point of time in step S622.

In step S632, virtual home viewer B sends the icon transfer certificate (A→B) to the virtual home DB server 21 via the Internet 5, thereby requesting for the transfer of the ownership of the pot plant icon 129. In response to this request, in step S612, the virtual home DB server 21 transfers the ownership of the pot plant icon 129 to user B and notifies virtual home viewer B thereof via the Internet 5. This is the end of the description of the direct ownership transfer processing.

Figure 96:
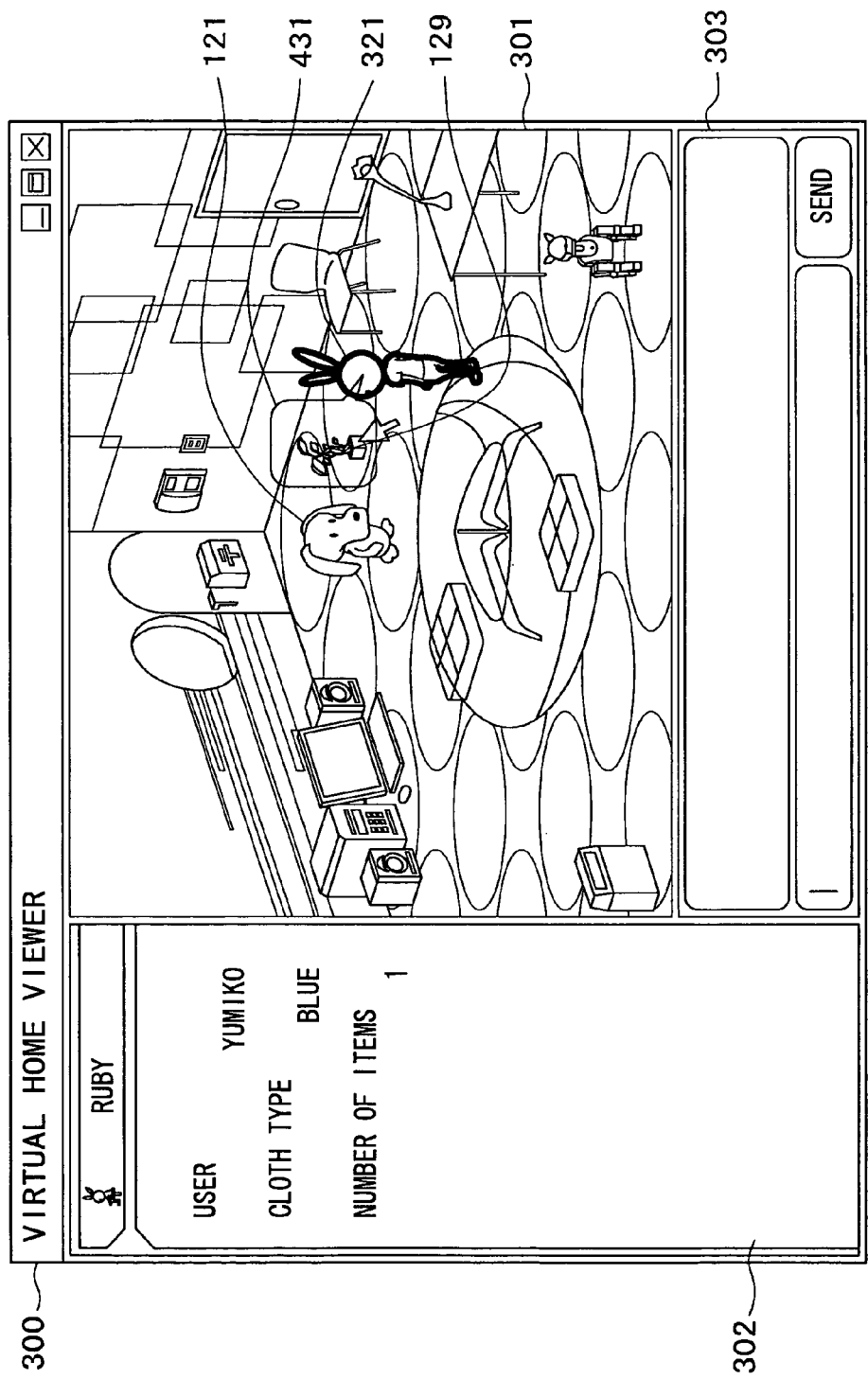
FIG. 96 illustrates an operation for confirming a directly passed item.

Upon completion of the direct ownership transfer processing, if user B chooses the mascot 321 (mascot B) in the virtual room shown in the main panel 301 as shown in FIG. 96, the balloon 431 in which an item carried by mascot 321 is shown is popped up, so that user B can make confirmation of the item presented by user A.

Figure 97:
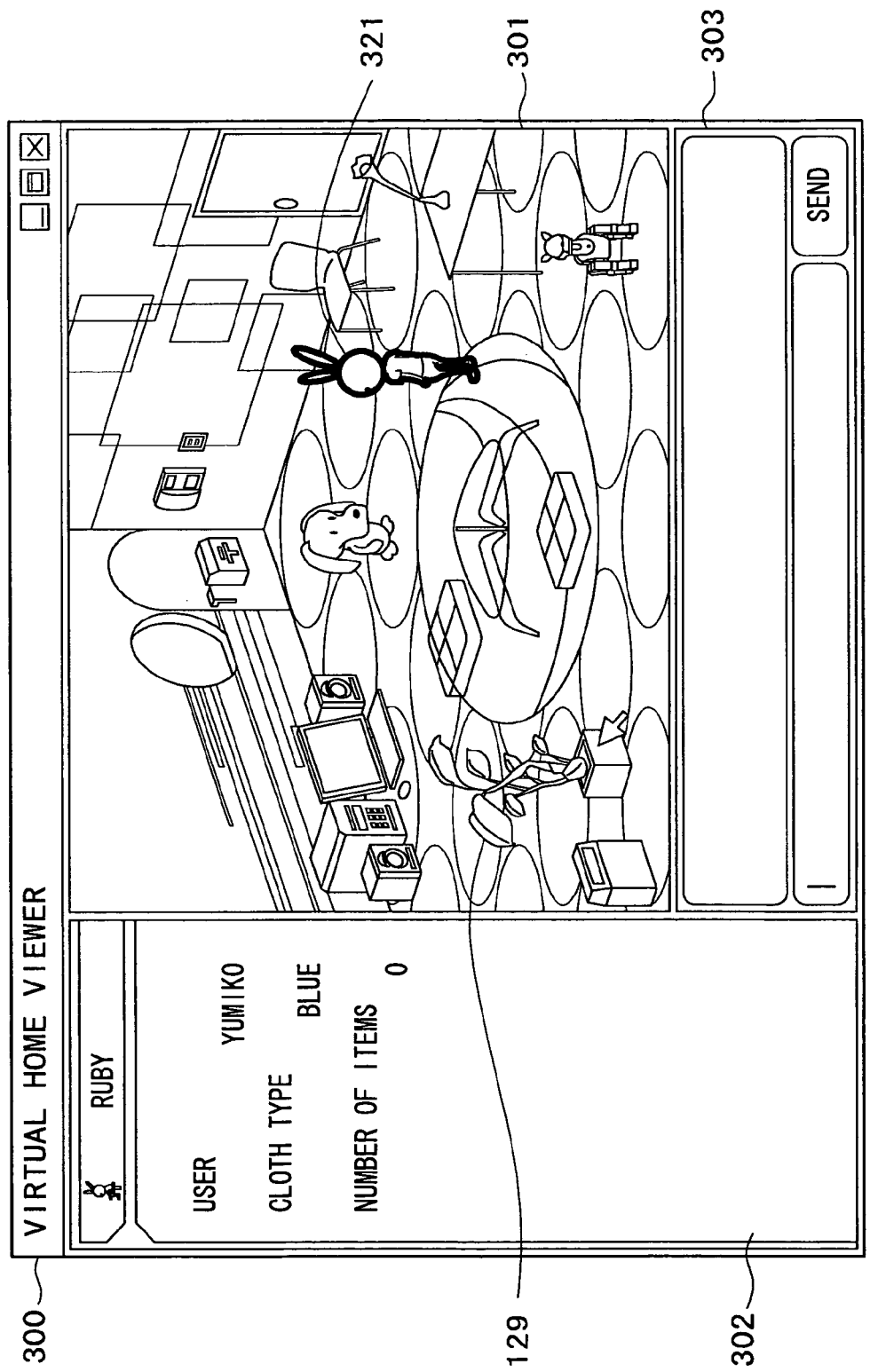
FIG. 97 illustrates an operation for arranging the directly passed item in the virtual room.

Further, dragging and dropping the item (in this example, the pot plant icon 129) shown in the popped up balloon 431 onto a desired position in the virtual room allow the presented item to be placed as desired in its original size as shown in FIG. 97.

In order to make a present from user B to user A when mascot A is in the virtual room of user B, user B may drag and drop the item to be presented onto mascot A.

The following describes the method of indirectly passing an item through the mailbox arranged on the door. First, an operation will be described in which the memo sheet icon 241 carried by mascot A out of the room is passed to mascot B via the mailbox arranged on the door.

Figure 98:
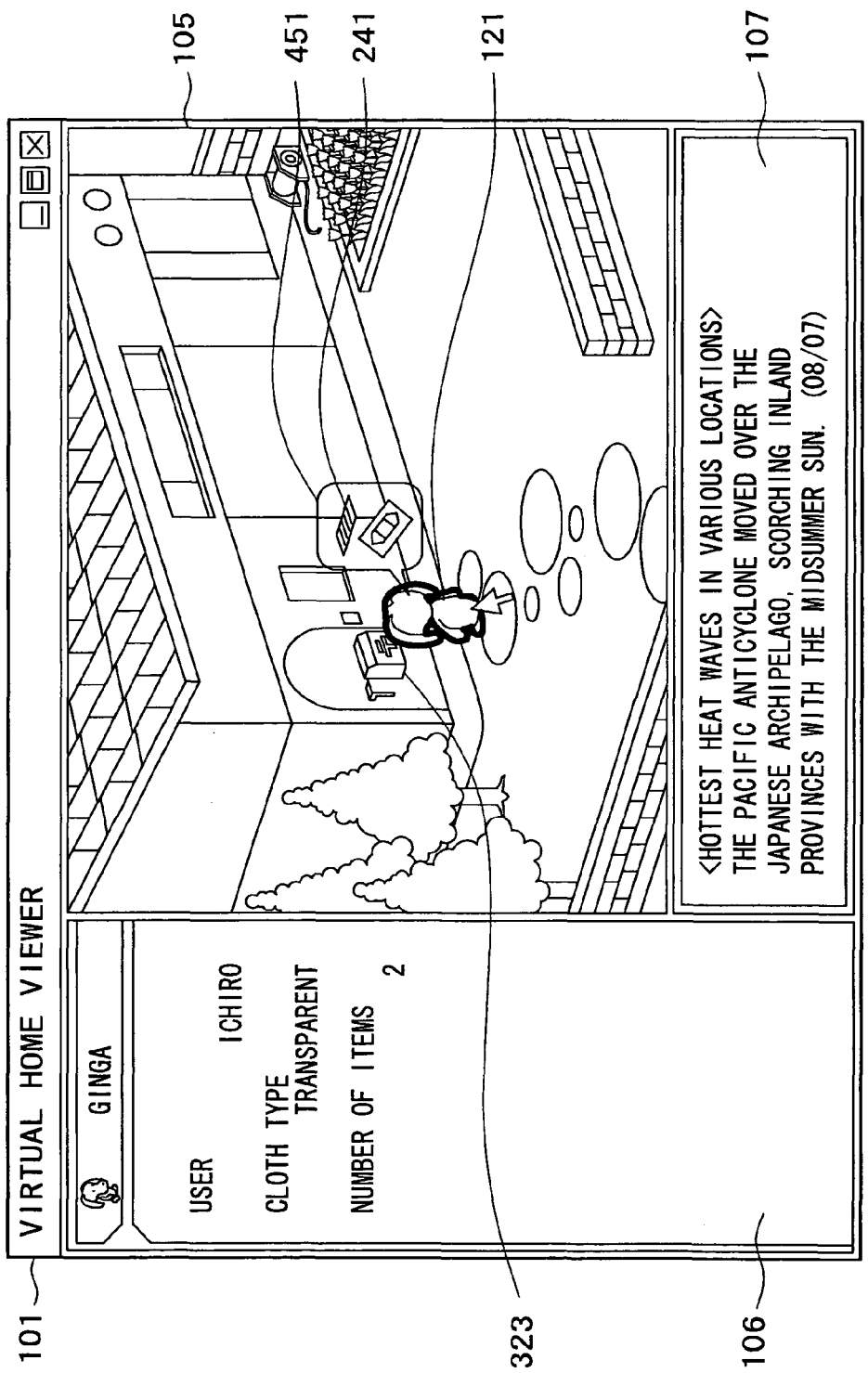
FIG. 98 illustrates a method of indirectly passing an item via a mailbox.
Figure 99:
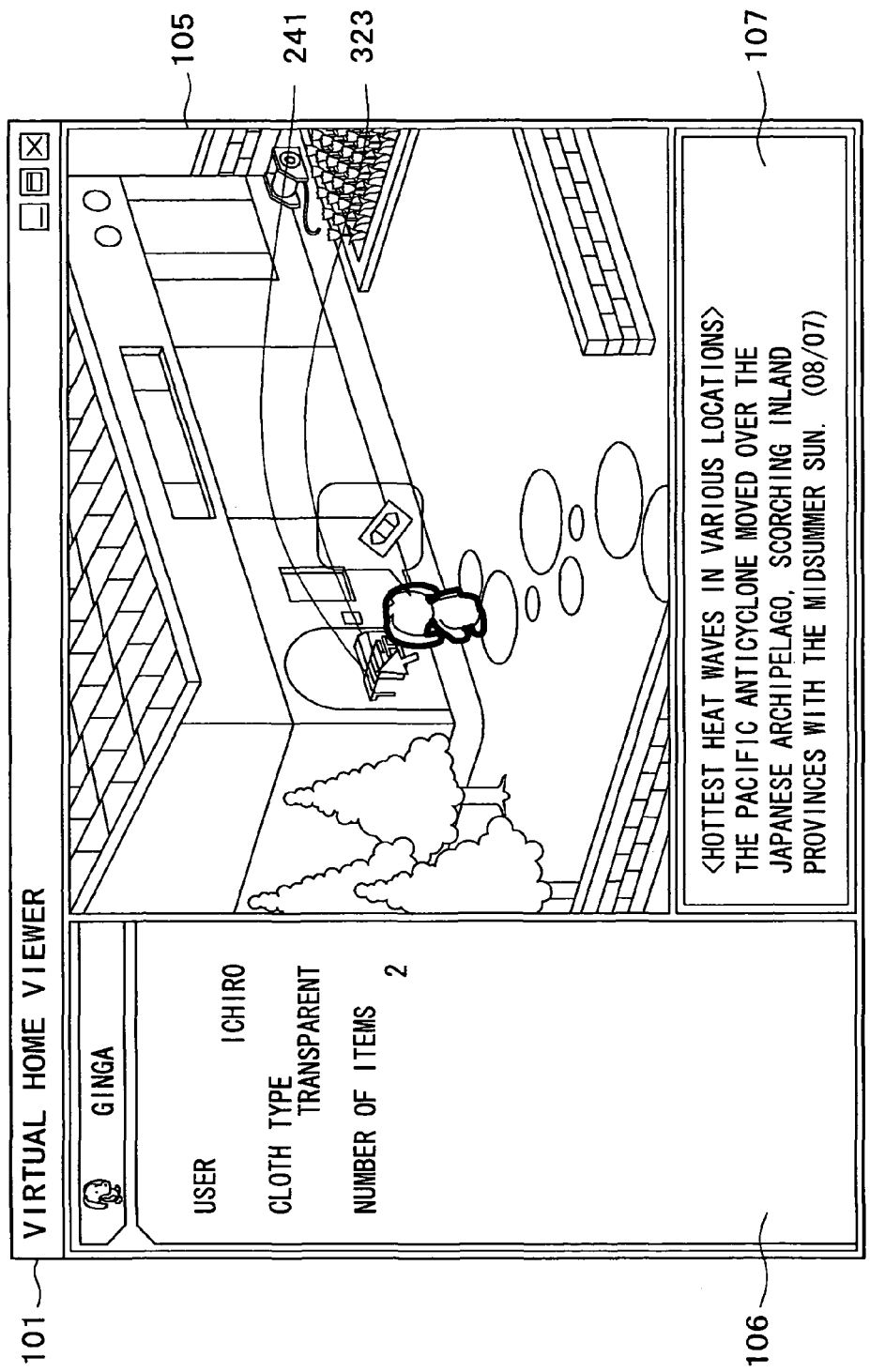
FIG. 99 illustrates a method of indirectly passing the item via the mailbox.

User A chooses mascot A displayed in the main panel 105 to pop up the balloon 451 as shown in FIG. 98 and drags and drops the memo sheet icon 241 shown in the balloon 451 onto the mailbox icon 323 arranged on the outside of the door as shown in FIG. 99.

Figure 100:
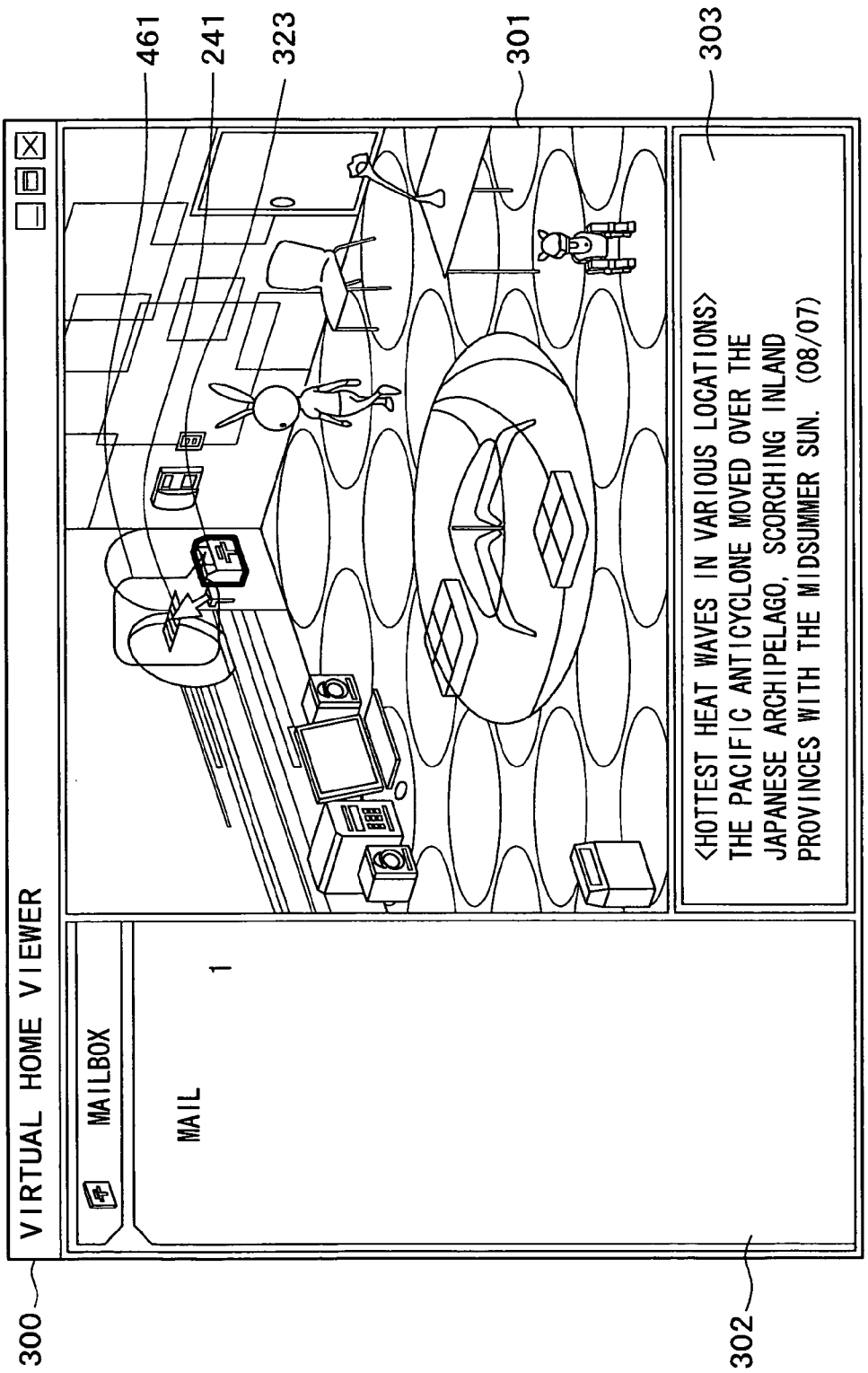
FIG. 100 illustrates an operation for confirming the item indirectly passed via the mailbox.

In response to this operation, on the screen of virtual home viewer B, as shown in FIG. 100, the external view of the mailbox icon 323 is changed to the state showing that the item is in the mailbox icon 323, in the virtual room displayed on the main panel 301. When user B clicks the mailbox icon 323, the balloon icon 461 pops up, in which the item (in this example, the memo sheet icon 241) passed from user A is displayed. Choosing the mailbox icon 323 causes the control panel 302 to display the number of items in the mailbox for example as the property of the mailbox icon 323.

Figure 101:
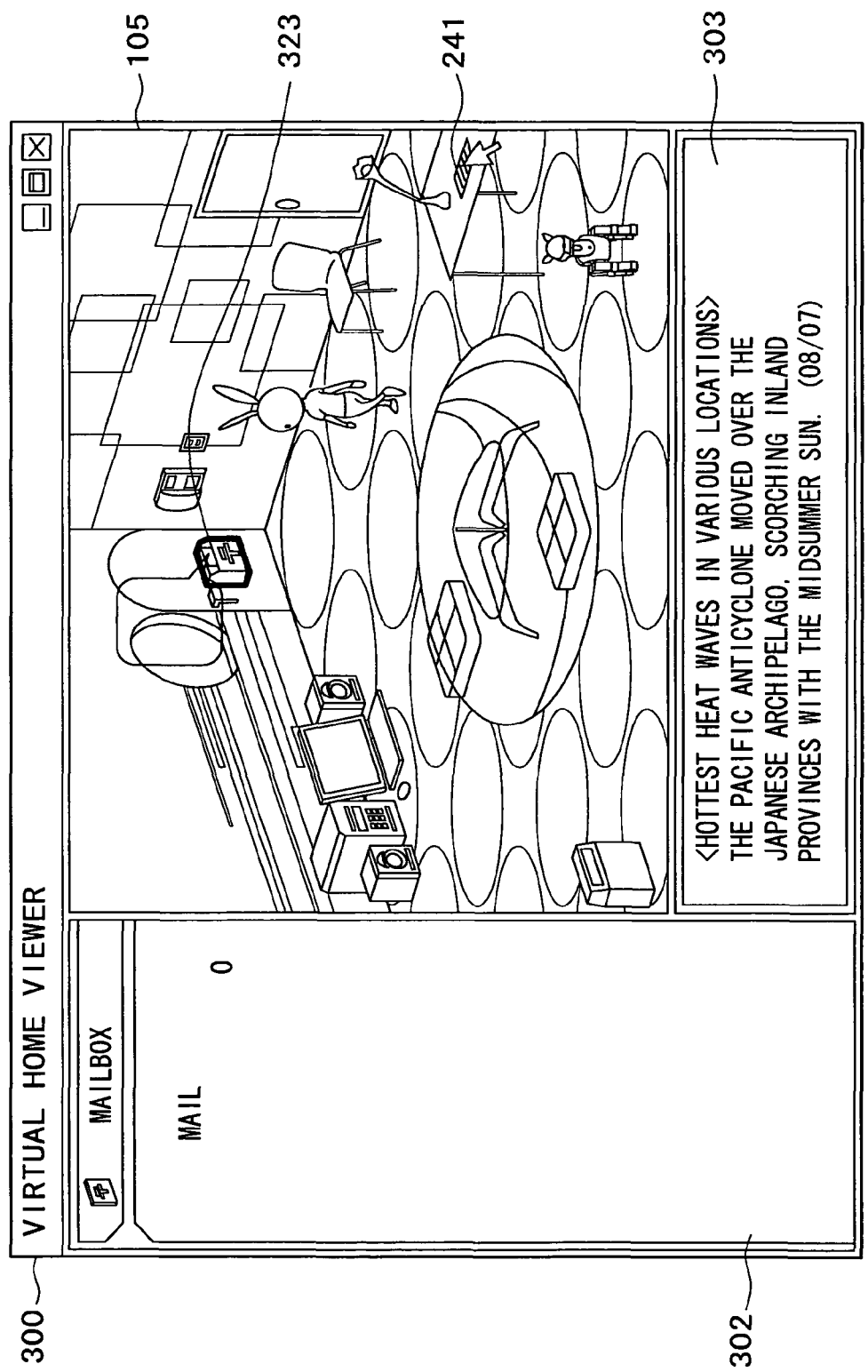
FIG. 101 illustrates an operation for arranging the item directly passed via the mailbox into the virtual room.

Further, when user B drags and drops the memo sheet icon 241 shown in the balloon 461 onto a desired place in the virtual room, the item (in this example, the memo sheet icon 241) passed through the mailbox can be arranged at a desired place in its original size in the virtual room as shown in FIG. 101.

Figure 102:
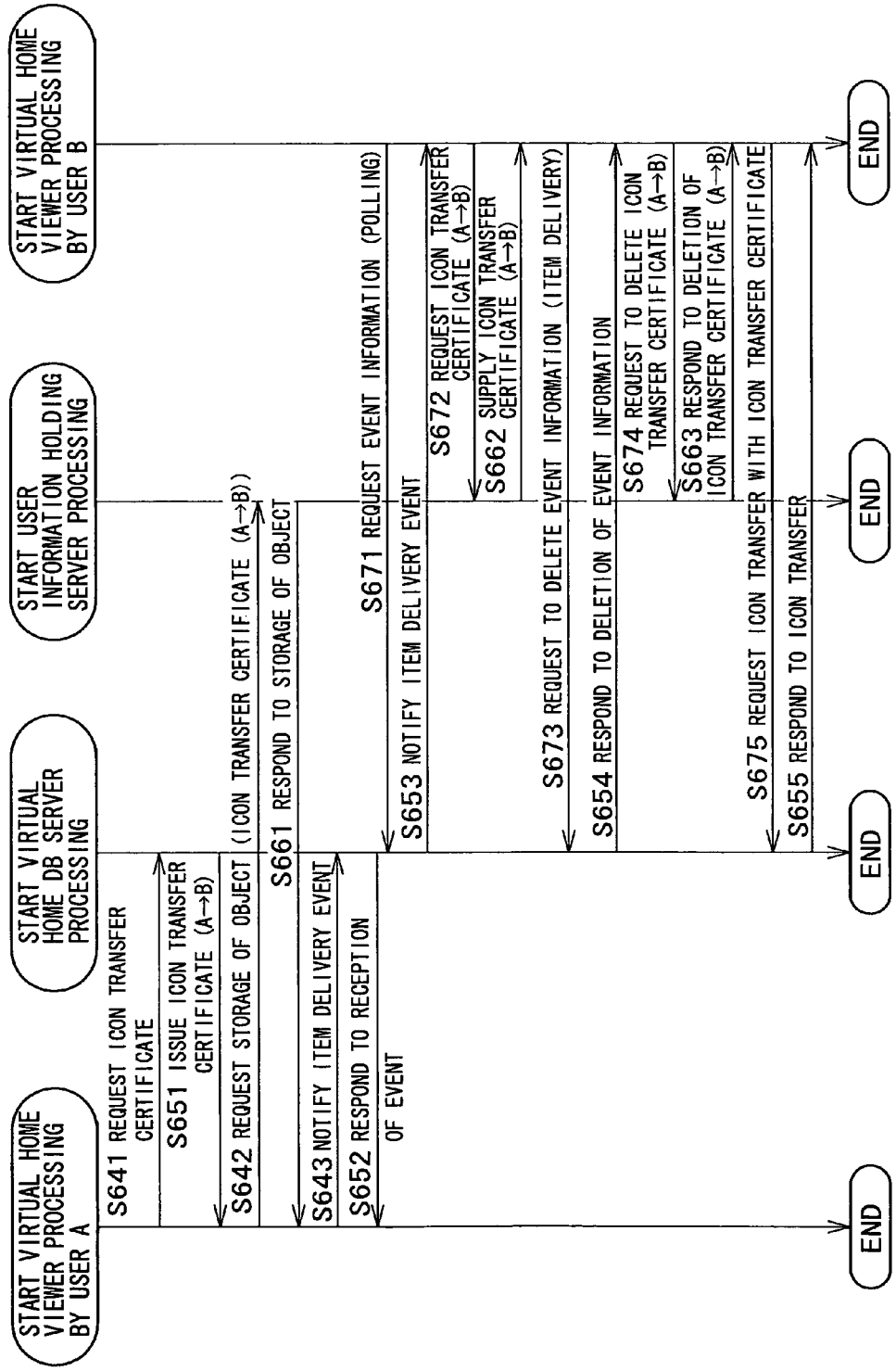
FIG. 102 is a flowchart for describing indirect ownership processing.

The following describes the ownership transfer processing in which an item (in this example, the memo sheet icon 241) is indirectly passed, with reference to the flowchart shown in FIG. 102. This indirect ownership transfer processing starts when the memo sheet icon 241 is dragged and dropped on the mailbox icon 323 outside the door on the screen of virtual home viewer A.

In step S641, virtual home viewer A requests the virtual home DB server 21 via the base station 4 and Internet 5 for the icon transfer certificate (A→B), which certifies the transfer of the ownership of the memo sheet icon 241 from user A to user B. In response to this request, in step S651, the virtual home DB server 21 issues the icon transfer certificate (A→B) to virtual home viewer A via the Internet 5.

In step S642, virtual home viewer A sends the icon transfer certificate (A→B) to the user information holding server 24 via the base station 4 and the Internet 5, thereby requesting for its storage as an object. In response to this request, in step S661, the user information holding server 24 sends the icon transfer certificate (A→B) and stores the certificate as an object, thereby notifying virtual home viewer A thereof via the Internet 5.

In step S643, virtual home viewer A notifies the virtual home DB server 21 via the base station 4 and the Internet 5 of an event information indicative that the item has been delivered to user B. In response to this notification, in step S652, the virtual home DB server 21 holds the event information indicative that the item has been delivered to user B and notifies virtual home viewer A thereof via the Internet 5.

On the other hand, if virtual home viewer B requests the virtual home DB server 21 via the Internet 5 for the event information as a periodical operation in step S671, then the virtual home DB server 21 sends the event information indicative that the item has been delivered to user B to virtual home viewer B via the Internet 5 in step S653. In response, on the screen of virtual home viewer B, as shown in FIG. 100, the external view of the mailbox icon 323 is changed to the state in which something is in the mailbox in the virtual room displayed on the main panel 301.

In step S672, virtual home viewer B requests the user information holding server 24 via the Internet 5 for icon transfer certificate (A→B) held in this server by user A. In response to this request, in step S662, the user information holding server 24 supplies the icon transfer certificate (A→B) to virtual home viewer B via the Internet 5.

In step S673, virtual home viewer B requests the virtual home DB server 21 via the Internet 5 for the deletion of the event information indicative that the item has been delivered to user B. In response to this request, in step S654, the virtual home DB server 21 deletes the event information indicative that the item has been delivered to user B.

In step S674, virtual home viewer B requests the user information holding server 24 via the Internet 5 to delete the icon transfer certificate (A→B), which is held in this server by user A. In response to this request, in step S663, the user information holding server 24 deletes the icon transfer certificate (A→B) and notifies virtual home viewer B thereof via the Internet 5.

In step S675, virtual home viewer B sends the icon transfer certificate (A→B) to the virtual home DB server 21 via the Internet 5 to request for the transfer of the ownership of the item (in this case, the memo sheet icon 241). In response to this request, in step S655, the virtual home DB server 21 transfers the ownership of the memo sheet icon 241 and notifies virtual home viewer B thereof via the Internet 5. This is the end of the description of the indirect ownership transfer processing.

Upon completion of the indirect ownership transfer processing, user B chooses the mailbox icon 323 in the virtual room displayed on the main panel 301 to pop up the balloon 461, by which user B can make confirmation of the delivered item.

Further, dragging and dropping the item (in this example, the memo sheet icon 241) shown in the popped up balloon 461 onto a desired place in the virtual room can arrange the delivered item in its original size at any desired place.

The following describes BGM (BackGround Music) sharing processing for reproducing same BGM between virtual home viewer A operated by user A and virtual home viewer B operated by user B with the mascot 321 (mascot B) of user B visiting the virtual room of user A for example. This BGM sharing processing uses the stream data of so-called Internet radio distributed by the audio server 26.

Figure 103:
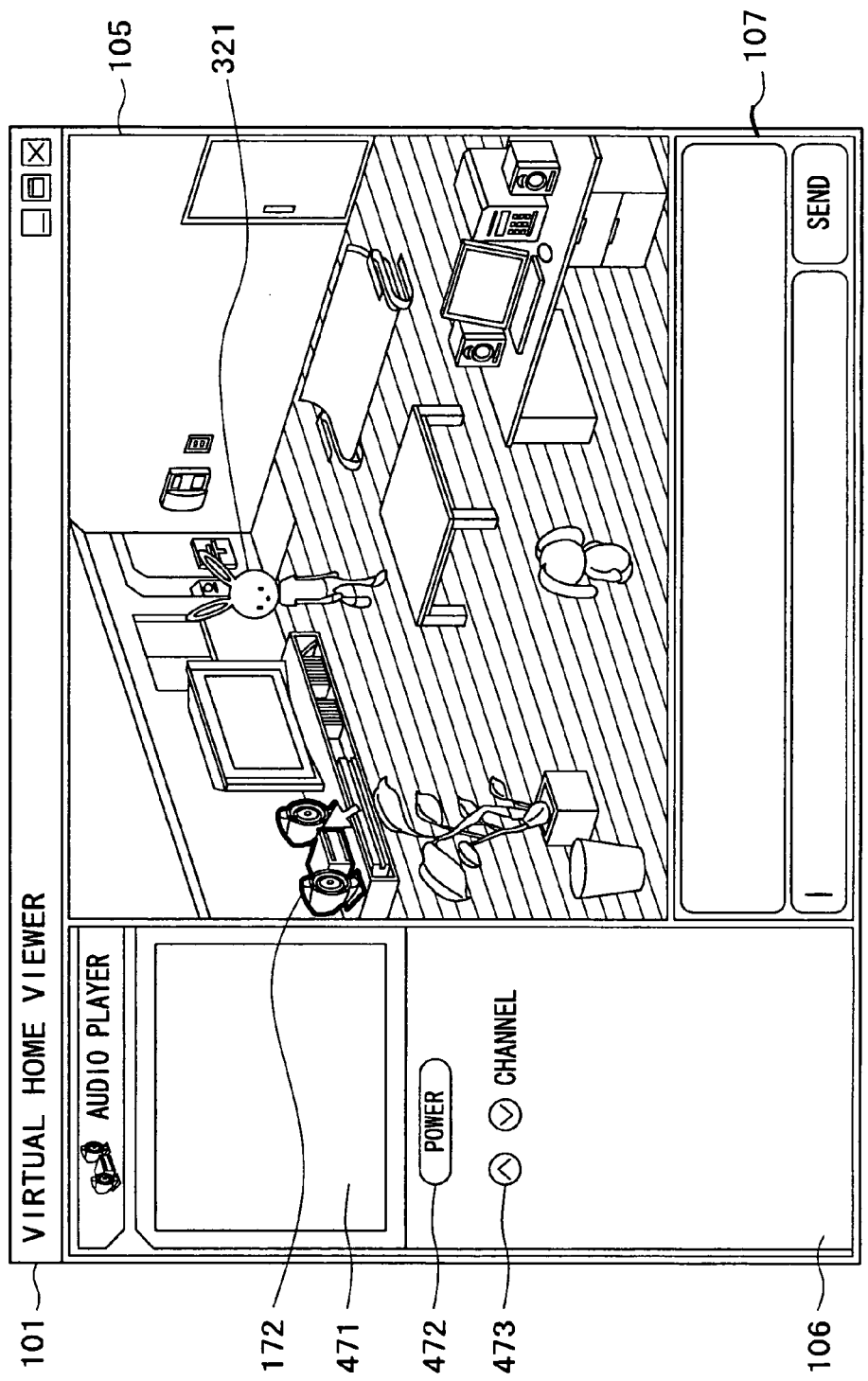
FIG. 103 illustrates an operation for Internet radio sharing processing.

Referring to FIG. 103, there is shown the screen of virtual home viewer A, in which the main panel 105 shows mascot B visiting the virtual room of user A. It should be noted that, although not shown, the same image is shown in the main panel 301 on the screen of virtual home viewer B.

When user A chooses the audio player icon 172 of the virtual room shown in the main panel 105, the control panel 106 displays, as the property of the audio player icon 172, an information display area 471 for displaying the information about the BGM being reproduced, "POWER" button 472, which is clicked to turn on/off the output of BGM, and "Channel" button 473, which is clicked to change BGM.

Figure 104:
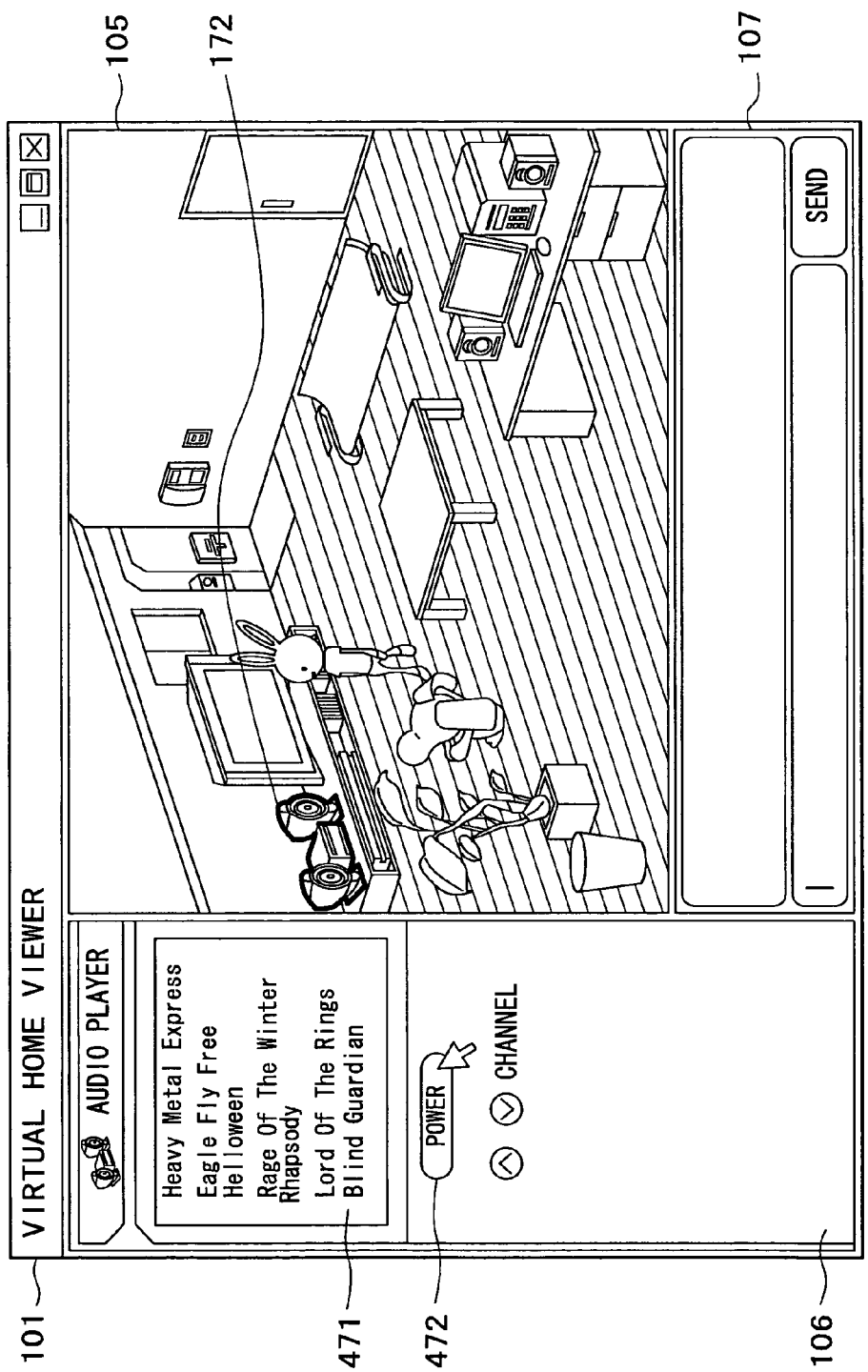
FIG. 104 illustrates an operation for Internet radio sharing processing.

Further, as shown in FIG. 104, when user A clicks the "POWER" button 472, the output of BGM is turned on, starting the reception and reproduction of the stream data distributed from the audio server 26. Likewise, in the virtual home viewer B, the reception and reproduction of the same stream data distributed from the audio server 26 are started.

Figure 105:
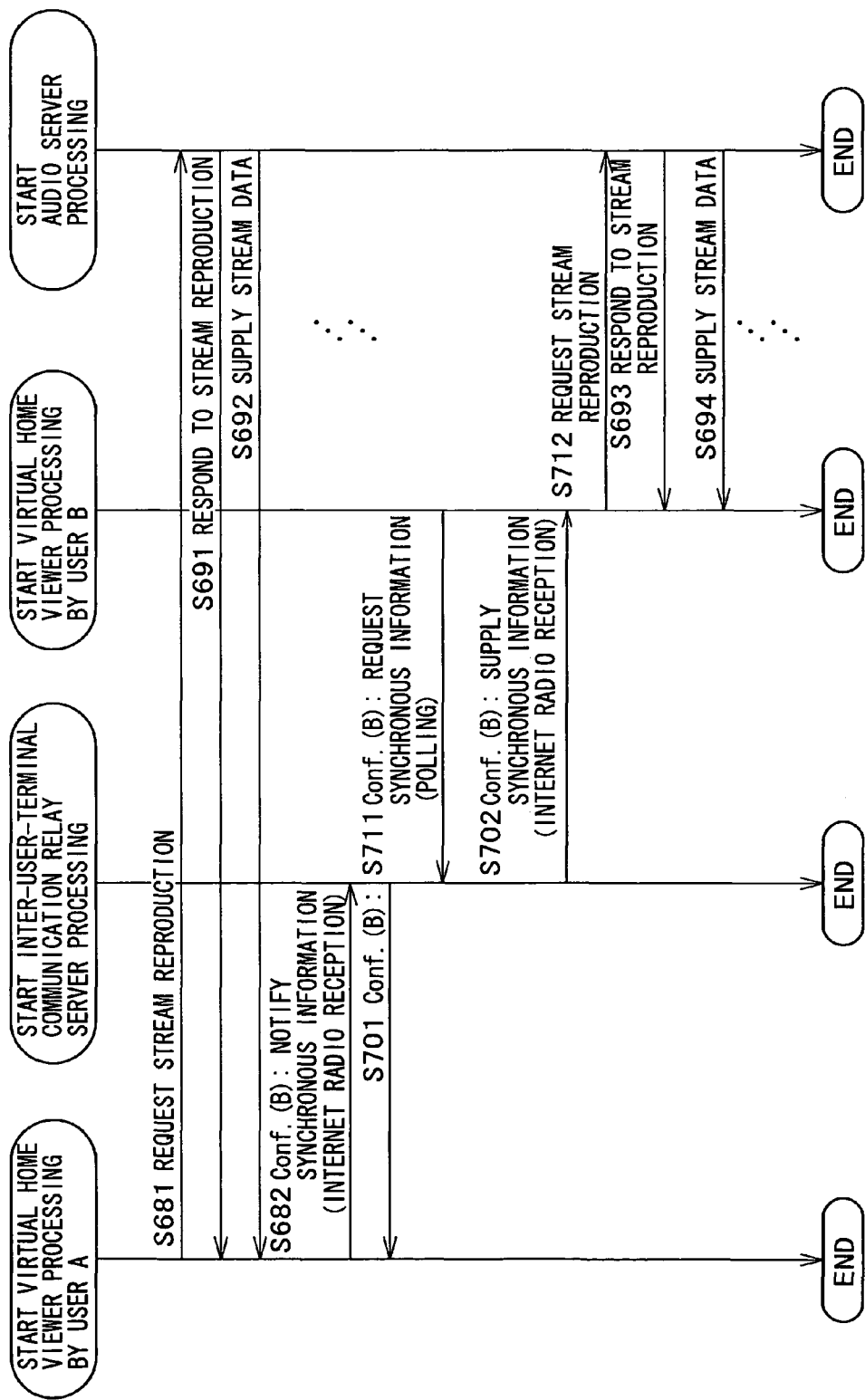
FIG. 105 is a flowchart for describing Internet radio sharing processing.

The following describes the BGM sharing processing, which is started upon clicking of the "POWER" button 472 by user A, with reference to the flowchart shown in FIG. 105.

In step S681, virtual home viewer A requests the audio server 26 via the base station 4 and the Internet 5 for stream reproduction (requests for the distribution of stream data). In step S691, the audio server 26 notifies virtual home viewer A via the Internet 5 and the base station 4 of the acknowledgement of this request and, in step S692, starts distributing the stream data to virtual home viewer A.

Consequently, virtual home viewer A starts reception and reproduction of the stream data and outputs BGM. In step S682, virtual home viewer A notifies the inter-user-terminal communication relay server 23 via the base station 4 and the Internet 5 of the turning-on of the output of BGM as the synchronous information of conference (B).

On the other hand, if, in step S711, virtual home viewer B requests the inter-user-terminal communication relay server 23 via the Internet 5 for the synchronous information of conference (B) as a periodical operation, then the inter-user-terminal communication relay server 23 notifies virtual home viewer B via the Internet 5 of the turning-on of the output of BGM as the synchronous information of conference (B) held at this point of time.

In response to this notification, in step S712, virtual home viewer B requests the audio server 26 via the Internet 5 for stream reproduction (requests for the distribution of stream data). In step S693, the audio server 26 notifies virtual home viewer B via the Internet 5 of the acknowledgement of this request and starts distributing the stream data to virtual home viewer B in step S694. Consequently, virtual home viewer B also starts reception and reproduction of the stream data and outputs BGM. This is the end of the description of the BGM sharing processing.

It should be noted that, in the BGM sharing processing, the music data accumulated in the equipment on the user side (for example, the PC 12) may be stream-distributed to virtual home viewer A or virtual home viewer B, rather than using the Internet radio stream data to be distributed by he audio server 26 on the service provider side.

The following describes image sharing processing for displaying the image data held by user A onto the screen of virtual home viewer A operated by user A and the screen of virtual home viewer B operated by user B with the mascot 321 (mascot B) of user B visiting the virtual room of user A, for example. This image sharing processing uses the image data managed by the photograph data transmission service 94, which is a functional block of the PC 12, for example.

Figure 106:
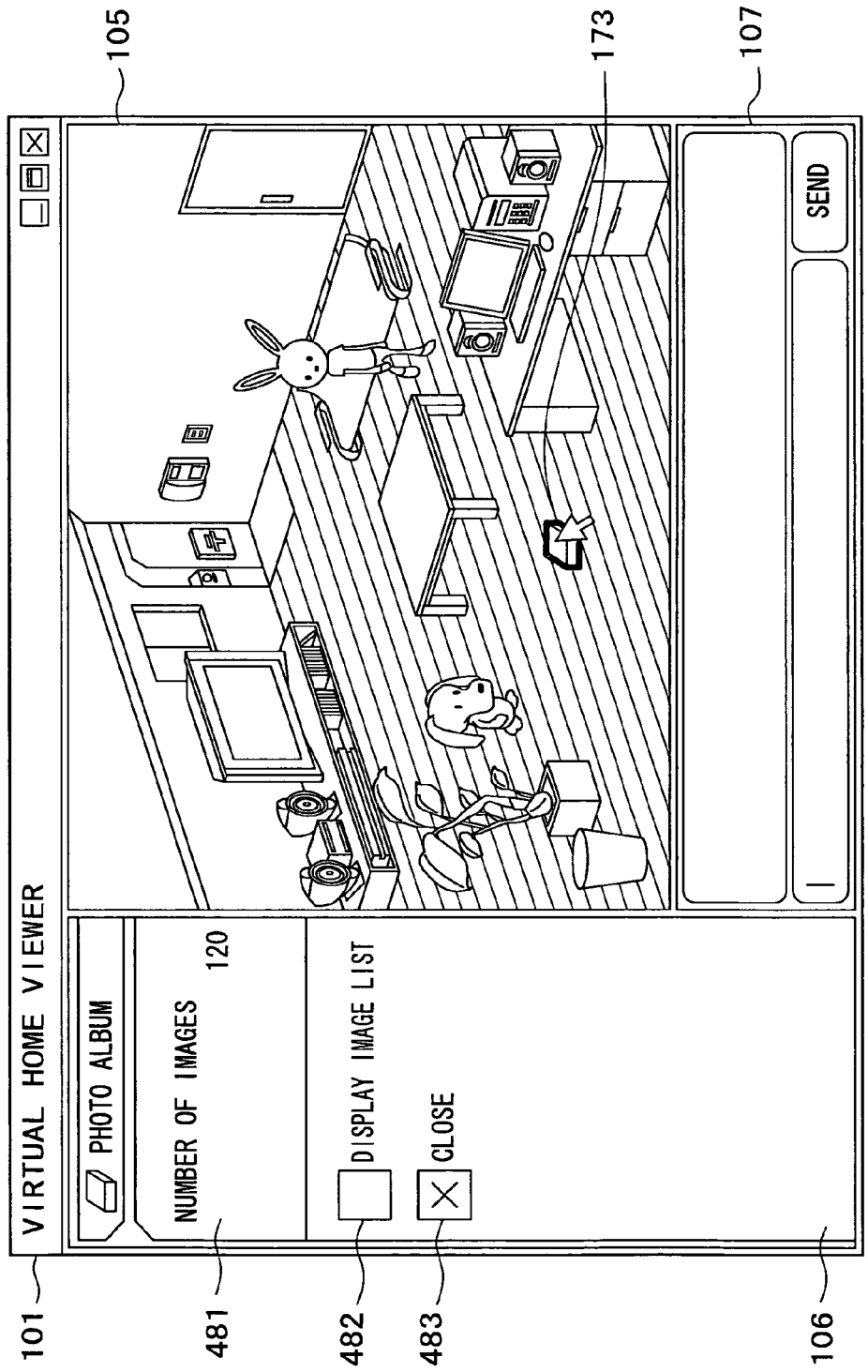
FIG. 106 illustrates an operation for image sharing processing.

Referring to FIG. 106, there is shown the screen of virtual home viewer A, in which the visiting of the virtual room of user A by mascot B is shown in the main panel 105. It should be noted that, although not shown, the same image is shown in the main panel 301 on the screen of virtual home viewer B.

When user A chooses the photo album icon 173 in the virtual room shown in the main panel 105, the control panel 106 displays, as the property of the photo album icon 173, an information display area 481 in which the information about image data is displayed, "Display Image List" button 482, which is clicked when displaying an image list including two or more reduced-size images onto the main panel 105, and "Close" button 483, which is clicked when returning the display of the main panel 105 from the image list to the virtual room.

Figure 107:
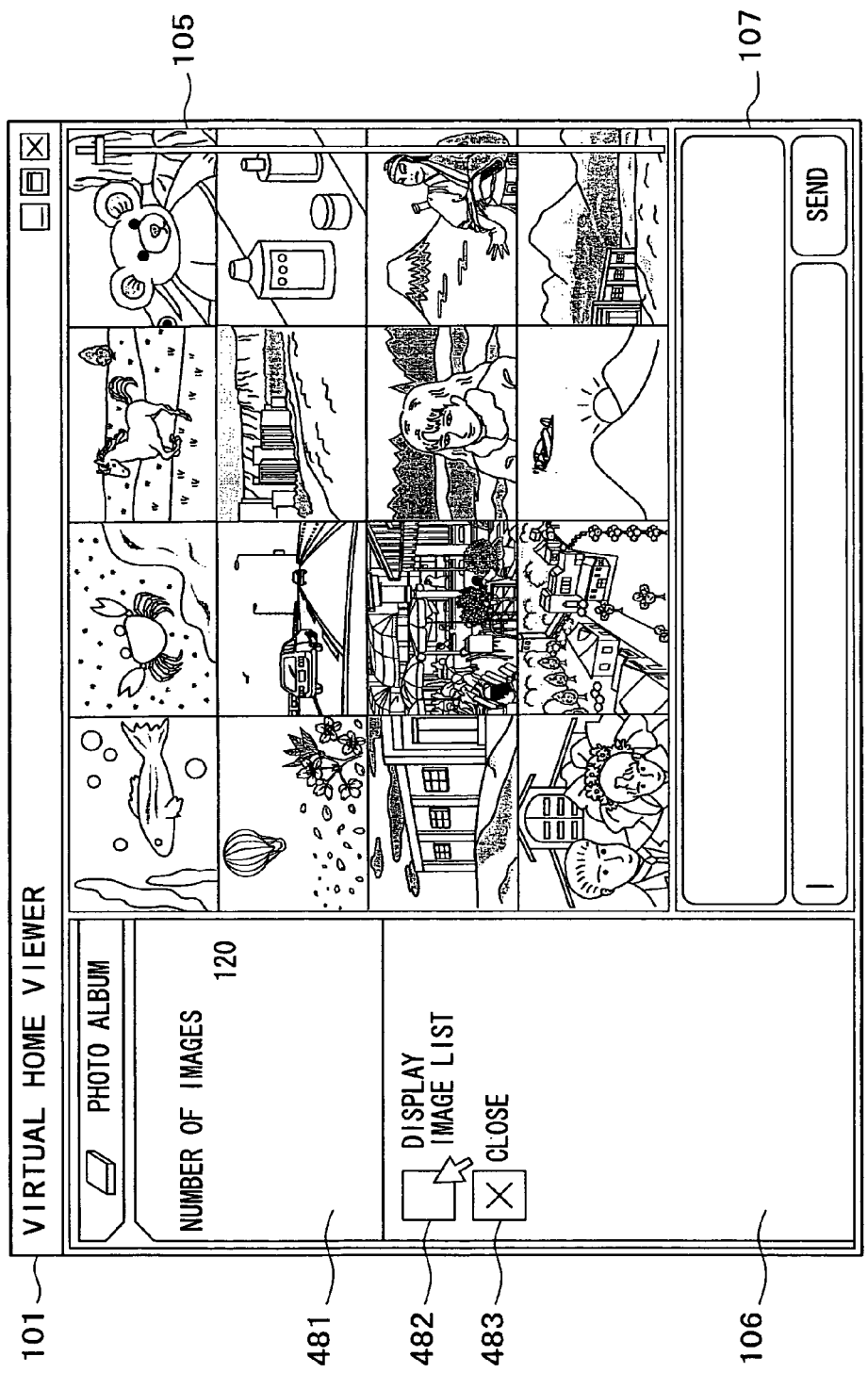
FIG. 107 illustrates an exemplary display at the time of image sharing processing.

If user A clicks the "Display Image List" button 482, the main panel 105 displays an image list including reduced-size images corresponding to the image data managed by the photograph data transmission service 94 as shown in FIG. 107.

Figure 108:
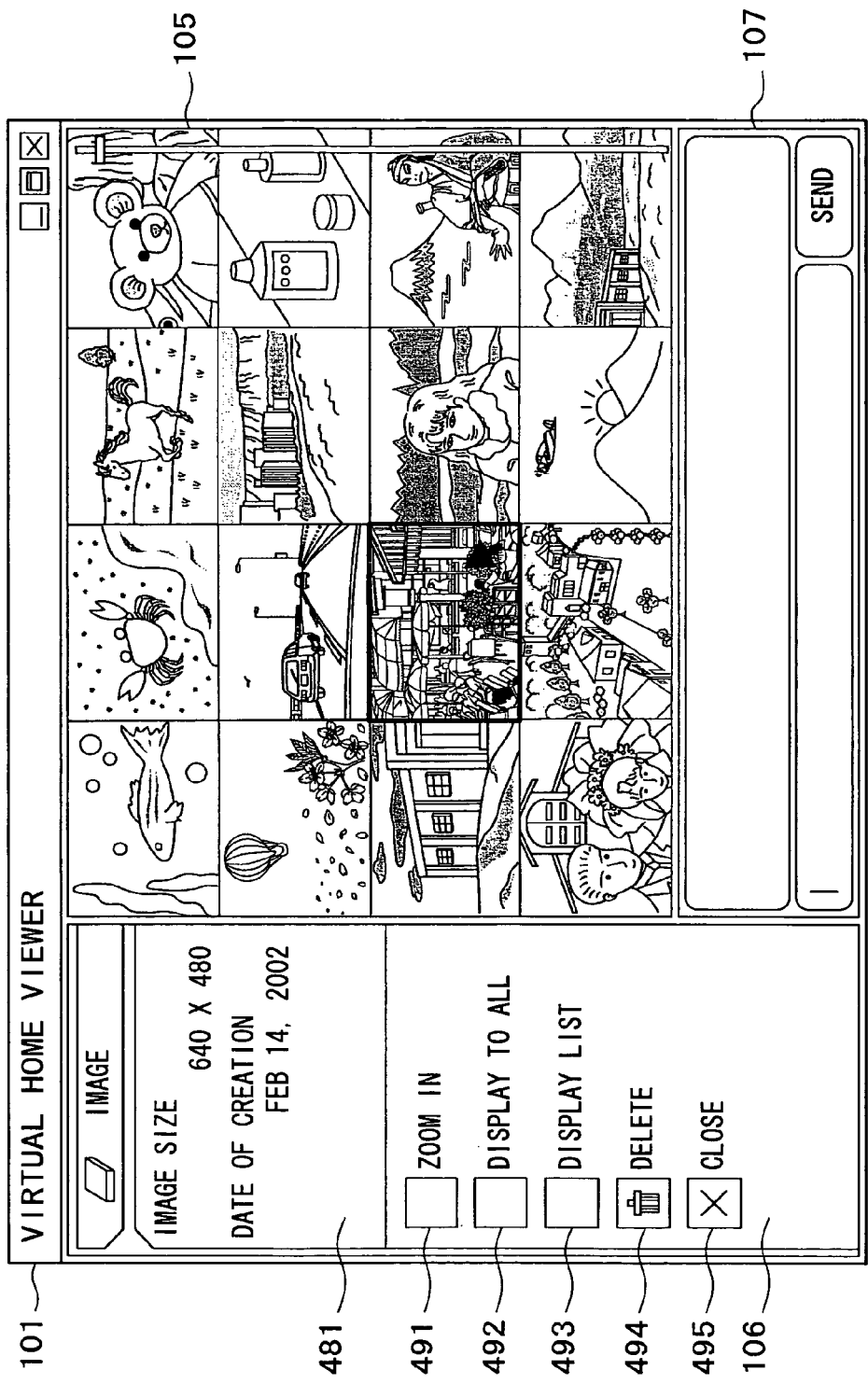
FIG. 108 illustrates an operation for image sharing processing.

When user A selects one of the images from the image list shown in the main panel 105, the information display area 481 displays the image size and date of creation of the selected reduced-size image as shown in FIG. 108.

The control panel 106 also displays "Zoom In" button 491 being clicked to zoom in a selected reduced-size image into the main panel 105, "Display to All" button 492 being clicked to share the image data of the selected reduced-size image to all users in the virtual room, "Display List" button 493 being clicked to return the display of the main panel 105 from the zoomed-in image to the image list, "Delete" button 494 being clicked to delete the selected reduced-size image from the image list, and "Close" button 495 being clicked to return the display of the main panel 105 from the image list to the virtual room.

Figure 109:
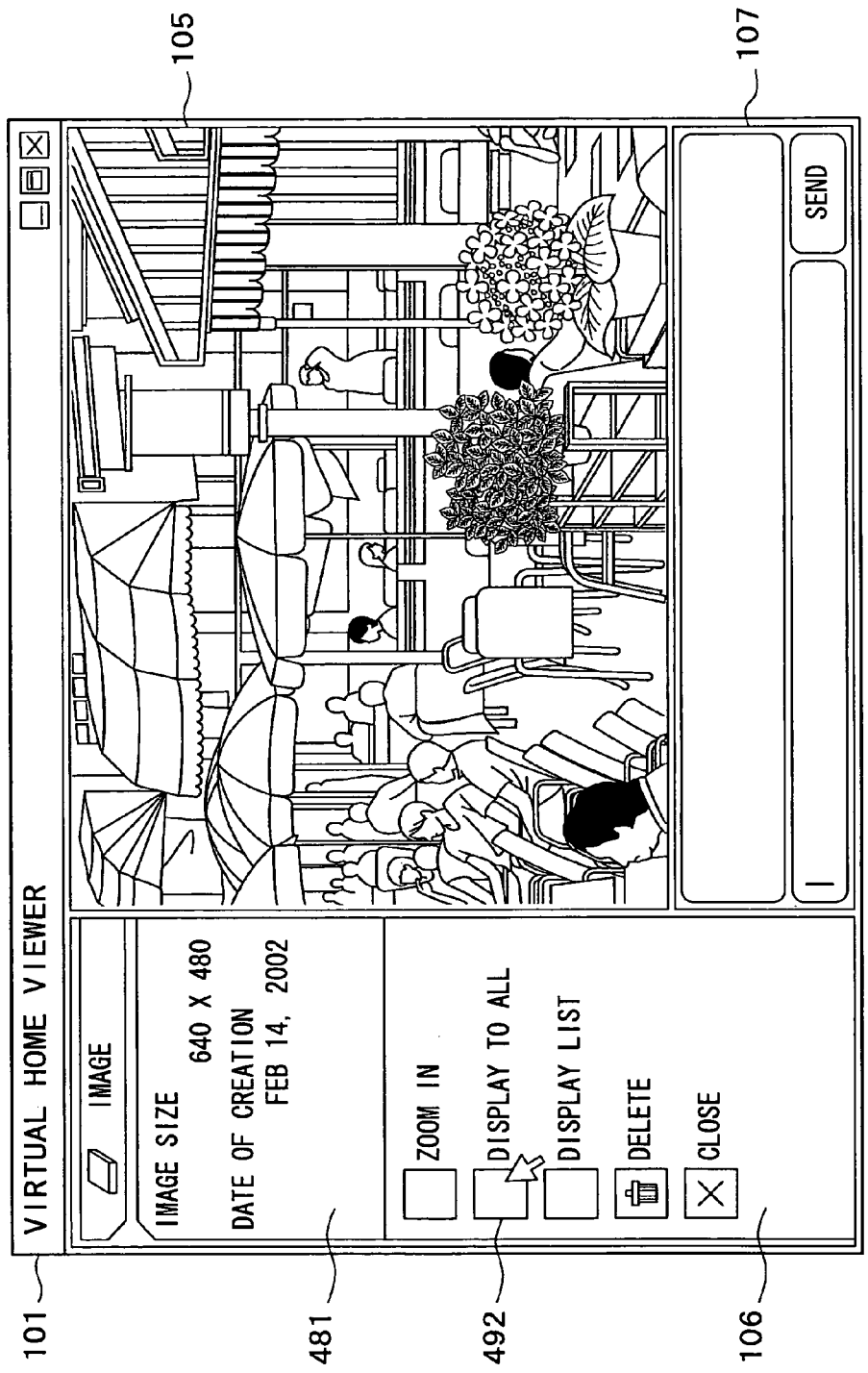
FIG. 109 illustrates an operation for image sharing processing.

If user A clicks the "Display to All" button 492, the selected reduced-size image is displayed in the main panel 105 as zoomed in as shown in FIG. 109 and the image data corresponding to the selected reduced-size image are supplied to the other user (in this example, user B).

Figure 110:
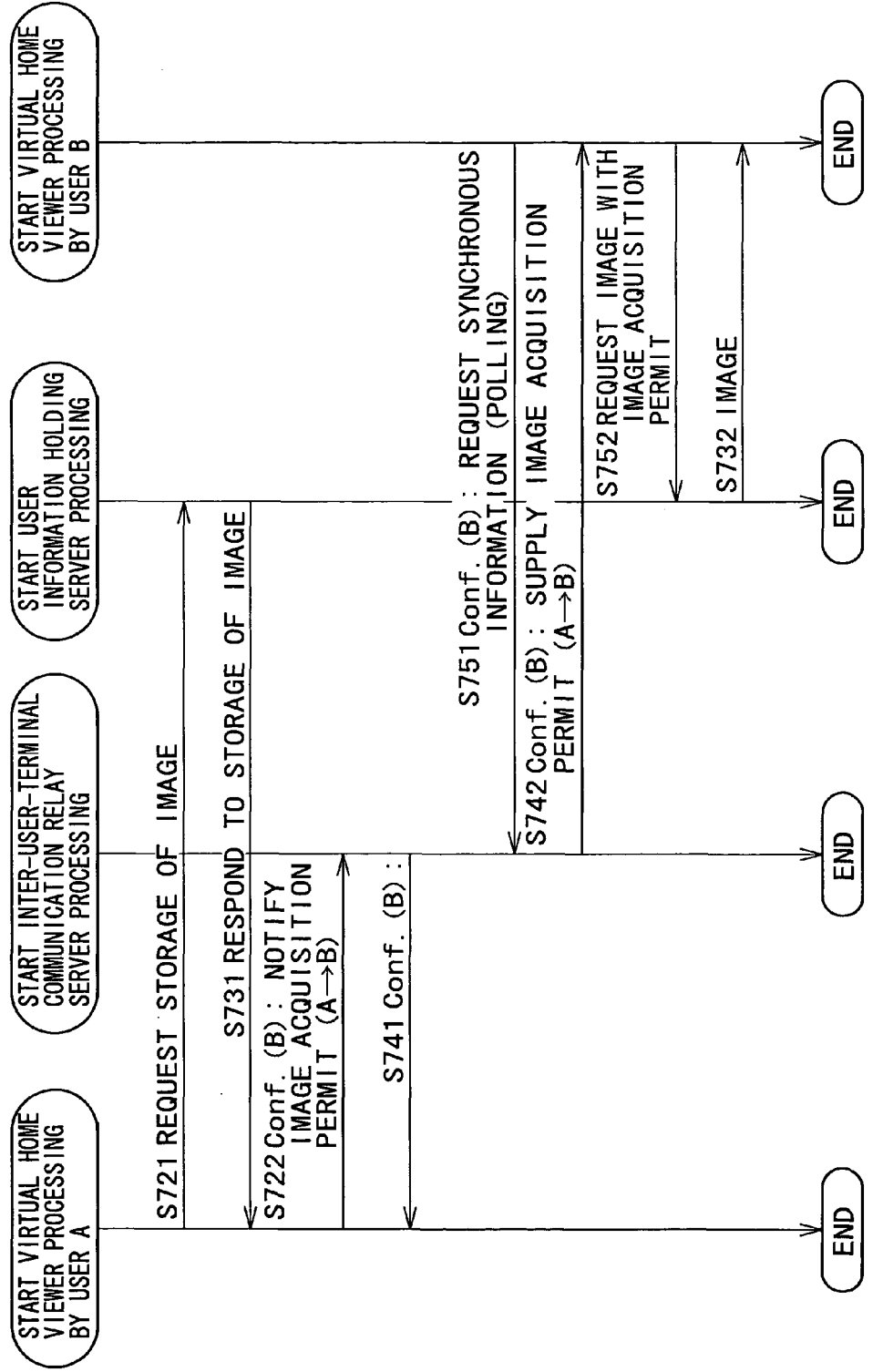
FIG. 110 is a flowchart for describing image sharing processing.

The following describes the image sharing processing being started by clicking the "Display to All" button 492, with reference to the flowchart shown in FIG. 110.

In step S721, virtual home viewer A sends the shared image data to the user information holding server 24 via the Internet 5, requesting for the storage of the sent data. In response to this request, in step S731, the user information holding server 24 holds the received shared image data and notifies virtual home viewer A thereof via the Internet 5.

In step S722, virtual home viewer A issues an image acquisition permit (A→B), which permits the sharing of the image data of user A with user B and sends the image acquisition permit (A→B), to the inter-user-terminal communication relay server 23 via the Internet 5 as the synchronous information of conference (B). In response, in step S741, the inter-user-terminal communication relay server 23 holds the received synchronous information and sends the synchronous information of conference (B) held at this point of time to virtual home viewer A via the Internet 5 (in this example, the synchronous information of conference (B) is not held, so that nothing is sent).

On the other hand, if virtual home viewer B requests the inter-user-terminal communication relay server 23 via the Internet 5 for the synchronous information of conference (B) as a periodical operation in step S751, then the inter-user-terminal communication relay server 23 sends the image acquisition permit (A→B) to virtual home viewer B via the Internet 5 as the synchronous information of conference (B) held at this point of time in step S742.

Figure 111:
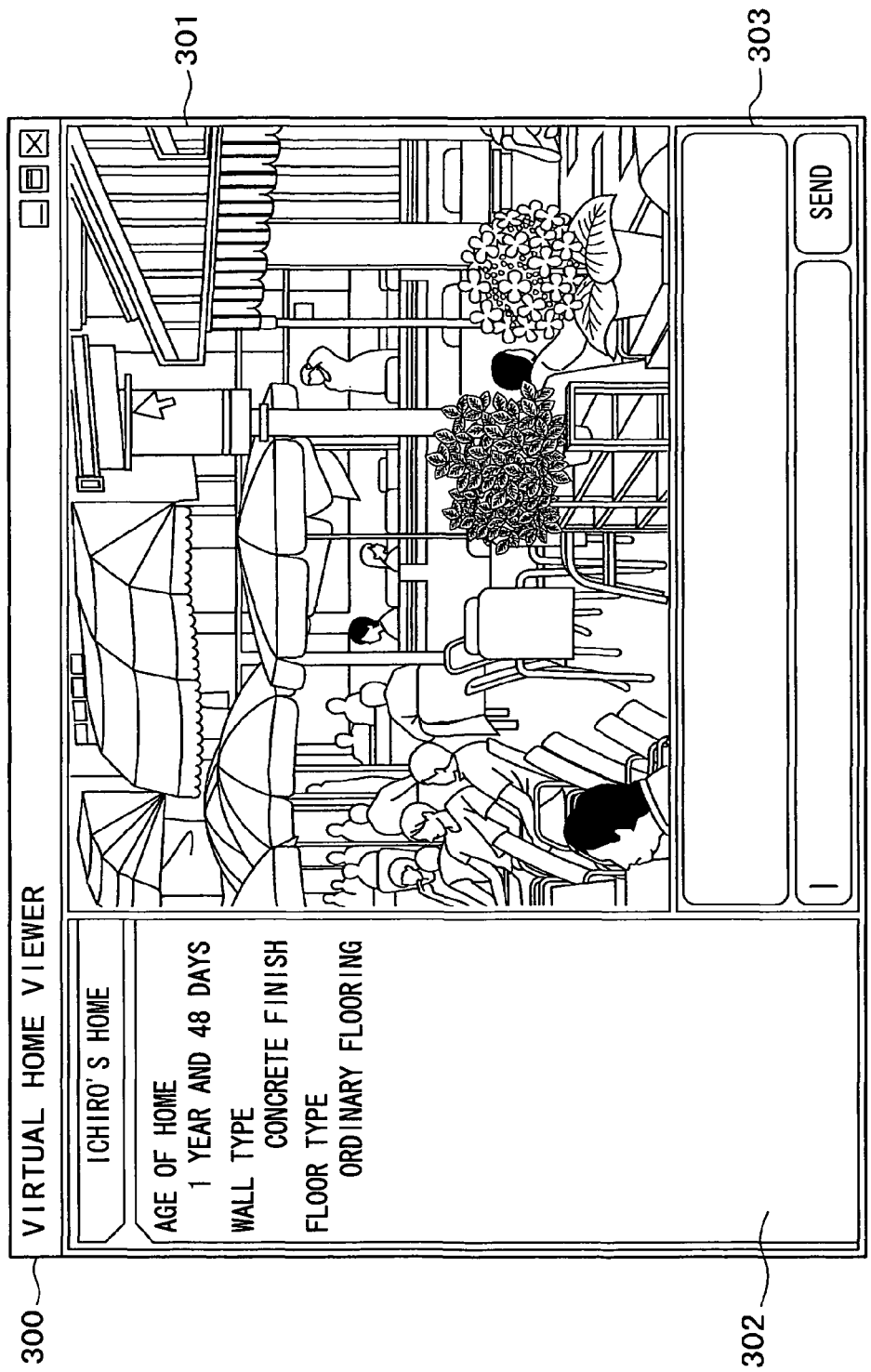
FIG. 111 illustrates an exemplary display of a shared image.

In step S752, virtual home viewer B sends the image acquisition permit (A→B) to the user information holding server 24 via the Internet 5, requesting for the supply of the image data. In response to this request, in step S732, the user information holding server 24 supplies the image data stored by the processing of step S731 to virtual home viewer B via the Internet 5. Virtual home viewer B displays the supplied image data in the main panel 301 as shown in FIG. 111. Consequently, the same image is displayed in both the main panel 105 of virtual home viewer A and the main panel 301 of virtual home viewer B. This is the end of the description of the image sharing processing.

It should be noted that, instead of holding the image data to be shared in the user information holding server 24, these image data may be held in the home server 11 to be supplied from the home server 11 to virtual home viewer B.

If user A clicks the "Display List" button 493 or the "Close" button 495 with the same image displayed in both the main panel 105 of virtual home viewer A and the main panel 301 of virtual home viewer B by the above-mentioned image sharing processing, image sharing end processing is executed, upon which the display of the main panel 301 of virtual home viewer B is returned to the virtual room of user A.

Figure 112:
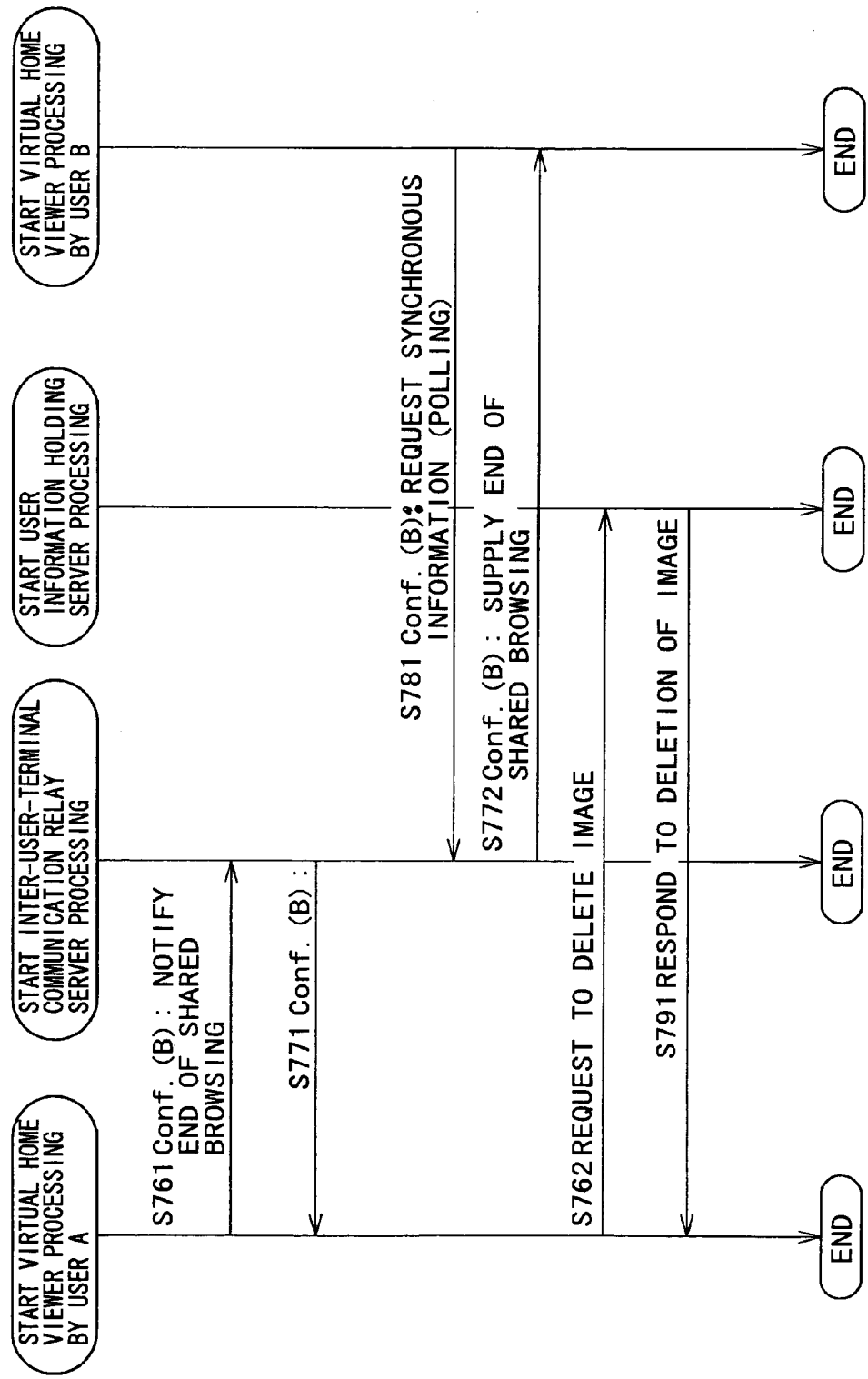
FIG. 112 is a flowchart for describing image sharing end processing.

The following describes this image sharing end processing with reference to the flowchart shown in FIG. 112. In step S761, virtual home viewer A notifies the inter-user-terminal communication relay server 23 via the Internet 5 of the end of browsing of shared image data as the synchronous information of conference (B). In response to this notification, in step S771, the inter-user-terminal communication relay server 23 holds the received synchronous information and sends the synchronous information of conference (B) held at this point of time to virtual home viewer A via the Internet 5 (in this example, the synchronous information of conference (B) is not held, so that nothing is sent).

On the other hand, if virtual home viewer B requests the inter-user-terminal communication relay server 23 for the synchronous information of conference (B) as a periodical operation in step S781, then the inter-user-terminal communication relay server 23 notifies virtual home viewer B of the end of shared browsing of the image data as the synchronous information of conference (B) held at this point of time in step S772. In response to this notification, virtual home viewer B returns the display of the main panel 301 to the virtual room of user A.

In step S762, virtual home viewer A requests the user information holding server 24 via the Internet 5 for the deletion of the image data held for shared use. In response to this request, in step S791, the user information holding server 24 deletes the image data stored therein and notifies virtual home viewer A thereof via the Internet 5. This is the end of the description of the image sharing end processing.

It should be noted that the same processing as the above-mentioned image sharing processing and image sharing end processing allows the sharing of content data (for example, audio data) other than image data, the sharing between user A and user B, or the dissolving of this sharing.

As described and according to the virtual space remote control system associated with the present invention, not only controlling the household electrical appliances connected to the home network by the entertainment-oriented GUI such as the virtual room, but also utilizing the content data hold in the household electrical appliance, which is connected to the home network, at a remote location, exchanging the realtime message with the other user (namely telephone chat and interphone chat), sharing the virtual room with plural users, and sharing the content data only with restricted users who share the virtual room can be performed.

As described above, the entertainment-oriented and communication-oriented GUI can increase the number of users who use the virtual space remote control system according to the invention. These features of the invention can also increase the frequency of usage of the virtual space remote control system according to the invention.

If, in order to increase in the number of icons arranged in the virtual room, the user purchases electronic devices and connect the devices to the home network, it results in the increase in the number of devices, which can be controlled by the virtual home viewer. This creates a positive spiral that the increased frequency of use in turn increases the number of electronic devices.

Use of the capabilities of visiting the virtual rooms of other users allows the establishment of a model room for advertising the features of network devices and network devices themselves. Also, use of chats in this model room allows the advertisement of commercial products.

The steps herein for describing the program recorded to the recording medium includes not only the processing operations being executed in a time-dependent manner in accordance with the described sequence, but also processing operations being executed not always in a time-dependent manner but in a parallel or discrete manner.

Term "system" as used herein denotes an entire apparatus based on a plurality of component units.

Industrial Applicability

As described and according to the present invention, the electrical household appliances connected to a home network can be controlled by use of the entertainment-oriented user interface called a virtual space and deeper communication can be achieved between users in which a private virtual space is shared only by restricted member users to simultaneously share content data.

The invention claimed is:

1. An information processing system, comprising:
   a service providing apparatus; and
   a plurality of information processing apparatuses connected to said service providing apparatus via a first network which is public, wherein the plurality of information processing apparatuses include first and second information processing apparatuses of respective first and second users, wherein
   said service providing apparatus includes
      authentication means for authenticating the connection of said service providing apparatus to said first information processing apparatus, via said first network, on the basis of identification information sent from said first information processing apparatus;
      providing means for providing a private virtual space service to the first information processing apparatus of the first user;
      sharing means for making the second information processing apparatus of the second user share said private virtual space service being provided to said first information processing apparatus of said first user; and
      common-use means for providing common use of streaming content data, held in an electronic device connected to a second network, among the first and second information processing apparatuses;
   when the streaming content data is being provided to the private virtual space provided to the first information processing apparatus of the first user in response to a request for the streaming content data from the first information processing apparatus of the first user, the streaming content data is provided to the second information processing apparatus only when the second information processing apparatus shares the private virtual space provided to the first information processing apparatus of the first user, the streaming content data being selected by the first user from a plurality of different content data and being separate from data representing the private virtual space;
   the common-use means notifies the second information processing apparatus of the request for the streaming content data by the first information processing apparatus; and
   the second information processing apparatus requests the same streaming content data from the electronic apparatus in response to the notification from the common-use means.

2. The information processing system according to claim 1, wherein said identification information includes a personal ID and password of said first user and a device ID and a password of said first information processing apparatus.

3. The information processing system according to claim 1, wherein said common-use means acquires said streaming content data from said electronic device via said first and second networks in accordance with an instruction by said first information processing apparatus.

4. The information processing system according to claim 1, wherein said first and second information processing apparatuses further comprise:
   acquisition means for acquiring said streaming content data from said electronic device via said first and second networks.

5. The information processing system according to claim 1, wherein said streaming content data are audio data, video data, or program data.

6. The information processing system according to claim 1, wherein said first information processing apparatus further comprises:
   control means for controlling the electronic device connected to the second network in accordance with an operation performed by said first user on an icon arranged in said private virtual space, said icon corresponding to said electronic device.

7. A service providing apparatus for providing a private virtual space service to each of a plurality of information processing apparatuses on a first network which is public, wherein the plurality of information processing apparatuses include first and second information processing apparatuses of respective first and second users, the service providing apparatus comprising:
   authentication means for authenticating the connection of said service providing apparatus to said first information processing apparatus, via said first network, on the basis of identification information sent from said first information processing apparatus;
   providing means for providing the private virtual space service to said first information processing apparatus of the first user;
   sharing means for making the second information processing apparatus of the second user share said private virtual space service being provided to said first information processing apparatus of said first user; and
   common-use means for providing common use of streaming content data, held in an electronic device connected to a second network, among the first and second information processing apparatuses, wherein, when the streaming content data is being provided to the private virtual space provided to the first information processing apparatus of the first user in response to a request for the streaming content data from the first information processing apparatus of the first user, the streaming content data is provided to the second information processing apparatus only when the second information processing apparatus shares the private virtual space provided to the first information processing apparatus of the first user, the streaming content data being selected by the first user from a plurality of different content data and being separate from data representing the private virtual space, the common-use means notifies the second information processing apparatus of the request for the streaming content data by the first information processing apparatus; and the second information processing apparatus requests the same streaming content data from the electronic apparatus in response to the notification from the common-use means.

8. The service providing apparatus according to claim 7, wherein said identification information includes a personal ID and a password of said first user and a device ID and a password of said first information processing apparatus.

9. The service providing apparatus according to claim 7, wherein said common-use means acquires said streaming content data from said electronic device via said first and second networks in accordance with an instruction given by said first information processing apparatus.

10. The service providing apparatus according to claim 7, wherein said streaming content data are audio data, video data, or program data.

11. A service providing method for providing a private virtual space service to each of a plurality of information processing apparatuses on a first network which is public, wherein the plurality of information processing apparatuses include first and second information processing apparatuses of respective first and second users, the method comprising:
   authenticating connection of a service providing apparatus to said first information processing apparatus, via said first network, on the basis of identification information sent from said first information processing apparatus;
   providing the private virtual space service to said first information processing apparatus of the first user;
   making the second information processing apparatus of the second user share said private virtual space service being provided to said first information processing apparatus of said first user; and
   providing common use of streaming content data, held in an electronic device connected to a second network, among the first and second information processing apparatuses of the respective first and second users, wherein,
   when the streaming content data is being provided to the private virtual space provided to the first information processing apparatus of the first user in response to a request for the streaming content data from the first information processing apparatus of the first user, the streaming content data is provided to the second information processing apparatus only when the second information processing apparatus shares the private virtual space provided to the first information processing apparatus of the first user, the streaming content data being selected by the first user from a plurality of different content data and being separate from data representing the private virtual space,
   said providing common use step notifies the second information processing apparatus of the request for the streaming content data by the first information processing apparatus; and
   the second information processing apparatus requests the same streaming content data from the electronic apparatus in response to the notification by the providing common use step.

12. A non-transitory computer-readable storage medium storing a computer-readable program, which when executed by a computer, causes the computer to perform a method of providing a private virtual space service to each of a plurality of information processing apparatuses on a first network which is public, wherein the plurality of information processing apparatuses include first and second information processing apparatuses of respective first and second users, said method comprising:
   authenticating connection of a service providing apparatus to said first information processing apparatus, via said first network, on the basis of identification information sent from said first information processing apparatus;
   providing said private virtual space service to said first information processing apparatus of the first user;
   making the second information processing apparatus of the second user share said private virtual space service being provided to said first information processing apparatus of said first user; and
   providing common use of streaming content data, held in an electronic device connected to a second network, among the first and second information processing apparatuses of the respective first and second users, wherein,
   when the streaming content data is being provided to the private virtual space provided to the first information processing apparatus of the first user in response to a request for the streaming content data from the first information processing apparatus of the first user, the streaming content data is provided to the second information processing apparatus only when the second information processing apparatus shares the private virtual space provided to the first information processing apparatus of the first user, the streaming content data being selected by the first user from a plurality of different content data and being separate from data representing the private virtual space,
   said providing common use step notifies the second information processing apparatus of the request for the streaming content data by the first information processing apparatus; and
   the second information processing apparatus requests the same streaming content data from the electronic apparatus in response to the notification by the providing common use step.

13. A system for providing a private virtual space service to each of a plurality of information processing apparatuses on a first network which is public, wherein the plurality of information processing apparatuses include first and second information processing apparatuses of respective first and second users, said system comprising:
   a processor operable to execute instructions, the instructions including:
      authenticating connection of a service providing apparatus to said first information processing apparatus, via said first network, on the basis of identification information sent from said first information processing apparatus;
      providing the private virtual space service to said first information processing apparatus of said first user;

making the second information processing apparatus of the second user share said private virtual space service being provided to said first information processing apparatus of said first user; and providing common-use of streaming content data, held in an electronic device connected to a second network, among the first and second information processing apparatuses of the respective first and second users, wherein, when the streaming content data is being provided to the private virtual space provided to the first information processing apparatus of the first user in response to a request for the streaming content data from the first information processing apparatus of the first user, the streaming content data is provided to the second information processing apparatus only when the second information processing apparatus shares the private virtual space provided to the first information processing apparatus of the first user, the streaming content data being selected by the first user from a plurality of different content data and being separate from data representing the private virtual space, wherein the providing common-use instruction notifies the second information processing apparatus of the request for the streaming content data by the first information processing apparatus; and the second information processing apparatus requests the same streaming content data from the electronic apparatus in response to the notification by the providing common-use instruction.

14. The system according to claim 13, wherein said identification information includes a personal ID and a password of said first user and a device ID and a password of said first information processing apparatus.

15. The system according to claim 13, wherein said providing common-use instruction acquires said streaming content data from said electronic device via said first and second networks in accordance with an instruction by said first information processing apparatus.

16. The system according to claim 13, wherein said streaming content data are audio data, video data, or program data.

17. An information processing apparatus that receives a private virtual space service from a service providing apparatus via a first network, which is public, comprising:
   transmission means for transmitting identification information by accessing said service providing apparatus via said first network;
   display control means for controlling the display of a private virtual space provided from said service providing apparatus to a first terminal apparatus of a first user; and
   sharing means for making a second terminal apparatus of a second user share said private virtual space provided by said service providing apparatus, and for providing common use of streaming content data, held in an electronic device connected to a second network, among the first terminal apparatus and the second terminal apparatus, wherein, when the streaming content data is being provided to the private virtual space provided to the first terminal apparatus of the first user in response to a request for the streaming content data from the first terminal apparatus of the first user, the streaming content data is provided to the second terminal apparatus only when the second terminal apparatus shares the private virtual space provided to the first terminal apparatus of the first user, the streaming content data being selected by the first user from a plurality of different content data and being separate from data representing the private virtual space, wherein the sharing means notifies the second terminal apparatus of the request for the streaming content data by the first terminal apparatus; and the second terminal apparatus requests the same streaming content data from the electronic apparatus in response to the notification from the sharing means.

18. The information processing apparatus according to claim 17, wherein said identification information includes a personal ID and a password of said first user and a device ID and a password of said first terminal apparatus.

19. The information processing apparatus according to claim 17, further comprising:
   acquisition means for acquiring said streaming content data from said electronic device via said first and second networks.

20. The information processing apparatus according to claim 17, wherein said streaming content data are audio data, video data, or program data.

21. The information processing apparatus according to claim 17, further comprising:
   control means for controlling the electronic device connected to the second network in accordance with an operation performed by said first user on an icon arranged in said private virtual space, said icon corresponding to said electronic device.

22. An information processing method that receives a private virtual space service from a service providing apparatus via a first network, which is public, comprising:
   transmitting identification information by accessing said service providing apparatus via said first network;
   controlling the display of a private virtual space provided from said service providing apparatus to a first terminal apparatus of a first user;
   making a second terminal apparatus of a second user share said private virtual space provided by said service providing apparatus to the first user; and
   providing common use of streaming content data, held in an electronic device connected to a second network, among the first terminal apparatus and the second terminal apparatus, wherein, when the streaming content data is being provided to the private virtual space provided to the first terminal apparatus of the first user in response to a request for the streaming content data from the first terminal apparatus of the first user, the streaming content data is provided to the second terminal apparatus only when the second terminal apparatus shares the private virtual space provided to the first terminal apparatus of the first user, the streaming content data being selected by the first user from a plurality of different content data and being separate from data representing the private virtual space, wherein the providing common use step notifies the second terminal apparatus of the request for the streaming content data by the first terminal apparatus; and the second terminal apparatus requests the same streaming content data from the electronic apparatus in response to the notification by the providing common use step.

23. A non-transitory computer-readable storage medium storing a computer-readable program, which when executed by a computer, causes the computer to perform a method of receiving a private virtual space service from a service providing apparatus via a first network, which is public, said method comprising:

transmitting identification information by accessing said service providing apparatus via said first network;

controlling the display of a private virtual space provided from said service providing apparatus to a first terminal apparatus of a first user;

making a second terminal apparatus of a second user share said private virtual space provided by said service providing apparatus to the first user; and providing common use of streaming content data, held in an electronic device connected to a second network, among the first terminal apparatus and the second terminal apparatus, wherein, when the streaming content data is being provided to the private virtual space provided to the first terminal apparatus of the first user in response to a request for the streaming content data from the first terminal apparatus of the first user, the streaming content data is provided to the second terminal apparatus only when the second terminal apparatus shares the private virtual space provided to the first terminal apparatus of the first user, the streaming content data being selected by the first user from a plurality of different content data and being separate from data representing the private virtual space, wherein the providing common use step notifies the second terminal apparatus of the request for the streaming content data by the first terminal apparatus; and the second terminal apparatus requests the same streaming content data from the electronic apparatus in response to the notification by the providing common use step.

24. A system for receiving a private virtual space service from a service providing apparatus via a first network, which is public, said system comprising:

a processor operable to execute instructions, the instructions including:

transmitting identification information by accessing said service providing apparatus via said first network;

controlling the display of a private virtual space provided from said service providing apparatus to a first terminal apparatus of a first user;

making a second terminal apparatus of a second user share said private virtual space provided by said service providing apparatus to the first user; and providing common use of streaming content data, held in an electronic device connected to a second network, among the first terminal apparatus and the second terminal apparatus, wherein, when the streaming content data is being provided to the private virtual space provided to the first terminal apparatus of the first user in response to a request for the streaming content data from the first terminal apparatus of the first user, the streaming content data is provided to the second terminal apparatus only when the second terminal apparatus shares the private virtual space provided to the first terminal apparatus of the first user, the streaming content data being selected by the first user from a plurality of different content data and being separate from data representing the private virtual space, wherein the providing common use instruction notifies the second terminal apparatus of the request for the streaming content data by the first terminal apparatus; and the second terminal apparatus requests the same streaming content data from the electronic apparatus in response to the notification by the providing common use instruction.

25. The system according to claim 24, wherein said identification information includes a personal ID and a password of said first user and a device ID and a password of said first terminal apparatus.

26. The system according to claim 24, wherein the instructions further include:

acquiring said streaming content data from said electronic device via said first and second networks.

27. The system according to claim 24, wherein said streaming content data are audio data, video data, or program data.

28. The system according to claim 24, wherein the instructions further include:

controlling the electronic device connected to the second network in accordance with an operation performed by said first user on an icon arranged in said private virtual space, said icon corresponding to said electronic device.

29. The information processing system according to claim 1, wherein the streaming content data is background music.

* * * * *